(12) United States Patent (10) Patent No.: US 8,654,195 B2
Ishiyama et al. (45) Date of Patent: Feb. 18, 2014

(54) DISTANCE MEASURING APPARATUS, DISTANCE MEASURING METHOD, DISTANCE MEASURING PROGRAM, DISTANCE MEASURING SYSTEM, AND IMAGE PICKUP APPARATUS

(75) Inventors: Eiji Ishiyama, Saitama (JP); Tomonori Masuda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 7 days.

(21) Appl. No.: 13/509,574

(22) PCT Filed: Oct. 26, 2010

(86) PCT No.: PCT/JP2010/068933
§ 371 (c)(1),
(2), (4) Date: May 11, 2012

(87) PCT Pub. No.: WO2011/058876
PCT Pub. Date: May 19, 2011

(65) Prior Publication Data
US 2012/0229628 A1    Sep. 13, 2012

(30) Foreign Application Priority Data

Nov. 13, 2009  (JP) ................................ 2009-260251
Nov. 16, 2009  (JP) ................................ 2009-261049
May 6, 2010    (JP) ................................ 2010-106441

(51) Int. Cl.
*H04N 7/18* (2006.01)
(52) U.S. Cl.
USPC .......................................... 348/135; 356/601
(58) Field of Classification Search
USPC ................ 356/12, 22; 396/61–67, 80–152;
702/85–199; 348/135; 235/414;
382/106, 154, 285
See application file for complete search history.

(56) References Cited

U.S. PATENT DOCUMENTS 6,542,249 B1 * 4/2003 Kofman et al. ............... 356/601
2002/0080259 A1   6/2002 Izumi
(Continued)

FOREIGN PATENT DOCUMENTS

DE    101 50 171 A1   5/2002
EP    1 637 836 A1    3/2006
(Continued)

*Primary Examiner* — Sath V Perungavoor
*Assistant Examiner* — Dakshesh Parikh
(74) *Attorney, Agent, or Firm* — Birch, Stewart, Kolasch & Birch, LLP

(57) ABSTRACT

A distance measuring apparatus according to the present invention includes an image input unit configured to input a plurality of viewpoint images obtained by capturing a subject from different viewpoints, an obtaining unit configured to obtain, regarding each of a plurality of distances of interest, a piece of calibration data corresponding to each of the plurality of distances of interest from a plurality of pieces of calibration data for matching two-dimensional coordinates of the viewpoint images and three-dimensional coordinates in a real space, an image correcting unit configured to correct, for each of the distances of interest, the plurality of viewpoint images based on each of the pieces of calibration data, a parallax calculation unit configured to calculate, for each of the distances of interest, a parallax between the plurality of corrected viewpoint images, a comparing unit configured to compare the corrected viewpoint images over the plurality of distances of interest to specify a piece of optimum calibration data from the plurality of pieces of calibration data, a distance calculation unit configured to calculate a subject distance based on the parallax, and an output unit configured to output, as a distance measurement result, the subject distance calculated from the parallax between the corrected viewpoint images with the piece of optimum calibration data.

69 Claims, 89 Drawing Sheets

(56) References Cited

U.S. PATENT DOCUMENTS

| | | |
|---|---|---|
| 2004/0228505 A1 | 11/2004 | Sugimoto |
| 2005/0237385 A1 | 10/2005 | Kosaka et al. |
| 2007/0296979 A1 | 12/2007 | Morimoto et al. |
| 2008/0239064 A1 | 10/2008 | Iwasaki |
| 2009/0214107 A1 | 8/2009 | Masuda |

FOREIGN PATENT DOCUMENTS

| | | |
|---|---|---|
| EP | 2 096 603 A1 | 9/2009 |
| JP | 10-320558 A | 12/1998 |
| JP | 2002-122778 A | 4/2002 |
| JP | 2002-315315 A | 10/2002 |
| JP | 2002-350131 A | 12/2002 |
| JP | 2004-334836 A | 11/2004 |
| JP | 2004-354257 A | 12/2004 |
| JP | 2005-258466 A | 9/2005 |
| JP | 2006-90756 A | 4/2006 |
| JP | 2007-109130 A | 4/2007 |
| JP | 2007-147457 A | 6/2007 |
| JP | 2008-2995 A | 1/2008 |
| JP | 2008-24191 A | 2/2008 |
| JP | 2008-116309 A | 5/2008 |
| JP | 2008-141666 A | 6/2008 |
| JP | 2008-241491 A | 10/2008 |
| JP | 2008-252254 A | 10/2008 |
| JP | 2008-298589 A | 12/2008 |
| JP | 2009-14445 A | 1/2009 |
| JP | 2009-205193 A | 9/2009 |
| WO | WO 2004/106856 A1 | 12/2004 |
| WO | WO 2009/119229 A1 | 10/2009 |

* cited by examiner

FIG.2

| DISTANCE | IMAGE PICKUP DEVICE 1 | | | | | | | | | | | IMAGE PICKUP DEVICE 2 |
|---|---|---|---|---|---|---|---|---|---|---|---|---|
| | DISTORTION PARAMETER | | | | EXTERNAL/INTERNAL PARAMETER MATRIX (ELEVEN ELEMENTS IN 3x4 MATRIX) | | | | | | | |
| | CENTER COORDINATES | | COEFFICIENT | | | | | | | | | |
| | x | y | SECONDARY | QUARTIC | $h_{11}$ | $h_{12}$ | $h_{13}$ | $h_{14}$ | $h_{21}$ | ... | $h_{32}$ | $h_{33}$ |
| 500 | | | | | | | | | | | | |
| 700 | | | | | | | | | | | | |
| 1000 | | | | | | | | | | | | |
| 1500 | | | | | | | | | | | | |
| 2000 | | | | | | | | | | | | |
| 3000 | | | | | | | | | | | | |
| 5000 | | | | | | | | | | | | |
| 10000 | | | | | | | | | | | | |

FIG.3

| DISTANCE (L) | IMAGE PICKUP DEVICE 1 | | | | | | | | | | IMAGE PICKUP DEVICE 2 |
|---|---|---|---|---|---|---|---|---|---|---|---|
| | DISTORTION PARAMETER | | | | EXTERNAL/INTERNAL PARAMETER MATRIX (ELEVEN ELEMENTS IN 3x4 MATRIX) | | | | | | |
| | CENTER COORDINATES | | COEFFICIENT | | | | | | | | |
| | x | y | SECONDARY | QUARTIC | $h_{11}$ | $h_{12}$ | $h_{13}$ | $h_{14}$ | $h_{21}$ | ... | $h_{32}$ | $h_{33}$ |

| x=x(L) |
|---|
| y=y(L) |
| k2=k2(L) |
| .... |

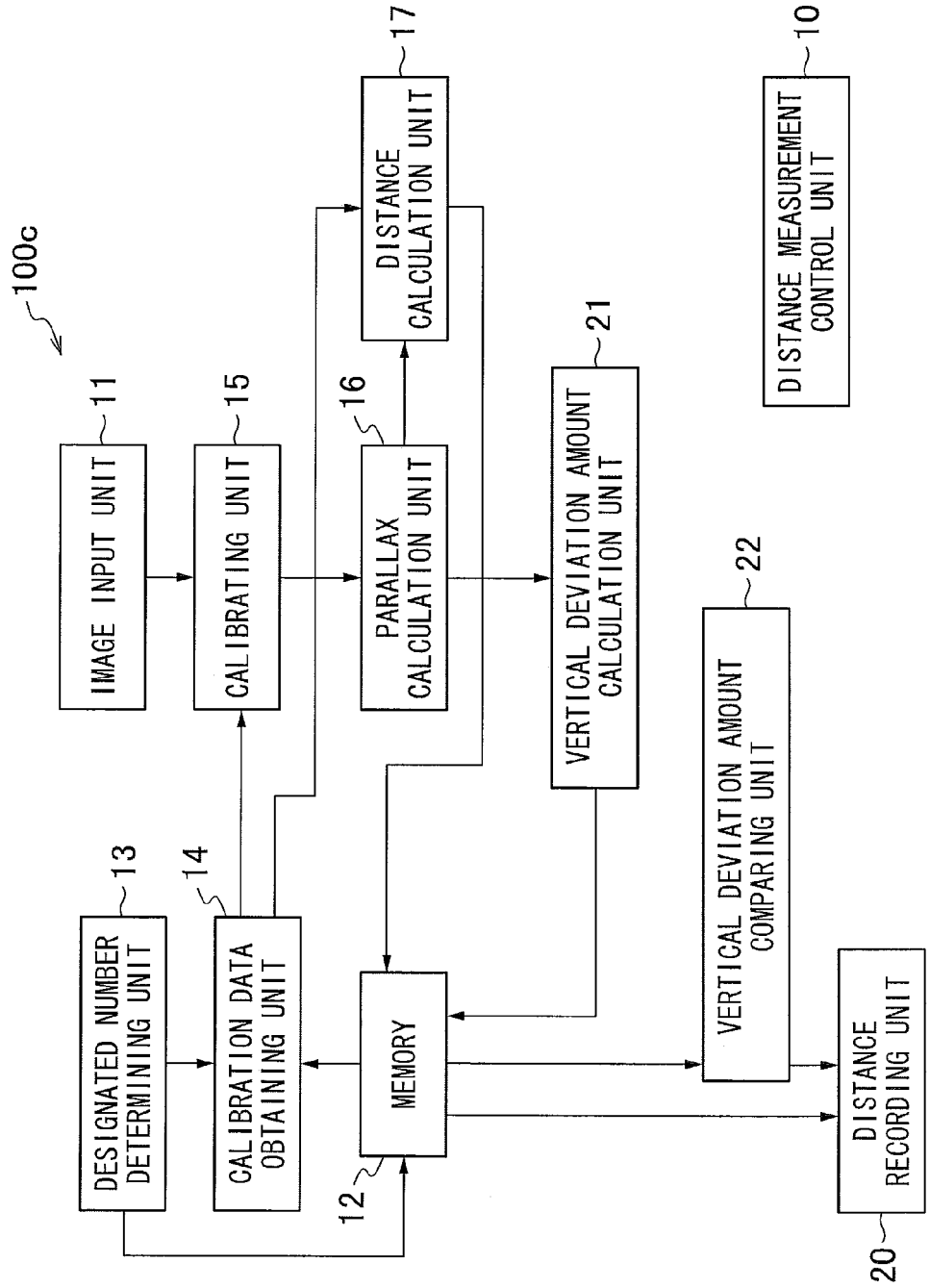

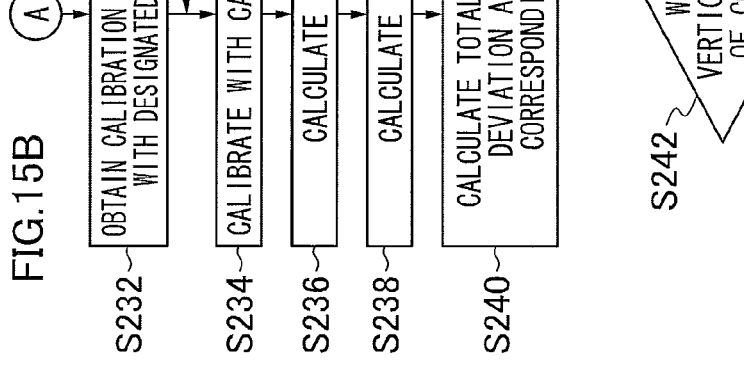
FIG.15B
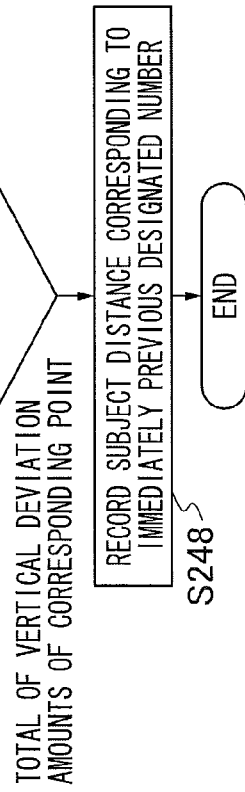
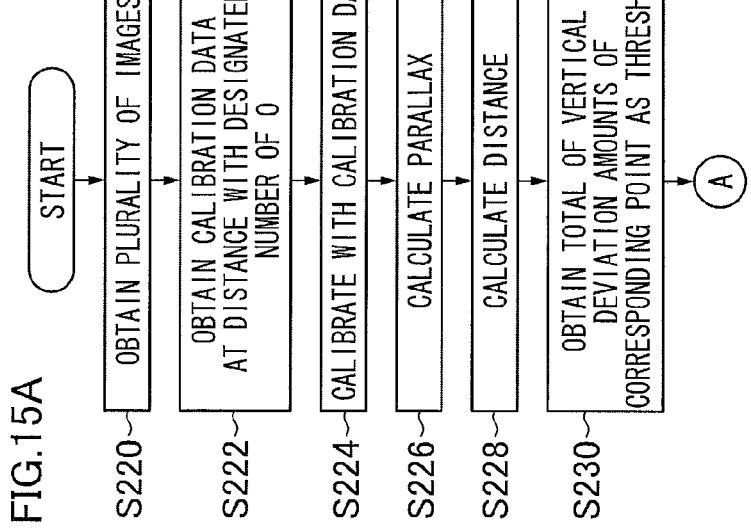
FIG.15A

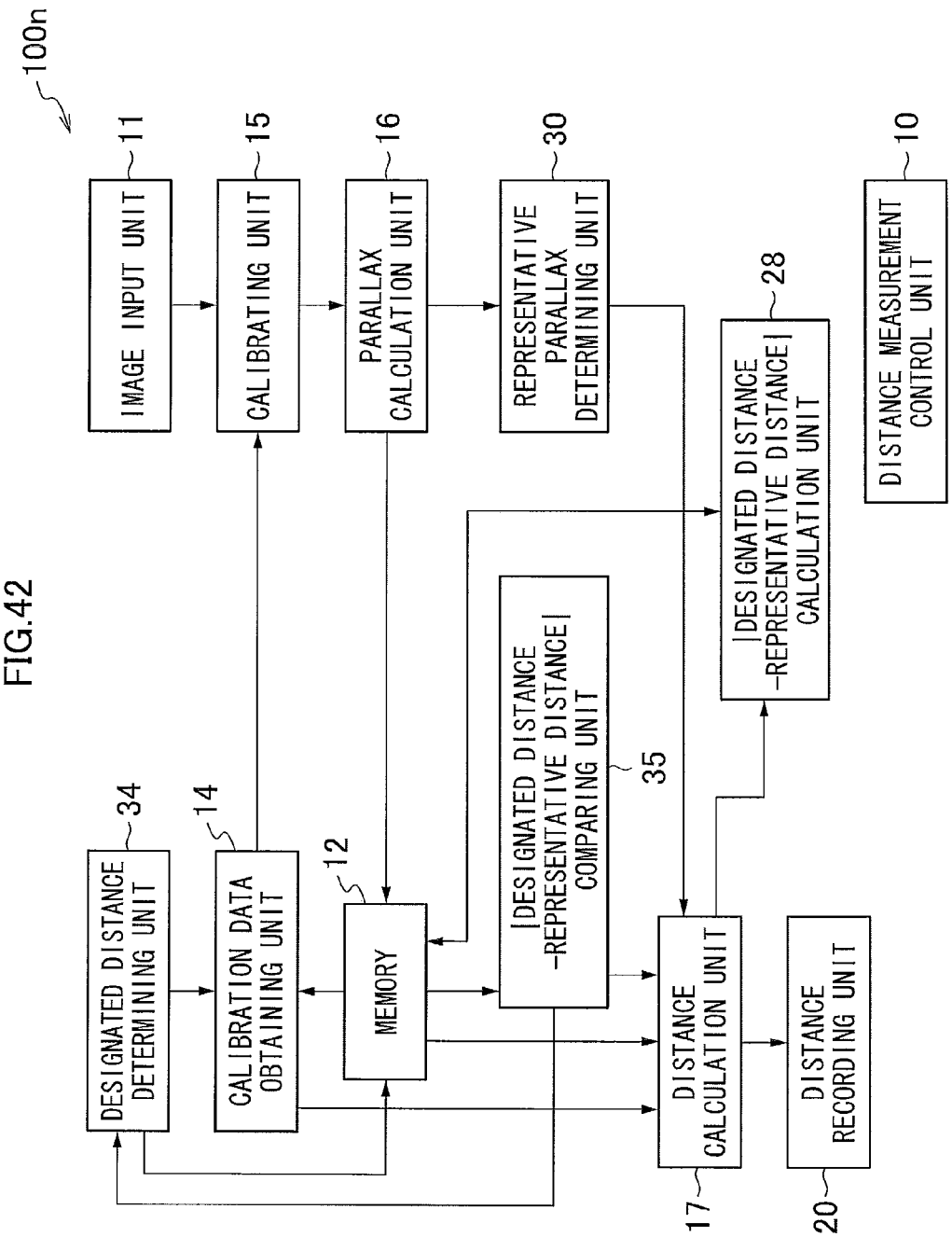

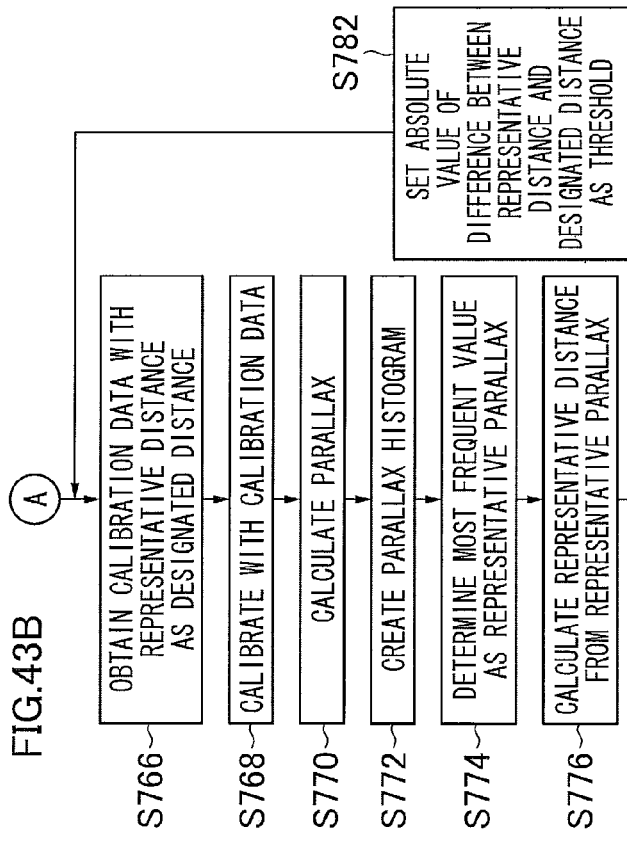
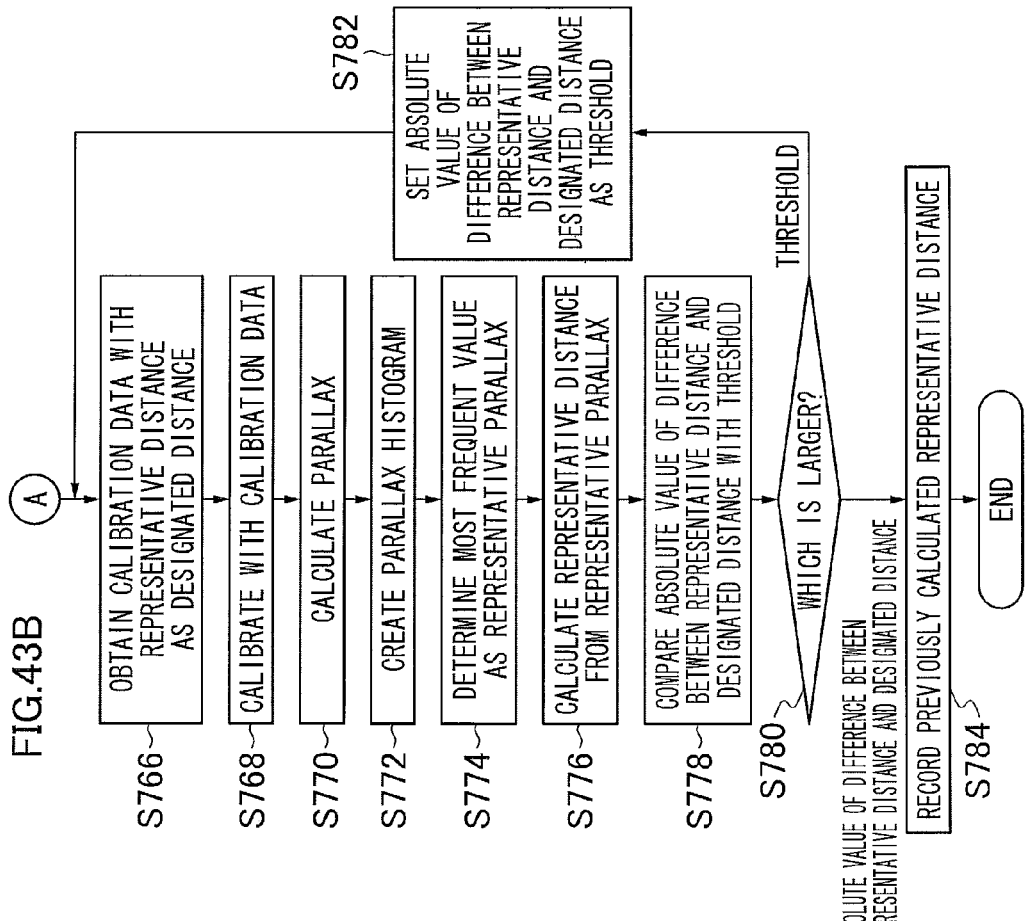
FIG.43A
FIG.43B

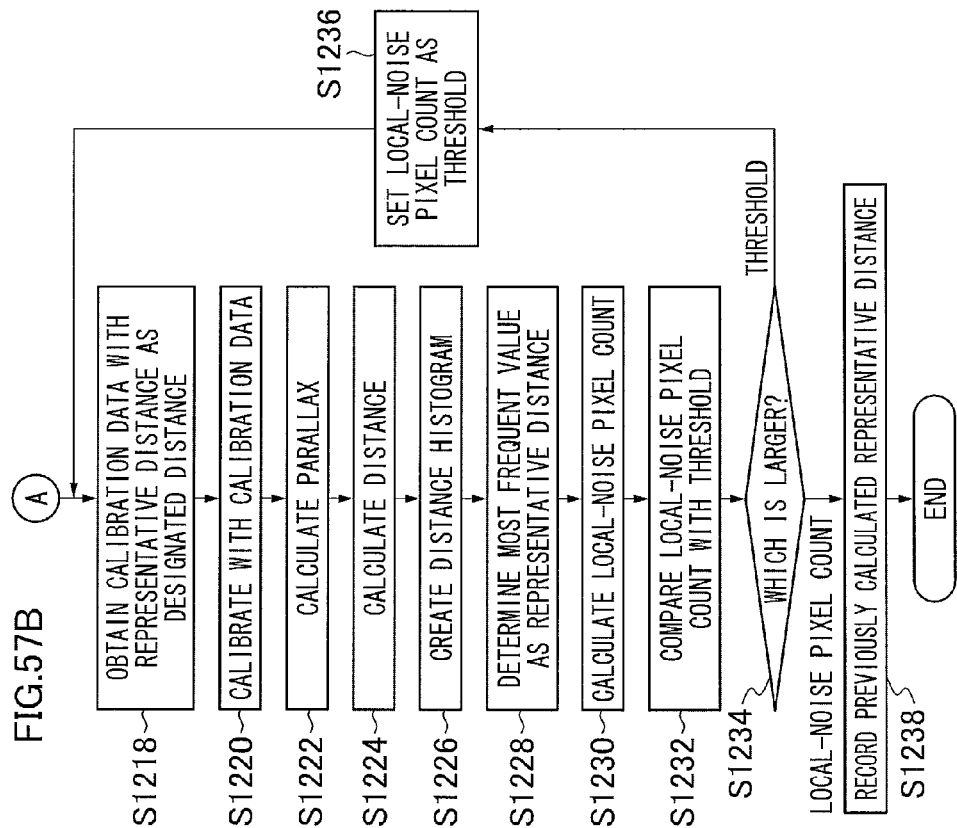
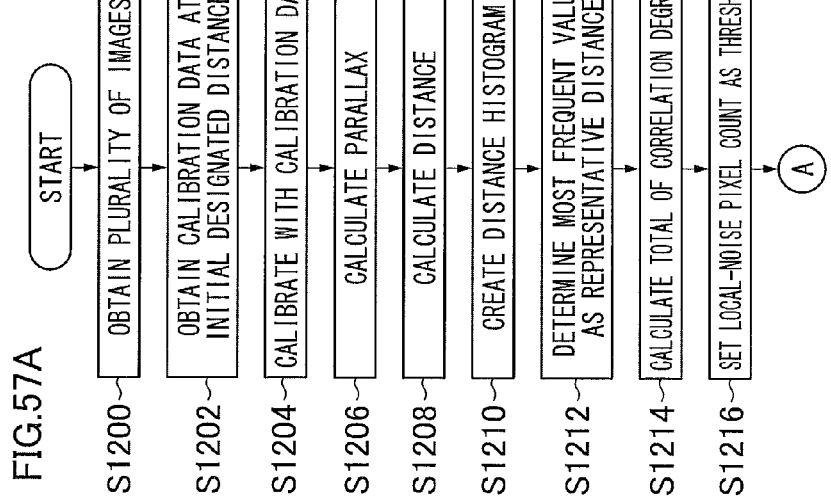

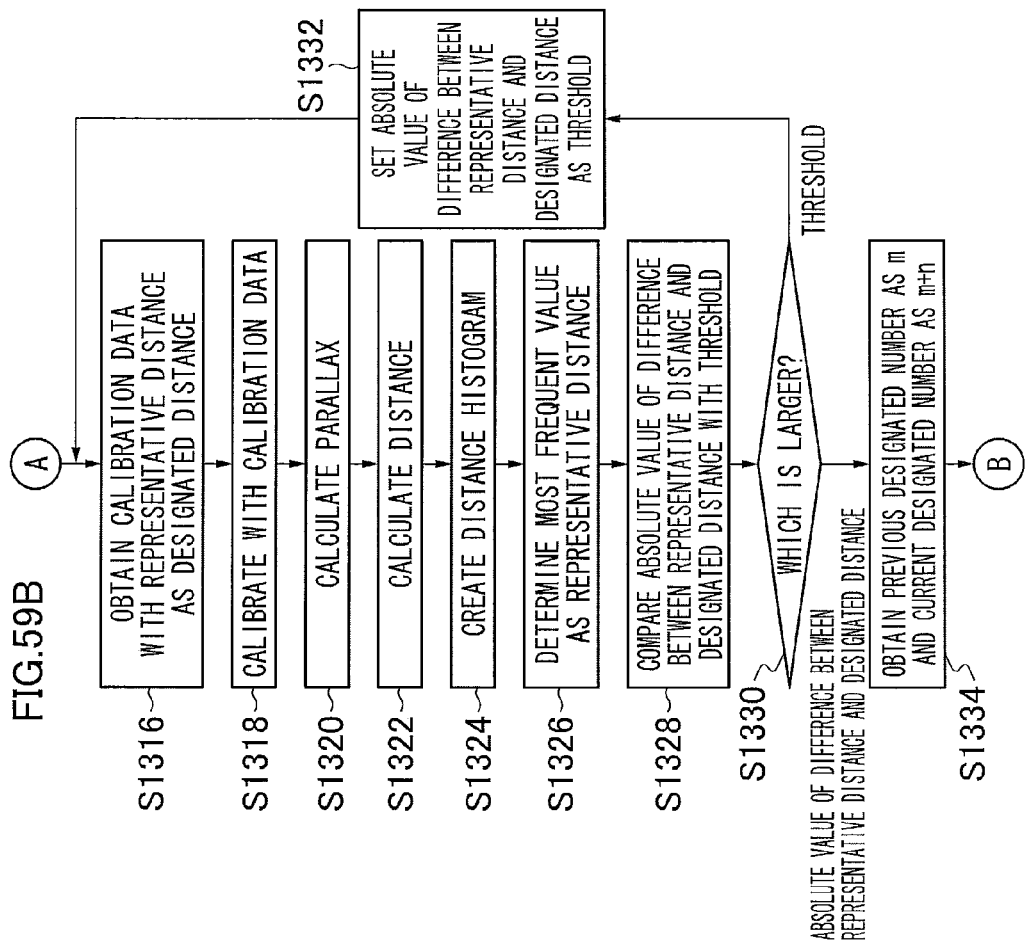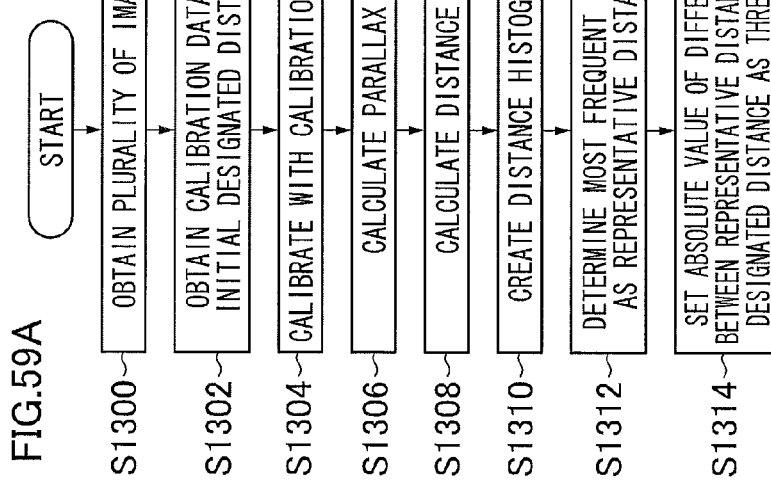

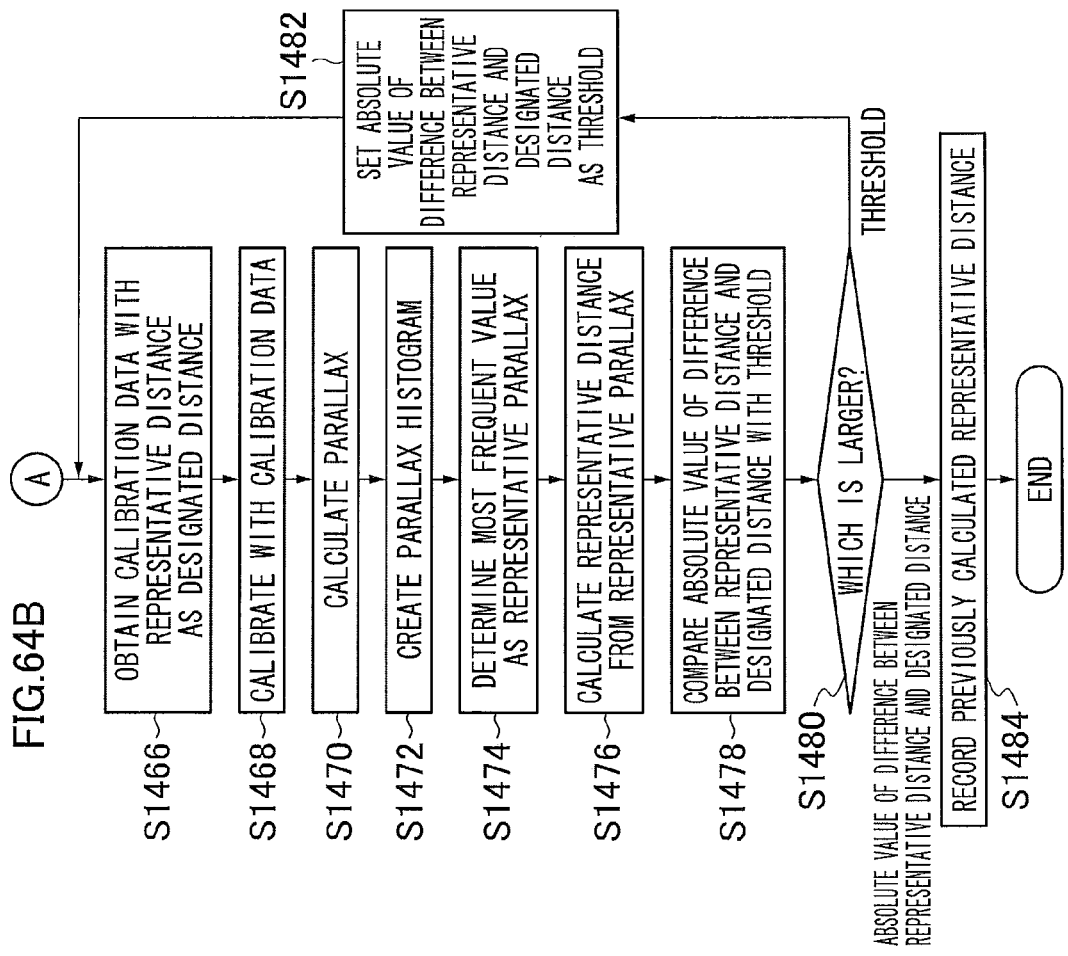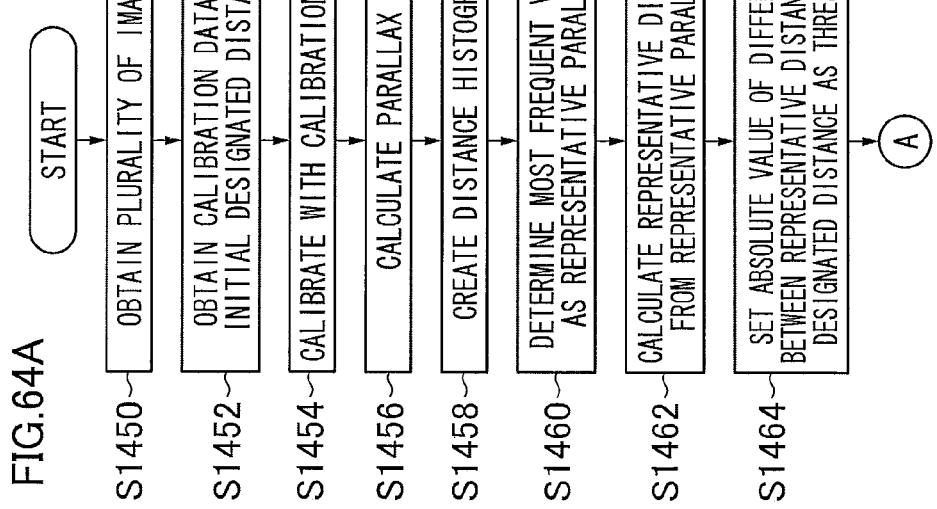

FIG.90

| FOCAL POSITION | CAMERA 1 | | | | | | | | | | CAMERA 2 |
|---|---|---|---|---|---|---|---|---|---|---|---|
| | DISTORTION PARAMETER | | | | EXTERNAL/INTERNAL PARAMETER MATRIX (ELEVEN ELEMENTS IN 3x4 MATRIX) | | | | | | |
| | CENTER COORDINATES | | COEFFICIENT | | | | | | | | |
| | x | y | SECONDARY | QUARTIC | $h_{11}$ | $h_{12}$ | $h_{13}$ | $h_{14}$ | $h_{21}$ | ... | $h_{32}$ | $h_{33}$ |
| POSITION 1 | | | | | | | | | | | |
| POSITION 2 | | | | | | | | | | | |
| POSITION 3 | | | | | | | | | | | |
| POSITION 4 | | | | | | | | | | | |
| POSITION 5 | | | | | | | | | | | |
| POSITION 6 | | | | | | | | | | | |
| POSITION 7 | | | | | | | | | | | |
| POSITION 8 | | | | | | | | | | | |

FIG.91

| FOCAL POSITION (L) | CAMERA 1 | | | | | | | CAMERA 2 |
|---|---|---|---|---|---|---|---|---|
| | DISTORTION PARAMETER | | | INTERNAL PARAMETER | | | | |
| | CENTER COORDINATES | | COEFFICIENT | FOCAL DISTANCE | | CENTER COORDINATES | | EXTERNAL PARAMETER MATRIX (3x4 MATRIX, 12 ELEMENTS) |
| | x | y | k2 k4 | fx | fy | fc | $u_0$ $v_0$ | $r_{00}$ .... |

| STORE EACH PARAMETER IN FORM OF COEFFICIENT IN POLYNOMIAL EXPRESSION FOR EACH FUNCTION OF EACH ELEMENT |
|---|

$fx = fx\_0 + fx\_1 * L + fx\_2 * L^2$
$fy = fy\_0 + fy\_1 * L + fy\_2 * L^2$
....

DISTANCE MEASURING APPARATUS, DISTANCE MEASURING METHOD, DISTANCE MEASURING PROGRAM, DISTANCE MEASURING SYSTEM, AND IMAGE PICKUP APPARATUS

TECHNICAL FIELD

The present invention relates to a distance measuring apparatus and distance measuring method of measuring a subject distance based on a plurality of viewpoint images and, in particular, to a distance measuring apparatus and distance measuring method capable of accurately measuring a subject distance even without lens position information.

BACKGROUND ART

In a stereo camera or multi-camera having a plurality of image pickup units, pieces of image information about a subject in respective captured images are compared with each other, thereby measuring three-dimensional information about the subject. At this time, for accurate three-dimensional measurement, it is required to remove influences due to optical characteristics of a zoom lens or focus lens and accurately grasp the focal distance, image center, and shearing of each camera, which are called camera parameters (hereinafter referred to as internal parameters) and geometrical information about the position, azimuth, and others of the camera in a space (hereinafter referred to as external parameters). Thus, a camera information storage unit stores lens distortion correction information or internal parameters varying depending on a zoom magnification and a focus position of each of a first image pickup unit and a second image pickup unit, and therefore stores a plurality of pieces of lens distortion correction information or internal parameters corresponding to combinations of a zoom magnification and a focus position. The camera information can be obtained by performing a camera calibration process in advance. For example, a measurement is performed with an existing camera calibration methodology, for example, a methodology used by Zhang, using a calibration pattern at the time of shipping from a factory or at the time of initial adjustment after installation, and then the camera information is stored in the camera information storage unit. A stereo image processing unit obtains zoom/focus information from the first image pickup unit and the second image pickup unit from a zoom/focus control unit, and obtains camera information from the camera information storage unit according to the zoom/focus information. By using this camera information, the stereo image processing unit performs stereo image processing on a stereo image to perform a three-dimensional measurement on the subject, and outputs, as three-dimensional information, parallax information, distance information, three-dimensional position information, an evaluation value indicating reliability of the three-dimensional measurement, and others (Patent Literature 1).

Patent Literature 2 discloses a structure in which, with one picked-up image being taken as a standard image and the other picked-up image being taken as a reference image, moving the reference image, creating a parallax image, and selecting a movement amount of the reference image with a minimum dispersion in parallax amount as a correction amount of the reference image.

Patent Literature 3 discloses a structure of generating a distance image, creating a histogram indicative of a frequency of appearances of a pixel for each distance in the distance image, and detecting a range of a main subject based on the histogram.

In a stereo camera system, when an object targeted for obtaining position information in a three-dimensional space (a target object) is shot by a plurality of cameras, position information of the target object in a three-dimensional space can be specified from position information of the target object projected onto a light-receiving surface (hereinafter referred to as a screen as appropriate) of a photoelectric conversion element such as, for example, a CCD, in each camera. Therefore, it is required to find in advance a correspondence (a position information correspondence) between position information of an object present at a position in a three-dimensional space and, when the target object is present at that position, position information about a position where that target object is projected onto the screen of each camera. Finding this position information correspondence is called calibration (Patent Literature 4).

A stereo camera unit finding three-dimensional information about a subject by using two cameras requires internal parameters formed of information including a focal distance of each camera, an image center, and a pixel size, external parameters formed of relation information such as positions and postures of two cameras, optical distortion parameters based on a difference between an ideal optical system and an actual optical system in each cameras, and others. These parameters are collectively referred to as camera parameters. In camera calibration, images of a subject whose three-dimensional position is known in advance are captured by the stereo camera unit configured of a plurality of cameras to fine a plurality of projected images and, from the plurality of these projected images and their three-dimensional coordinate positions, camera parameters are found. Then, from these camera parameters, three-dimensional information about a point corresponding to a predetermined image position in the projected image (Patent Literature 5).

Depth image generating means reads a depth image generating method (a mapping table) corresponding to an AF focusing position (a distance from an image pickup lens to a subject currently in focus) and sets a depth value for each pixel based on this mapping table and distance information for each pixel obtained by distance information obtaining means, thereby generating a depth image. With this, a stereoscopic vision image suitable for the subject obtained from the AF focusing position at the time of shooting can be created (Patent Literature 6).

Images of a subject is captured by two or more cameras provided at different positions; a search is made for a corresponding point, which is a corresponding pixel between the plurality of images obtained above (a standard image obtained by a standard camera and a reference image obtained by a reference camera) (stereo matching); a difference (parallax) is calculated between a pixel on the standard image and a pixel on the reference image, these pixels corresponding to each other; and the principle of triangulation is applied to the parallax to measure a distance from the standard camera or the reference camera to a point on the subject corresponding to the pixel. With this, a distance image representing a stereoscopic shape of the subject can be generated. In stereo matching, since there are a plurality of points in a real space mapped on a pixel on the reference image, based on the fact that a pixel on the reference image corresponding to that pixel is present on a straight line representing mapping of points in the real space (an epipolar line), a search is made for a corresponding point, which is a pixel on the reference image corresponding to that pixel. In stereo matching, a correlation window including a pixel for which a corresponding-point search is made for is set on the standard image, a correlation window identical to that set on the standard image is moved on the reference image along the epipolar line, a correlation about each pixel in the correlation window on each image is calculated for each movement position, and a pixel positioned at the center of a correlation window with its correlation on the reference image being equal to a predetermined threshold or more is found as a corresponding point of the pixel (Patent Literature 7).

Even in a camera not having a distance measurement sensor mounted thereon, as long as the camera has a mechanism of motor-driving a focus lens forward and backward to focus the focus lens on a subject, the number of pulses of that motor driving can be counted and, from this count value, distance information can be found. In this case, a relation between the-number-of-pulses count value and the distance may be in a form of a function or table data (Patent Literature 8).

A face detecting unit detects a face from each of images captured by two image pickup units based on image data stored in a frame memory. As this face detecting method, a known method can be used. For example, a pattern imaged for face detection is stored in a ROM and, by referring to this pattern image, a face detection is made by pattern recognition (Patent Literature 9).

Other than the above, there are various face detecting methods. For example, there is a methodology in which a region having a skin color and the shape (for example, an oblong-based figure) of a person is detected in an image and the detected region is extracted as being taken as a region of the face (Patent Literature 10).

Examples of a method of searching for a corresponding point between different viewpoint images include a Sum of Absolute Difference (SAD) method and a Phase-Only Correction (POC) method (Patent Literature 11).

Patent Literature 12 illustrates an example of a distortion correction equation.

Patent Literature 13 illustrates an example of a table defining a position (focal position) of a focus lens according to a subject distance.

CITATION LIST

Patent Literature

PTL 1: Japanese Patent Application Laid-Open No. 2008-241491
PTL 2: Japanese Patent Application Laid-Open No. 2002-315315
PTL 3: Japanese Patent Application Laid-Open No. 2008-116309
PTL 4: Japanese Patent Application Laid-Open No. 10-320558
PTL 5: Japanese Patent Application Laid-Open No. 2006-90756
PTL 6: Japanese Patent Application Laid-Open No. 2008-141666
PTL 7: Japanese Patent Application Laid-Open No. 2009-205193
PTL 8: Japanese Patent Application Laid-Open No. 2004-334836
PTL 9: Japanese Patent Application Laid-Open No. 2008-252254
PTL 10: Japanese Patent Application Laid-Open No. 2007-109130
PTL 11: Japanese Patent Application Laid-Open No. 2009-14445
PTL 12: Japanese Patent Application Laid-Open No. 2004-354257
PTL 13: Japanese Patent Application Laid-Open No. 2005-258466 (paragraph 0030, FIG. 7)

SUMMARY OF INVENTION

Technical Problem

In the structure of Patent Literature 1, it is required to obtain the lens positions of the image pickup devices (the positions of the focus lens and the zoom lens). Therefore, in the state where the lens positions of the image pickup devices are not known, the subject distance cannot be measured.

Patent Literatures 2 and 3 does not disclose any structure capable of accurately measuring a subject distance without lens position information.

Also, in the structure of Patent Literature 3, generation of a distance image is a requisite.

For example, when a plurality of image pickup devices are used for shooting to obtain a plurality of viewpoint images and then a subject distance is tried to be obtained from the plurality of these viewpoint images, since the shooting has ended already, it is general that lens position information at the time of shooting cannot be obtained. Therefore, calibration based on the lens position of the focus lens cannot be performed.

On the other hand, to obtain appropriate three-dimensional information from a subject image obtained as being AF-focused by a plurality of cameras to generate a distance image, it is effective to prepare, in advance, camera parameters for calibration each according to a subject distance and perform calibration using a camera parameter corresponding to an actual subject distance.

In paragraph 0018 of Patent Literature 6, the focus control unit obtains a focus control position of the image pickup unit. That is, only the image pickup device having a function of obtaining focus control position information can make a distance measurement.

While it can be considered that focus lens position detecting means such as an encoder as in Patent Literature 8 is used to obtain an accurate focus lens position at the time of focusing and a subject distance from that position to the target subject is estimated, it is difficult to provide this means to a compact digital camera due to restrictions in cost.

The present invention was made in view of these circumstances, and has an object of providing a distance measuring apparatus and distance measuring method capable of accurately measuring a subject distance even without lens position information.

Also, the preset invention provides a method of setting a camera parameter for calibration according to a subject distance without detecting an accurate focus lens position at the time of adjusting a focus by using mechanical means such as an encoder.

Furthermore, the present invention provides a method of setting a suitable camera parameter for calibration according to the state of an optical system under circumstances where an image pickup optical system is changed due to focusing control.

Solution to Problems

To achieve the objects described above, a distance measuring apparatus according to a first aspect of the present invention includes an image input unit inputting a plurality of viewpoint images obtained by capturing a subject from different viewpoints by a plurality of image pickup devices; a calibration data obtaining unit paying attention to each of a plurality of distances of interest and obtaining calibration data corresponding to each of the plurality of distances of interest from a plurality of pieces of calibration data for matching two-dimensional coordinates of the viewpoint images and three-dimensional coordinates in a real space; an image correcting unit correcting, for each of the distances of interest, the plurality of viewpoint images based on each of the pieces of calibration data; a parallax calculation unit calculating, for each of the distances of interest, a parallax between the plurality of corrected viewpoint images; a comparing unit comparing the corrected viewpoint images over the plurality of distances of interest, thereby specifying optimum calibration data from the plurality of pieces of calibration data; a distance calculation unit calculating a subject distance based on the parallax; and an output unit outputting, as a distance measurement result, the subject distance calculated from the parallax between the corrected viewpoint images with the optimum calibration data.

That is, optimum calibration data is specified from the plurality of pieces of calibration data over the focusable distance range of the image pickup device, and a subject distance calculated from a parallax between corrected viewpoint images with the optimum calibration data can be obtained as a distance measurement result. Thus, the subject distance can be accurately measured even without lens position information.

The distance measuring apparatus according to a second aspect of the present invention includes, in the first aspect described above, a correlation degree calculation unit calculating, for each of the distances of interest, a correlation degree of at least one of luminance and color between the plurality of corrected viewpoint images, wherein the comparing unit compares the correlation degrees over the plurality of distances of interest to specify calibration data with the correlation degree being maximum as the optimum calibration data.

The distance measuring apparatus according to a third aspect of the present invention includes, in the first aspect described above, a vertical deviation amount calculation unit calculating, for each of the distances of interest, a vertical deviation amount between corresponding pixels between the plurality of corrected viewpoint images, wherein the comparing unit compares the vertical deviation amounts over the plurality of distances of interest to specify calibration data with the vertical deviation amount being minimum as the optimum calibration data.

The distance measuring apparatus according to a fourth aspect of the present invention includes, in the first aspect described above, a parallax-calculated pixel count calculating unit calculating, for each of the distances of interest, a parallax-calculated pixel count that allows parallax calculation between the plurality of corrected viewpoint images, wherein the comparing unit compares the parallax-calculated pixel counts over the plurality of distances of interest to specify calibration data with the parallax-calculated pixel count being maximum as the optimum calibration data.

The distance measuring apparatus according to a fifth aspect of the present invention includes, in the first aspect described above, a local-noise pixel count calculation unit calculating, for each of the distances of interest, a local-noise pixel count that is locally present in a parallax distribution of the plurality of corrected viewpoint images, wherein the comparing unit compares the local-noise pixel counts over the plurality of distances of interest to specify calibration data with the local-noise pixel count being minimum as the optimum calibration data.

Also, a distance measuring apparatus according to a sixth aspect of the present invention includes an image input unit inputting a plurality of viewpoint images obtained by capturing a subject from different viewpoints by a plurality of image pickup devices; a calibration data obtaining unit paying attention to each of a plurality of distances of interest and obtaining calibration data corresponding to each of the plurality of distances of interest from a plurality of pieces of calibration data for matching two-dimensional coordinates of the viewpoint images and three-dimensional coordinates in a real space; an image correcting unit correcting, for each of the distances of interest, the plurality of viewpoint images based on each of the pieces of calibration data; a parallax calculation unit calculating, for each of the distances of interest, a parallax between the plurality of corrected viewpoint images; a distance calculation unit calculating, for each of the distances of interest, a subject distance based on the parallax; a comparing unit comparing differences each between the subject distance and the distance of interest over the plurality of distances of interest, thereby specifying optimum calibration data from the plurality of pieces of calibration data; and an output unit outputting, as a distance measurement result, the subject distance calculated from the parallax between the corrected viewpoint images with the optimum calibration data.

That is, optimum calibration data is specified from the plurality of pieces of calibration data over the focusable distance range of the image pickup device, and a subject distance calculated from a parallax between corrected viewpoint images with the optimum calibration data can be obtained as a distance measurement result. Thus, the subject distance can be accurately measured even without lens position information.

Furthermore, a distance measuring apparatus according to a seventh aspect of the present invention includes an image input unit inputting a plurality of viewpoint images obtained by capturing a subject from different viewpoints by a plurality of image pickup devices; a calibration data obtaining unit paying attention to each of a plurality of distances of interest and obtaining calibration data corresponding to each of the plurality of distances of interest from a plurality of pieces of calibration data for matching two-dimensional coordinates of the viewpoint images and three-dimensional coordinates in a real space; a first parallax calculation unit calculating, for each of the distances of interest, a first parallax based on the distance of interest; an image correcting unit correcting, for each of the distances of interest, the plurality of viewpoint images based on each of the pieces of calibration data; a second parallax calculation unit calculating, for each of the distances of interest, a second parallax between the plurality of corrected viewpoint images; a comparing unit comparing differences each between the first parallax and the second parallax over the plurality of distances of interest, thereby specifying optimum calibration data from the plurality of pieces of calibration data; a distance calculation unit calculating a subject distance based on the second parallax of the corrected viewpoint image with the optimum calibration data; and an output unit outputting the calculated subject distance as a distance measurement result.

That is, optimum calibration data is specified from the plurality of pieces of calibration data over the focusable distance range of the image pickup device, and a subject distance calculated from a parallax between corrected viewpoint images with the optimum calibration data can be obtained as a distance measurement result. Thus, the subject distance can be accurately measured even without lens position information.

Furthermore, a distance measuring apparatus according to an eighth aspect of the present invention includes an image input unit inputting a plurality of viewpoint images obtained by capturing a subject from different viewpoints by a plurality of image pickup devices; a calibration data obtaining unit paying attention to each of a plurality of distances of interest and obtaining calibration data corresponding to each of the plurality of distances of interest from a plurality of pieces of calibration data for matching two-dimensional coordinates of the viewpoint images and three-dimensional coordinates in a real space; an image correcting unit correcting, for each of the distances of interest, the plurality of viewpoint images based on each of the pieces of calibration data; a parallax calculation unit calculating, for each of the distances of interest, a parallax between the plurality of corrected viewpoint images; a distance calculation unit calculating, for each of the distances of interest, a subject distance based on the parallax; a distance difference calculation unit calculating, for each of the distances of interest, a difference between the subject distance and the distance of interest; a distance-of-interest determining unit determining a beginning distance of interest among the plurality of distances of interest and determining the calculated subject distance as a next distance of interest, thereby switching the distance of interest; a comparing unit comparing the differences before and after switching of the distance of interest, thereby selecting a distance measurement result from the plurality of calculated subject distances; and an output unit outputting the distance measurement result.

That is, optimum calibration data is specified from the plurality of pieces of calibration data over the focusable distance range of the image pickup device, and a subject distance calculated from a parallax between corrected viewpoint images with the optimum calibration data can be obtained as a distance measurement result. Thus, the subject distance can be accurately measured even without lens position information.

Still further, a distance measuring apparatus according to a ninth aspect of the present invention includes an image input unit inputting a plurality of viewpoint images obtained by capturing a subject from different viewpoints by a plurality of image pickup devices; a calibration data obtaining unit paying attention to each of a plurality of distances of interest and obtaining calibration data corresponding to each of the plurality of distances of interest from a plurality of pieces of calibration data for matching two-dimensional coordinates of the viewpoint images and three-dimensional coordinates in a real space; an image correcting unit correcting, for each of the distances of interest, the plurality of viewpoint images based on each of the pieces of calibration data; a parallax calculation unit calculating, for each of the distances of interest, a parallax between the plurality of corrected viewpoint images; a distance calculation unit calculating, for each of the distances of interest, a subject distance based on the parallax; a distance-of-interest determining unit determining a beginning distance of interest among the plurality of distances of interest and determining the calculated subject distance as a next distance of interest, thereby switching the distance of interest; a distance difference calculation unit calculating, for each of the distances of interest, a difference between the subject distance and the distance of interest; a comparing unit comparing the difference and a threshold; and an output unit outputting the calculated subject distance as a distance measurement result when the difference is smaller than the threshold.

That is, optimum calibration data is specified from the plurality of pieces of calibration data over the focusable distance range of the image pickup device, and a subject distance calculated from a parallax between corrected viewpoint images with the optimum calibration data can be obtained as a distance measurement result. Thus, the subject distance can be accurately measured even without lens position information.

Furthermore, a provisional subject distance is first calculated with a beginning distance of interest and, with the calculated subject distance being taken as a next distance of interest, a subject distance as a distance measurement result is calculated. Thus, the distance measurement result can be quickly and accurately outputted.

The distance measuring apparatus according to a tenth aspect of the present invention includes, in the first aspect described above, a distance-of-interest determining unit determining a beginning distance of interest among the plurality of distances of interest and determining the calculated subject distance as a next distance of interest, thereby switching the distance of interest; and a correlation degree calculation unit calculating, for each of the distances of interest, a correlation degree of at least one of luminance and color between the plurality of corrected viewpoint images, wherein the comparing unit compares the correlation degrees for each switching of the distance of interest and, when the correlation degree calculated after switching of the distance of interest is smaller than the correlation degree calculated before switching of the distance of interest, adopts the subject distance calculated before switching of the distance of interest as the distance measurement result.

That is, a provisional subject distance is first calculated with a beginning distance of interest and, with the calculated subject distance being taken as a next distance of interest, a subject distance as a distance measurement result is calculated. Thus, the distance measurement result can be quickly and accurately outputted.

The distance measuring apparatus according to an eleventh aspect of the present invention includes, in the first aspect described above, a distance-of-interest determining unit determining a beginning distance of interest among the plurality of distances of interest and determining the calculated subject distance as a next distance of interest, thereby switching the distance of interest; and a vertical deviation amount calculation unit calculating, for each of the distances of interest, a vertical deviation amount between corresponding pixels between the plurality of corrected viewpoint images, wherein the comparing unit compares the vertical deviation amounts for each switching of the distance of interest and, when the vertical deviation amount calculated after switching of the distance of interest is larger than the vertical deviation amount calculated before switching of the distance of interest, adopts the subject distance calculated before switching of the distance of interest as the distance measurement result.

That is, a provisional subject distance is first calculated with a beginning distance of interest and, with the calculated subject distance being taken as a next distance of interest, a subject distance as a distance measurement result is calculated. Thus, the distance measurement result can be quickly and accurately outputted.

The distance measuring apparatus according to a twelfth aspect of the present invention includes, in the first aspect described above, a distance-of-interest determining unit determining a beginning distance of interest among the plurality of distances of interest and determining the calculated subject distance as a next distance of interest, thereby switching the distance of interest; and a parallax-calculated pixel count calculating unit calculating, for each of the distances of interest, a parallax-calculated pixel count that allows parallax calculation between the plurality of corrected viewpoint images, wherein the comparing unit compares the parallax-calculated pixel counts for each switching of the distance of interest and, when the parallax-calculated pixel count calculated after switching of the distance of interest is smaller than the parallax-calculated pixel count calculated before switching of the distance of interest, adopts the subject distance calculated before switching of the distance of interest as the distance measurement result.

That is, a provisional subject distance is first calculated with a beginning distance of interest and, with the calculated subject distance being taken as a next distance of interest, a subject distance as a distance measurement result is calculated. Thus, the distance measurement result can be quickly and accurately outputted.

The distance measuring apparatus according to a thirteenth aspect of the present invention includes, in the first aspect described above, a distance-of-interest determining unit determining a beginning distance of interest among the plurality of distances of interest and determining the calculated subject distance as a next distance of interest, thereby switching the distance of interest; and a local-noise pixel count calculation unit calculating, for each of the distances of interest, a local-noise pixel count that is locally present in a parallax distribution of the plurality of corrected viewpoint images, wherein the comparing unit compares the local-noise pixel counts for each switching of the distance of interest and, when the local-noise pixel count calculated after switching of the distance of interest is larger than the local-noise pixel count calculated before switching of the distance of interest, adopts the subject distance calculated before switching of the distance of interest as the distance measurement result.

That is, a provisional subject distance is first calculated with a beginning distance of interest and, with the calculated subject distance being taken as a next distance of interest, a subject distance as a distance measurement result is calculated. Thus, the distance measurement result can be quickly and accurately outputted.

The distance measuring apparatus according to a fourteenth aspect of the present invention includes, in the first to thirteenth aspects described above, a representative parallax determining unit creating a histogram indicating a relation between a parallax and a number of occurrences between the viewpoint images and determining a representative parallax based on the number of occurrences in the histogram, wherein the distance calculation unit calculates the subject distance based on the representative parallax.

That is, the representative parallax can be accurately found in a simple manner. Thus, the subject distance as the distance measurement result can be accurately obtained in a simple manner.

In the distance measuring apparatus according to a fifteenth aspect of the present invention, in the fourteenth aspect described above, the representative parallax determining unit detects a most frequent value from the histogram, and determines the most frequent value as the representative parallax.

The distance measuring apparatus according to a sixteenth aspect of the present invention includes, in the first to thirteenth aspects described above, a representative distance determining unit creating a histogram indicating a relation between a distance and a number of occurrences of each of pixels of the viewpoint images and determining a representative distance based on the number of occurrences in the histogram, wherein the distance calculation unit calculates a distance of each of the pixels, and the output unit outputs the representative distance as the distance measurement result.

That is, the representative distance (that is, the subject distance as the distance measurement result) can be accurately found in a simple manner.

In the distance measuring apparatus according to a seventeenth aspect of the present invention, in the sixteenth aspect described above, the most frequent value is detected in the histogram, and the most frequent value is determined as the representative distance.

In the distance measuring apparatus according to an eighteenth aspect of the present invention, in the fourteenth to seventeenth aspects described above, whether the number of occurrences is high or low is discriminated in the histogram, and a component of a pixel locally present is removed from the histogram.

That is, instead of finding a representative parallax or a representative distance from all pixels, the representative parallax or the representative distance can be found with judgment targets for invalid matching pixel judgment or the like being restricted. Thus, distance measurement can be quickly made.

The distance measuring apparatus according to a nineteenth aspect of the present invention includes, in the fourteenth to eighteenth aspects described above, a region-of-interest determining unit determining a region of interest for which the number of occurrences is to be calculated, wherein the number of occurrences is calculated restrictively to the region of interest to create the histogram.

That is, the representative parallax or the representative distance can be found restrictively to the region of interest. Thus, distance measurement can be quickly made.

In the distance measuring apparatus according to a twentieth aspect of the present invention, in the nineteenth aspect described above, the region-of-interest determining unit determines a calculation region for use in exposure control or focusing control at the time of shooting the viewpoint images as the region of interest.

In the distance measuring apparatus according to a twenty-first aspect of the present invention, in the nineteenth aspect described above, the region-of-interest determining unit divides the viewpoint images into a plurality of divisional regions in an array, performs a frequency analysis for each of the divisional regions, and determines a divisional region having a high-frequency component as the region of interest.

In the distance measuring apparatus according to a twenty-second aspect of the present invention, in the nineteenth to twenty-first aspects described above, the region-of-interest determining unit determines a specific target extraction region where a specific target is extracted from the viewpoint images as the region of interest.

The distance measuring apparatus according to a twenty-second aspect of the present invention includes, in the fourteenth to twenty-second aspects described above, a weight determining unit determining a weight with respect to the number of occurrences based on a position of each of the pixels in the viewpoint images, wherein the histogram is created by weighting based on the weight.

A distance measuring method according to a twenty-fourth aspect of the present invention includes an image input step of inputting a plurality of viewpoint images obtained by capturing a subject from different viewpoints by a plurality of image pickup devices; a calibration data obtaining step of paying attention to each of a plurality of distances of interest and obtaining calibration data corresponding to each of the plurality of distances of interest from a plurality of pieces of calibration data for matching two-dimensional coordinates of the viewpoint images and three-dimensional coordinates in a real space; an image correcting step of correcting, for each of the distances of interest, the plurality of viewpoint images based on each of the pieces of calibration data; a parallax calculation step of calculating, for each of the distances of interest, a parallax between the plurality of corrected viewpoint images; a comparing step of comparing the corrected viewpoint images over the plurality of distances of interest, thereby specifying optimum calibration data from the plurality of pieces of calibration data; a distance calculation step of calculating a subject distance based on the parallax; and an output step of outputting, as a distance measurement result, the subject distance calculated from the parallax between the corrected viewpoint images with the optimum calibration data.

The distance measuring method according to a twenty-fifth aspect of the present invention includes, in the twenty-fourth aspect described above, a correlation degree calculation step of calculating, for each of the distances of interest, a correlation degree of at least one of luminance and color between the plurality of corrected viewpoint images, wherein the correlation degrees are compared over the plurality of distances of interest to specify calibration data with the correlation degree being maximum as the optimum calibration data.

The distance measuring method according to a twenty-sixth aspect of the present invention includes, in the twenty-fourth aspect described above, a vertical deviation amount calculation step of calculating, for each of the distances of interest, a vertical deviation amount between corresponding pixels between the plurality of corrected viewpoint images, wherein the vertical deviation amounts are compared over the plurality of distances of interest to specify calibration data with the vertical deviation amount being minimum as the optimum calibration data.

The distance measuring method according to a twenty-seventh aspect of the present invention includes, in the twenty-fourth aspect described above, parallax-calculated pixel count calculating step of calculating, for each of the distances of interest, a parallax-calculated pixel count that allows parallax calculation between the plurality of corrected viewpoint images, wherein the parallax-calculated pixel counts are compared over the plurality of distances of interest to specify calibration data with the parallax-calculated pixel count being maximum as the optimum calibration data.

Note that in the aspect described above, the method may include a parallax-calculated pixel count calculating step of calculating, for each of the distances of interest, a parallax-calculated pixel count that allows parallax calculation between the plurality of corrected viewpoint images, wherein the parallax-calculated pixel counts may be compared over the plurality of distances of interest to specify calibration data with the parallax-calculated pixel count being minimum as the optimum calibration data.

The distance measuring method according to a twenty-eighth aspect of the present invention includes, in the twenty-fourth aspect described above, a local-noise pixel count calculation step of calculating, for each of the distances of interest, a local-noise pixel count that is locally present in a parallax distribution of the plurality of corrected viewpoint images, wherein the local-noise pixel counts are compared over the plurality of distances of interest to specify calibration data with the local-noise pixel count being minimum as the optimum calibration data.

Also, a distance measuring method according to a twenty-ninth aspect of the present invention includes an image input step of inputting a plurality of viewpoint images obtained by capturing a subject from different viewpoints by a plurality of image pickup devices; a calibration data obtaining step of paying attention to each of a plurality of distances of interest and obtaining calibration data corresponding to each of the plurality of distances of interest from a plurality of pieces of calibration data for matching two-dimensional coordinates of the viewpoint images and three-dimensional coordinates in a real space; an image correcting step of correcting, for each of the distances of interest, the plurality of viewpoint images based on each of the pieces of calibration data; a parallax calculation step of calculating, for each of the distances of interest, a parallax between the plurality of corrected viewpoint images; a distance calculation step of calculating, for each of the distances of interest, a subject distance based on the parallax; a comparing step of comparing differences each between the subject distance and the distance of interest over the plurality of distances of interest, thereby specifying optimum calibration data from the plurality of pieces of calibration data; and an output step of outputting, as a distance measurement result, the subject distance calculated from the parallax between the corrected viewpoint images with the optimum calibration data.

Furthermore, a distance measuring method according to a thirtieth aspect of the present invention includes an image input step of inputting a plurality of viewpoint images obtained by capturing a subject from different viewpoints by a plurality of image pickup devices; a calibration data obtaining step of paying attention to each of a plurality of distances of interest and obtaining calibration data corresponding to each of the plurality of distances of interest from a plurality of pieces of calibration data for matching two-dimensional coordinates of the viewpoint images and three-dimensional coordinates in a real space; a first parallax calculation step of calculating, for each of the distances of interest, a first parallax based on the distance of interest; an image correcting step of correcting, for each of the distances of interest, the plurality of viewpoint images based on each of the pieces of calibration data; a second parallax calculation step of calculating, for each of the distances of interest, a second parallax between the plurality of corrected viewpoint images; a comparing step of comparing differences each between the first parallax and the second parallax over the plurality of distances of interest, thereby specifying optimum calibration data from the plurality of pieces of calibration data; a distance calculation step of calculating a subject distance based on the second parallax of the corrected viewpoint image with the optimum calibration data; and an output step of outputting the calculated subject distance as a distance measurement result.

In the distance measuring method according to a thirty-first aspect of the present invention, in the twenty-fourth to thirtieth aspects described above, a first distance measurement is performed while the distance of interest is being changed with a second change width larger than a first change width to obtain a first subject distance, a second distance measurement is performed while the distance of interest being changed with the first change width near the first subject distance to obtain a second subject distance, and the second subject distance is outputted as the distance measurement result.

In the distance measuring method according to a thirty-second aspect of the present invention, in the thirty-first aspect described above, a judgment criterion for the optimum calibration data differs between the first distance measurement and the second distance measurement.

A distance measuring method according to a thirty-third aspect of the present invention includes an image input step of inputting a plurality of viewpoint images obtained by capturing a subject from different viewpoints by a plurality of image pickup devices; a calibration data obtaining step of paying attention to each of a plurality of distances of interest and obtaining calibration data corresponding to each of the plurality of distances of interest from a plurality of pieces of calibration data for matching two-dimensional coordinates of the viewpoint images and three-dimensional coordinates in a real space; a step of determining a beginning distance of interest among the plurality of distances of interest; an image correcting step of correcting, for each of the distances of interest, the plurality of viewpoint images based on each of the pieces of calibration data; a parallax calculation step of calculating, for each of the distances of interest, a parallax between the plurality of corrected viewpoint images; a distance calculation step of calculating, for each of the distances of interest, a subject distance based on the parallax; a step of determining the calculated subject distance as a next distance of interest, thereby switching the distance of interest; a comparing step of calculating, for each of the distances of interest, a difference between the subject distance and the distance of interest and comparing the differences before and after switching of the distance of interest, thereby selecting a distance measurement result from the plurality of calculated subject distances; and an output step of outputting the distance measurement result.

A distance measuring method according to a thirty-fourth aspect of the present invention includes an image input step of inputting a plurality of viewpoint images obtained by capturing a subject from different viewpoints by a plurality of image pickup devices; a step of determining a beginning distance of interest among a plurality of distances of interest; a calibration data obtaining step of paying attention to each of the plurality of distances of interest and obtaining a plurality of pieces of calibration data corresponding to each of the plurality of distances of interest from a plurality of pieces of calibration data for matching two-dimensional coordinates of the viewpoint images and three-dimensional coordinates in a real space; an image correcting step of correcting, for each of the distances of interest, the plurality of viewpoint images based on each of the pieces of calibration data; a parallax calculation step of calculating, for each of the distances of interest, a parallax between the plurality of corrected viewpoint images; a distance calculation step of calculating, for each of the distances of interest, a subject distance based on the parallax; a step of determining the calculated subject distance as a next distance of interest, thereby switching the distance of interest; a comparing step of calculating, for each of the distances of interest, a difference between the subject distance and the distance of interest and comparing the difference and a threshold; and an output step of outputting the calculated subject distance as a distance measurement result when the difference is smaller than the threshold.

The distance measuring method according to a thirty-fifth aspect of the present invention includes, in the twenty-fourth aspect described above, a step of determining a beginning distance of interest among a plurality of distances of interest; a step of calculating, for each of the distances of interest, a correlation degree of at least one of luminance and color between the plurality of corrected viewpoint images; and a step of determining the calculated subject distance as a next distance of interest, thereby switching the distance of interest, wherein the correlation degrees are compared for each switching of the distance of interest and, when the correlation degree calculated after switching of the distance of interest is smaller than the correlation degree calculated before switching of the distance of interest, the subject distance calculated before switching of the distance of interest is adopted as the distance measurement result.

The distance measuring method according to a thirty-sixth aspect of the present invention includes, in the twenty-fourth aspect described above, a step of determining a beginning distance of interest among a plurality of distances of interest; a step of calculating, for each of the distances of interest, a vertical deviation amount between corresponding pixels between the plurality of corrected viewpoint images; and a step of determining the calculated subject distance as a next distance of interest, thereby switching the distance of interest, wherein the vertical deviation amounts are compared for each switching of the distance of interest and, when the vertical deviation amount calculated after switching of the distance of interest is larger than the vertical deviation amount calculated before switching of the distance of interest, the subject distance calculated before switching of the distance of interest is adopted as the distance measurement result.

The distance measuring method according to a thirty-seventh aspect of the present invention includes, in the twenty-fourth aspect described above, a step of determining a beginning distance of interest among a plurality of distances of interest; a step of calculating, for each of the distances of interest, a parallax-calculated pixel count that allows parallax calculation between the plurality of corrected viewpoint images; and a step of determining the calculated subject distance as a next distance of interest, thereby switching the distance of interest, wherein the parallax-calculated pixel counts are compared for each switching of the distance of interest and, when the parallax-calculated pixel count calculated after switching of the distance of interest is larger than the parallax-calculated pixel count calculated before switching of the distance of interest, the subject distance calculated before switching of the distance of interest is adopted as the distance measurement result.

The distance measuring method according to a thirty-eighth aspect of the present invention includes, in the twenty-fourth aspect described above, a step of determining a beginning distance of interest among a plurality of distances of interest; a step of calculating, for each of the distances of interest, a local-noise pixel count that is locally present in a parallax distribution of the plurality of corrected viewpoint images; and a step of determining the calculated subject distance as a next distance of interest, thereby switching the distance of interest, wherein the local-noise pixel counts are compared for each switching of the distance of interest and, when the local-noise pixel count calculated after switching of the distance of interest is larger than the local-noise pixel count calculated before switching of the distance of interest, the subject distance calculated before switching of the distance of interest is adopted as the distance measurement result.

In the distance measuring method according to a thirty-ninth aspect of the present invention, in the thirty-third to thirty-eighth aspects described above, a judgment criterion for the optimum calibration data differs between a first distance measurement for determining the beginning distance of interest and obtaining an initial said subject distance and a second distance measurement for determining the subject distance obtained in the first distance measurement as a next said distance of interest and obtaining the subject distance as the distance measurement result.

In the distance measuring method according to a fortieth aspect of the present invention, in the twenty-fourth to thirty-ninth aspects described above, a histogram indicating a relation between a parallax and a number of occurrences between the viewpoint images is created to determine a representative parallax, and the subject distance is calculated based on the representative parallax.

In the distance measuring method according to a forty-first aspect of the present invention, in the fortieth aspect described above, a most frequent value is detected in the histogram, and the most frequent value is determined as the representative parallax.

In the distance measuring method according to a forty-second aspect of the present invention, in the twenty-fourth to thirty-ninth aspects described above, a histogram indicating a relation between a distance and a number of occurrences of each pixel of the viewpoint images is created, a representative distance is determined based on the number of occurrences in the histogram, and the representative distance is outputted as the distance measurement result.

In the distance measuring method according to a forty-third aspect of the present invention, in the forty-second aspect described above, a most frequent value is detected in the histogram, and the most frequent value is determined as the representative distance.

In the distance measuring method according to a forty-fourth aspect of the present invention, in the fortieth to forty-third aspects described above, whether the number of occurrences is high or low is discriminated in the histogram, and a component of a pixel locally present is removed from the histogram.

In the distance measuring method according to a forty-fifth aspect of the present invention, in the fortieth to forty-fourth aspects described above, a region of interest for which the number of occurrences is to be calculated is determined, and the number of occurrences is calculated restrictively to the region of interest to create the histogram.

In the distance measuring method according to a forty-sixth aspect of the present invention, in the forty-fifth aspect described above, a calculation region for use in exposure control or focusing control at the time of shooting the viewpoint images is determined as the region of interest.

In the distance measuring method according to a forty-seventh aspect of the present invention, in the forty-fifth aspect described above, the viewpoint images are divided into a plurality of divisional regions in an array, a frequency analysis for each of the divisional regions, and a divisional region having a high-frequency component as the region of interest.

In the distance measuring method according to a forty-eighth aspect of the present invention, in the forty-fifth to forty-seventh aspects described above, a specific target extraction region where a specific target is extracted from the viewpoint images is determined as the region of interest.

In the distance measuring method according to a forty-ninth aspect of the present invention, in the forty-fifth to forty-eighth aspects described above, a weight with respect to the number of occurrences is determined based on a position of each of the pixels in the viewpoint images, and the histogram is created by weighting based on the weight.

A distance measuring apparatus according to a fiftieth aspect of the present invention includes an image input unit inputting a plurality of viewpoint images obtained by capturing a same subject from different viewpoints by an image pickup apparatus capable of focus adjustment; a calibration parameter storage unit storing calibration parameters corresponding to focal positions in the image pickup apparatus; a distance estimating unit estimating a subject distance, which is a distance from the image pickup apparatus to the subject, based on the viewpoint images or collateral information of the viewpoint images; a focal position selecting unit selecting a focal position based on the subject distance estimated by the distance estimating unit; an initial calibration data setting unit setting initial calibration data for use in initial distance measurement calculation for the subject from the calibration parameters stored in the calibration parameter storage unit based on the focal position selected by the focal position selecting unit; and a distance measurement calculation unit calculation a subject distance based on the initial calibration data set by the initial calibration data setting unit and a parallax between the plurality of viewpoint images.

According to the present invention, initial calibration data can be set in a simple manner by using a viewpoint image or its collateral information.

The distance measuring apparatus according to a fifty-first aspect of the present invention includes, in the fiftieth aspect described above, a judging unit evaluating the distance calculated by the distance measurement calculation unit and judging success or failure of distance measurement calculation; and a calibration parameter resetting unit resetting a calibration parameter applicable to the subject distance from the calibration parameters stored in the calibration parameter storage unit according to the judgment result of the judging unit.

According to the present invention, initial calibration data is set, distance measurement calculation is performed from a viewpoint image capturing a focused subject, the distance measurement calculation is evaluated, and a calibration parameter is reset according to the result. Thus, a calibration parameter according to the variable focusing state of the image pickup optical system can be set for simple and accurate distance measurement.

In the distance measuring apparatus according to a fifty-second aspect of the present invention, in the fifty-first aspect described above, the distance estimating unit estimates the subject distance based on the collateral information of the viewpoint images, the initial calibration data setting unit sets the initial calibration data for use in the initial distance measurement calculation for the subject based on the subject distance estimated by the distance estimating unit and the calibration parameters stored in the calibration parameter storage unit, and the judging unit creates reliability information indicating reliability of the initial calibration data set by the initial calibration data setting unit based on the result of the distance measurement calculation by the distance measurement calculation unit, and judges success or failure of the distance measurement calculation based on the reliability information.

According to the present invention, success or failure of the distance measurement calculation is judged based on the reliability information created based on the result of the distance measurement subject calculation. Thus, a subject distance with low reliability can be prevented from being easily used for setting initial calibration data.

In the distance measuring apparatus according to a fifty-third aspect of the present invention, in the fifty-second aspect described above, the judging unit selects a condition for judging success or failure of the distance measurement calculation according to the reliability information.

In the distance measuring apparatus according to a fifty-fourth aspect of the present invention, in the fiftieth to fifty-third aspects described above, the distance estimating unit estimates the subject distance based on shooting mode information included in the collateral information.

According to the present invention, the subject distance can be estimated in a simple manner generally based on the shooting mode information included in the collateral information of the image.

In the distance measuring apparatus according to a fifty-fifth aspect of the present invention, in the fiftieth to fifty-third aspects described above, the distance estimating unit estimates the subject distance based on information about a shot scene obtained by analyzing the viewpoint images or shot-scene information included in the collateral information.

According to the present invention, the subject distance can be estimated in a simple manner based on the information about the shot scene included in the image itself.

In the distance measuring apparatus according to a fifty-sixth aspect of the present invention, in the fiftieth to fifty-third aspects described above, the distance estimating unit estimates the subject distance based on size information of the subject obtained by analyzing the viewpoint images or subject size information included in the collateral information.

In the distance measuring apparatus according to a fifty-seventh aspect of the present invention, in the fifty-sixth aspect described above, the distance estimating unit estimates the subject distance based on a comparison between a size of a human subject included in the viewpoint images and a standard size of the human subject.

According to the present invention, the subject distance can be estimated in a simple manner generally based on the size of the human subject included in the image.

In the distance measuring apparatus according to a fifty-eighth aspect of the present invention, in the fiftieth to fifty-third aspects described above, the distance estimating unit estimates the subject distance based on a parallax in a focus evaluation value calculation region of the viewpoint images.

According to the present invention, by calculation the parallax restrictively to the focused subject, the calculation time and calculation load can be suppressed.

In the distance measuring apparatus according to a fifty-ninth aspect of the present invention, in the fiftieth to fifty-third aspects described above, the distance estimating unit estimates the subject distance based on a convergence distance of the image pickup apparatus.

In the present invention, the subject distance is estimated by using the fact that there is a high possibility that a convergence point appears at the center of a screen when viewed from either left or right viewpoint and an image of the subject is captured at this distance.

The distance measuring apparatus according to a sixtieth aspect of the present invention includes, in the fifty-ninth aspect described above, a convergence distance storage unit storing a convergence distance for each model of the image pickup apparatus, wherein the distance estimating unit estimates the subject distance based on a convergence distance corresponding to a model of the image pickup apparatus capturing the viewpoint images among the convergence distances stored in the convergence distance storage unit.

The distance measuring apparatus according to a sixty-first aspect of the present invention includes, in the fifty-ninth aspect described above, an external parameter obtaining unit obtaining an external parameter of the image pickup apparatus, wherein the distance estimating unit calculates the convergence distance of the image pickup apparatus from the external parameter of the image pickup apparatus obtained by the external parameter obtaining unit, and estimates the calculated convergence distance as the subject distance.

According to the present invention, even when a convergence distance for each image pickup apparatus is not known in advance, the convergence distance of the image pickup apparatus can be calculated.

The distance measuring apparatus according to a sixty-second aspect of the present invention includes, in the fiftieth to fifty-third aspects described above, a feature storage unit storing features of the viewpoint images, wherein the distance estimating unit compares a feature of a previous viewpoint image stored in the feature storage unit and a feature of a current viewpoint image, and estimates a subject distance of the previous viewpoint image as the subject distance of the current viewpoint image.

In the present invention, when distance measurement is continuously performed based on a plurality of viewpoint images, it can be presumed that these viewpoint images have similar features. Therefore, by taking the subject distance for the previous viewpoint image as a current subject distance as it is, the subject distance estimating process is simplified.

In the distance measuring apparatus according to a sixty-third aspect of the present invention, in the sixty-second aspect described above, the distance estimating unit estimates the subject distance of the previous viewpoint image as the subject distance of the current viewpoint image only when the previous feature of the viewpoint images stored in the feature storage unit and the current feature of the viewpoint images match each other.

In the present invention, when the shooting condition is changed, the subject distance of the previous viewpoint image is not taken as a subject distance of the current viewpoint image, thereby preventing a subject distance not suitable for the shooting condition from being used.

The distance measuring apparatus according to a sixty-fourth aspect of the present invention includes, in the fifty to fifty-third aspects described above, a distance measurement calculation parameter input unit accepting an input of a parameter regarding distance measurement calculation, wherein the distance estimating unit estimates the subject distance from the parameter inputted from the distance measurement calculation parameter input unit.

In the present invention, it is assumed that the parameter regarding distance measurement calculation are reliable and inputted from a user, and the subject distance is calculated by using this assumption.

In the distance measuring apparatus according to a sixty-fifth aspect of the present invention, in the fiftieth to sixty-fourth aspects described above, the calibration parameter storage unit stores calibration parameters corresponding to respective focal points set in a discrete manner.

In the distance measuring apparatus according to a sixty-sixth aspect of the present invention, in the fiftieth to sixty-fourth aspects described above, the calibration parameter storage unit stores functions defining calibration parameters corresponding to respective focal points.

A distance image pickup apparatus according to a sixty-seventh aspect of the present invention includes a focal position control unit controlling a focal position of each of focus lenses of different image pickup optical systems; and an image pickup unit capable of outputting a plurality of viewpoint images obtained by image pickup devices photoelectrically converting subject images formed via the image pickup optical systems to an image input unit included in the distance measuring apparatus according to any one of the fiftieth to sixty-sixth aspects.

A distance measuring method according to a sixty-eighth aspect of the present invention includes the steps, to be executed by an information processing apparatus, of: inputting a plurality of viewpoint images obtained by capturing a same subject from different viewpoints by an image pickup apparatus capable of focus adjustment; storing calibration parameters corresponding to focal positions in the image pickup apparatus; estimating a subject distance, which is a distance from the image pickup apparatus to the subject, based on the viewpoint images or collateral information of the viewpoint images; selecting a focal position based on the estimated subject distance; setting initial calibration data for use in initial distance measurement calculation for the subject from the stored calibration parameters based on the selected focal position; and calculation a subject distance based on the set initial calibration data and a parallax between the plurality of viewpoint images.

A distance measuring program according to a sixty-ninth aspect of the present invention causes an information processing apparatus to achieve functions including: a function of accepting an input of a plurality of viewpoint images obtained by capturing a same subject from different viewpoints by an image pickup apparatus capable of focus adjustment; a function of storing calibration parameters corresponding to focal positions in the image pickup apparatus; a function of estimating a subject distance, which is a distance from the image pickup apparatus to the subject, based on the viewpoint images or collateral information of the viewpoint images; a function of selecting a focal position based on the estimated subject distance; a function of setting initial calibration data for use in initial distance measurement calculation for the subject from the stored calibration parameters based on the selected focal position; and a function of calculation a subject distance based on the set initial calibration data and a parallax between the plurality of viewpoint images.

A distance measuring system according to a seventieth aspect of the present invention includes a focal position control unit controlling a focal position of each of focus lenses of different image pickup optical systems; and an image pickup unit capable of outputting a plurality of viewpoint images obtained by image pickup devices photoelectrically converting subject images formed via the image pickup optical systems to an image input unit of the distance measuring apparatus.

Advantageous Effects of Invention

According to the present invention, a subject distance can be accurately measured even without lens position information.

Also, according to the present invention, a subject distance is estimated based on viewpoint images or collateral information of the viewpoint images, a focal position is selected based on the estimated subject distance, and an initial calibration parameter corresponding to the selected focal position is set, thereby performing a distance measurement calculation from the viewpoint images obtained by capturing the subject. Therefore, a camera parameter for calibration according to the subject distance can be set without detecting an accurate focus lens position at the time of focus adjustment by using any mechanical measure.

Furthermore, according to the present invention, initial calibration data is set to perform a distance measurement calculation from the viewpoint images obtained by capturing the subject, the distance measurement calculation is evaluated, and a calibration parameter is reset according the evaluation result. Therefore, it is possible to set a calibration parameter according to the focusing position of the variable image pickup optical system and perform an accurate distance measurement in a simple manner.

BRIEF DESCRIPTION OF DRAWINGS

FIG. 2 is an explanatory diagram illustrating an example of calibration data.
FIG. 3 is an explanatory diagram of an example of a calibration data calculation function.
FIG. 12 is a block diagram of a distance measuring apparatus in a first example of a second embodiment.
FIG. 15A is a flowchart of a distance measuring process in a second example of the second embodiment.
FIG. 15B is a flowchart of the distance measuring process in the second example of the second embodiment.

FIG. 42 is a block diagram of a distance measuring apparatus in a second example of the seventh embodiment.

FIG. 43A is a flowchart of a distance measuring process in the second example of the seventh embodiment.

FIG. 43B is a flowchart of the distance measuring process in the second example of the seventh embodiment.

FIG. 57A is a flowchart of a distance measuring process in the first example of the twelfth embodiment.

FIG. 57B is a flowchart of the distance measuring process in the first example of the twelfth embodiment.

FIG. 59A is a flowchart of a distance measuring process in a first example of a thirteenth embodiment.

FIG. 59B is a flowchart of the distance measuring process in the first example of the thirteenth embodiment.

FIG. 64A is a flowchart of a distance measuring process in the first example of the fourteenth embodiment.

FIG. 64B is a flowchart of the distance measuring process in the first example of the fourteenth embodiment.

FIG. 90 is a diagram conceptually illustrating the structure of calibration parameters corresponding to focal positions (discrete values).

FIG. 91 is a diagram conceptually illustrating the structure of calibration parameters corresponding to focal positions (functions).

DESCRIPTION OF EMBODIMENTS

Embodiments of the present invention are described in detail below according to the attached drawings.

A first embodiment is described first.

Figure 1:
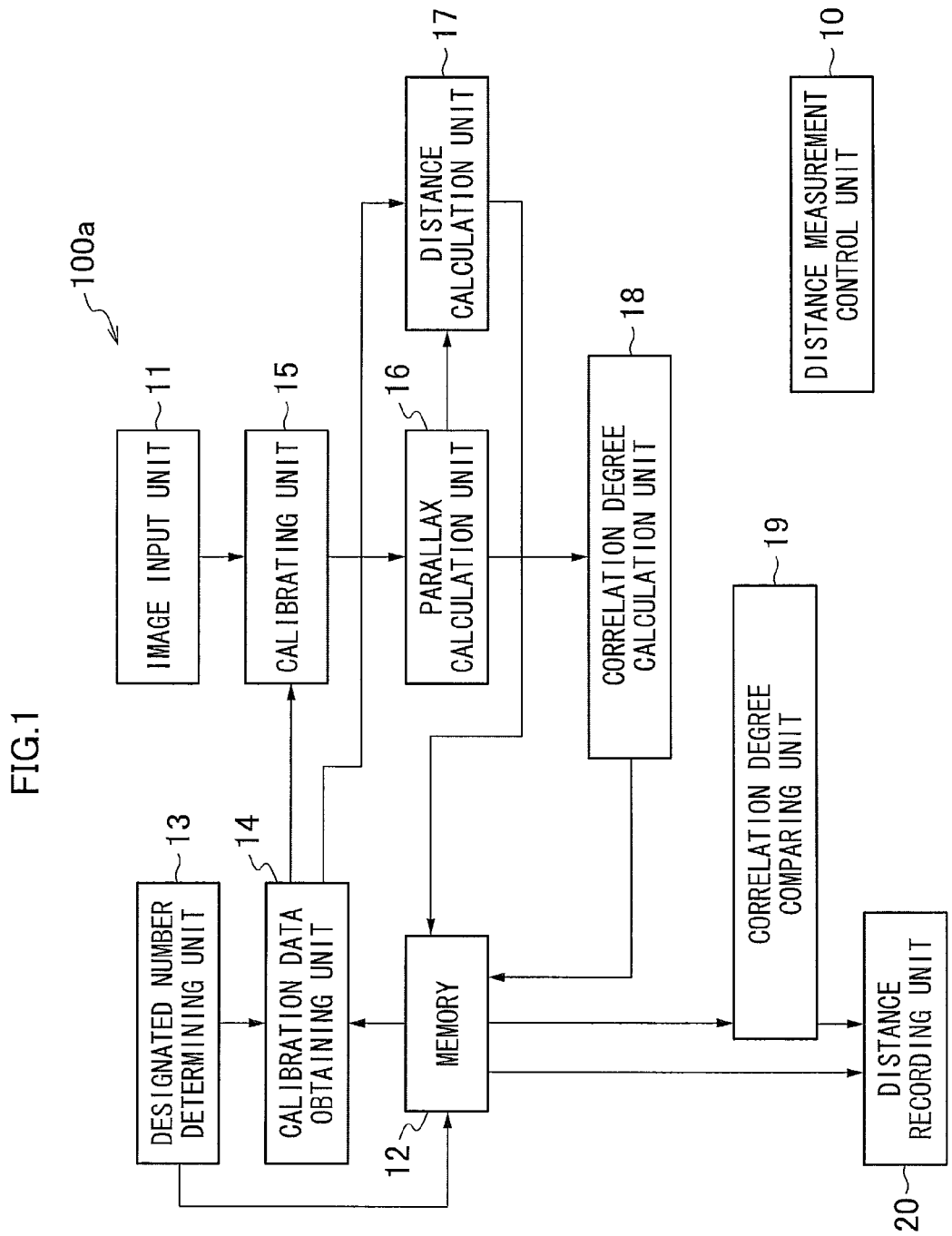
FIG. 1 is a block diagram of a distance measuring apparatus in a first example of a first embodiment.

FIG. 1 is a block diagram of a distance measuring apparatus 100a in a first example of the first embodiment.

In FIG. 1, the distance measuring apparatus 100a of the present example includes a distance measurement control unit 10, an image input unit 11, a memory 12, a designated number determining unit 13, a calibration data obtaining unit 14, a calibrating unit 15, a parallax calculation unit 16, a distance calculation unit 17, a correlation degree calculation unit 18, a correlation degree comparing unit 19, and a distance recording unit 20.

The distance measurement control unit 10 collectively controls the respective units of the distance measuring apparatus 100a, thereby executing a distance measuring process.

The image input unit 11 inputs a plurality of image pickup images (hereinafter referred to as "viewpoint images") obtained by capturing a subject from different viewpoints by a plurality of image pickup devices. Examples of the image input unit 11 include a recording medium interface inputting a plurality of viewpoint images from a recording medium such as a memory card, a camera interface receiving a plurality of viewpoint images by communicating a 3D digital camera (a stereoscopic shooting apparatus), and a network interface inputting a plurality of viewpoint images from a network.

The memory 12 is a device storing various pieces of information. For example, the memory 12 is configured of a ROM (Read Only Memory), a RAM (Random Access Memory), and an EEPROM (Electrically Erasable and Programmable ROM).

The distance measurement control unit 10, the designated number determining unit 13, the calibration data obtaining unit 14, the calibrating unit 15, the parallax calculation unit 16, the distance calculation unit 17, the correlation degree calculation unit 18, and the correlation degree comparing unit 19 are configured of, for example, a CPU (Central Processing Unit).

The designated number determining unit 13 determines a designated number. The designated number is an index indicating to which one attention is to be paid among a plurality of designated distances (distances of interest) over a focusable distance range focusable by an image pickup device. That is, with a designated number, the designated number determining unit 13 designates designated distance to which attention is to be paid and calibration data.

The calibration data obtaining unit 14 obtains calibration data corresponding to the determined designated number (that is, calibration data corresponding to the designated distance to which attention is paid). The calibration data is data for a matching two-dimensional coordinates of the viewpoint images and three-dimensional coordinates in a real space.

The calibrating unit 15 (image correcting means) corrects the plurality of viewpoint images based on the obtained calibration data.

The parallax calculation unit 16 calculates, for each designated distance, a parallax between the plurality of corrected viewpoint images.

The distance calculation unit 17 calculates a subject distance based on the parallax calculated by the parallax calculation unit 16.

The correlation degree calculation unit 18 calculates, for each distance of interest, a correlation degree of luminance or color between corresponding pixels between the plurality of corrected viewpoint images.

The correlation degree comparing unit 19 compares correlation degrees over the plurality of distances of interest, thereby specifying calibration data with the correlation degree being maximum from the plurality of pieces of calibration data as optimum calibration data.

The distance recording unit 20 specifies a subject distance calculated from the parallax between the corrected viewpoint images with the optimum calibration data as a distance measurement result, and records the result in a recording medium.

Next, various modes for obtaining calibration data are described.

In a first mode, table information indicating a correspondence between a focusable distance and calibration data is stored in the memory 12 in advance, and calibration data corresponding to the focusable distance is obtained from the memory 12.

FIG. 2 illustrates an example of structure of calibration data stored in the memory 12. The calibration data of the present example is configured to include, for each image pickup device of a camera, distortion parameters (center coordinates and coefficients), external parameters, and internal parameters. The distortion parameters and the internal parameters are parameters for image correction for each image pickup device, and the external parameters are parameters for image correction between image pickup devices. Calibration data between designated distances may be found by linear interpolation.

In a second mode, a function indicating a correspondence between a focusable distance and calibration data is stored in the memory 12 in advance, and calibration data corresponding to the focusable distance is calculated from the function.

FIG. 3 illustrates an example of structure of the function stored in the memory 12. The function of the present example outputs distortion parameters (center coordinates and coefficients), external parameters, and internal parameters, with a focusable distance L being taken as an input value. For example, coefficients of a polynomial expression configuring the function are stored in the memory 12.

Figure 4:
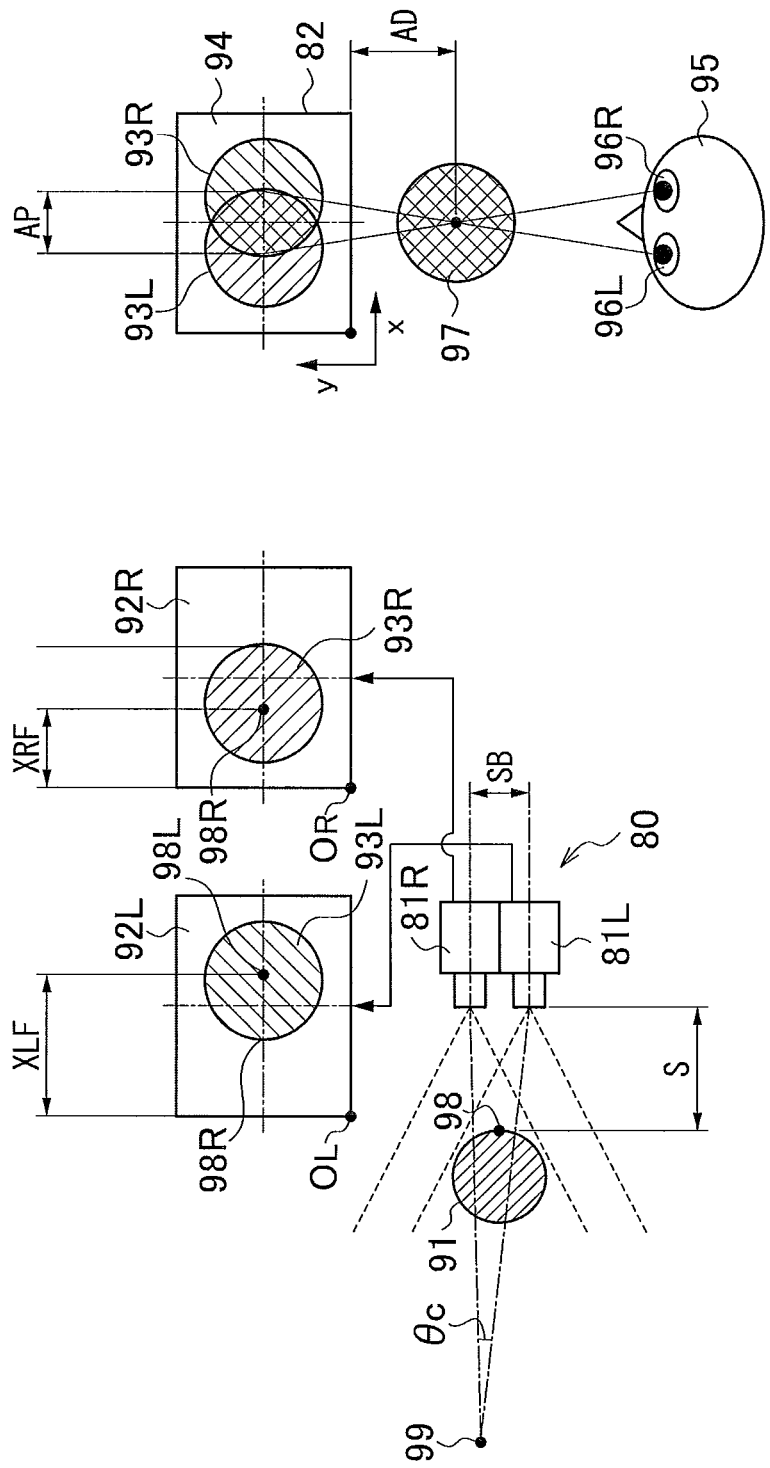
FIG. 4A is an explanatory diagram for use in describing a relation between parallax and subject distance.
FIG. 4B is an explanatory diagram for use in describing the relation between parallax and subject distance.

Next, a relation between the subject distance and parallax is described by using FIG. 4A and FIG. 4B.

First, for ease of understanding, description is made assuming that, in a 3D digital camera 80 capturing the plurality of viewpoint images, a baseline length SB (a space of optical axes of the image pickup devices 81L and 81R) and an angle of convergence θc (an angle formed by the optical axes of the image pickup devices 81L and 81R) are constant. By capturing images of a same specific target 91 (for example, a ball) from a plurality of viewpoints with the plurality of image pickup devices 81L and 81R, a plurality of viewpoint images (a left viewpoint image 92L a right viewpoint image 92R) are generated. The generated viewpoint images 92L and 92R include specific target images 93L and 93R, respectively, onto which the same specific target 91 is projected. By overlaying and displaying these viewpoint images 92L and 92R on a monitor 82 capable of stereoscopic display, that is, by 3D display, a 3D display image 94 is reproduced. The 3D display image 94 is configured of the left viewpoint image 92L and the right viewpoint 92R. An observer 95 observes the 3D display image 94 on the monitor 82 from both eyes 96L and 96R. Then, a virtual image 97 of the specific target 91 (for example, the ball) appears popping up to the observer 95. Note that since the specific target 91 is present at a position closer to a convergence point 99 where the optical axes cross in FIG. 4B, the virtual image 97 appears popping up forward, but if the specific target is present at a position far away from the convergence point 99, the virtual image appears withdrawing deeply. As illustrated in FIG. 4A, in a range where a subject distance S is smaller than a distance to the convergence point 99, as the subject distance S is smaller a difference |XLF-XRF| between center coordinates XLF and XRF (in FIG. 2 only the x coordinate is illustrated) of the specific target images 93L and 93R on the viewpoint images 92L and 92R is larger. That is, the subject distance S is smaller, corresponding points go away from each other further between the viewpoint images. Here, the difference |XLF-XRF| regards only to the x coordinate, and this is represented as a parallax AP (a both-eye parallax amount). That is, if the baseline length SB and the angle of convergence θc are constant, as the subject distance S is smaller, AP is larger, and a popping-up amount of the virtual image 97 the observer 95 can sense is larger. That is, the subject distance S and the parallax AP have a certain correspondence.

However, in practice, since fluctuations in the baseline length SB and the angle of convergence θc are present between 3D digital camera apparatuses, even the subject distance S is the same, fluctuations in the parallax AP also occur between the apparatuses. That is, in the state where calibration between image pickup devices is not appropriately performed, the subject distance S cannot be accurately found from the parallax AP. Calibration parameters for correcting fluctuations between the image pickup devices in the virtual images are external parameters.

Figure 5:
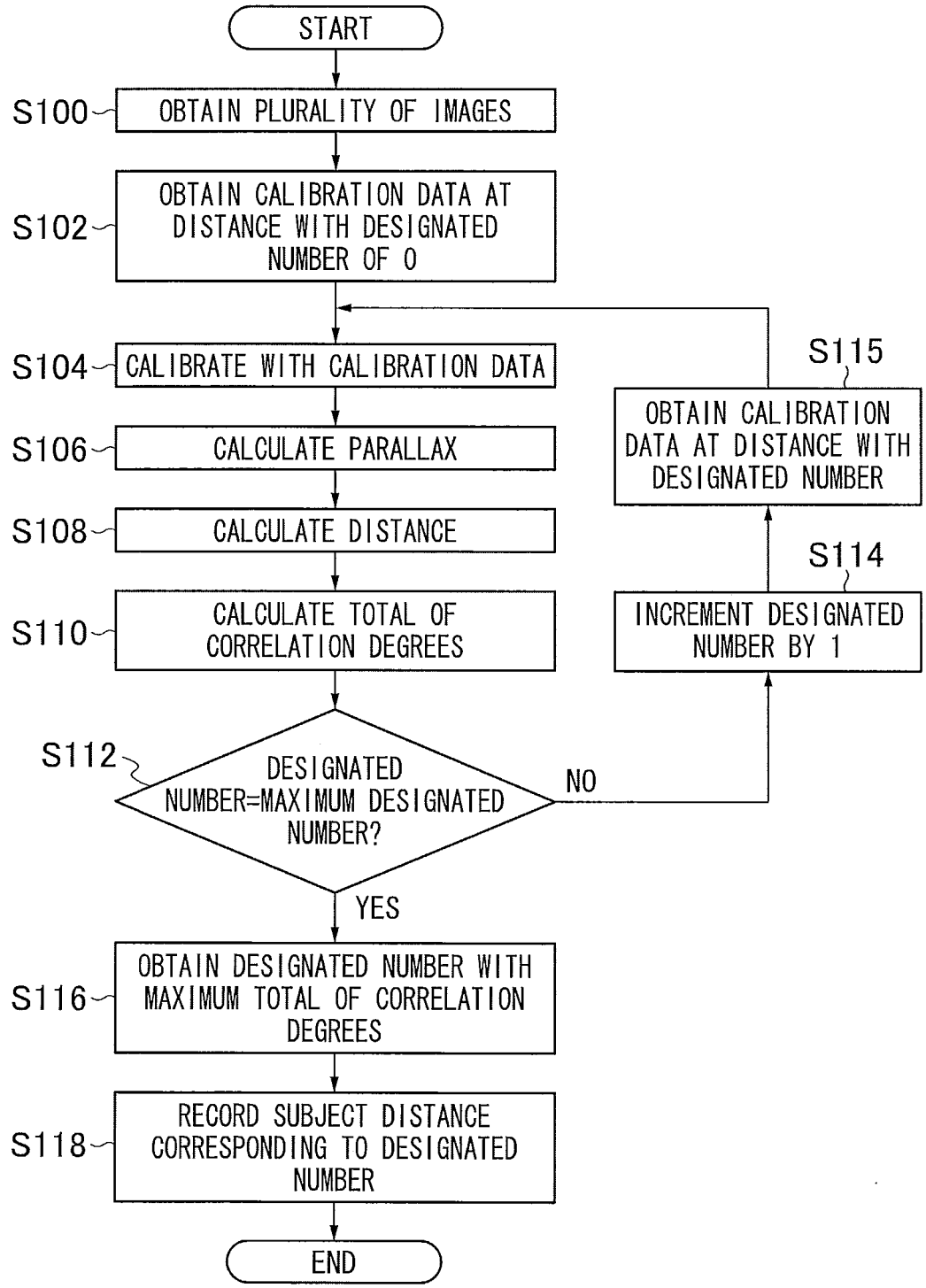
FIG. 5 is a flowchart of a distance measuring process in the first example of the first embodiment.

Next, an example of a distance measuring process in the first example of the first embodiment is described by using a flowchart of FIG. 5.

At step S100, a plurality of viewpoint images are obtained by the image input unit 11.

At step S102, an initial designated number (in the present example, "0") is determined by the designated number determining unit 13. Calibration data corresponding to the initial designated number is obtained by the calibration data obtaining unit 14. That is, calibration data corresponding to an initial designated distance (an initial distance of interest) is obtained.

At step S104, calibration is performed by the calibrating unit 15 by using the obtained calibration data. That is, based on the calibration data corresponding to the designated distance, the plurality of viewpoint images are corrected.

At step S106, a parallax is calculated by the parallax calculation unit 16 between the plurality of corrected viewpoint images. Specifically, first, with one viewpoint image being taken as a standard image and another viewpoint image being taken as a reference image, each pixel of the standard image and each pixel of the reference image are associated with each other (detection of corresponding pixels). Next, based on the position of each pixel in the standard image and position of each pixel in the reference image, a parallax of each pixel is calculated.

In the present example, a parallax of each pixel is calculated not in an entire range of the viewpoint image but in a specified area of interest (for example, a focusing area).

At step S108, based on the parallax, a subject distance is calculated by the distance calculation unit 17.

At step S110, a total of correlation degrees of at least one of luminance and color in the plurality of corrected viewpoint images is calculated by the correlation degree calculation unit 18.

Note that since a difference in luminance and color between the corresponding pixels (a correlation degree for each pixel) between the plurality of viewpoint images has been already calculated by the parallax calculation unit 16 through detection of corresponding pixels, a total of differences can be totalized for a specified area of interest (for example, a focusing area or a face detection area). The area of interest will be described further below in detail in a fourteenth embodiment.

At step S112, it is determined whether the designated number=the maximum designated number. If the designated number=the maximum designated number does not hold, the procedure goes to step S114. If the designated number=the maximum designated number holds, the procedure goes to step S116.

If the designated number=the maximum designated number does not hold, the designated number is incremented by 1 at step S114. At step S115, calibration data corresponding to a distance with the designated number (a designated distance) is obtained by the calibration data obtaining unit 14, and then the procedure goes to step S104.

If the designated number=the maximum designated number holds, by the correlation degree comparing unit 19 at step S116, the totals of correction degrees are compared over all designated distances receiving attention, and a designated number with a maximum total of correlation degrees is selected. That is, calibration data with a maximum total of correlation degrees is specified from the plurality of pieces of calibration data as optimum calibration data.

At step S118, distance information corresponding to the selected designated number is recorded by the distance recording unit 20. That is, the subject distance calculated from the parallax between the corrected viewpoint images with the optimum calibration data is outputted as a distance measurement result.

Also, in the present example, the subject distance as the distance measurement result is added to an image file including the plurality of viewpoint images as additional information. For example, the subject distance is written in the header of the image file.

Figure 6:
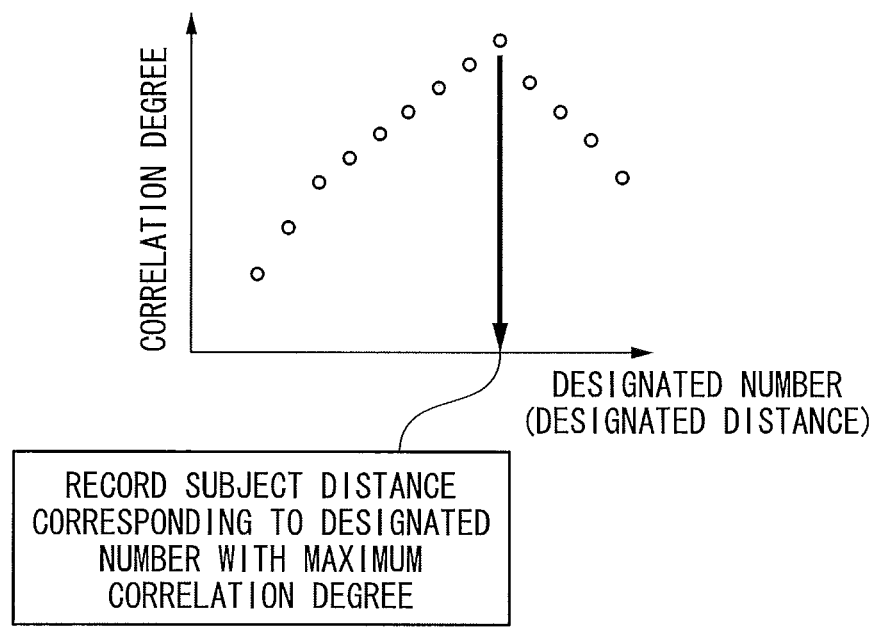
FIG. 6 is an explanatory diagram for use in describing distance measurement in the first example of the first embodiment.

As illustrated in FIG. 6, in a range in which a focus lens of an image pickup device can focus (a focusable distance), with the designated distance (the focusable distance) being switched from a minimum value to a maximum value, a correlation degree is calculated for each designated distance. Calibration data corresponding to a designated distance with a maximum correlation degree is specified as optimum calibration data. Then, the subject distance based on the parallax between the corrected viewpoint images with the optimum calibration data is recorded as a distance measurement result.

Figure 7B:
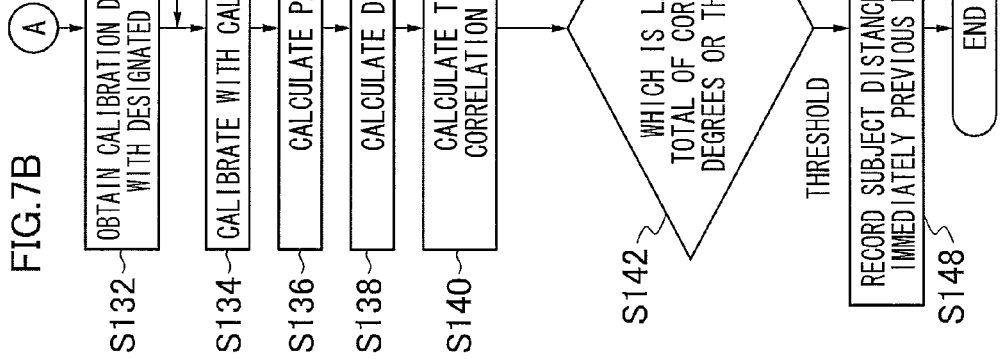
FIG. 7B is a flowchart of the distance measuring process in the second example of the first embodiment.
Figure 7A:
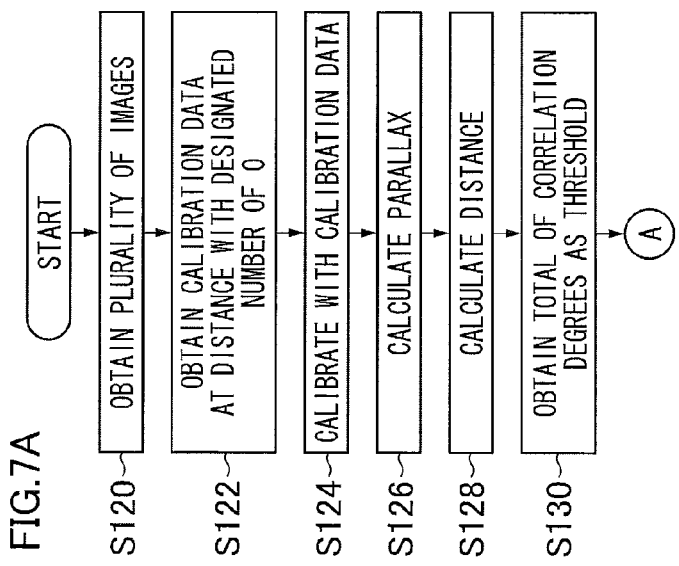
FIG. 7A is a flowchart of a distance measuring process in a second example of the first embodiment.

Next, an example of a distance measuring process in a second example of the first embodiment is described by using flowcharts of FIG. 7A and FIG. 7B.

Steps S120 to S128 are similar to steps S100 to S108 of the first example.

At step S130, by the correlation degree calculation unit 18, a total of correlation degrees is calculated and the total of correlation degrees is set as a threshold (threshold=correlation degree).

At step S132, calibration data corresponding to a designated number of 1 is obtained by the calibration data obtaining unit 14.

At step S134, calibration (image correction) with the calibration data is performed by the calibrating unit 15.

At step S136, a parallax is calculated by the parallax calculation unit 16 between the corrected viewpoint images.

At step S138, a distance is calculated by the distance calculation unit 17 based on the parallax.

At step S140, a total of correlation degrees is calculated by the correlation degree calculation unit 18.

At step S142, the total of correlation degrees currently calculated and the threshold (the total of correlation degrees previously calculated) are compared with each other by the correlation degree comparing unit 19. If the total of correlation degrees≥the threshold, the procedure goes to step S144. If the total of correlation degrees<the threshold, the procedure goes to step S148.

At step S144, the total of correlation degrees currently calculated is set as a threshold (the threshold=the total of correlation degrees currently calculated).

At step S146, the designated number is incremented by 1. At step S147, calibration data corresponding to the designated number is obtained by the calibration data obtaining unit 14, and then the procedure goes to step S134.

At step S148, the subject distance by using the calibration data corresponding to the previous designated number is recorded as a distance measurement result.

Figure 8:
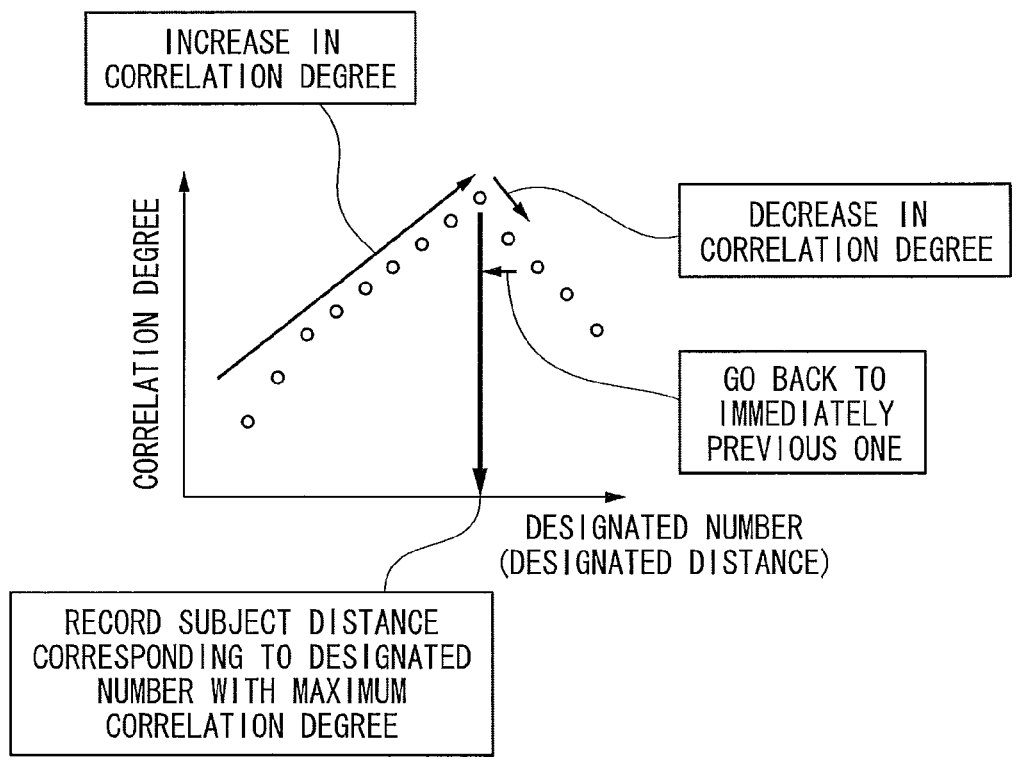
FIG. 8 is an explanatory diagram for use in describing distance measurement in the second example of the first embodiment.

In the present example, as illustrated in FIG. 8, a correlation degree is calculated for each designated distance in a range where the focus lens of the image pickup device can focus while the designated distance of interest is being switched from a minimum distance toward a maximum distance. Calibration data corresponding to a designated distance with a maximum correlation degree is specified as optimum calibration data. Then, the subject distance calculated from the parallax between the corrected viewpoint images with the optimum calibration data is recorded as a distance measurement result.

Figure 9:
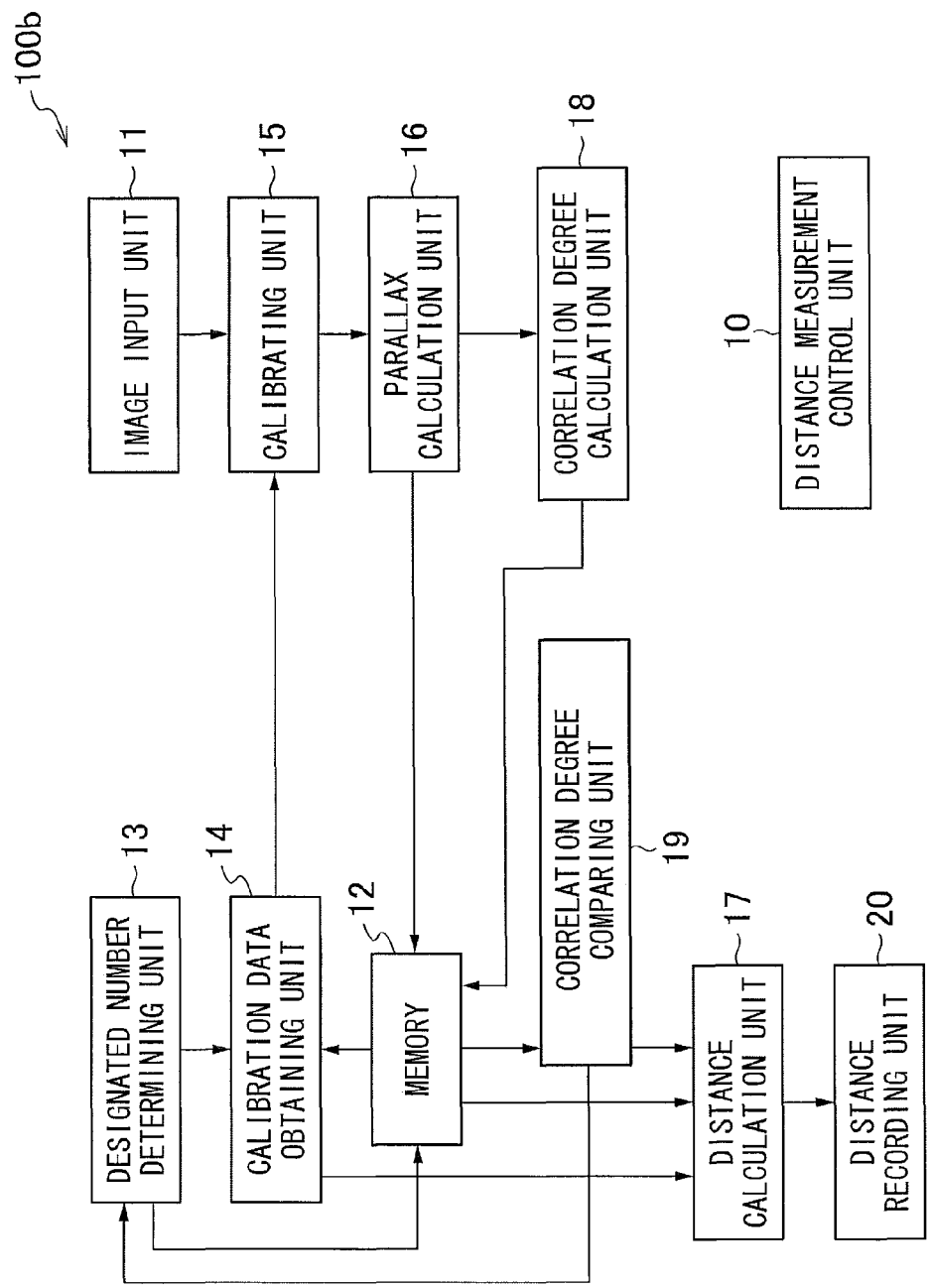
FIG. 9 is a block diagram of a distance measuring apparatus in a third example of the first embodiment.

FIG. 9 is a block diagram of a distance measuring apparatus 100b in a third example of the first embodiment. Note that components identical to those of the distance measuring apparatus 100a of the first example illustrated in FIG. 1 are provided with same reference characters.

Figure 10:
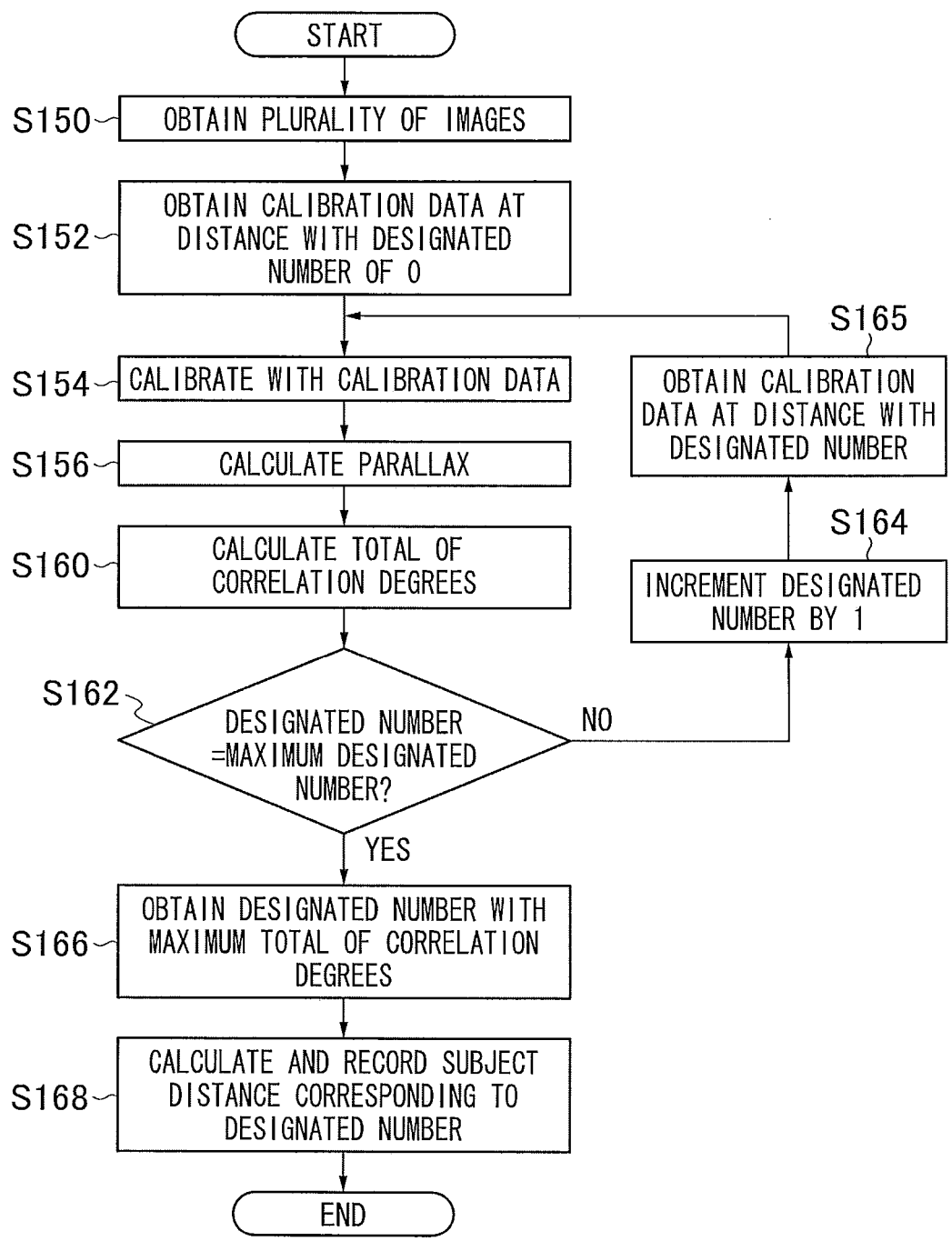
FIG. 10 is a flowchart of a distance measuring process in the third example of the first embodiment.

Next, a distance measuring process in the third example of the first embodiment is described by using a flowchart of FIG. 10.

Steps S150 to S156 are similar to steps S100 to S106 of the first example, and steps S160 to S166 are similar to steps S110 to S116 of the first example.

In the present third example, step S108 of the first example is not executed, and a subject distance is calculated and recorded at S168 only for the judgment result (that is, the designated number with the maximum correlation degree).

Figure 11B:
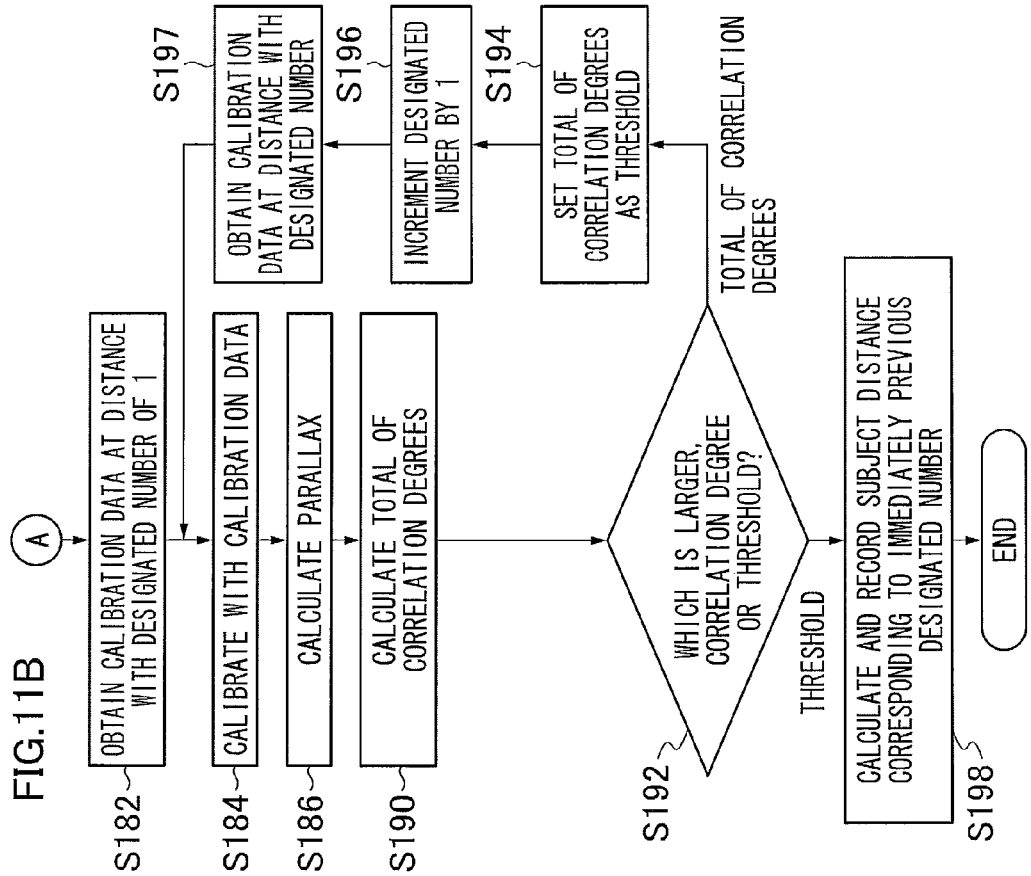
FIG. 11B is a flowchart of the distance measuring process in the fourth example of the first embodiment.
Figure 11A:
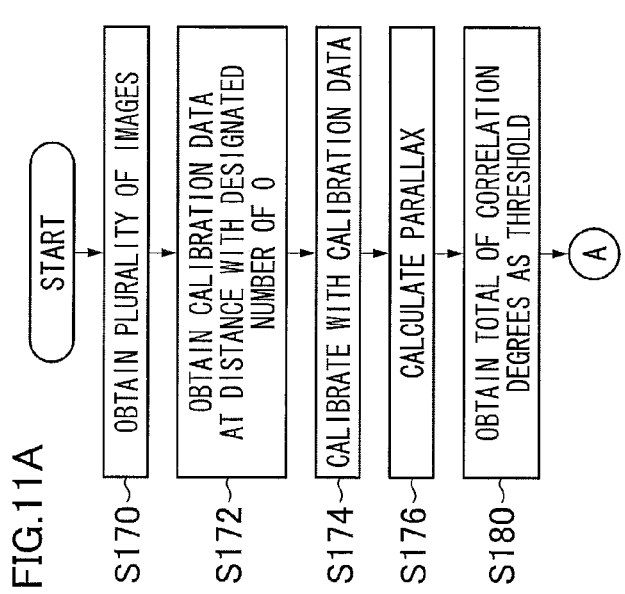
FIG. 11A is a flowchart of a distance measuring process in a fourth example of the first embodiment.

Next, a distance measuring process in a fourth example of the first embodiment is described by using flowcharts of FIG. 11A and FIG. 11B.

Steps S170 to S176 are similar to steps S120 to S126 of the second example, step S180 to S186 are similar to steps S130 to S136 of the second example, and step S190 to S197 are similar to steps S140 to S147 of the second example.

In the fourth example, steps S128 and S138 of the second example are not executed, and a subject distance is calculated and recorded at step S198 only for the judgment result (that is, the designated number with the maximum correlation degree).

Next, a second embodiment is described.

FIG. 12 is a block diagram of a distance measuring apparatus 100c in a first example of the second embodiment. Note that components identical to those of the distance measuring apparatus 100a of FIG. 1 (the first example of the first embodiment) are provided with same reference characters, and details already described are not described.

The distance measuring apparatus 100c includes a vertical deviation amount calculation unit 21 and a vertical deviation amount comparing unit 22.

The vertical deviation amount calculation unit 21 calculates, for each designated distance, a vertical deviation amount between corresponding pixels between the plurality of corrected viewpoint images.

The vertical deviation amount comparing unit 22 compares vertical deviation amounts over the plurality of designated distances receiving attention, and specifies calibration data with a minimum vertical deviation amount as optimum calibration data.

Figure 13:
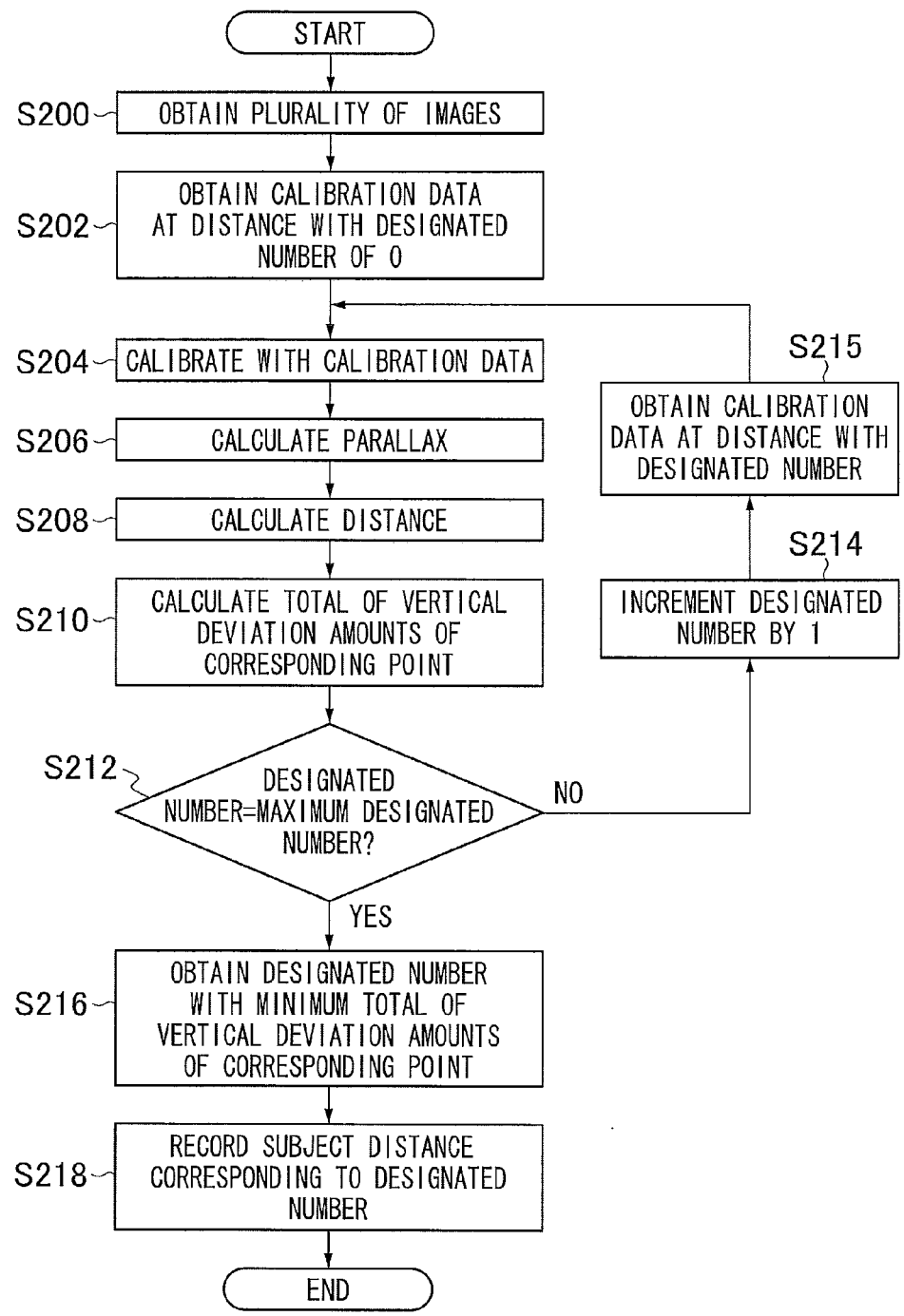
FIG. 13 is a flowchart of a distance measuring process in the first example of the second embodiment.

Next, a distance measuring process in the first example of the second embodiment is described by using a flowchart of FIG. 13.

Steps S200 to S208 are similar to steps S100 to S108 of FIG. 5 (the first example of the first embodiment).

At step S210, a total of deviation amounts between the corresponding pixels is calculated by the vertical deviation amount calculation unit 21. That is, with one viewpoint image being taken as a standard image and another viewpoint image being taken as a reference image, differences in a vertical direction between corresponding pixels between the standard image and the reference image (vertical deviation amounts of the respective pixels) are totalized. In the case of FIG. 4A, a difference between y coordinates of corresponding points between the specific target image 93L of the left viewpoint image and the specific target image 93R of the right viewpoint image is a vertical deviation amount of each pixel.

At step S212, it is determined whether the designated number=the maximum designated number.

If the designated number=the maximum designated number does not hold, the designated number is incremented by 1 at step S214. At step S215, calibration data corresponding to the designated distance is obtained, and then the procedure goes to step S204.

If the designated number=the maximum designated number holds, totals of vertical deviation amounts are calculated by the vertical deviation amount comparing unit 22 at step S216 over all designated distances receiving attention and a designated number with a minimum total of vertical deviation amounts is selected. That is, calibration data with a minimum total of vertical deviation amounts is specified from the plurality of pieces of calibration data as optimum calibration data.

At step S218, the subject distance corresponding to the selected designated number is recorded by the distance recording unit 20. That is, the subject distance calculated from the parallax between the corrected viewpoint images with the optimum calibration data is outputted as a distance measurement result.

Figure 14:
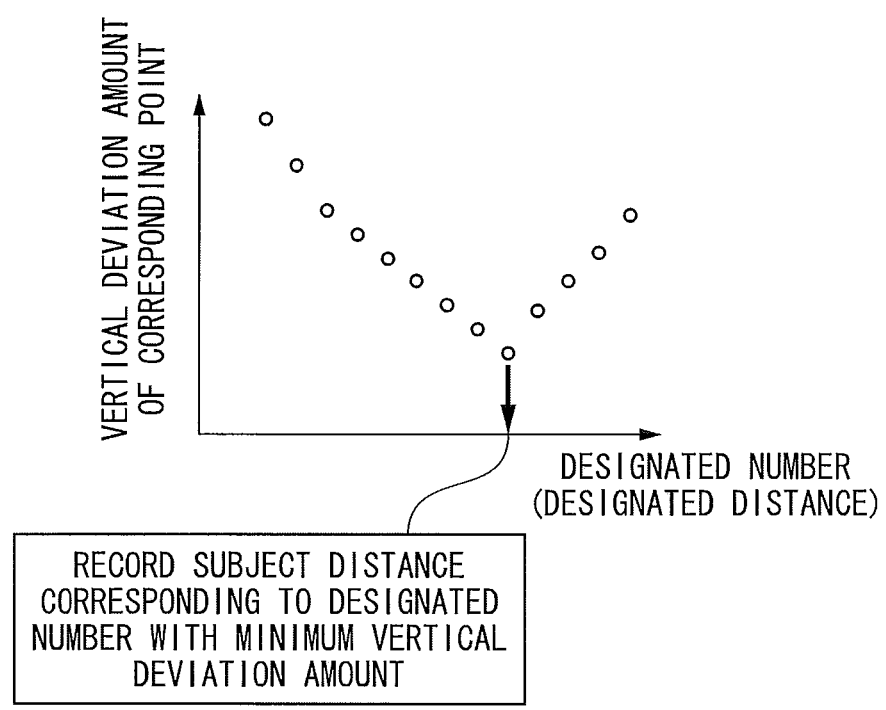
FIG. 14 is an explanatory diagram for use in describing distance measurement in the first example of the second embodiment.

If accurate calibration has been performed, a difference (a vertical deviation amount) is hardly present between the corresponding points between the corrected viewpoint images. That is, it can be said that calibration data with a minimum vertical deviation amount is most suitable calibration data. Therefore, in the present example, as illustrated in FIG. 14, a vertical deviation amount is calculated for each distance of interest in a range of focusable distances of the image pickup device while the distance of interest (the designated distance) is being switched from a minimum value toward a maximum value. Calibration data corresponding to a distance of interest with a minimum vertical deviation amount is specified as optimum calibration data, and the subject distance based on the parallax between the corrected viewpoint images with that optimum calibration data (the subject distance corresponding to a minimum value of the vertical deviation amount) is recorded as a distance measurement result.

Next, an example of a distance measuring process in a second example of the second embodiment is described by using flowcharts of FIG. 15A and FIG. 15B.

Steps S220 to S228 are similar to S120 to S128 of FIG. 7A (the second example of the first embodiment).

At step S230, a total of vertical deviation amounts is calculated by the vertical deviation amount calculation unit 21, and that total of vertical deviation amounts is set as a threshold (the threshold=the total of vertical deviation amounts).

Steps S232 to S238 are similar to steps S132 to S138 of FIG. 7B.

At step S240, a total of vertical deviation amounts is calculated by the vertical deviation amount calculation unit 21.

At step S242, the total of vertical deviation amounts currently calculated and the threshold (the total of vertical deviation amounts previously calculated) are compared by the vertical deviation amount comparing unit 22. If the total of the vertical deviation amount≤the threshold, the procedure goes to step S244. If the total of the vertical deviation amount>the threshold, the procedure goes to step S248.

At step S244, the total of vertical deviation amounts currently calculated is set as a threshold (the threshold=the total of vertical deviation amounts currently calculated). The designated number is incremented by 1 at step S246. At step S247, calibration data corresponding to the designated number is obtained by the calibration data obtaining unit 14, and then the procedure goes to step S234.

At step S248, the subject distance found by using the calibration data corresponding to the previous designated number is recorded as a distance measurement result.

In the present example, a vertical deviation amount is calculated for each distance of interest in a range of focusable distances of the image pickup device while the distance of interest (the designated distance) is being switched from a minimum value toward a maximum value. Calibration data corresponding to a distance of interest with a minimum vertical deviation amount is specified as optimum calibration data, and the subject distance calculated from the parallax between the corrected viewpoint images with that optimum calibration data is recorded as a distance measurement result.

Figure 16:
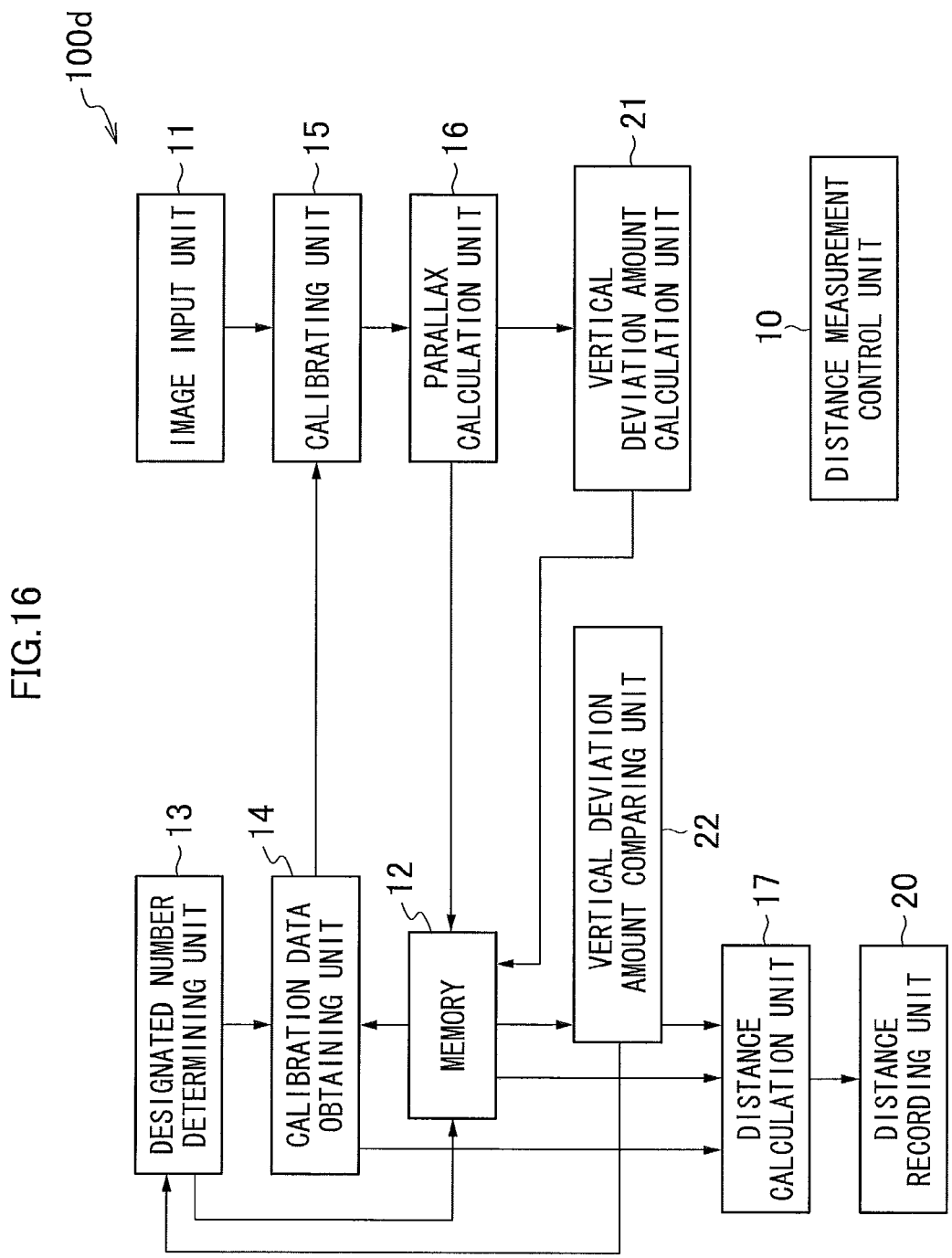
FIG. 16 is a block diagram of a distance measuring apparatus in a third example of the second embodiment.

FIG. 16 is a block diagram of a distance measuring apparatus 100*d* in a third example of the second embodiment. Note that components identical to those of the distance measuring apparatus 100*c* of the first example of the present embodiment illustrated in FIG. 12 are provided with same reference characters.

In the present third example, a distance calculation for each designated number (step S208 of FIG. 13) is not executed, and a subject distance is calculated and recorded only for the designated number with a minimum vertical deviation amount.

Next, a third embodiment is described.

Figure 17:
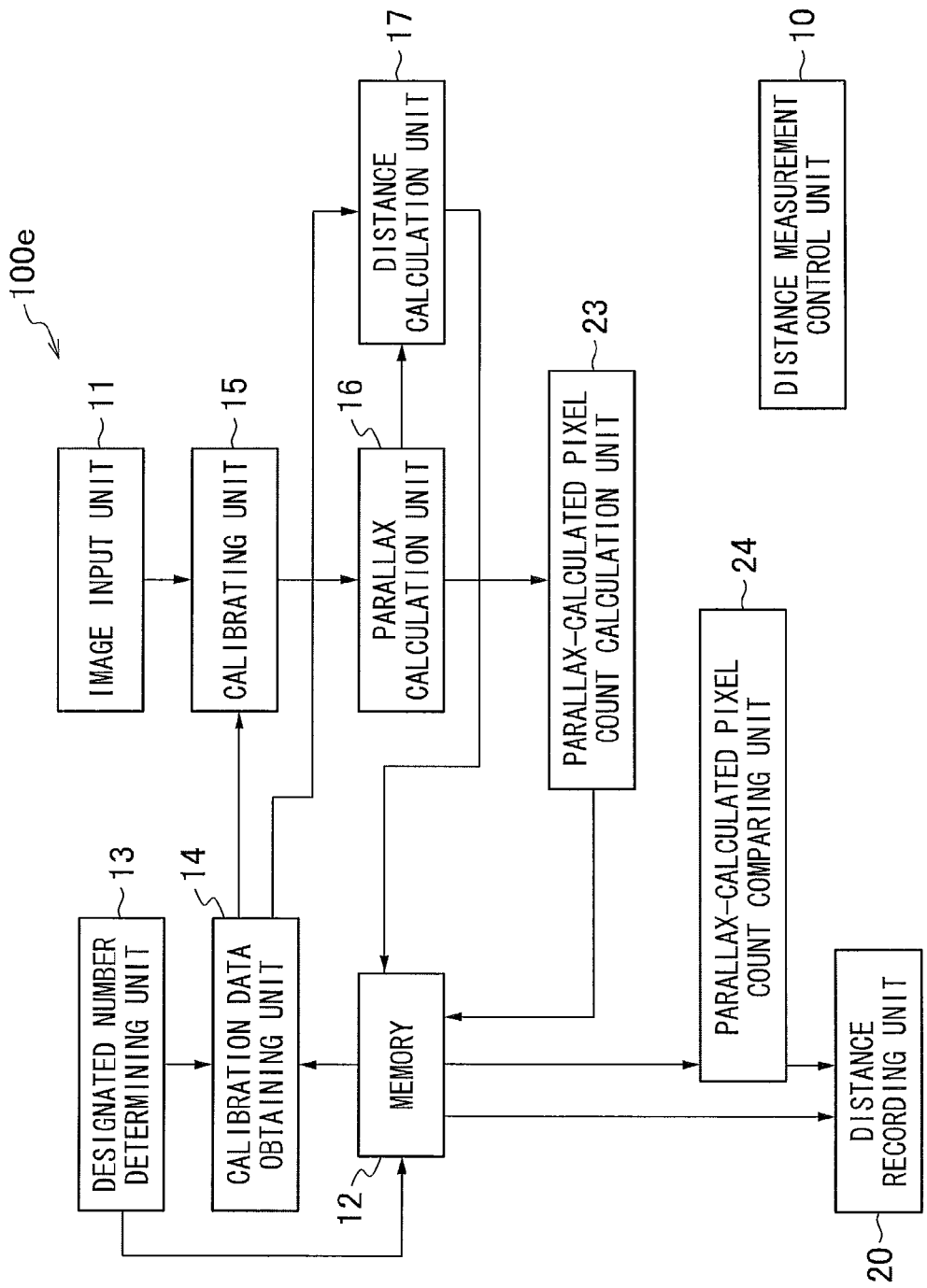
FIG. 17 is a block diagram of a distance measuring apparatus in a first example of a third embodiment.

FIG. 17 is a block diagram of a distance measuring apparatus 100*e* in a first example of the third embodiment. Note that components identical to those of the distance measuring apparatus 100*a* of FIG. 1 (the first example of the first embodiment) are provided with same reference characters, and details already described are not described.

The distance measuring apparatus 100*e* includes a parallax-calculated pixel count calculation unit 23 and a parallax-calculated pixel count comparing unit 24.

The parallax-calculated pixel count calculation unit 23 calculates, for each designated distance, a pixel count for which which a parallax calculation has been successfully made between the plurality of corrected viewpoint images (hereinafter referred to as a "parallax-calculated pixel count").

The parallax-calculated pixel count comparing unit 24 compares parallax-calculated pixel counts over the plurality of designated distances receiving attention, and calibration data with a maximum parallax-calculated pixel count is specified as optimum calibration data.

Figure 18:
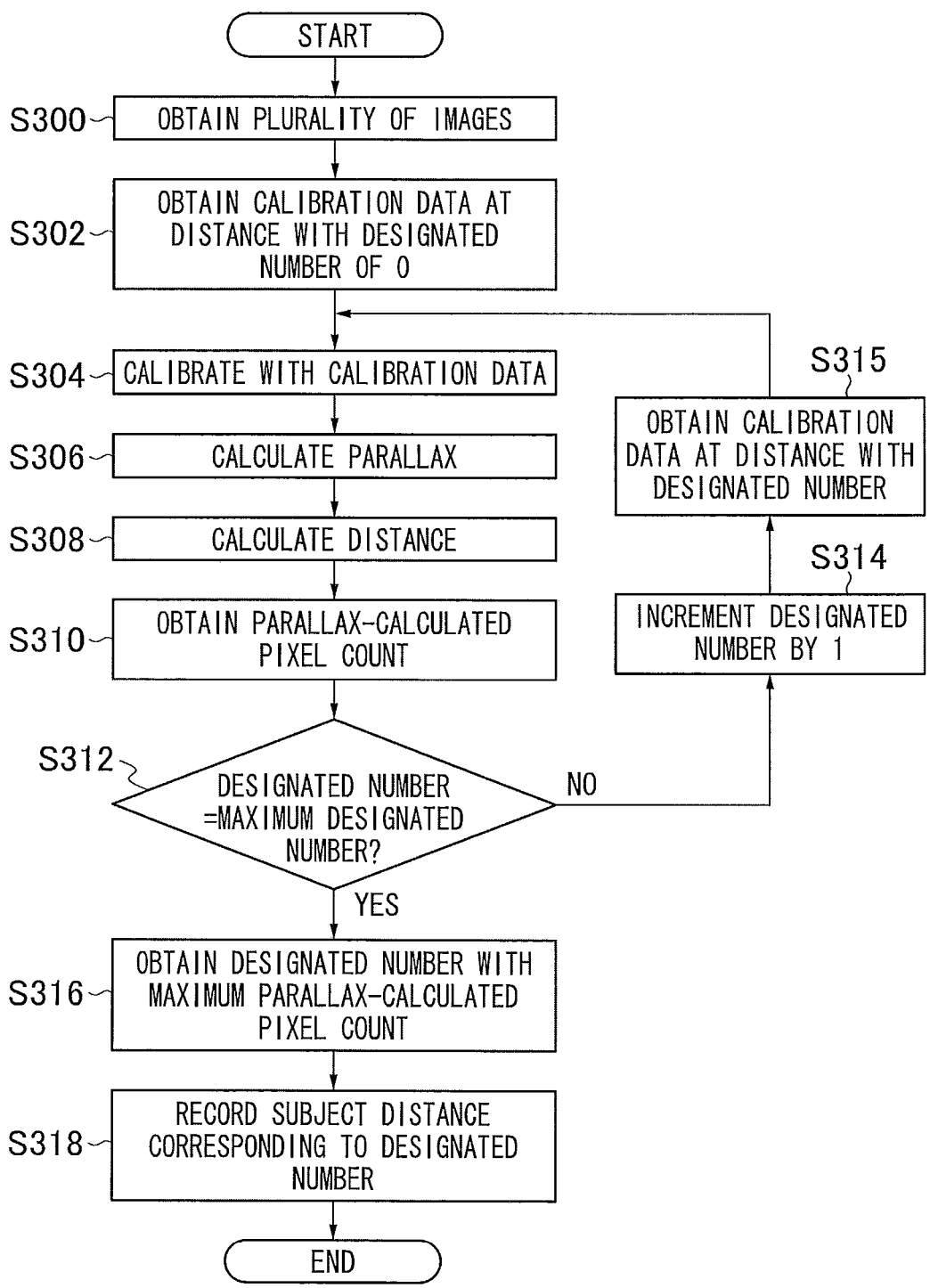
FIG. 18 is a flowchart of a distance measuring process in the first example of the third embodiment.

Next, a distance measuring process in the first example of the third embodiment is described by using a flowchart of FIG. 18.

Steps S300 to S308 are similar to steps S100 to S108 of FIG. 5 (the first example of the first embodiment).

At step S310, a parallax-calculated pixel count is calculated by the parallax-calculated pixel count calculation unit 23.

For example, a pixel relevant to both of the following first condition and second condition is counted as a parallax-calculated pixel.

First condition: a correspondence (matching) between the pixels with one of the plurality of viewpoint images being taken as a reference image and a correspondence between the pixels with another being taken as a reference image are identical.

Second condition: one pixel in the standard image does not correspond to many pixels (pixels as many as a predetermined number or more) of the reference image.

In short, the parallax-calculated pixel count calculation unit 23 counts a pixel with correct parallax calculation (a pixel with a successful parallax calculation) as a parallax-calculated pixel. It may be determined whether detection of a corresponding point has been successful between the corrected viewpoint images, and the number of successful pixels may be counted. It goes without saying that, according to a judgment criterion of each processing system, the parallax-calculated pixel count may be performed with a condition other than the first and second conditions described above.

At step S312, it is determined whether the designated number=the maximum designated number.

If the designated number=the maximum designated number does not hold, the designated number is incremented by 1 at step S314. At step S315, calibration data corresponding to the designated distance is obtained, and then the procedure goes to step S304.

If the designated number=the maximum designated number holds, parallax-calculated pixel counts are compared at step S316 by the parallax-calculated pixel count comparing unit 24 over all designated distance receiving attention, and a designated number with a maximum parallax-calculated pixel count is selected. That is, calibration data with a maximum parallax-calculated pixel count is specified from the plurality of pieces of calibration data as optimum calibration data.

At step S322, the subject distance corresponding to the selected designated number is recorded by the distance recording unit 20. That is, the subject distance based on the parallax between the corrected viewpoint images with the optimum calibration data is outputted as a distance measurement result.

Figure 19B:
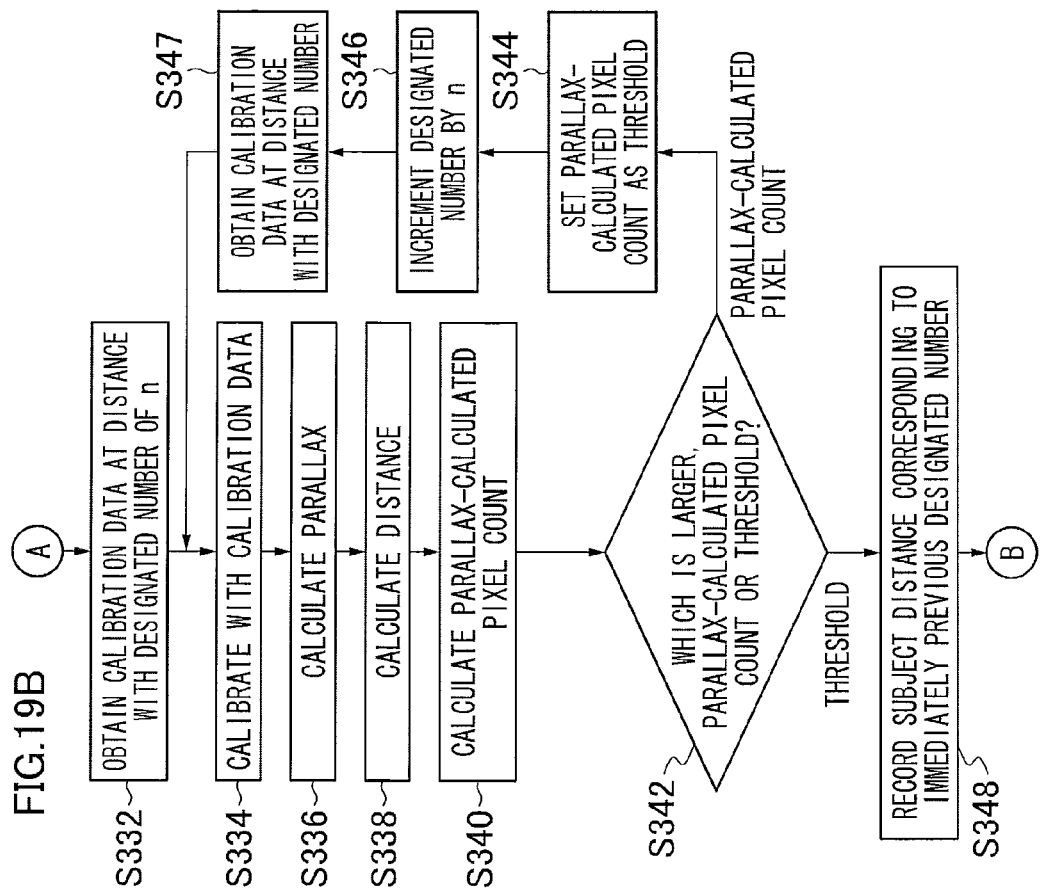
FIG. 19B is a flowchart of the distance measuring process in the third example of the second embodiment
Figure 19A:
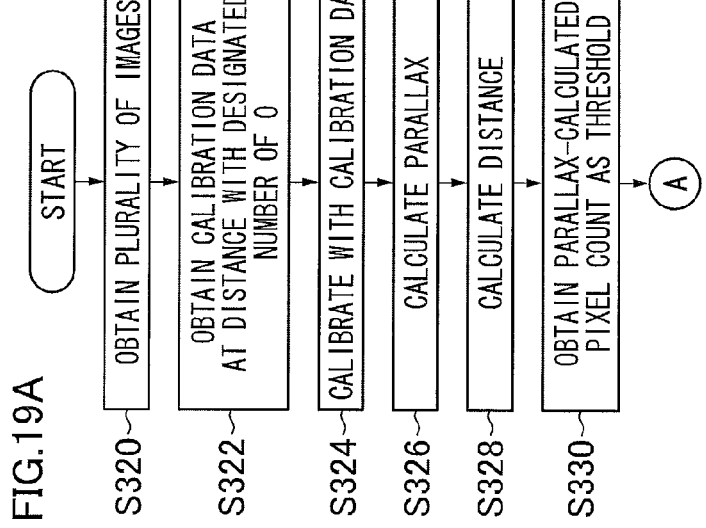
FIG. 19A is a flowchart of a distance measuring process in the third example of the second embodiment.

Next, an example of a distance measuring process in a second example of the third embodiment is described by using flowcharts of FIG. 19A and FIG. 19B.

Steps S320 to S328 are similar to steps S120 to S128 of FIG. 7A (the second example of the first embodiment).

At step S330, a parallax-calculated pixel count is calculated by the parallax-counted pixel count calculation unit 23, and that parallax-calculated pixel count is set as a threshold (the threshold=the parallax-calculated pixel count).

Steps S332 to S338 are similar to steps S132 to S138 of FIG. 7B.

At step S340, a parallax-counted pixel count is calculated by the parallax-counted pixel count calculation unit 23.

At step S342, the parallax-counted pixel count currently calculated and the threshold (the parallax-counted pixel count previously calculated) are compared by the parallax-counted pixel count comparing unit 24.

If the parallax-calculated pixel count≥the threshold, the parallax-calculated pixel count currently calculated is set as a threshold at step S344 (the threshold=parallax-calculated pixel count), the designated number is incremented by 1 at step S346, calibration data corresponding to the designated number is obtained at step S347, and then the procedure goes to step S334.

If the parallax-calculated pixel count<the threshold, the subject distance found by using the calibration data corresponding to the previous designated number is recorded at step S348 as a distance measurement result.

Figure 20:
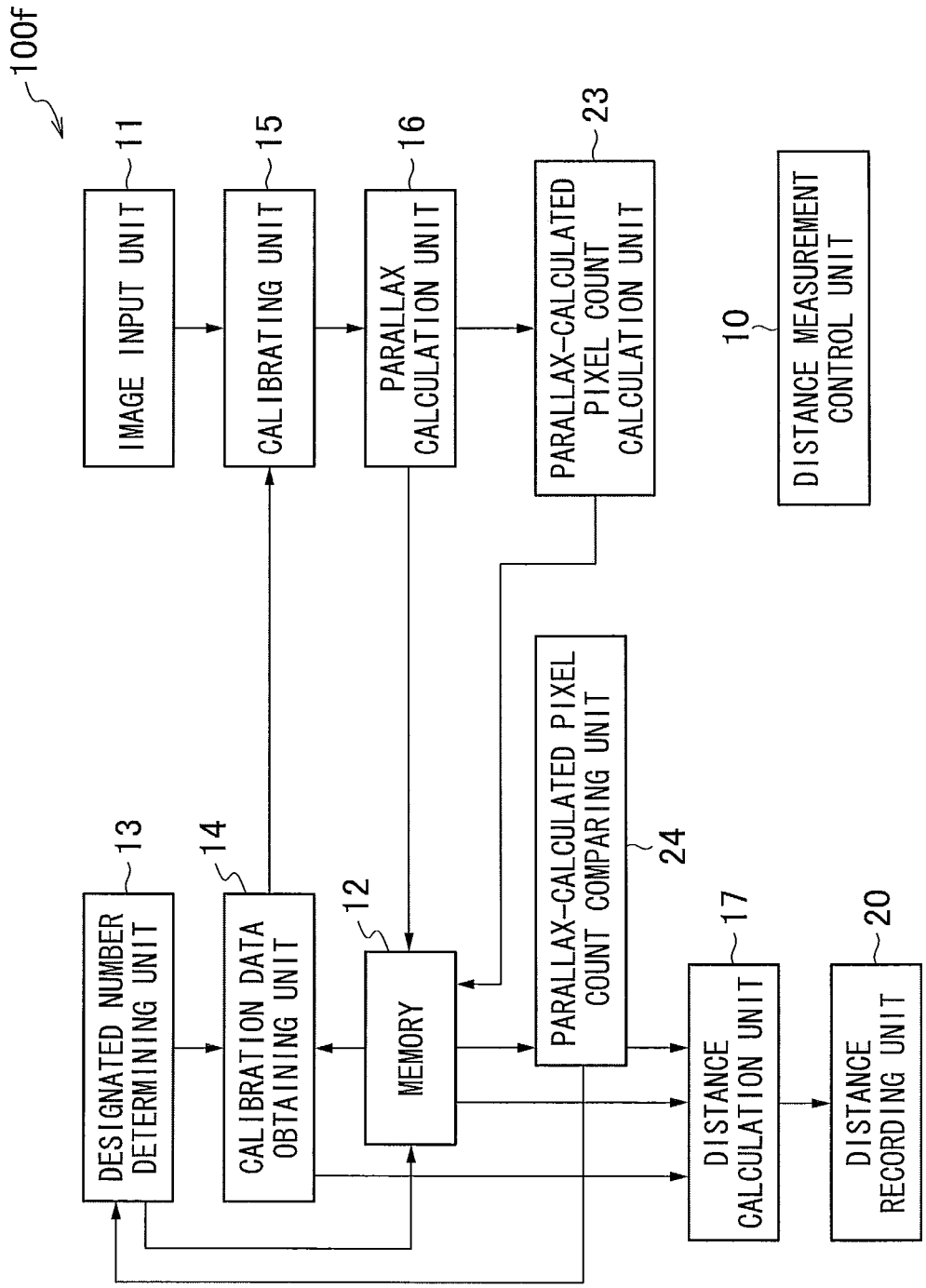
FIG. 20 is a block diagram of a distance measuring apparatus in a third example of the third embodiment.

FIG. 20 is a block diagram of a distance measuring apparatus 100f in a third example of the third embodiment. Note that components identical to those of the distance measuring apparatus 100e of the first example of the present embodiment illustrated in FIG. 17 are provided with same reference characters. In the third example, a subject distance is calculated and recorded for only a designated number with a maximum parallax-calculated pixel count.

Next, a fourth embodiment is described.

Figure 21:
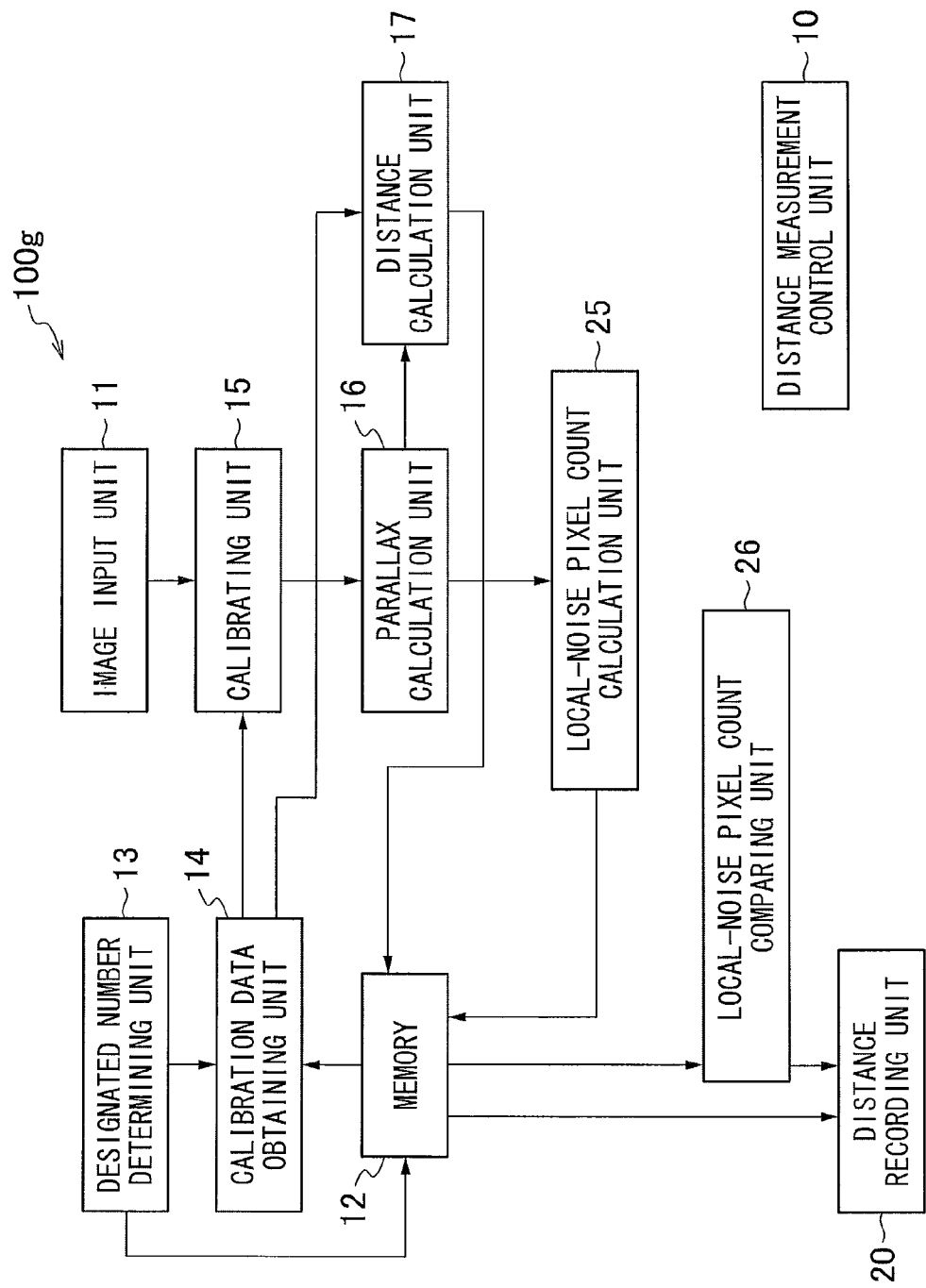
FIG. 21 is a block diagram of a distance measuring apparatus in a first example of a fourth embodiment.

FIG. 21 is a block diagram of a distance measuring apparatus 100g in a first example of the fourth embodiment. Note that components identical to those of the distance measuring apparatus 100a of FIG. 1 (the first example of the first embodiment) are provided with same reference characters, and details already described are not described.

The distance measuring apparatus 100g includes a local-noise pixel count calculation unit 25 and a local-noise pixel count comparing unit 26.

The local-noise pixel count calculation unit 25 calculates, for each designated distance, a pixel count locally present in a parallax distribution of the plurality of corrected viewpoint images (hereinafter referred to a "local-noise pixel count").

The parallax-calculated pixel count comparing unit 24 compares local-noise pixel counts over the plurality of distances of interest and specifies calibration data with a minimum local-noise pixel count as optimum calibration data.

Figure 22:
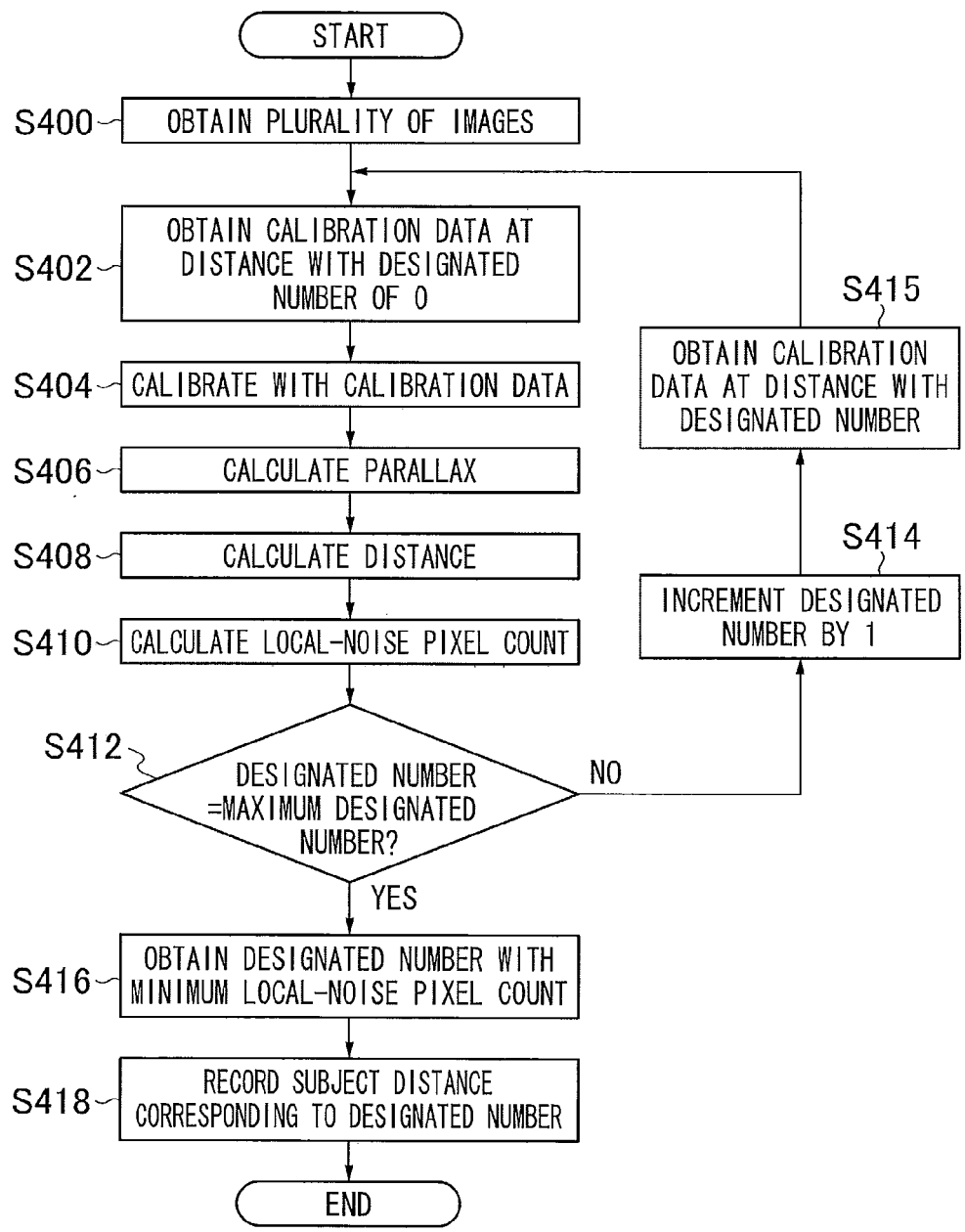
FIG. 22 is a flowchart of a distance measuring process in the first example of the fourth embodiment.

Next, an example of a distance measuring process in the first example of the fourth embodiment is described by using a flowchart of FIG. 22.

Steps S400 to S408 are similar to steps S100 to S108 of FIG. 5 (the first example of the first embodiment).

At step S410, a local-noise pixel count is calculated by the local-noise pixel count calculation unit 25.

Specifically, in the corrected viewpoint images, attention is paid to each pixel, and the number of pixels each with a significantly different parallax compared with surrounding pixels is counted. In short, not in a luminance or color distribution but in a parallax distribution, an isolated pixel or pixel group is detected, and the number of the detected pixels (local-noise pixels) is counted. Note that parallax and distance correspond with each other, an isolated pixel or pixel group may be detected and counted in a distance distribution.

At step S412, it is determined whether the designated number=the maximum designated number.

If the designated number=the maximum designated number does not hold, the designated number is incremented by 1 at step S414. At step S415, calibration data corresponding to the designated distance is obtained, and then the procedure goes to step S402.

If the designated number=the maximum designated number holds, local-noise pixel counts are compared by the local-noise pixel count comparing unit 26 over all designated distances receiving attention at step 418 and a designated number with a minimum local-noise pixel count is selected. That is, calibration data with a minimum local-noise pixel count is specified from the plurality of pieces of calibration data as optimum calibration data.

At step S418, the subject distance corresponding to the selected designated number is recorded by the distance recording unit 20.

Figure 23B:
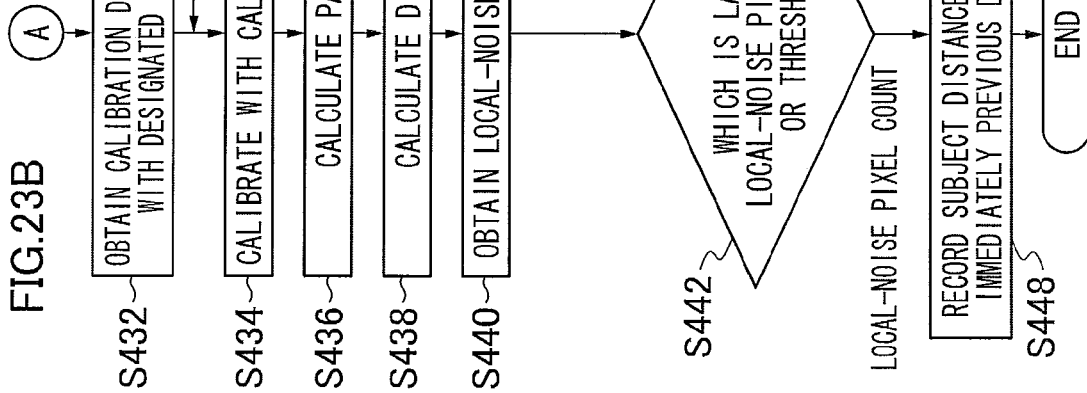
FIG. 23B is a flowchart of the distance measuring process in the second example of the fourth embodiment.
Figure 23A:
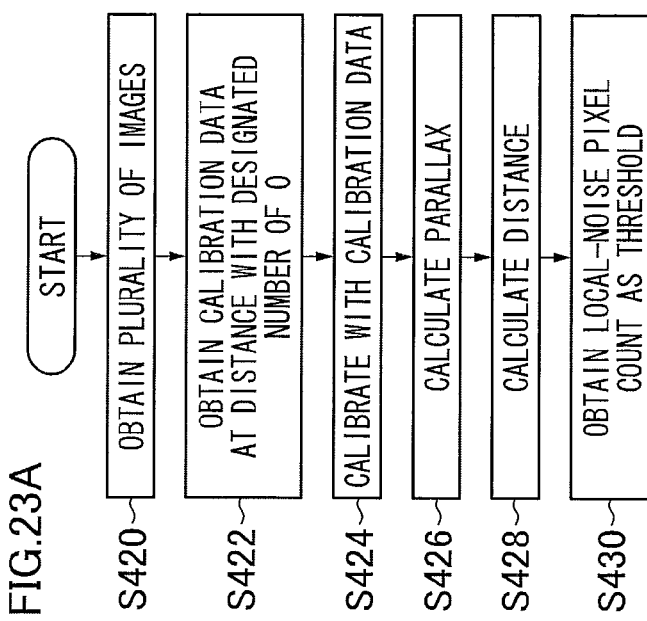
FIG. 23A is a flowchart of a distance measuring process in a second example of the fourth embodiment.

Next, an example of a distance measuring process in a second example of the fourth embodiment is described by using flowcharts of FIG. 23A and FIG. 23B.

Steps S420 to S428 are similar to steps S120 to S128 of FIG. 7A (the second example of the first embodiment).

At step S430, a local-noise pixel count is calculated by the local-noise pixel count calculation unit 25, and that local-noise pixel count is set as a threshold (the threshold=the local-noise pixel count).

Steps S432 to S438 are similar to steps S132 to S138 of FIG. 7B.

At step S440, a local-noise pixel count is calculated by the local-noise pixel count calculation unit 25.

At step S442, the local-noise pixel count currently calculated and the threshold (the local-noise pixel count previously calculated) are compared with each other by the local-noise pixel count comparing unit 26.

If the local-noise pixel count≤the threshold, the local-noise pixel count currently calculated is set as a threshold at step S444 (the threshold=the local-noise pixel count). The designated number is incremented by 1 at step S446, calibration data corresponding to the designated number is obtained at step S447, and then the procedure goes to step S434.

If the local-noise pixel count>the threshold holds, at step S448, the subject distance found by using the calibration data corresponding to the previous designated number is recorded as a distance measurement result.

Figure 24:
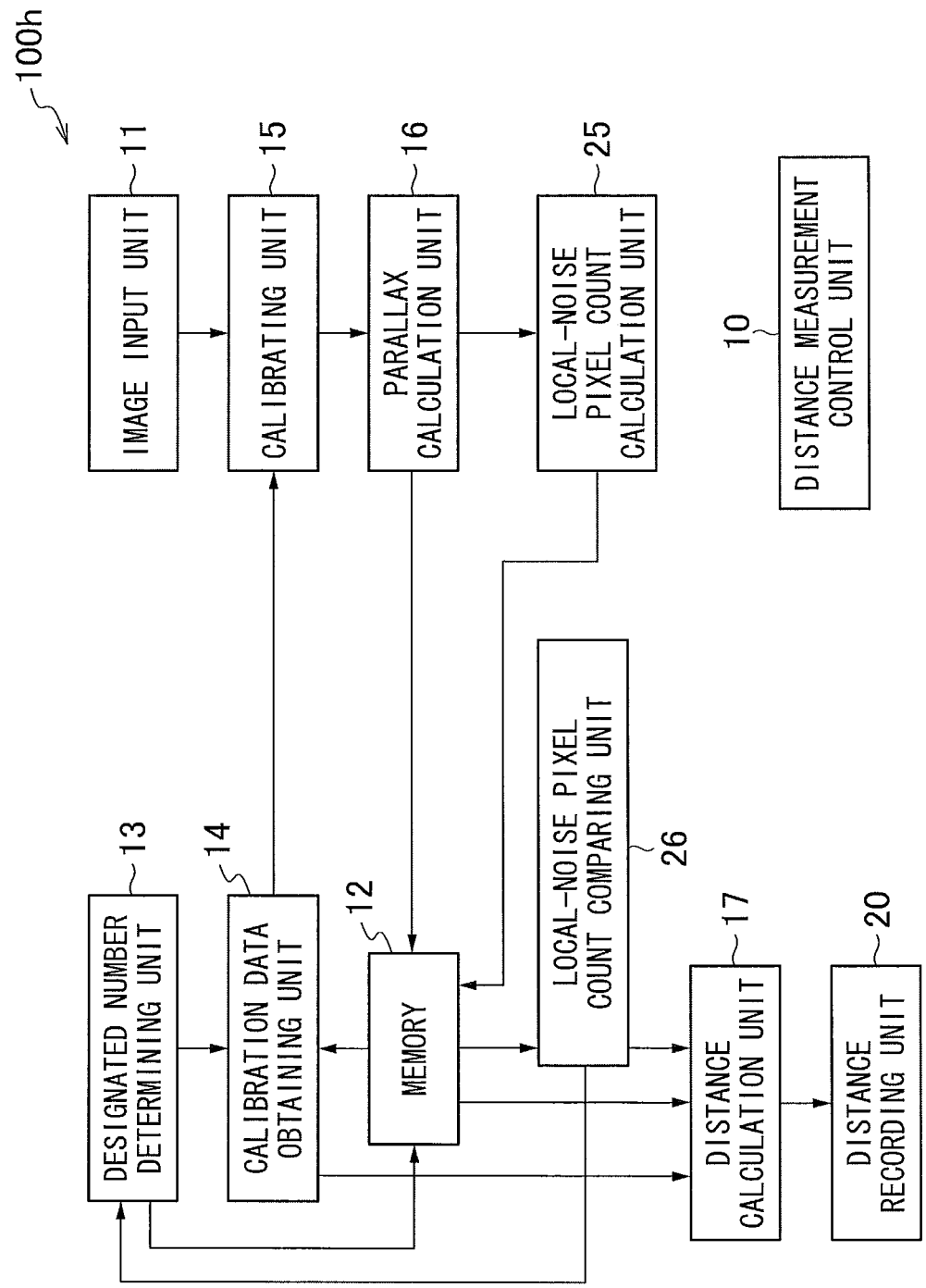
FIG. 24 is a block diagram of a distance measuring apparatus in a third example of the fourth embodiment.

FIG. 24 is a block diagram of a distance measuring apparatus 100h in a third example of the fourth embodiment. Note that components identical to those of the distance measuring apparatus 100g of the first example of the present embodiment illustrated in FIG. 21 are provided with same reference characters. In the present third example, a subject distance is calculated and recorded only for a designated number with a minimum local-noise pixel count.

Next, a fifth embodiment is described.

Figure 25:
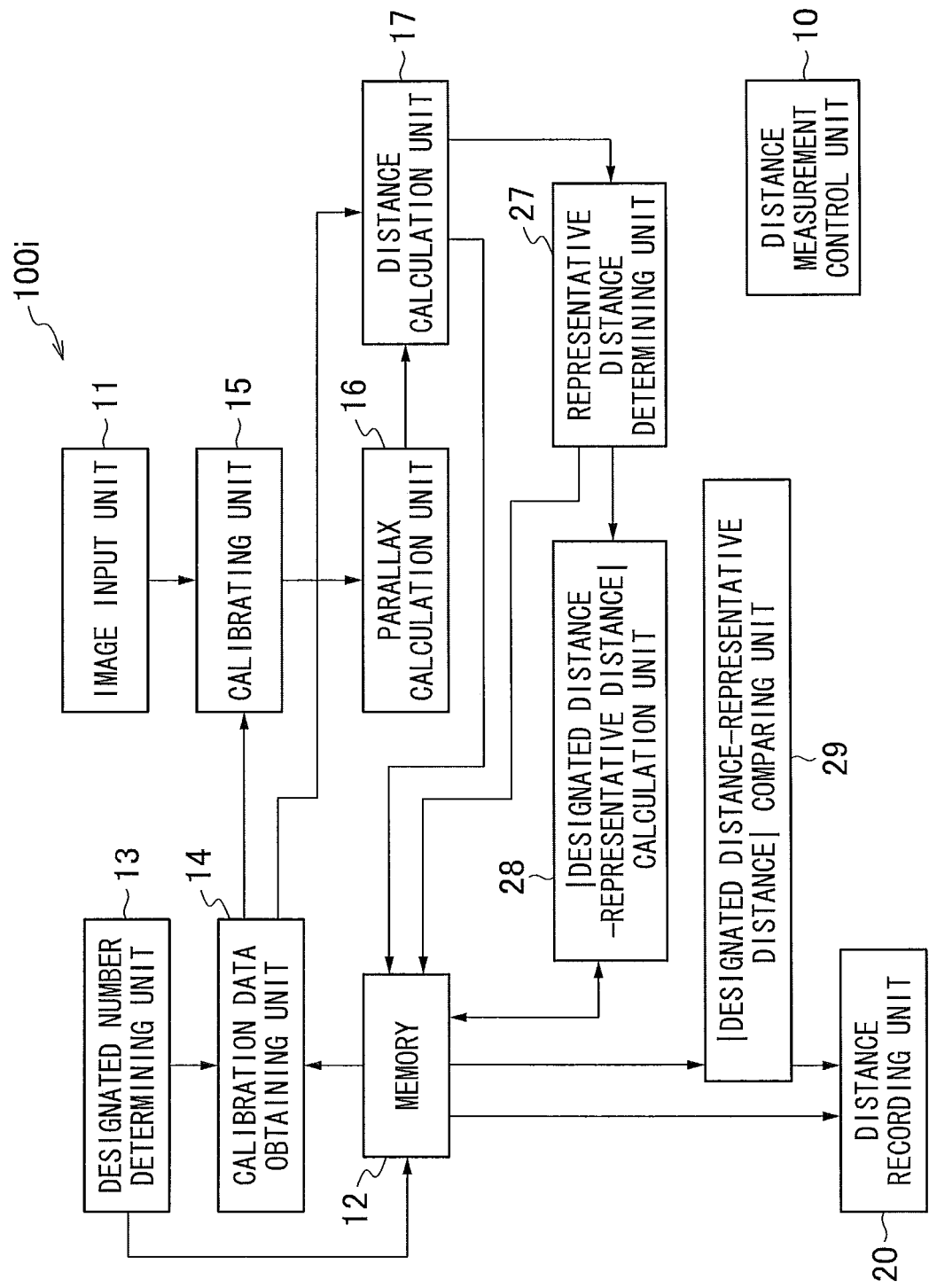
FIG. 25 is a block diagram of a distance measuring apparatus in a first example of the fifth embodiment.

FIG. 25 is a block diagram of a distance measuring apparatus 100i of a first example of the fifth embodiment. Note that components identical to those of the distance measuring apparatus 100a of FIG. 1 (the first example of the first embodiment) are provided with same reference characters, and details already described are not described.

The distance measuring apparatus 100i includes a representative distance determining unit 27, a |designated distance–representative distance| calculation unit 28, and a |designated distance–representative distance| comparing unit 29.

The representative distance determining unit 27 determines, for each designated distance, a representative value of distance (hereinafter referred to as a "representative distance") for each pixel (or each pixel group) calculated based on a parallax between the plurality of corrected viewpoint images.

The |designated distance–representative distance| calculation unit 28 (distance difference calculation means) calculates |designated distance–representative distance| for each designated distance.

The |designated distance–representative distance| comparing unit 29 compares |designated distance–representative distance| over a plurality of designated distances receiving attention, and specifies calibration data with minimum |designated distance-representative distance| as optimum calibration data.

Figure 26:
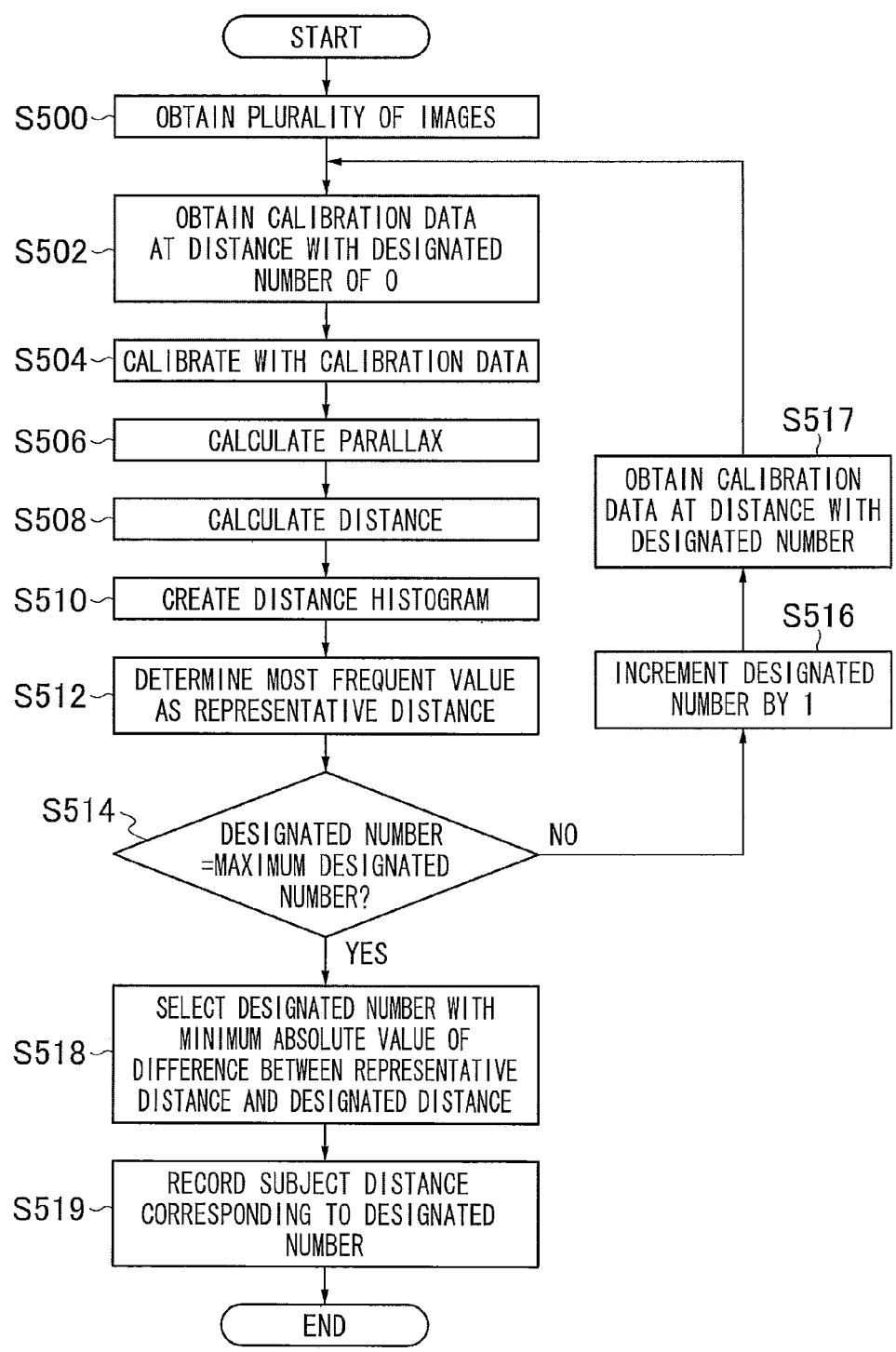
FIG. 26 is a flowchart of a distance measuring process in the first example of the fifth embodiment.

Next, a distance measuring process of a first example of the fifth embodiment is described by using a flowchart of FIG. 26.

Steps S500 to S508 are similar to steps S100 to S108 of FIG. 5 (the first example of the first embodiment).

Figure 27:
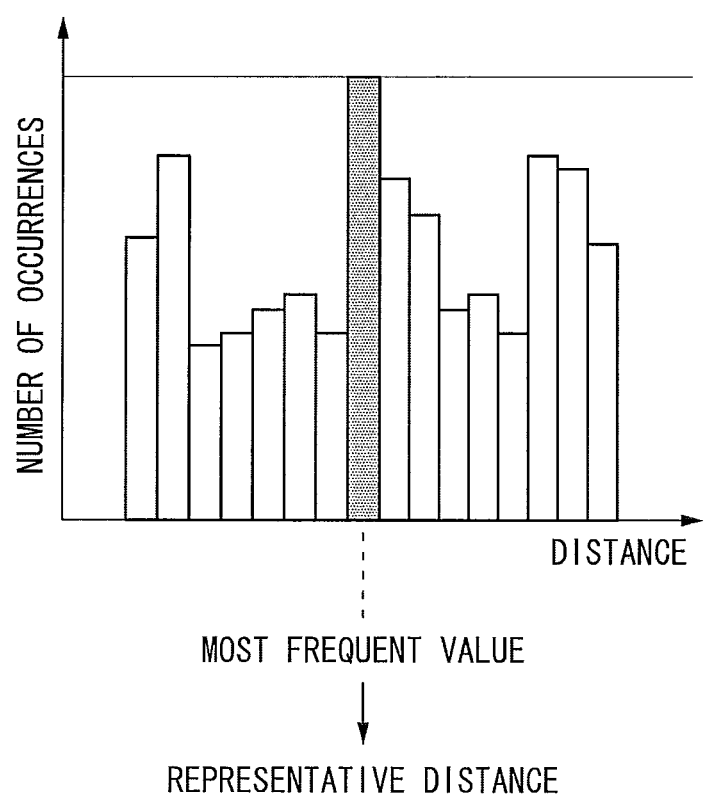
FIG. 27 is an explanatory diagram illustrating an example of a distance histogram.

At step S510, a distance histogram is created by the representative distance determining unit 27. As illustrated in FIG. 27, the distance histogram illustrates a relation between distance and a number of occurrences (pixel count) for each pixel in the corrected viewpoint images.

At step S512, as illustrated in FIG. 27, the most frequent value is detected in the distance histogram, and that most frequent value is determined as a representative distance. That is, the most frequent value of distance is selected as a subject distance candidate.

At step S514, it is determined whether the designated number=the maximum designated number.

If the designated number=the maximum designated number does not hold, the designated number is incremented by 1 at step S516. At step S517, calibration data corresponding to the designated distance is obtained.

If the designated number=the maximum designated number holds, a designated number with minimum |designated distance–representative distance| is selected at step S518. Specifically, |designated distance–representative distance| is calculated by the |designated distance–representative distance| calculation unit 28, and |designated distance–representative distance| are compared by the |designated distance–representative distance| comparing unit 29 over the plurality of designated distances receiving attention, and a designated number with minimum |designated distance–representative distance| is selected. That is, calibration data with minimum |designated distance–representative distance| is specified from the plurality of pieces of calibration data as optimum calibration data.

At step S519, a representative distance corresponding to the selected designated number is recorded by the distance recording unit 20. That is, the subject distance calculated from the parallax between the corrected viewpoint images with the optimum calibration data is outputted as a distance measurement result.

Note that while the most frequent value of the distance histogram is taken as a representative distance (a subject distance) in the present example, the present invention is not restricted to this. The representative distance may be found with another method.

Figures 28A, 28B:
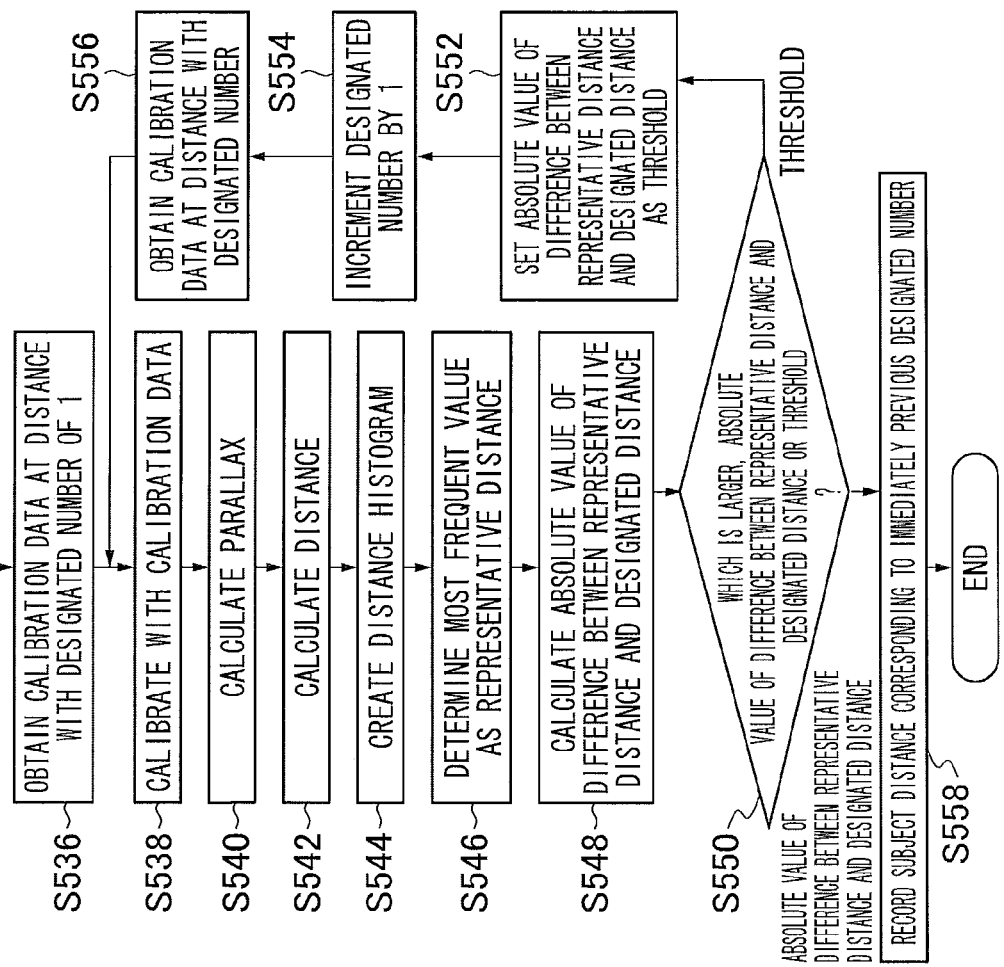
FIG. 28A is a flowchart of a distance measuring process in a second example of the fifth embodiment.
FIG. 28B is a flowchart of the distance measuring process in the second example of the fifth embodiment.

Next, a distance measuring process of a second example of the fifth embodiment is described by using flowcharts of FIG. 28A and FIG. 28B. The present distance measuring process is performed by the distance measuring apparatus 100i illustrated in FIG. 25.

Steps S520 to S528 are similar to steps S120 to S128 of FIG. 7A (the second example of the first embodiment).

At step S530, a distance histogram is created. At step S532, the most frequent value of distance is determined as a representative value. At step S534, |designated distance–representative distance| is calculated and is set as a threshold (the threshold=|designated distance–representative distance|).

Steps S536 to S542 are similar to steps S132 to S138 of FIG. 7B.

At step S544, a distance histogram is created. At step S546, the most frequent value of distance is determined as a representative distance. At step S548, |designated distance–representative distance| is calculated.

At step S558, |designated distance–representative distance| currently calculated and the threshold (|designated distance–representative distance| previously calculated) are compared by the |designated distance–representative distance| comparing unit 29.

If |designated distance–representative distance|≤the threshold, |designated distance–representative distance currently calculated is set at step S552 as a threshold (the threshold=|designated distance–representative distance|). The designated number is incremented by 1 at step S554. At step S556, calibration data corresponding to the designated number is obtained, and then the procedure goes to step S538.

If |designated distance–representative distance|>the threshold, the representative distance corresponding to the previous designated number is recorded at step S558 as a subject distance of a distance measurement result.

Figure 29:
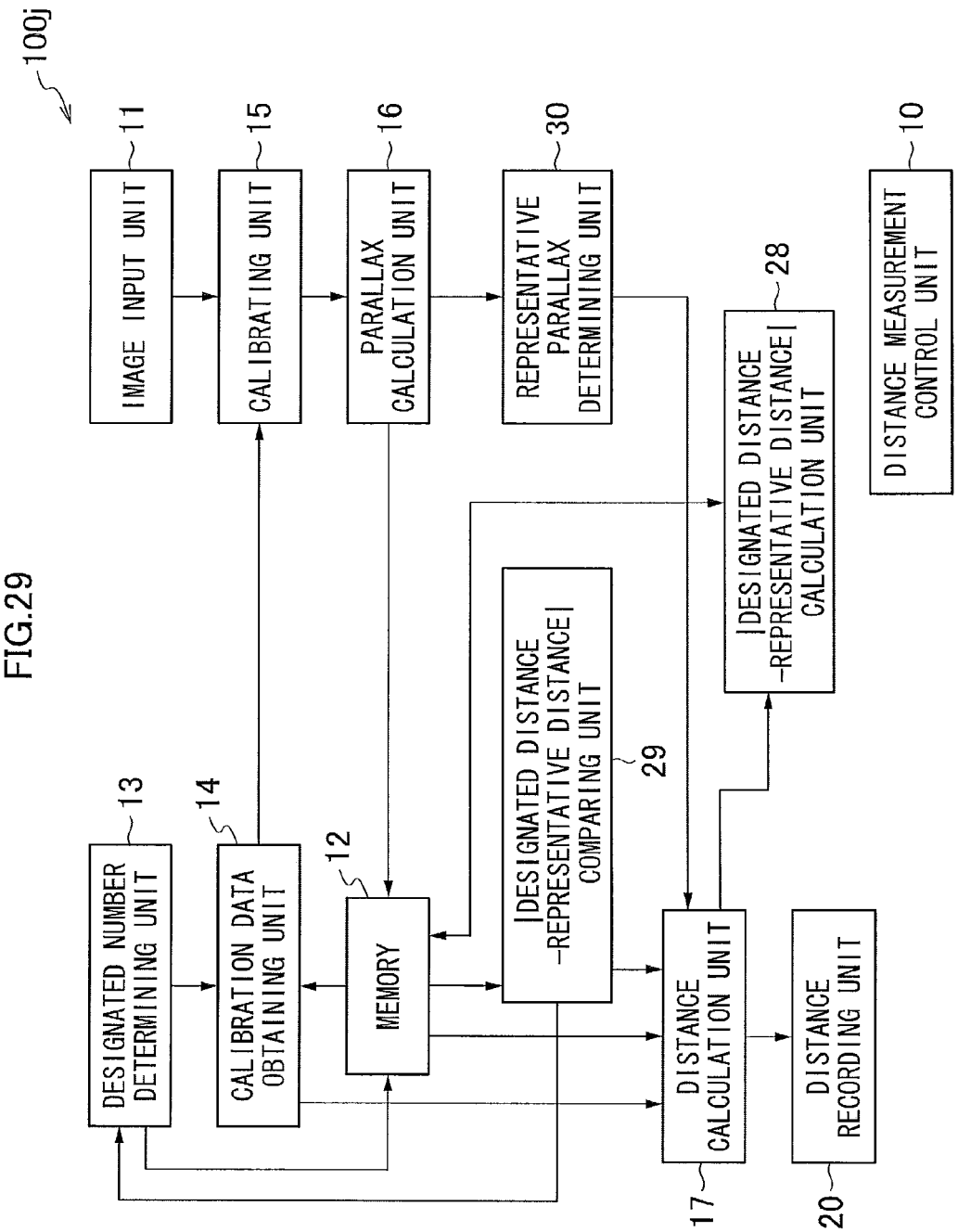
FIG. 29 is a block diagram of a distance measuring apparatus in a third example of the fifth embodiment.

FIG. 29 is a block diagram of a distance measuring apparatus 100j of a third example of the fifth embodiment. In the following, only details different from the distance measuring apparatus 100i of FIG. 25 (the first example of the present embodiment) are described.

The distance measuring apparatus 100j of the present example includes a representative parallax determining unit 30. The representative parallax determining unit 30 determines a representative value of parallax between corrected viewpoint images (hereinafter referred to as a "representative parallax") for each designated distance. The representative parallax represents a parallax for each pixel (or pixel group) for which detection of a corresponding pixel has been successful at the parallax calculation unit 16.

The distance calculation unit 17 calculates a representative distance based on the representative parallax.

Figure 30:
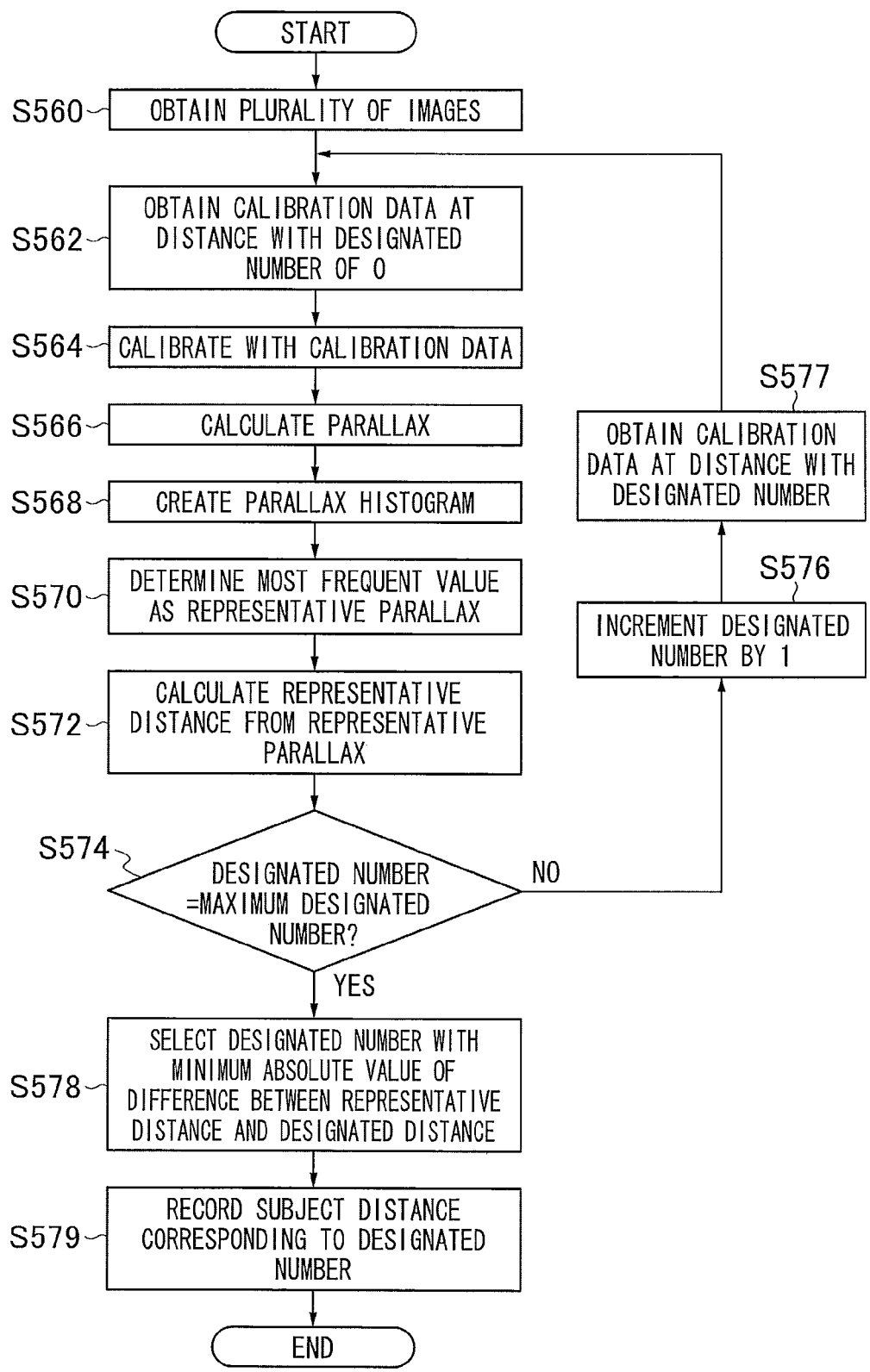
FIG. 30 is a flowchart of a distance measuring process in the third example of the fifth embodiment.

Next, a distance measuring process in the third example of the fifth embodiment is described by using a flowchart of FIG. 30.

Steps S560 to S566 are similar to steps S500 to S506 of FIG. 26 (the first example of the present embodiment).

Figure 31:
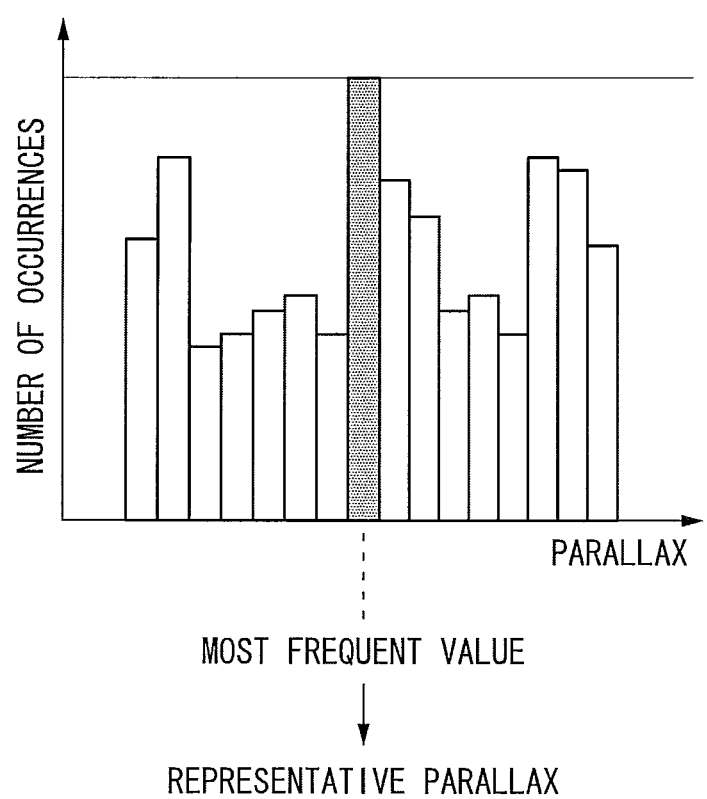
FIG. 31 is an explanatory diagram illustrating an example of a parallax histogram.

At step S568, a parallax histogram is created by the representative parallax determining unit 30. As illustrated in FIG. 31, the parallax histogram illustrates a relation between a parallax and a number of occurrences (pixel count) for each pixel between corrected viewpoint images.

At step S570, as illustrated in FIG. 31, the most frequent value is detected by the representative parallax determining unit 30 in the parallax histogram, and that most frequent value is determined as a representative parallax. That is, the most frequent value of parallax is selected as a parallax of a main subject.

At step S572, a representative distance is calculated by the distance calculation unit 17 based on the representative parallax. That is, a distance corresponding to the most frequent value of parallax is calculated as a subject distance candidate.

Steps S574 to S579 are similar to steps S514 to S519 of FIG. 26.

Figure 32:
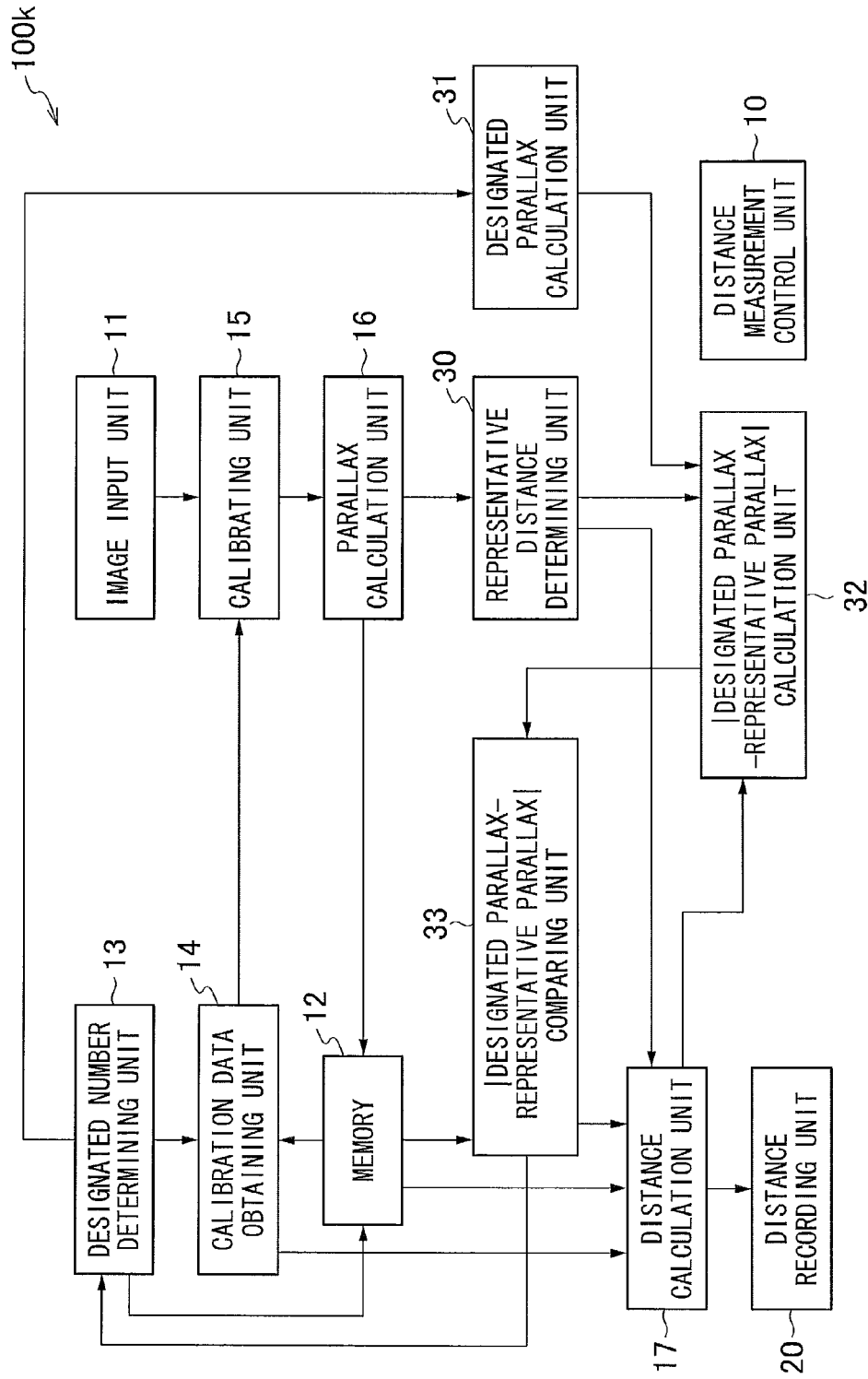
FIG. 32 is a block diagram of a distance measuring apparatus in a fourth example of the fifth embodiment

FIG. 32 is a block diagram of a distance measuring apparatus 100k of a fourth example of the fifth embodiment. In the following, only details different from the distance measuring apparatus 100j of FIG. 29 (the third example of the present embodiment) are described.

The distance measuring apparatus 100k of the present example includes a designated parallax calculation unit 31, a |designated parallax–representative parallax| calculation unit 32, and a designated parallax–representative parallax comparing unit 33.

The designated parallax calculation unit 31 calculates, for each designated distance, a parallax (hereinafter referred to as a "designated parallax") based on the designated distance.

The |designated parallax–representative parallax| calculation unit 32 calculates |designated parallax–representative parallax| for each designated distance.

The |designated parallax–representative parallax comparing unit 33 compares |designated parallax–representative parallax| over a plurality of designated distances receiving attention, and specifies calibration data with maximum |designated parallax-representative parallax| as optimum calibration data.

Figure 33:
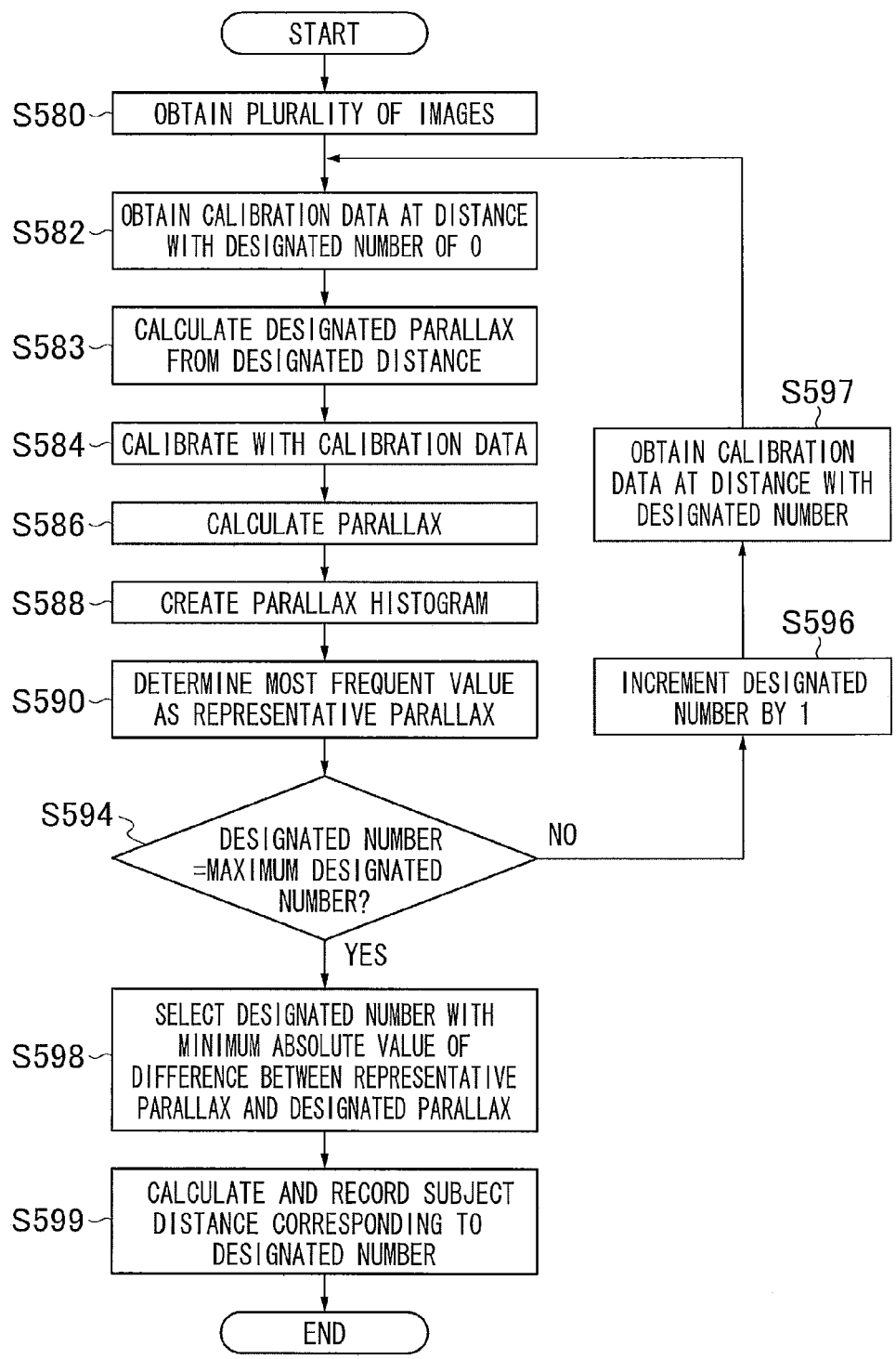
FIG. 33 is a flowchart of the distance measuring process in the fourth example of the fifth embodiment.

Next, a distance measuring process in a fourth example of the fifth embodiment is described by using a flowchart of FIG. 33.

Steps S580 to S582 are similar to steps S560 to S562 of FIG. 30 (the third example of the present embodiment).

At step S583, a designated parallax is calculated by the designated parallax calculation unit 31 based on the designated distance. That is, the designated distance is converted to a designated parallax.

Steps S584 to S590 are similar to steps S564 to S570 of FIG. 30. In the present example, a step corresponding to step S572 of FIG. 30 is not present. Steps S594 to S597 are similar to steps S574 to S577 of FIG. 30.

At step S598, a designated number with minimum |designated parallax–representative parallax| is selected. That is, |designated parallax–representative parallax| is calculated by the |designated parallax–representative parallax| calculation unit 32, |designated parallax–representative parallax| are compared by the |designated parallax–representative parallax| comparing unit 33 over the plurality of designated distances of interest, and a designated number with minimum |designated parallax–representative parallax| is specified. That is, optimum calibration data is specified.

At step S599, a designated distance corresponding to the specified designated number (or a corresponding point distance) is recorded by the distance recording unit 20 as a subject distance of a distance measurement result.

As described above, while |designated distance–representative distance| is calculated and minimum |designated distance–representative distance| is selected to specify optimum calibration data in the first to third examples, the designated distance is converted to a designated parallax to calculate |designated parallax–representative parallax| and minimum |designated parallax–representative parallax| is selected to specify optimum calibration data in the fourth example.

Next, a sixth embodiment is described.

Figure 34:
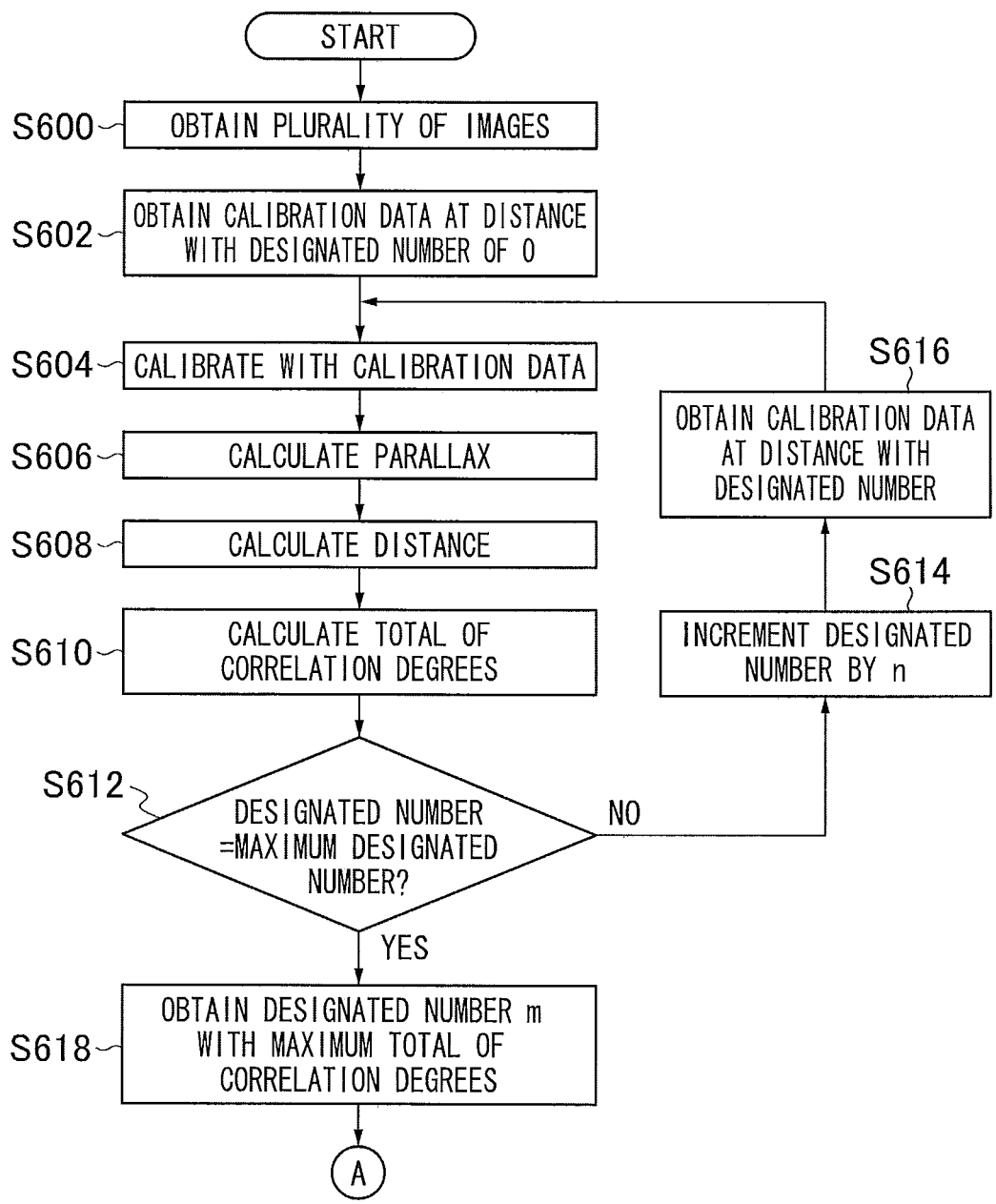
FIG. 34 is a flowchart of an example of a first-half process of a distance measuring process in a first example of a sixth embodiment.
Figure 35:
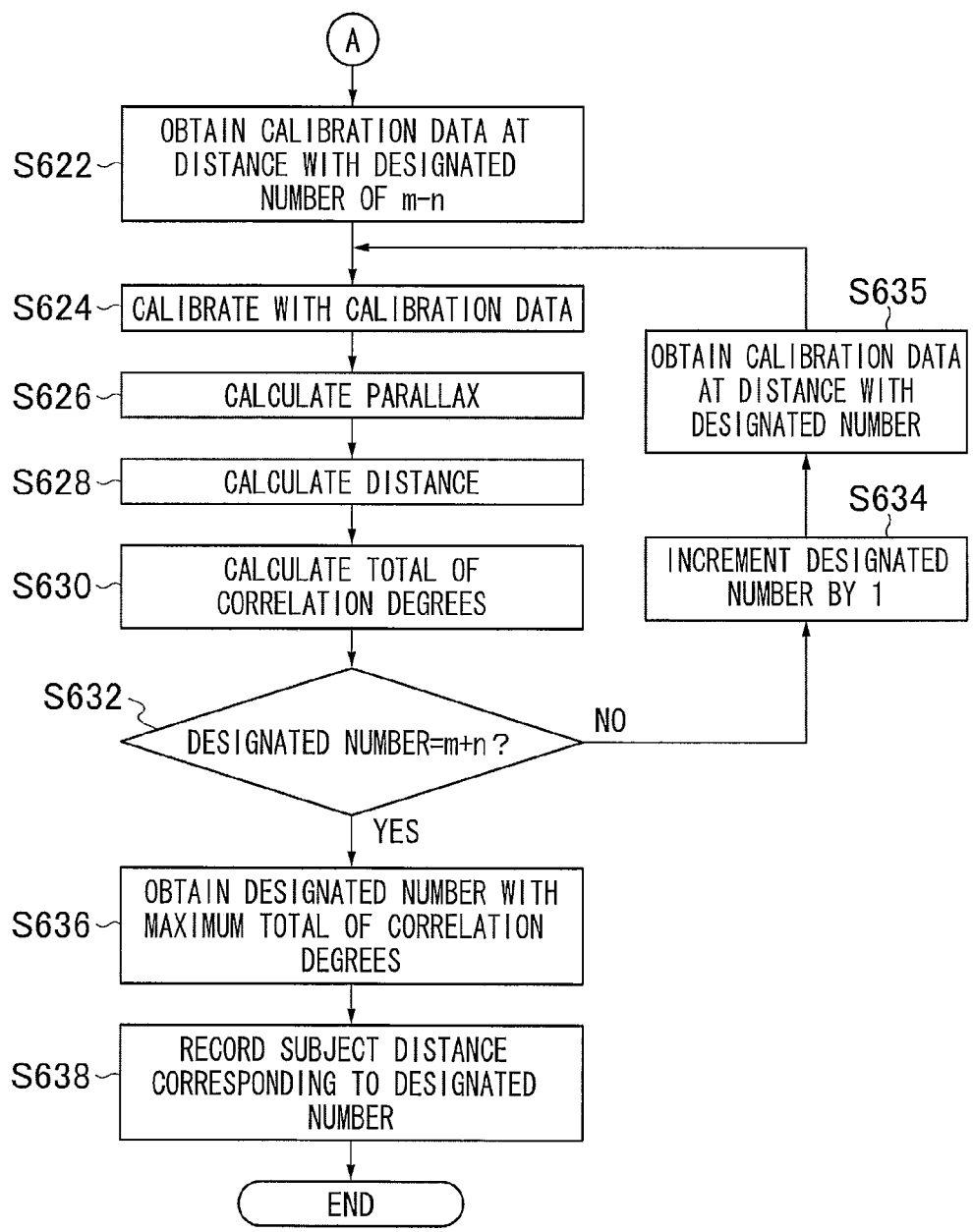
FIG. 35 is a flowchart of an example of a latter-half process of the distance measuring process in the first example of the sixth embodiment.

A distance measuring process in a first example of the sixth embodiment is described by using flowcharts of FIG. 34 and FIG. 35. This distance measuring process is executed by the distance measuring apparatus 100a of FIG. 1.

In the present embodiment, with the control by the distance measurement control unit 10, a first distance measurement (hereinafter referred to as a "first-half process") is performed while a designated distance (a distance of interest) is being changed with a large change width to obtain a first subject distance. Next, a second distance measurement (hereinafter referred to as a "latter-half process") is performed while the designated distance is being changed with a small change width near the first subject distance to obtain a second subject distance. The distance recording unit 20 records the second subject distance as a distance measurement result.

FIG. 34 illustrates the first-half process. Steps S600 to S610 are similar to steps S100 to S110 of FIG. 5 (the first example of the first embodiment). That is, a plurality of viewpoint images are obtained (step S600), calibration data corresponding to a designated distance with a designated number of 0 is obtained (step S602), the plurality of viewpoint images are corrected with the calibration data (step S604), a parallax between the plurality of corrected viewpoint images is calculated (step S606), a subject distance is calculated based on the parallax (step S608), and a total correlation degrees is calculated as a judgment criterion for optimum calibration data (step S610). At step S612, it is determined the designated number=the maximum designated number. If the designated number=the maximum designated number does not hold, the designated number is incremented by n at step S614. Here, n≥2. That is, while the designated distance (the distance of interest) being changed with a change width larger than a normal change width, a judgment criterion (in the present example, a total of correction degrees) is calculated fro each designated distance. If the designated number=the maximum designated number, totals of correlation degrees are compared at step S618 over the plurality of designated distances receiving attention, and a designated number (which is taken as m) with a maximum total of correlation degrees is obtained. That is, a designated distance with a maximum total of correlation degrees and calibration data are specified.

FIG. 34 illustrates the latter-half process. At step S622, calibration data corresponding to a designated distance with a designated number of m−n is obtained. Steps S624 to S630 are similar to steps S604 to S610 of the first-half process. At step S632, it is determined whether the designated number=m+n. If the designated number=m+n does not hold, the procedure goes to step S634. If the designated number=m+n holds, the procedure goes to step S636. The designated number is incremented by 1 at step S634. At step S635, calibration data corresponding to the designated distance is obtained, and then the procedure goes to step S624. At step S636, a designated number with a maximum total of correlation degrees is obtained. That is, a designated distance with a maximum total of correlation degrees and calibration data are specified. At step S638, the subject distance corresponding to the specified designated number (the subject distance calculated at step S628) is recorded as a subject distance.

Figure 36A:
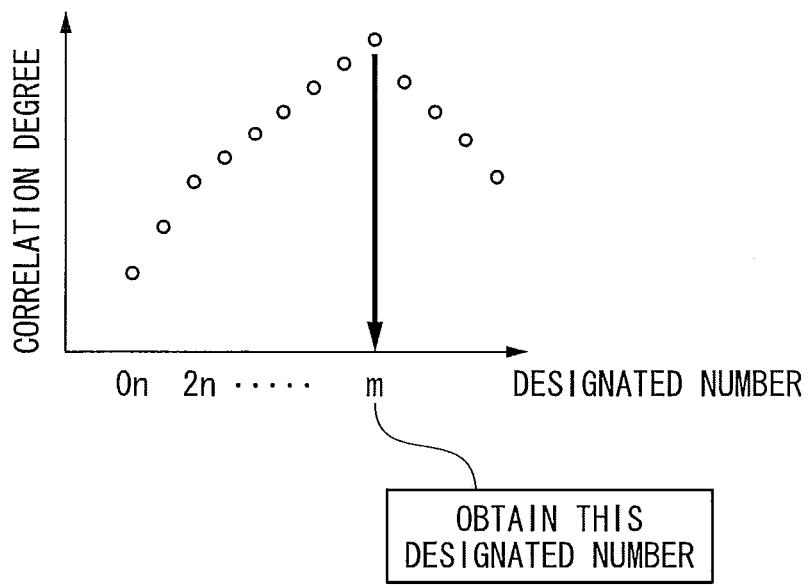
FIG. 36A is an explanatory diagram for use in describing distance measurement in the first example of the sixth embodiment.
Figure 36B:
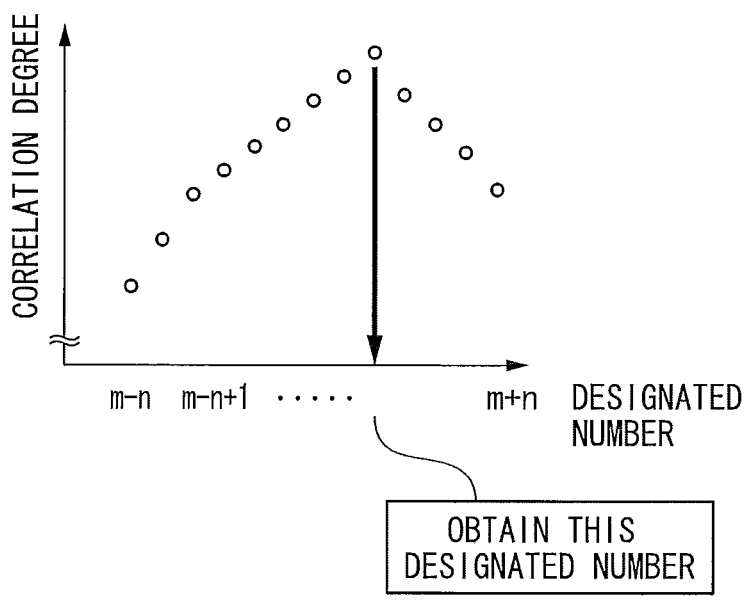
FIG. 36B is an explanatory diagram for use in describing distance measurement in the first example of the sixth embodiment.

In the present example, first as illustrated in FIG. 36A, with an entire focusable distance range being taken as a range for searching for a subject distance, a rough distance measurement for changing the designated number with a change width n (n≥2) is performed, thereby obtaining the designated number m with a maximum total of correlation degrees. That is, a first subject distance is detected while the distance of interest being changed with a large change width. Next, as illustrated in FIG. 36B, the range of searching for a subject distance is restricted to a distance range corresponding to designated numbers of m−n to m+n, and a detailed distance measurement for changing the designated number with a change width=1 is performed, thereby obtaining a designated number with a maximum total of correction degrees. That is, a second distance measurement is detected as a distance measurement result while the distance of interest is being changed with a small change width. With this, a distance measurement can be accurately made, and the processing time in the entire distance measurement process can be reduced.

Next, a distance measuring process of a second example of the sixth embodiment is described by using flowcharts of FIG. 37A, FIG. 37B, FIG. 38A and FIG. 38B. This distance measuring process is executed at the distance measuring apparatus 100a of FIG. 1.

Figure 37B:
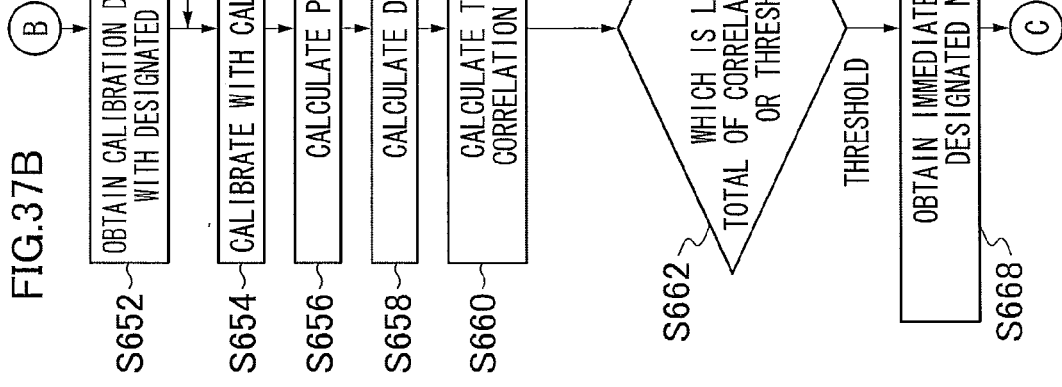
FIG. 37B is a flowchart of the example of the first-half process of the distance measuring process in the second example of the sixth embodiment.
Figure 37A:
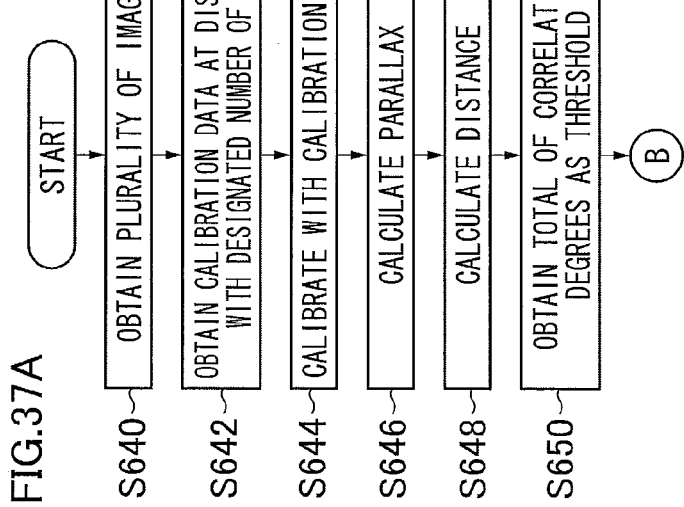
FIG. 37A is a flowchart of an example of a first-half process of a distance measuring process in a second example of the sixth embodiment.

FIG. 37A and FIG. 37B illustrate the first-half process. Steps S640 to S650 are similar to steps S120 to S130 of FIG. 7A (the second example of the first embodiment). At step S652, calibration data corresponding to the designated distance with the designated number of n is obtained. Steps S654 to S660 are similar to steps S134 to S140 of FIG. 7B. At step S662, the total of correlation degrees and the threshold are compared with each other. If the total of correlation degrees≥the threshold, the procedure goes to step S664. If the total of correlation degrees<the threshold, the procedure goes to step S668. At step S664, the total of correlation values is set as a threshold, At step S666, the designated number is incremented by n. At step S667, calibration data corresponding to the designated distance is obtained. At step S668, an immediately previous designated number (which is taken as m) is obtained.

Figure 38B:
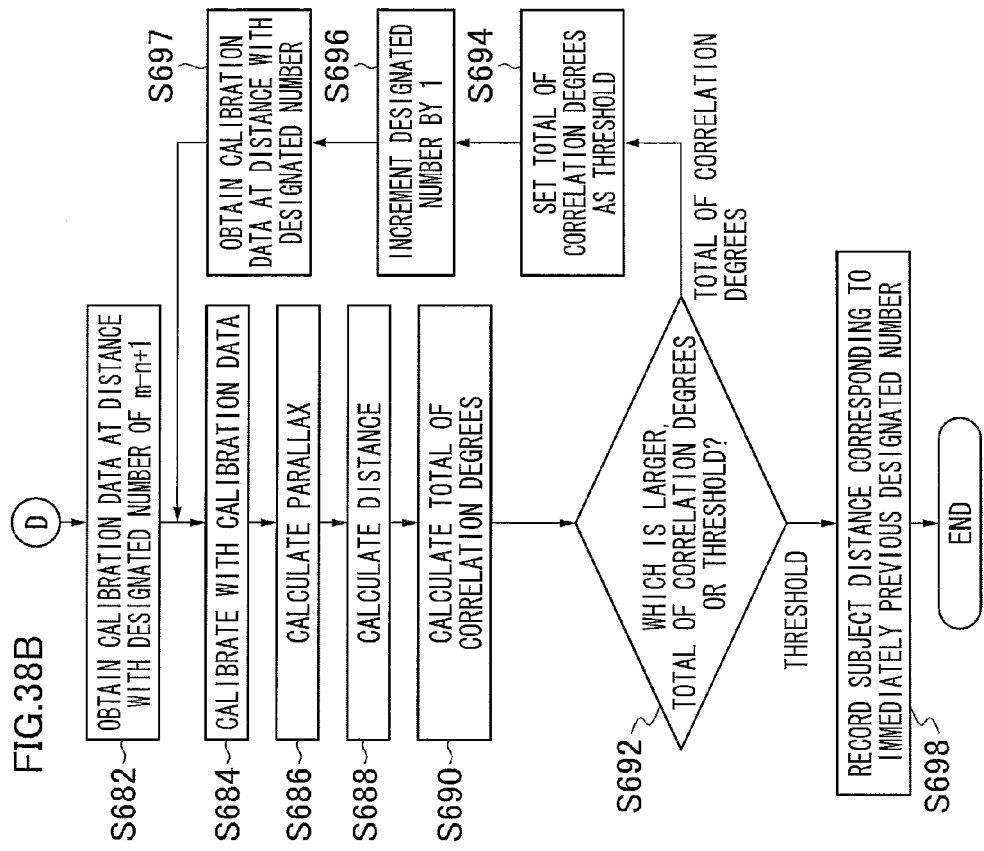
FIG. 38B is a flowchart of the example of the latter-half process of the distance measuring process in the second example of the sixth embodiment.
Figure 38A:
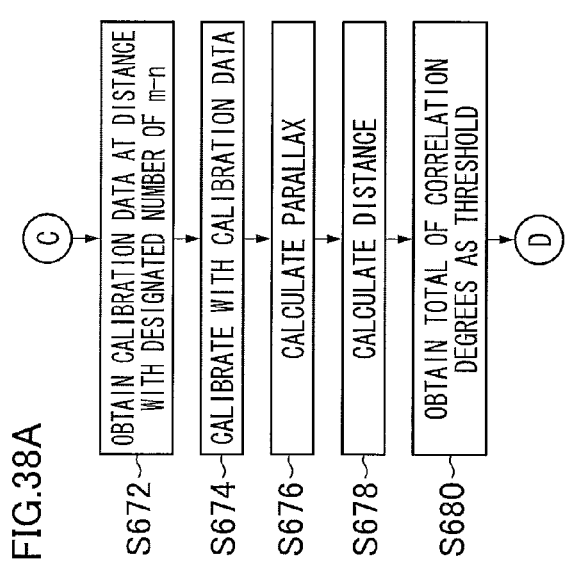
FIG. 38A is a flowchart of an example of a latter-half process of the distance measuring process in the second example of the sixth embodiment.

FIG. 38A and FIG. 38B illustrate the latter-half process. At step S672, calibration data corresponding to a distance with a designated number of m−n is obtained. Steps S674 to S680 are similar to steps S644 to 650 of the first-half process. At step S682, calibration data corresponding to a distance with a designated number of m−n+1 is obtained. Steps S684 to S690 are similar to steps S654 to 660 of the first-half process. At step S692, the total of correlation degrees and the threshold are compared with each other. If the total of correlation degrees≥the threshold, the procedure goes to step S694. If the total of correlation degrees<the threshold, the procedure goes to step S698. At step S694, the total of correlation degrees is set as a threshold. At step S696, the designate number is incremented by 1. At step S697, calibration data corresponding to the designated distance is obtained. At step S698, the subject distance corresponding to the immediately previous designated number is recorded.

Figure 39A:
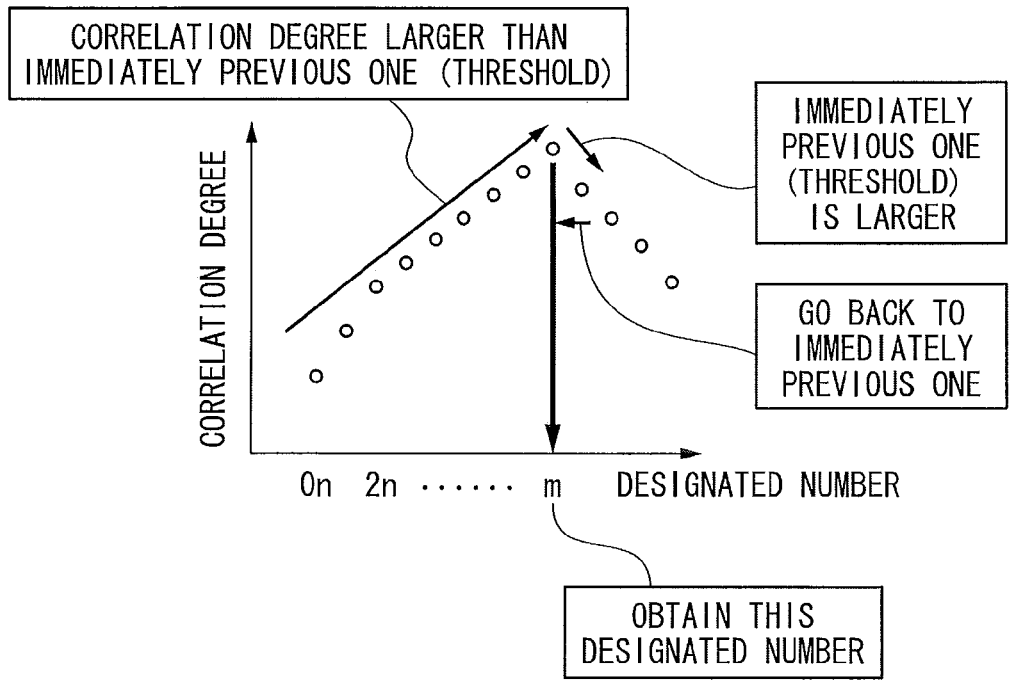
FIG. 39A is an explanatory diagram for use in describing distance measurement in the first example of the sixth embodiment.
Figure 39B:
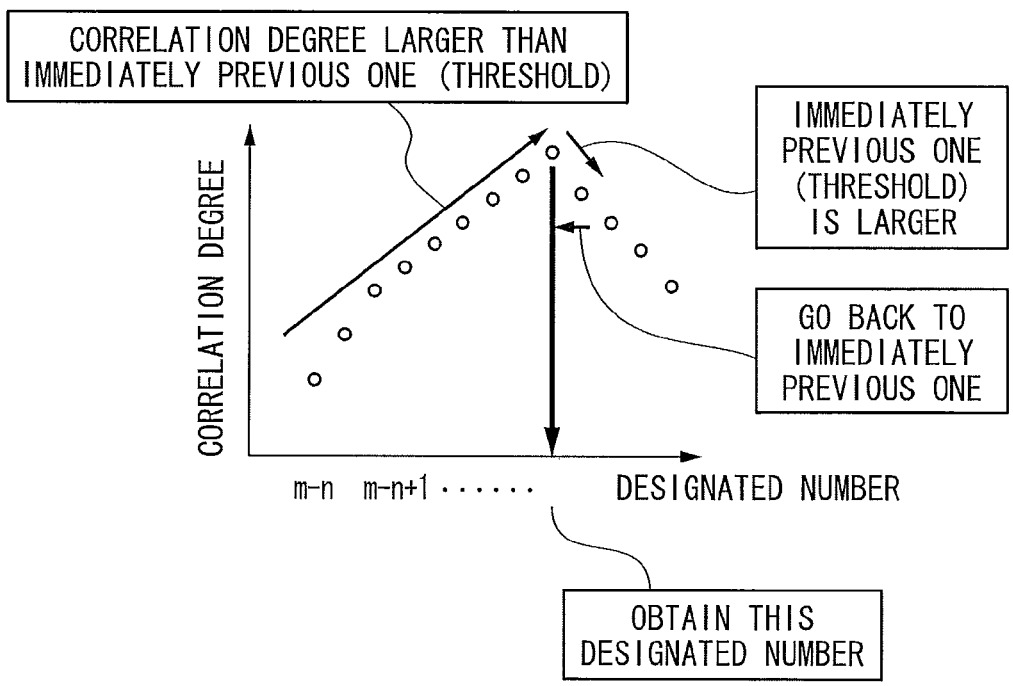
FIG. 39B is an explanatory diagram for use in describing distance measurement in the first example of the sixth embodiment.

In the present example, first as illustrated in FIG. 39A, the designated number at the time of starting a search is set at 0 (a close edge in the focusable distance range), a rough distance measurement for changing the designated number with a change width=n (n≥2) is performed, thereby obtaining the designated number m with a maximum total of correlation degrees. That is, a first subject distance is detected while the distance of interest is being changed with a large change width. Next, as illustrated in FIG. 39B, the designated number at the time of starting a search is set at m−n (near the first subject distance), a detailed distance measurement for changing the designated number with a change width=1 is performed, thereby obtaining a designated number m with a maximum total of correlation degrees. That is, a second subject distance is detected as a distance measurement result while the distance of interest is being changed with a small change width. With this, a distance measurement can be accurately made, and the processing time as a whole distance measurement process can be reduced.

Note that while the case has been exemplarily described in which the total of correlation degrees is used as a judgment criterion for optimum calibration data, it goes without saying that another judgment criterion (for example, the total of vertical deviation amounts described in the second embodiment, the parallax-calculated pixel count described in the third embodiment, the local-noise pixel count described in the fourth embodiment, or others) may be used.

Also, while the case has been described in which the same judgment criterion for optimum calibration data is used in both of the first-half process and the latter-half process (in the present example, the total of correlation degrees is used for both), the judgment criterion may differ. For example, a judgment is made based on the total of correlation degrees in the first-half process, and a judgment is made based on the local-noise pixel count in the latter-half process.

Next, a seventh embodiment is described.

Figure 40:
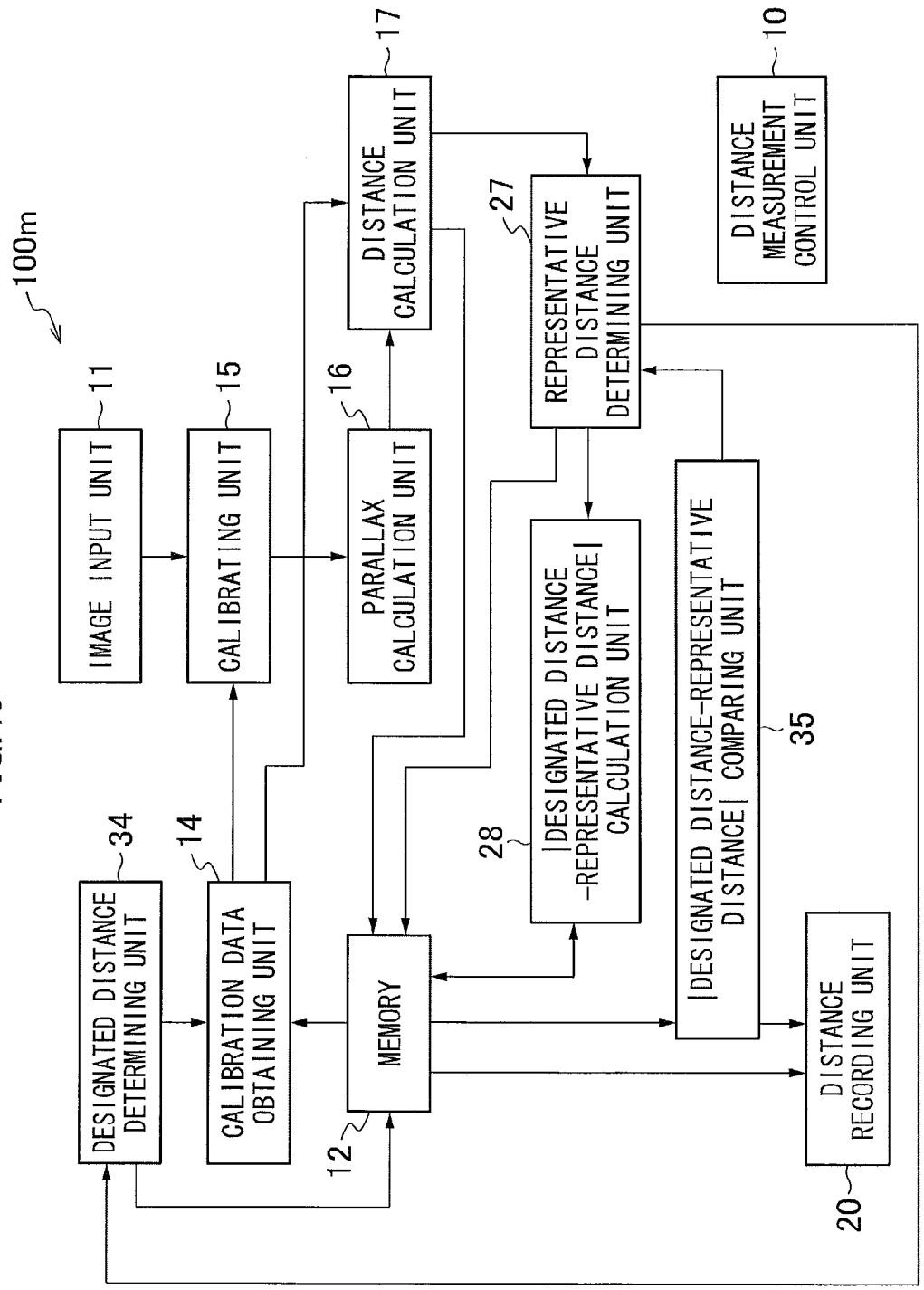
FIG. 40 is a block diagram of a distance measuring apparatus in a first example of a seventh embodiment.

FIG. 40 is a block diagram of a distance measuring apparatus 100m in a first example of the seventh embodiment. Note that components identical to those of the distance measuring apparatus 100i of FIG. 25 (the first example of the fifth embodiment) are provided with same reference characters, and details already described are hereinafter not described.

A designated distance determining unit 34 determines a designated distance first receiving attention (hereinafter referred to as an "initial designated distance") among the plurality of designated distances (distances of interest) over an entire focusable distance range of the image pickup device (81L and 81R of FIG. 4A). Also, the designated distance determining unit 34 determines a representative distance (a subject distance) calculated based on a parallax between the corrected viewpoint images by the distance calculation unit 17 and the representative distance determining unit 27 as a designated distance next receiving attention, thereby switching the designated distance.

A |designated distance−representative distance| comparing unit 35 of the present embodiment compares |designated distance−representative distance| before and after switching of the designated distance, thereby selecting a distance measurement result from the plurality of representative distances (subject distances).

Various modes of determining an initial designated distance by the designated distance determining unit 34 are present.

In a first mode, collateral information of the viewpoint images is obtained from an image file including the plurality of viewpoint images and, based on that collateral information, an initial designated distance is determined. For example, a distance determination is made based on shooting mode information indicating a mode (a human shooting mode, a landscape shooting mode, or the like) at the time of shooting a subject by the image pickup device.

In a second mode, an initial designated distance is determined based on information regarding a shot scene obtained from the viewpoint images. For example, the viewpoint images are analyzed to specify whether the scene is a human shooting scene or a landscape shooting scene and, based on that scene, a distance determination is made.

In a third mode, an initial designated distance is determined based on the size of a subject obtained from the viewpoint images. For example, a distance determination is made based on a comparison between the size of a face in the viewpoint images and a standard size of the face.

In a fourth mode, an initial designated distance is determined based on a parallax in a focus area (focusing evaluation value calculation region). For example, a parallax histogram regarding a plurality of viewpoint images before correction with calibration data is created, the most frequent value in the parallax histogram is converted to a distance, and that distance is taken as an initial designated distance.

In a fifth mode, an initial designated distance is determined based on a distance of a convergence point (a point of intersection of optical axes) of the plurality of image pickup devices.

Figure 41B:
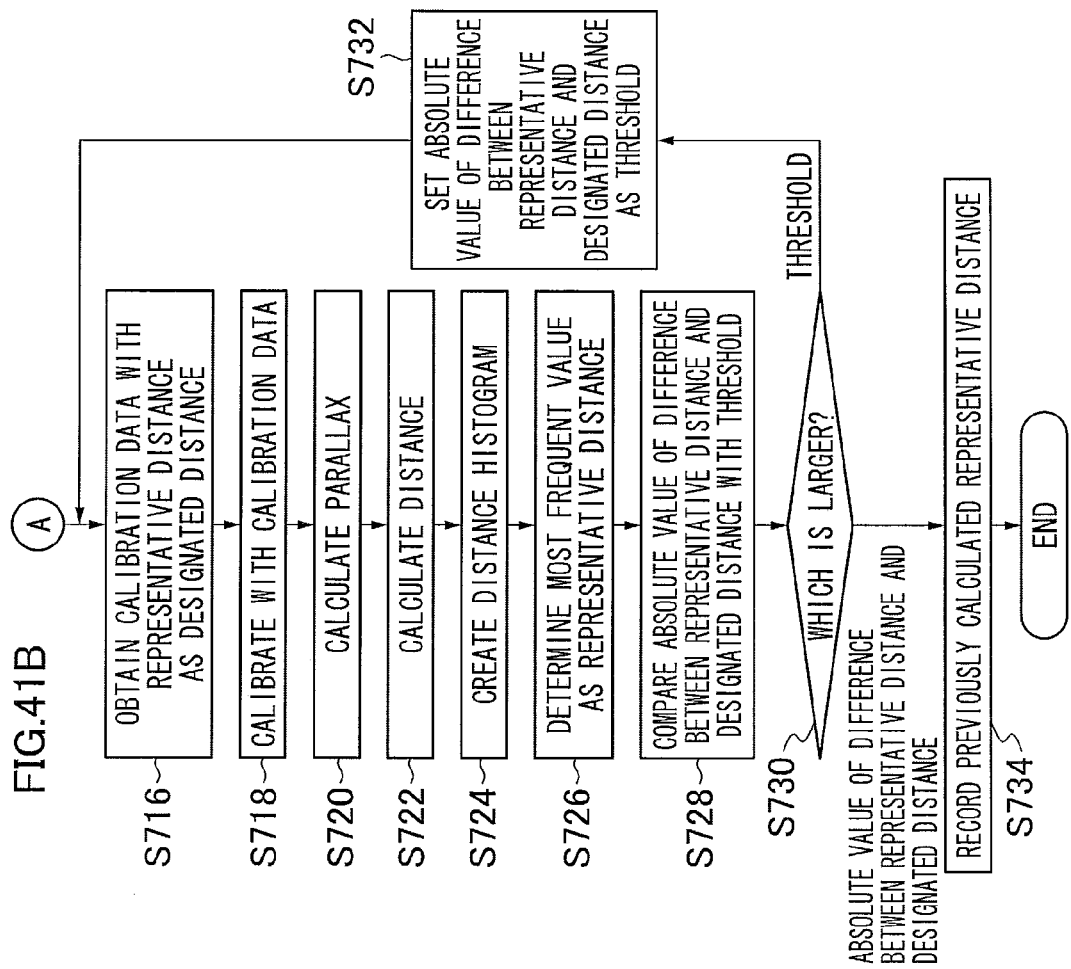
FIG. 41B is a flowchart of the distance measuring process in the first example of the seventh embodiment.
Figure 41A:
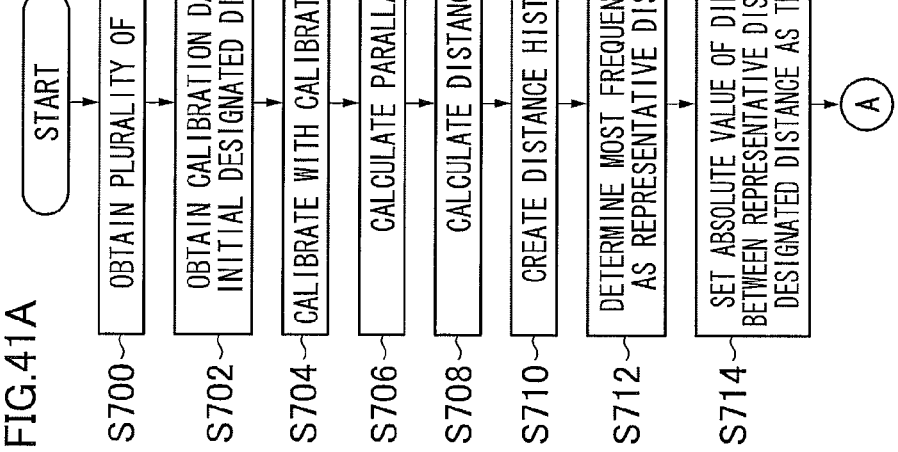
FIG. 41A is a flowchart of a distance measuring process in the first example of the seventh embodiment.

Next, a distance measuring process of the first example of the seventh embodiment is described by using flowcharts of FIG. 41A and FIG. 41B.

First at step S700, a plurality of viewpoint images are obtained by the image input unit 11.

Next, at step S702, an initial designated distance is determined by the designated distance determining unit 34, and calibration data corresponding to the initial designated distance is obtained by the calibration data obtaining unit 14.

Steps S704 to S712 are similar to steps S524 to S532 of FIG. 28A (the second example of the fifth embodiment). That is, a plurality of viewpoint images are corrected based on the calibration data (step S704), a parallax of each pixel is calculated between the plurality of corrected viewpoint images (step S706), a distance of each pixel is calculated based on the parallax of each pixel between the viewpoint images (step S708), a distance histogram indicating a relation between distances and frequency of occurrences (pixel count) is created (step S710), and the most frequent value of distance is determined as a representative distance as a subject distance candidate (step S712).

At step S714, |designated distance–representative distance| is calculated by the |designated distance–representative distance| calculation unit 28, and is set as a threshold (the threshold=|designated distance–representative distance|).

At step S716, a representative distance is determined by the designated distance determining unit 34 as a next designated distance of interest, and calibration data is obtained by the calibration data obtaining unit 14. That is, the distance of interest is switched.

Steps S718 to S726 are similar to steps S704 to S712.

At step S728, |designated distance–representative distance| is calculated by the |designated distance–representative distance| calculation unit 28, and |designated distance–representative distance| currently calculated and the threshold (|designated distance–representative distance| previously calculated) are compared with each other by the |designated distance–representative distance| comparing unit 29.

If |designated distance–representative distance|≤the threshold, |designated distance–representative distance| currently calculated is set at step S732 as a threshold, and then the procedure goes to step S716. At step S716, the representative distance is determined by the designated distance determining unit 34 as a next designated distance of interest. That is, the distance of interest is switched.

If |designated distance–representative distance|>the threshold, the distance information previously calculated (the representative distance) is recorded at step S734 by the distance recording unit 20 as a distance measurement result.

In this manner, in the present example, |designated distance–representative distance| before and after switching of the designated distance are compared with each other and, if the current one is larger than the previous one, the representative distance previously calculated is selected as a distance measurement result. That is, a designated distance with minimum |designated distance–representative distance| is detected, and calibration data corresponding to that designated distance is specified as optimum calibration data, thereby determining a distance measurement result.

FIG. 42 is a block diagram of a distance measuring apparatus 100n in a second example of the seventh embodiment. Note that components identical to those of the distance measuring apparatus 100j of FIG. 29 (the second example of the fifth embodiment) and those of FIG. 40 (the first example of the present embodiment) are provided with same reference characters, and details already described are not described.

Next, a distance measuring process of the second example of the seventh embodiment is described by using flowcharts of FIG. 43A and FIG. 43B.

Steps S750 to S756 are similar to steps S700 to S706 of FIG. 41A (the first example of the present embodiment). Steps S758 to S762 are similar to steps S568 to S572 of FIG. 30 (the third example of the fifth embodiment). Steps S764 to S770 are similar to steps S714 to S720 of FIG. 41. Steps S772 to S776 are similar to steps S758 to S762 of the present example. Steps S778 to S784 are similar to steps S728 to S734 of FIG. 41.

In the present second example, a parallax histogram is created (steps S758 and S772), the most frequent value of parallax is determined as a representative parallax (steps S760 and S774), and a representative distance is calculated based on the representative parallax (steps S762 and S776). |designated distance–representative distance| before and after switching of the distance of interest (the designated distance) are compared with each other and, if the current one is larger than the previous one, the representative distance previously calculated is selected as a distance measurement result, which is similar to the first example. That is, a designated distance with minimum |designated distance–representative distance| is detected, and calibration data corresponding to that designated distance is specified as optimum calibration data.

Next, an eighth embodiment is described.

Figure 44:
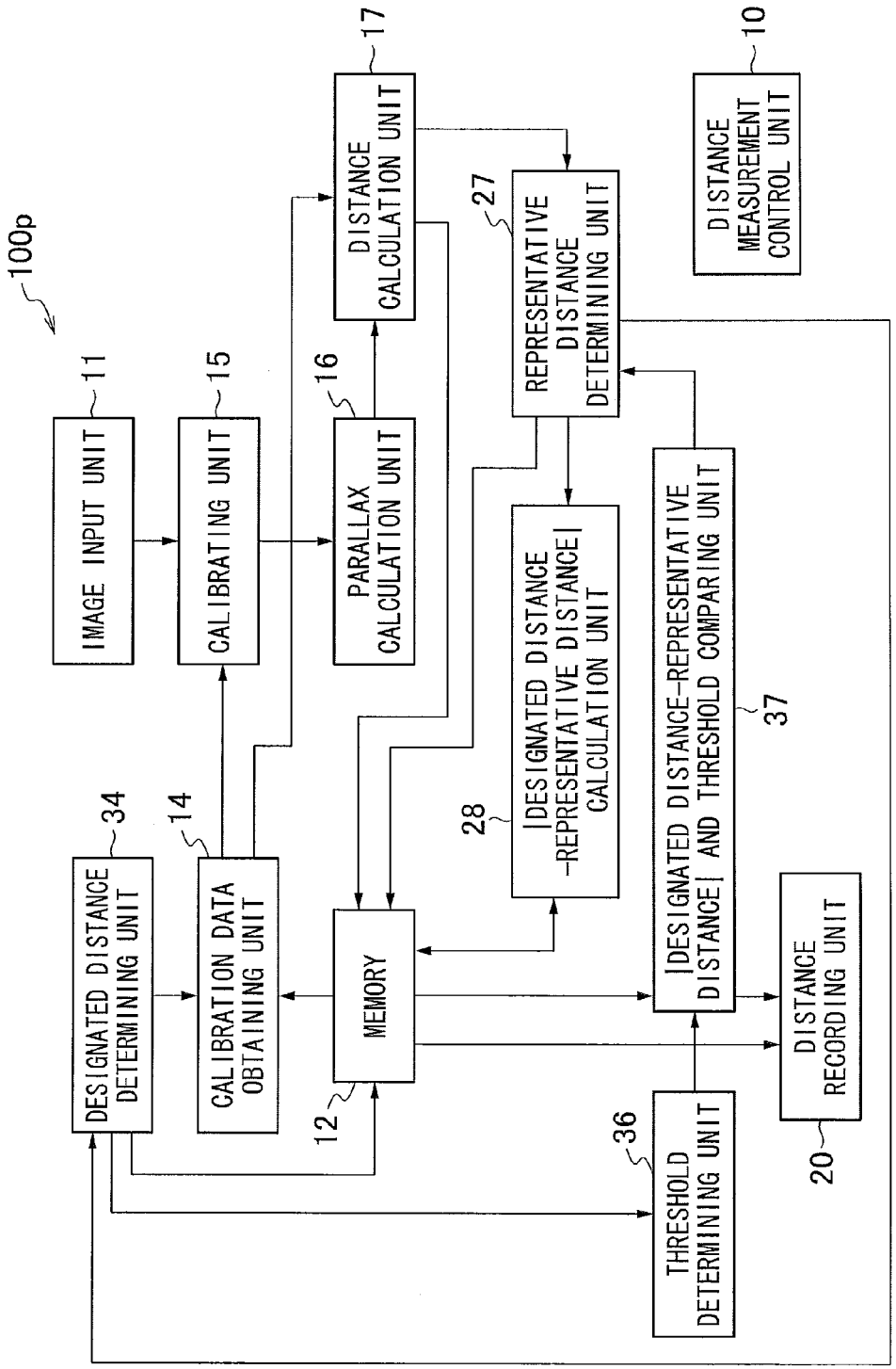
FIG. 44 is a block diagram of a distance measuring apparatus in a first example of an eighth embodiment.

FIG. 44 is a block diagram of a distance measuring apparatus 100p in a first example of the eighth embodiment. Note that components identical to those of the distance measuring apparatus 100m of FIG. 40 (the first example of the seventh embodiment) are provided with same reference characters, and details already described are not described.

A threshold determining unit 36 determines a threshold based on the designated distance.

A |designated distance–representative distance| threshold comparing unit 37 compares |designated distance–representative distance| and the threshold with each other and, when |designated distance−representative distance| is smaller than the threshold, adopts the representative distance as a subject distance of a distance measurement result.

Figure 45:
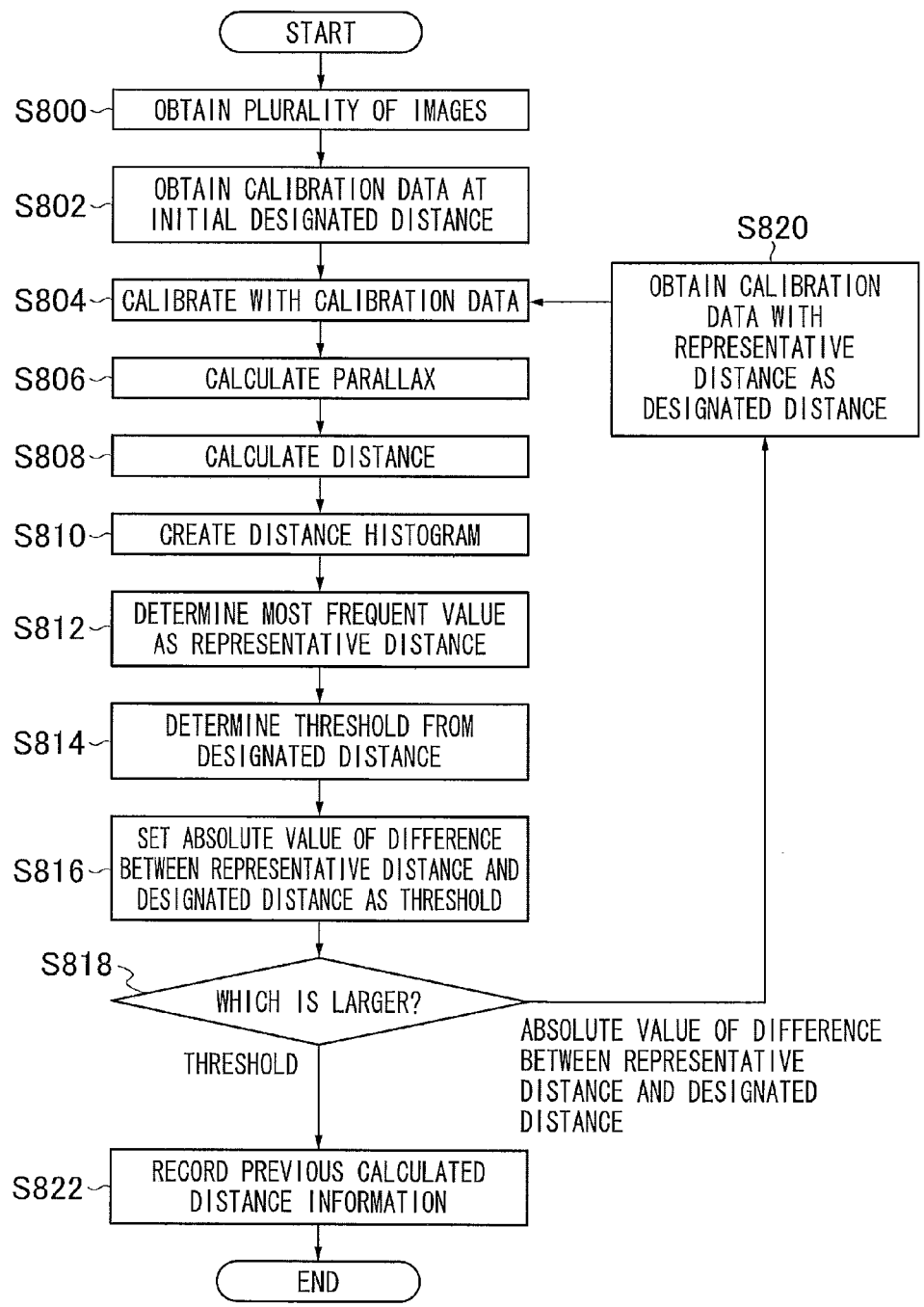
FIG. 45 is a flowchart of a distance measuring process in the first example of the eighth embodiment.

Next, a distance measuring process of a first example of the eighth embodiment is described by using a flowcharts of FIG. 45.

Steps S800 to S812 are similar to steps S700 to S712 of FIG. 41A (the first example of the seventh embodiment).

At step S814, a threshold is determined by the threshold determining unit 36. For example, table data indicating a correspondence between designated distances and thresholds is obtained from the memory 12 to obtain a threshold corresponding to the designated distance of interest. A threshold corresponding to the designated distance may be calculated from a function.

At step S816, |designated distance−representative distance| and the threshold are compared with each other by the |designated distance−representative distance| threshold comparing unit 37.

At step S818, if |designated distance−representative distance|≥the threshold, the procedure goes to step S820. If |designated distance−representative distance|<the threshold, the procedure goes to step S822.

At step S820, the representative distance is determined by the designated distance determining unit 34 as a next designated distance of interest, thereby switching the distance of interest, and then the procedure goes to step S804.

At step S822, the distance information previously calculated (the representative distance) is recorded by the distance recording unit 20 as a distance measurement result.

In this manner, in the present example, |designated distance−representative distance| and the threshold are compared with each other and, if |designated distance−representative distance|<the threshold, the representative distance previously calculated is adopted as a distance measurement result. That is, a designated distance with |designated distance−representative distance|<the threshold is detected, and calibration data corresponding to that designated distance is specified as optimum calibration data, thereby determining the distance measurement result.

Figure 46:
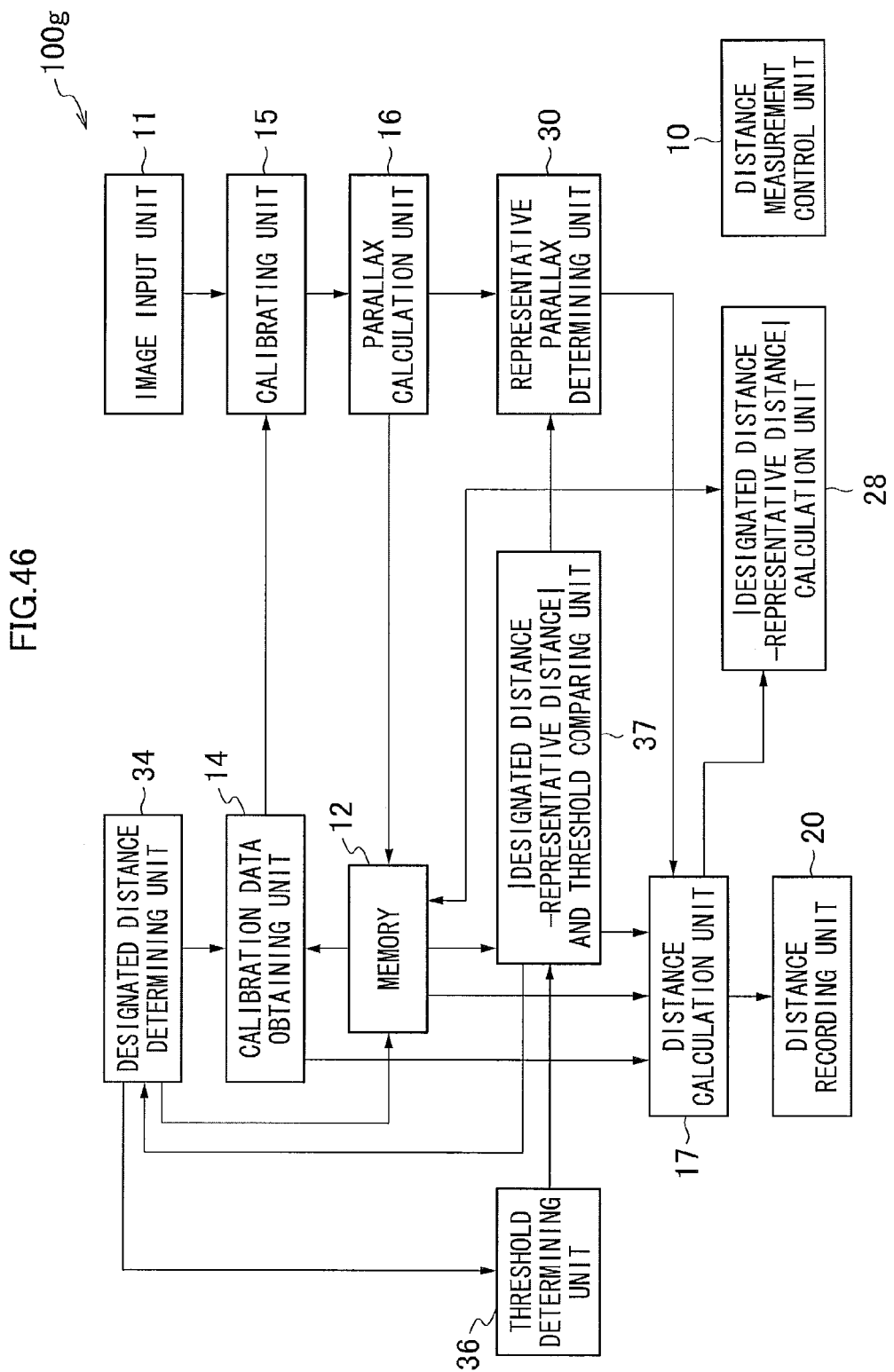
FIG. 46 is a block diagram of a distance measuring apparatus in a second example of the eighth embodiment.

FIG. 46 is a block diagram of a distance measuring apparatus 100q of a second example of the eighth embodiment. Note that components identical to those of the distance measuring apparatus 100n of FIG. 42 (the second example of the seventh embodiment) and those of FIG. 44 (the first example of the present embodiment) are provided with same reference characters, and details already described are hereinafter not described.

A detailed description of a distance measuring process of the second example of the eighth embodiment is omitted. In the present example, a subject distance is calculated only based on the representative parallax.

Next, a ninth embodiment is described.

Figure 47:
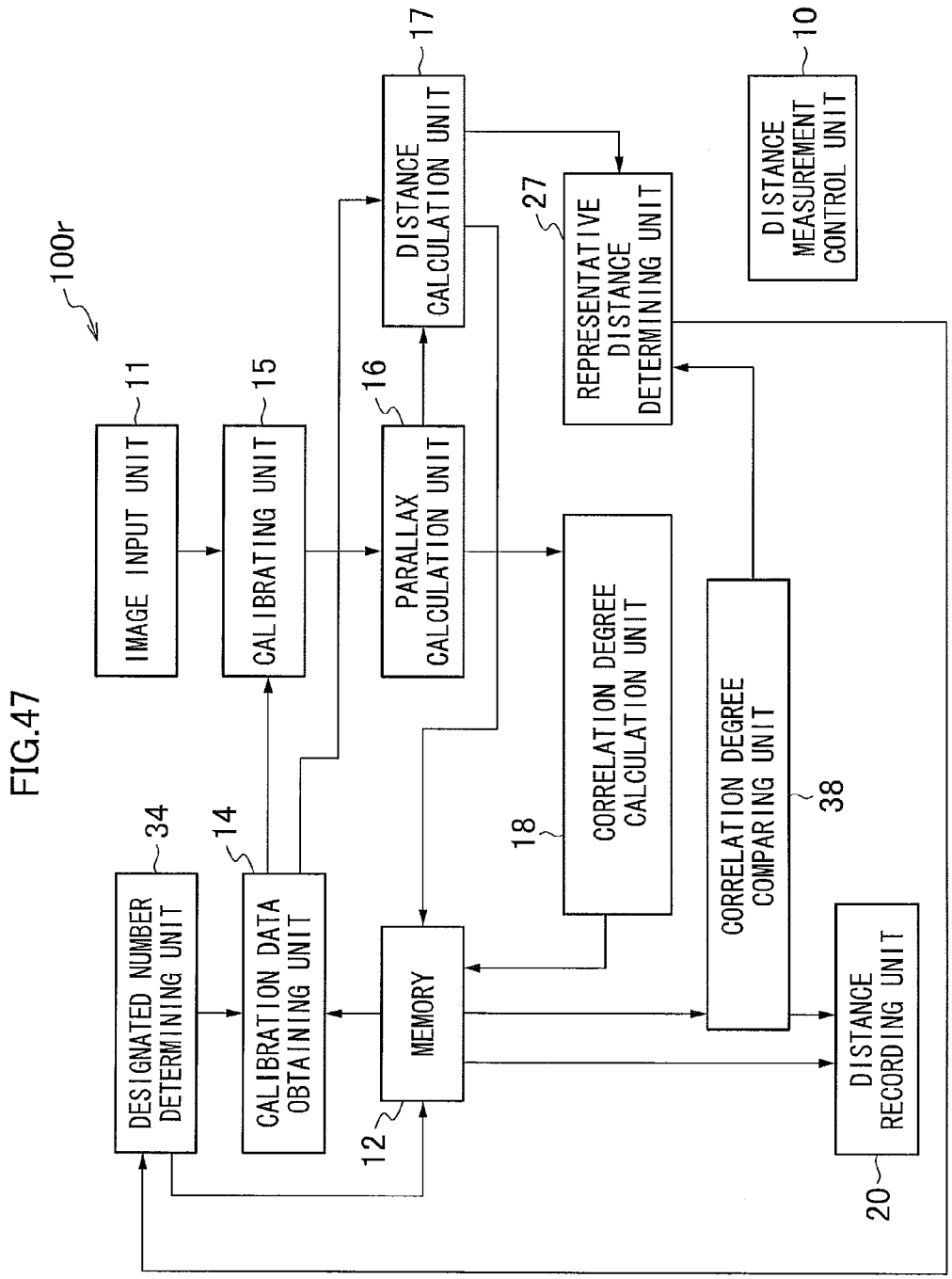
FIG. 47 is a block diagram of a distance measuring apparatus in a first example of a ninth embodiment.

FIG. 47 is a block diagram of a distance measuring apparatus 100r of a first example of the ninth embodiment. Note that components identical to those of the distance measuring apparatus 100m of FIG. 40 (the first example of the seventh embodiment) are provided with same reference characters, and details already described are hereinafter not described. Also, a correlation degree calculation unit 18 is similar to that of FIG. 1 (the first embodiment), and is not described.

A correlation degree comparing unit 38 of the present embodiment compares, for each switching of the designated distance (the distance of interest) by the designated distance determining unit 34, the totals of correlation degrees before and after switching with each other and, if the total of correlation degrees before switching is larger than the total of correlation degrees after switching, adopts the representative distance (the subject distance) before switching as a distance measurement result.

Figures 48A, 48B:
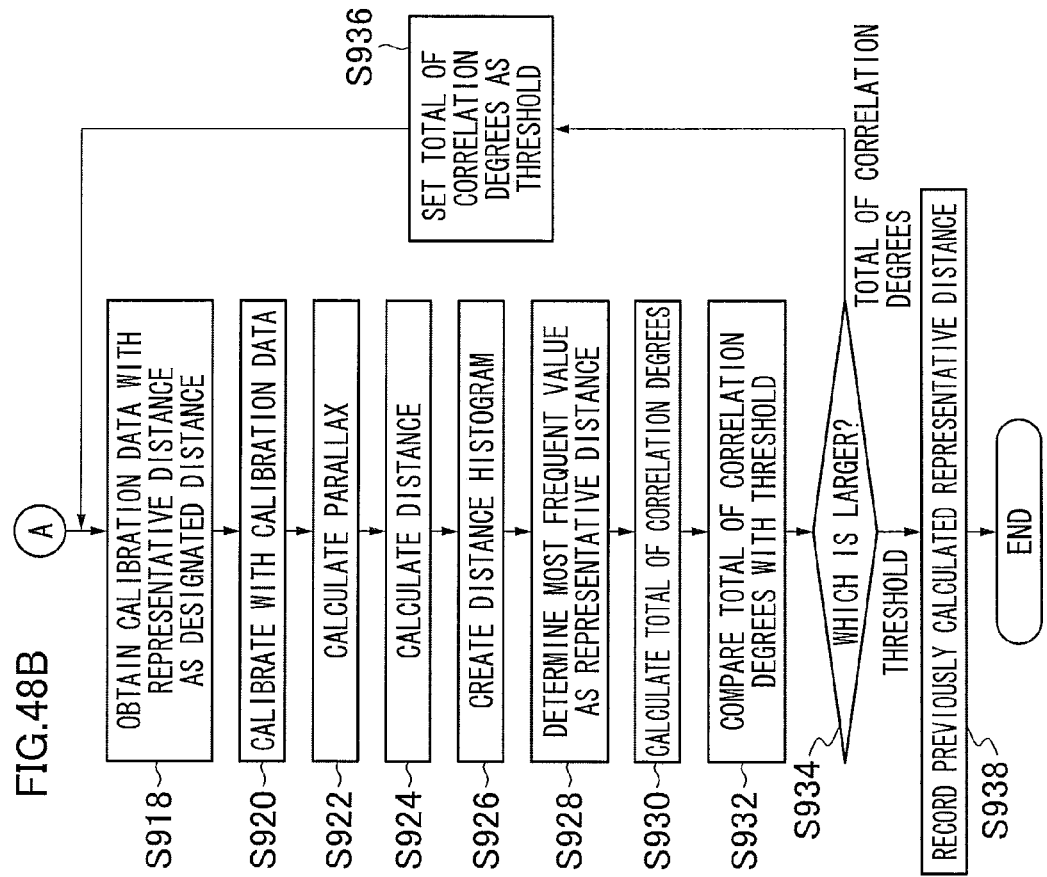
FIG. 48A is a flowchart of a distance measuring process in the first example of the ninth embodiment.
FIG. 48B is a flowchart of the distance measuring process in the first example of the ninth embodiment.

Next, a distance measuring process of the first example of the ninth embodiment is described by using flowcharts of FIG. 48A and FIG. 48B.

Steps S900 to S912 are similar to steps S700 to S712 of FIG. 41A (the first example of the seventh embodiment). At step S914, a total of correlation degrees is calculated by the correlation degree calculation unit 18. At step S916, the calculated total of correlation degrees is set as a threshold.

Steps S918 to S928 are similar to steps S716 to S726 of FIG. 41B. At step S930, a total of correlation degrees is calculated by the correlation degree calculation unit 18. At step S932, the total of correlation degrees currently calculated is compared by the correlation degree comparing unit 38 with the threshold (the total of correlation degrees previously calculated).

At step S934, if the total of correlation degrees≥the threshold, the procedure goes to step S936. If the total of correlation degrees<the threshold, the procedure goes to step S938.

At step S936, the total of correlation degrees currently calculated is set as a threshold.

At step S938, the representative distance previously calculated is adopted as a distance measurement result.

Figure 49:
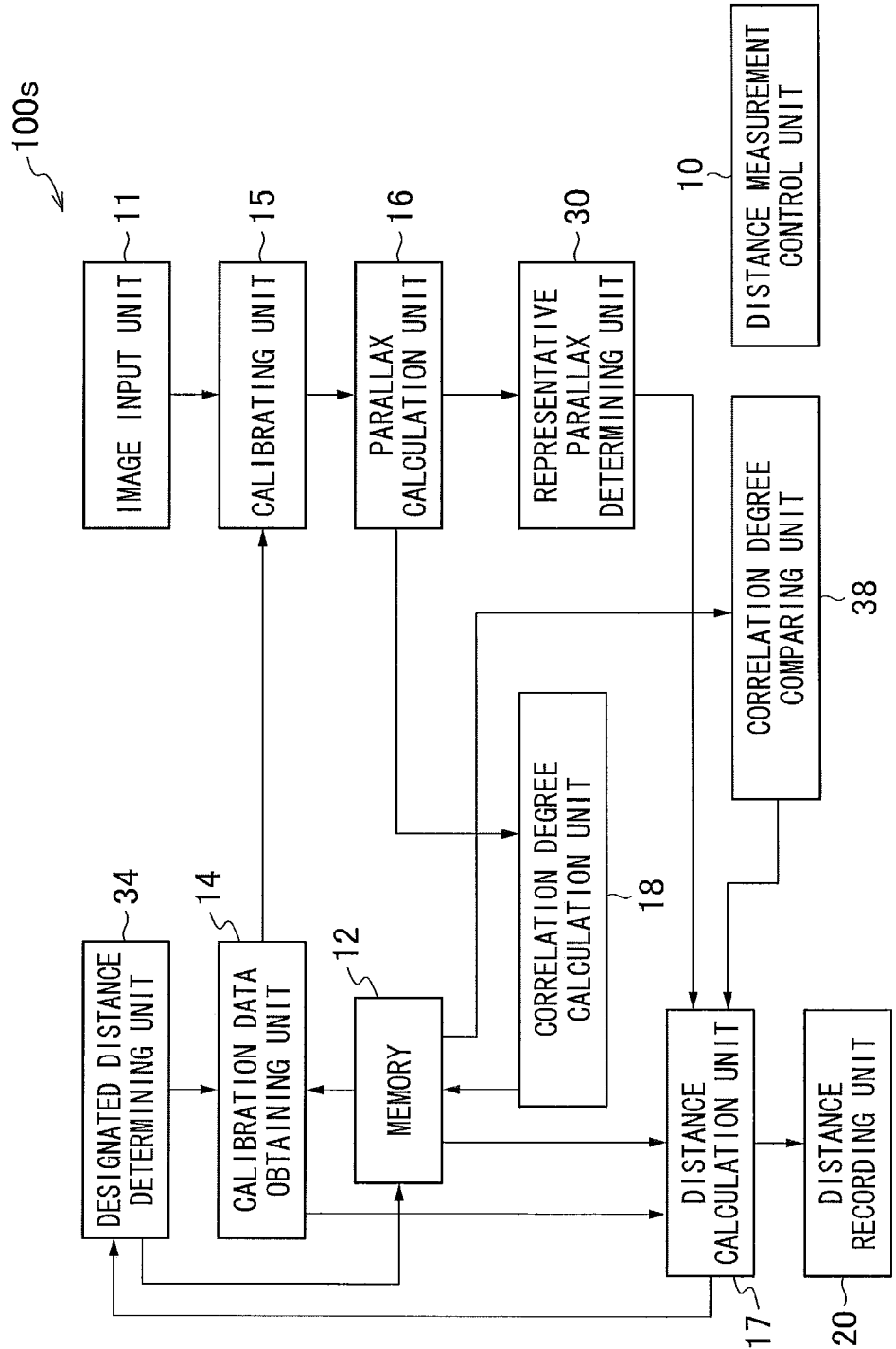
FIG. 49 is a block diagram of a distance measuring apparatus in a second example of the ninth embodiment.

FIG. 49 is a block diagram of a distance measuring apparatus 100s of the second example of the ninth embodiment. Note that components identical to those of the distance measuring apparatus 100j of FIG. 29 (the second example of the fifth embodiment) and those of FIG. 47 (the first example of the present embodiment) are provided with same reference characters, and details already described are hereinafter not described. In the present example, a subject distance is calculated only based on the representative parallax.

Next, a tenth embodiment is described.

Figure 50:
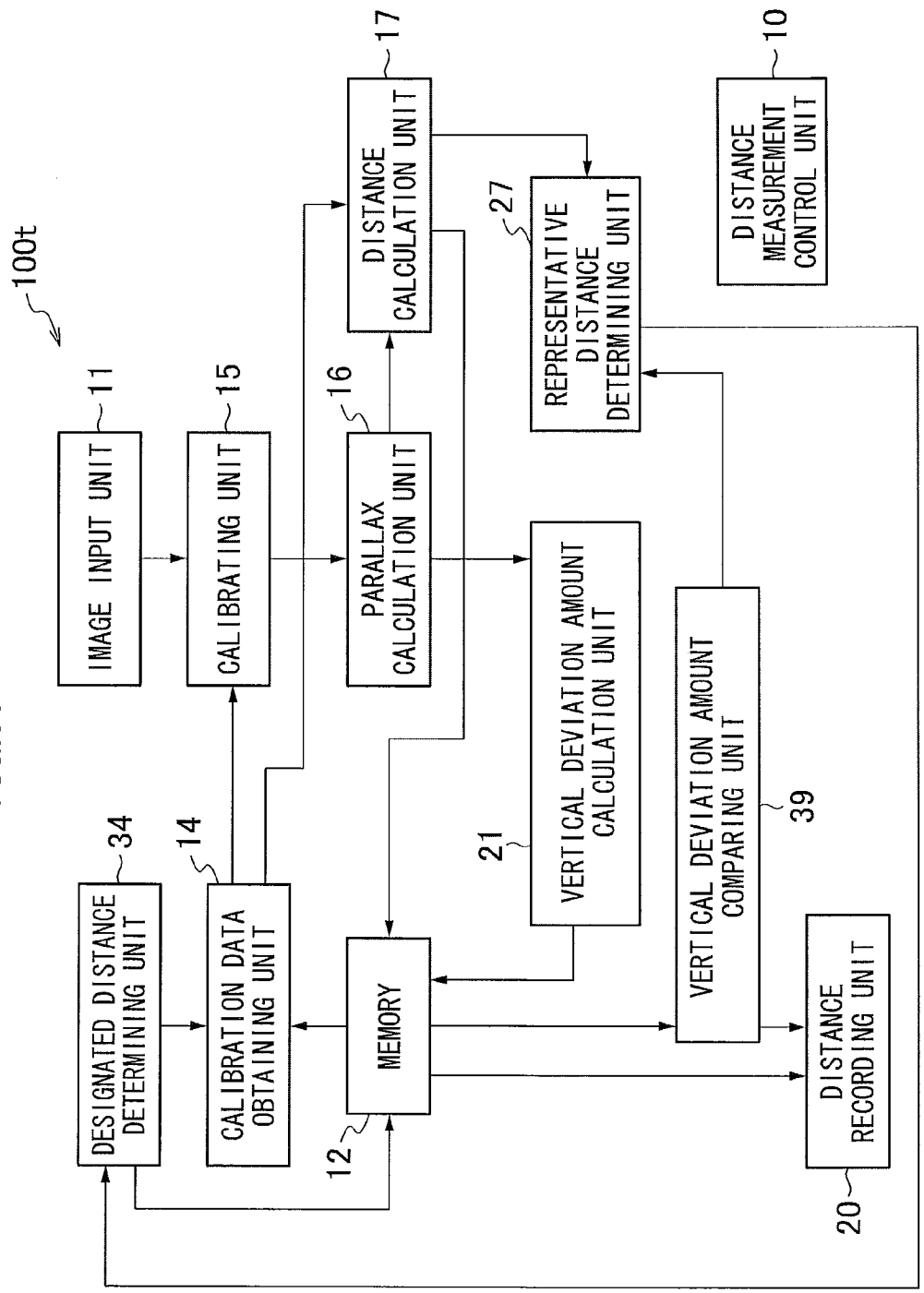
FIG. 50 is a block diagram of a distance measuring apparatus in a first example of a tenth embodiment.

FIG. 50 is a block diagram of a distance measuring apparatus 100t of the first example of the tenth embodiment. Note that components identical to those of the distance measuring apparatus 100m of FIG. 40 (the first example of the seventh embodiment) are provided with same reference characters, and details already described are hereinafter not described. Also, a vertical deviation amount calculation unit 21 is similar to that of FIG. 12 (the second embodiment), and is not described.

A vertical deviation amount comparing unit 39 of the present embodiment compares, for each switching of the designated distance (the distance of interest) by the designated distance determining unit 34, the totals of vertical deviation amounts before and after switching with each other and, if the total of vertical deviation amounts before switching is smaller than the total of vertical deviation amounts after switching, adopts the representative distance (the subject distance) before switching as a distance measurement result.

Figure 51B:
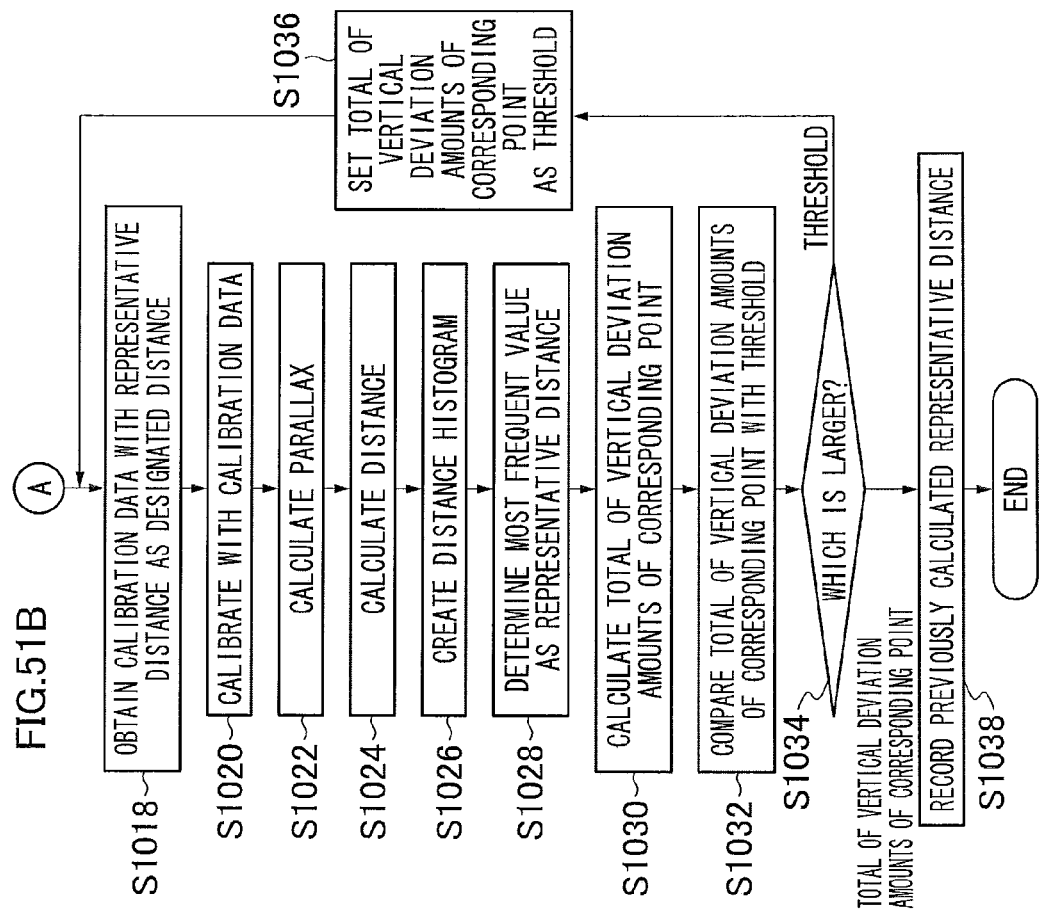
FIG. 51B is a flowchart of the distance measuring process in the first example of the tenth embodiment.
Figure 51A:
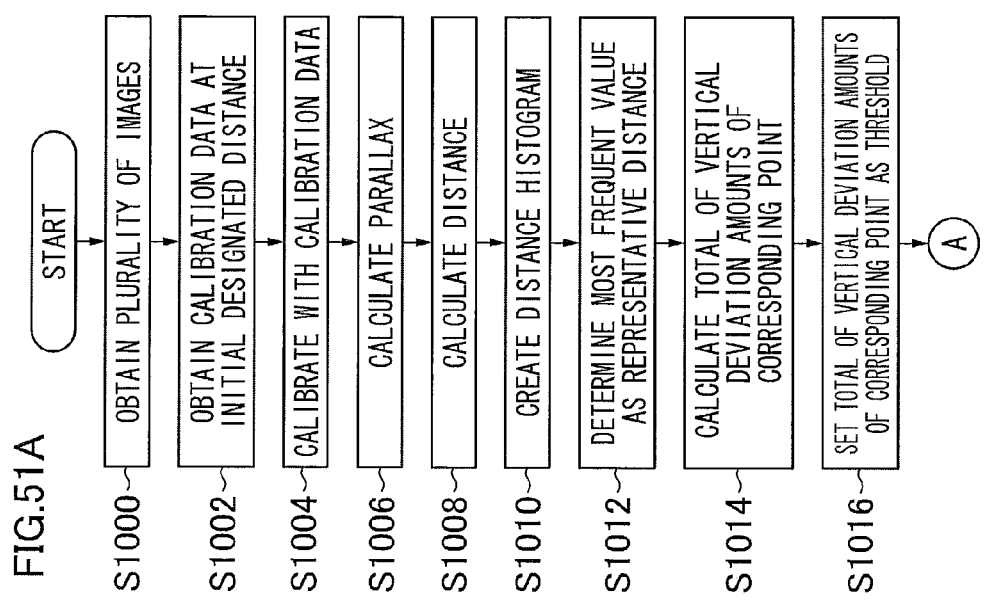
FIG. 51A is a flowchart of a distance measuring process in the first example of the tenth embodiment.

Next, a distance measuring process of the first example of the tenth embodiment is described by using flowcharts of FIG. 51A and FIG. 51B.

Steps S1000 to S1012 are similar to steps S700 to S712 of FIG. 41A (the first example of the seventh embodiment). At step S1014, a total of vertical deviation amounts is calculated by the vertical deviation amount calculation unit 21. At step S1016, the total of vertical deviation amounts calculated is set as a threshold.

Steps S1018 to S1028 are similar to steps S716 to S726 of FIG. 41B. At step S1030, a total of vertical deviation amounts is calculated by the vertical deviation amount calculation unit 21. At step S1032, the total of vertical deviation amounts currently calculated is compared with the threshold (the total of vertical deviation amounts previously calculated).

At step S1034, if the total of vertical deviation amounts≤the threshold, the procedure goes to step S1036. If the total of vertical deviation amounts>the threshold, the procedure goes to step S1038.

At step S1036, the total of vertical deviation amounts currently calculated is set as a threshold.

At step S1038, the representative distance previously calculated is adopted as a distance measurement result.

Figure 52:
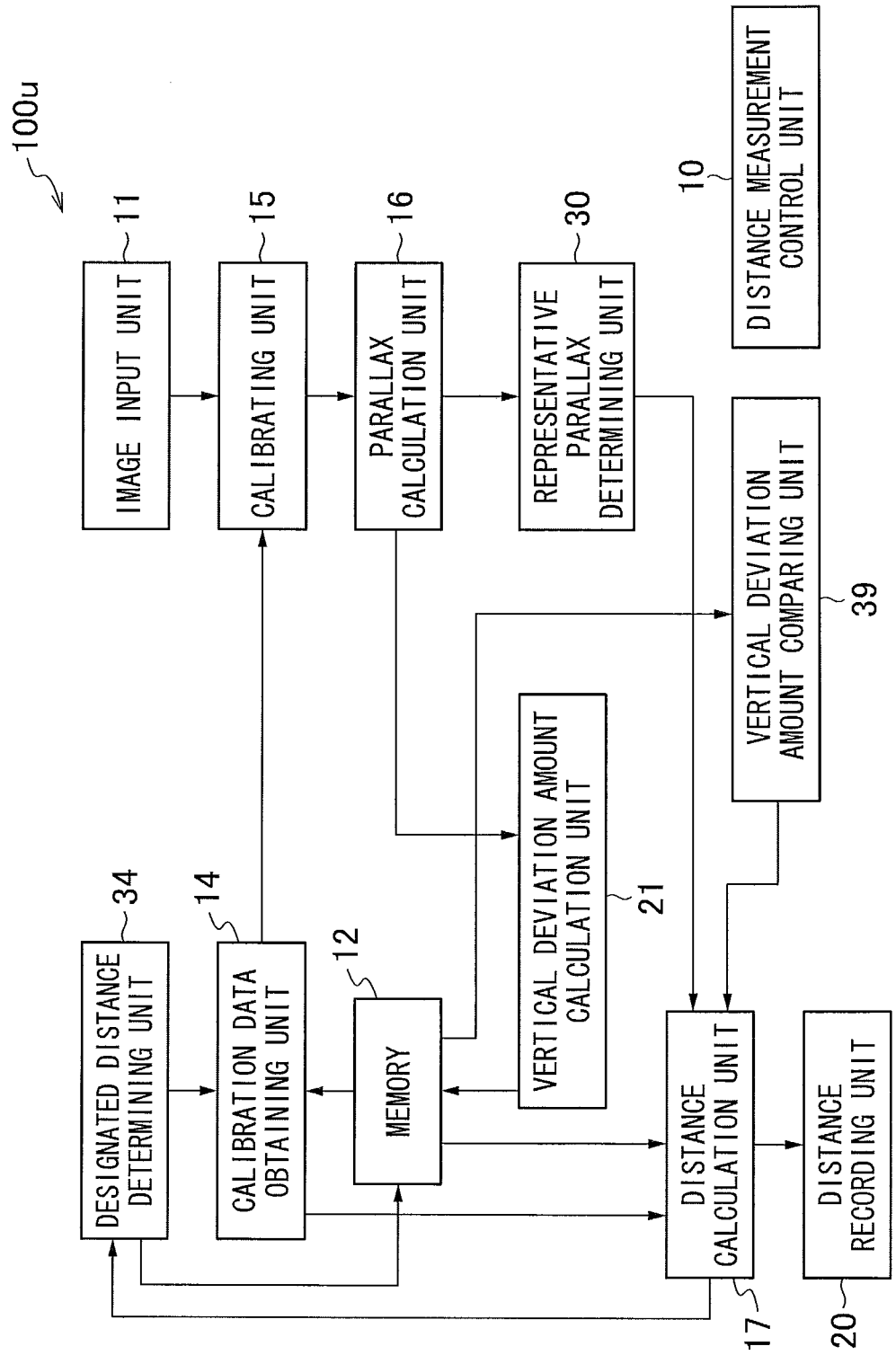
FIG. 52 is a block diagram of a distance measuring apparatus in a second example of the tenth embodiment.

FIG. 52 is a block diagram of a distance measuring apparatus 100u of a second example of the tenth embodiment. Note that components identical to those of the distance measuring apparatus 100j of FIG. 29 (the second example of the fifth embodiment) and those of FIG. 50 (the first example of the present embodiment) are provided with same reference characters, and details already described are hereinafter not described. In the present example, a subject distance is calculated only based on the representative parallax.

Next, an eleventh embodiment is described.

Figure 53:
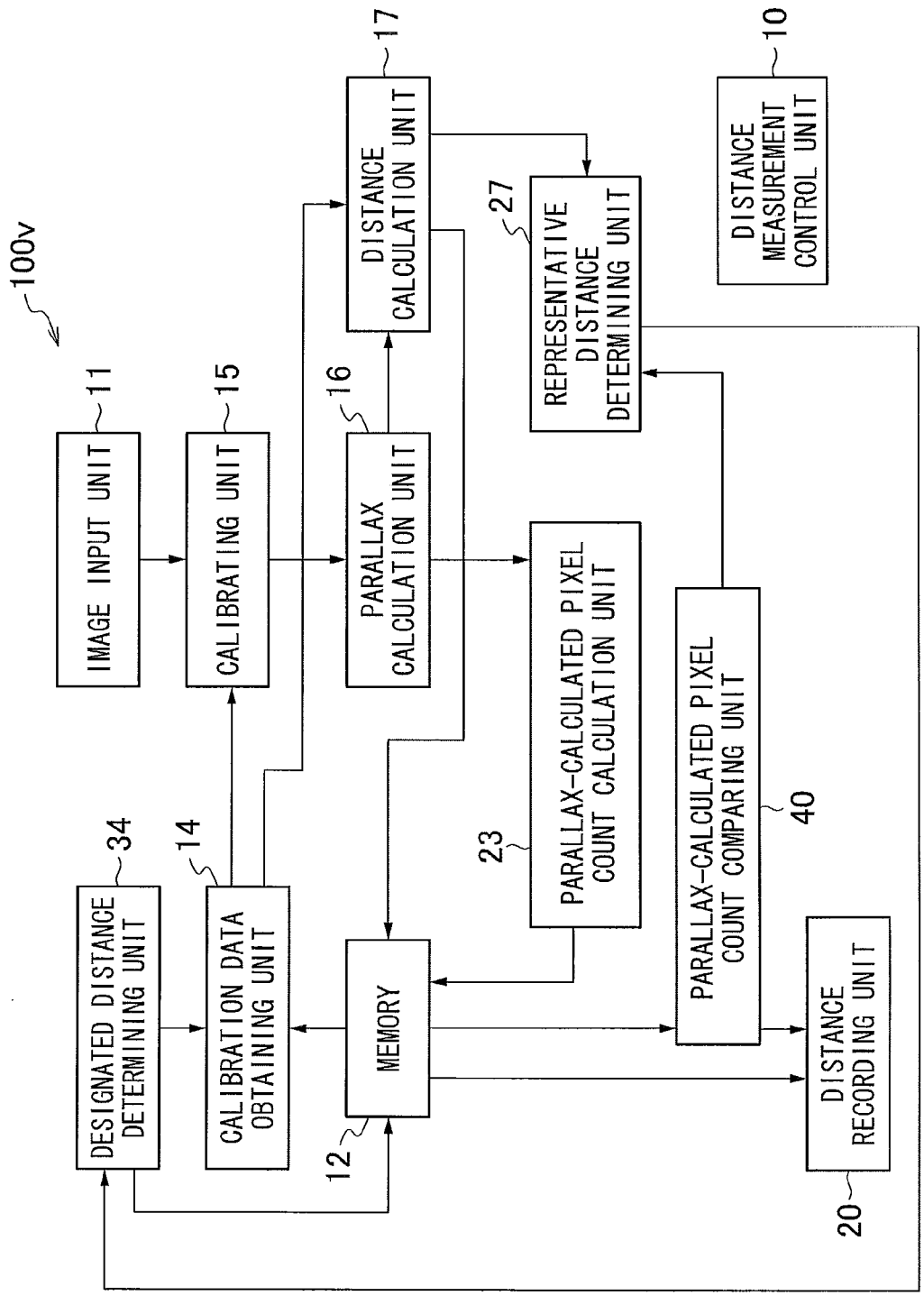
FIG. 53 is a block diagram of a distance measuring apparatus in a first example of an eleventh embodiment.

FIG. 53 is a block diagram of a distance measuring apparatus 100v of a first example of the eleventh embodiment. Note that components identical to those of the distance measuring apparatus 100m of FIG. 40 (the first example of the seventh embodiment) are provided with same reference characters, and details already described are hereinafter not described. Also, a parallax-calculated pixel count calculation unit 23 is similar to that of FIG. 17 (the third embodiment), and is not described.

A parallax-calculated pixel count comparing unit 40 of the present embodiment compares, for each switching of the designated distance (the distance of interest) by the designated distance determining unit 34, the parallax-calculated pixel counts before and after switching with each other and, if the parallax-calculated pixel count before switching is larger than the parallax-calculated pixel count after switching, adopts the representative distance (the subject distance) before switching as a distance measurement result.

Figure 54B:
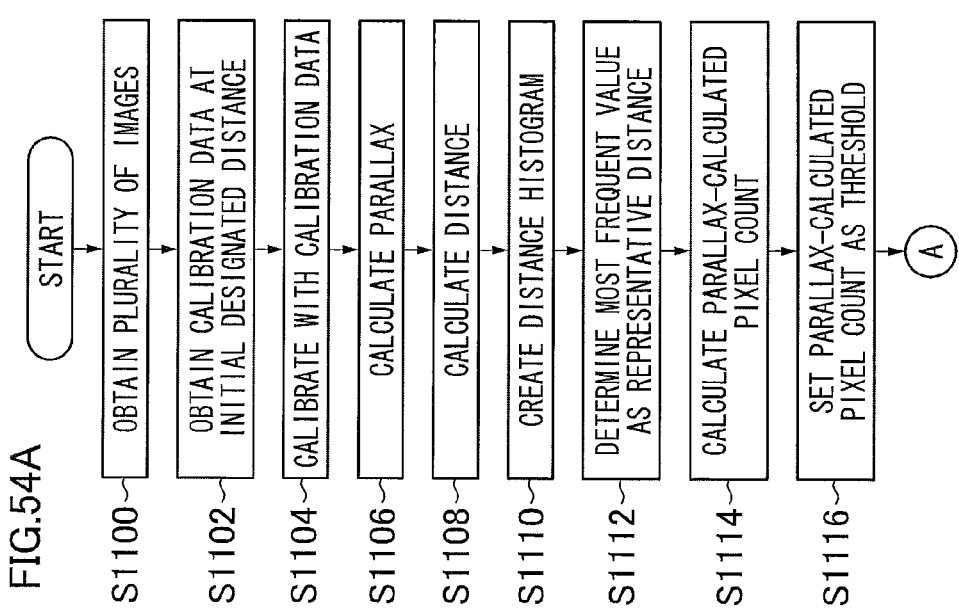
FIG. 54B is a flowchart of the distance measuring process in the first example of the eleventh embodiment.
Figure 54A:
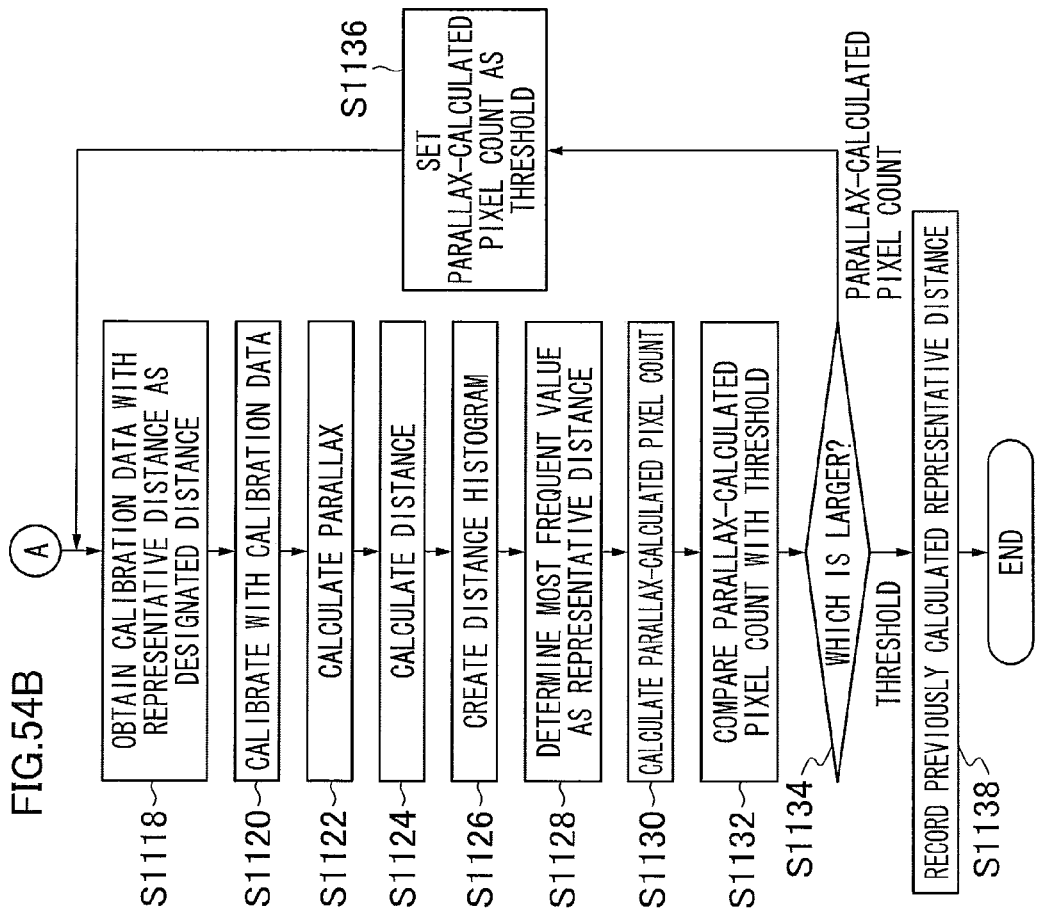
FIG. 54A is a flowchart of a distance measuring process in the first example of the eleventh embodiment.

Next, a distance measuring process of the first example of the eleventh embodiment is described by using flowcharts of FIG. 54A and FIG. 54B.

Steps S1100 to S1112 are similar to steps S700 to S712 of FIG. 41A (the first example of the seventh embodiment). At step S1114, a parallax-calculated pixel count is calculated by the parallax-calculated pixel count calculation unit 23. At step S1116, the calculated parallax-calculated pixel count is set as a threshold.

Steps S1118 to S1128 are similar to steps S716 to S726 of FIG. 41B. At step S1130, a parallax-calculated pixel count is calculated by the parallax-calculated pixel count calculation unit 23.

At step S1132, the total parallax-calculated pixel count currently calculated is compared by the parallax-calculated pixel count comparing unit 40 with the threshold (the total parallax-calculated pixel count previously calculated).

At step S1134, if the parallax-calculated pixel count≥the threshold, the procedure goes to step S1136. If the parallax-calculated pixel count<the threshold, the procedure goes to step S1138.

At step S1136, the parallax-calculated pixel count currently calculated is set as a threshold.

At step S1138, the representative distance previously calculated is adopted and recorded as a distance measurement result.

Figure 55:
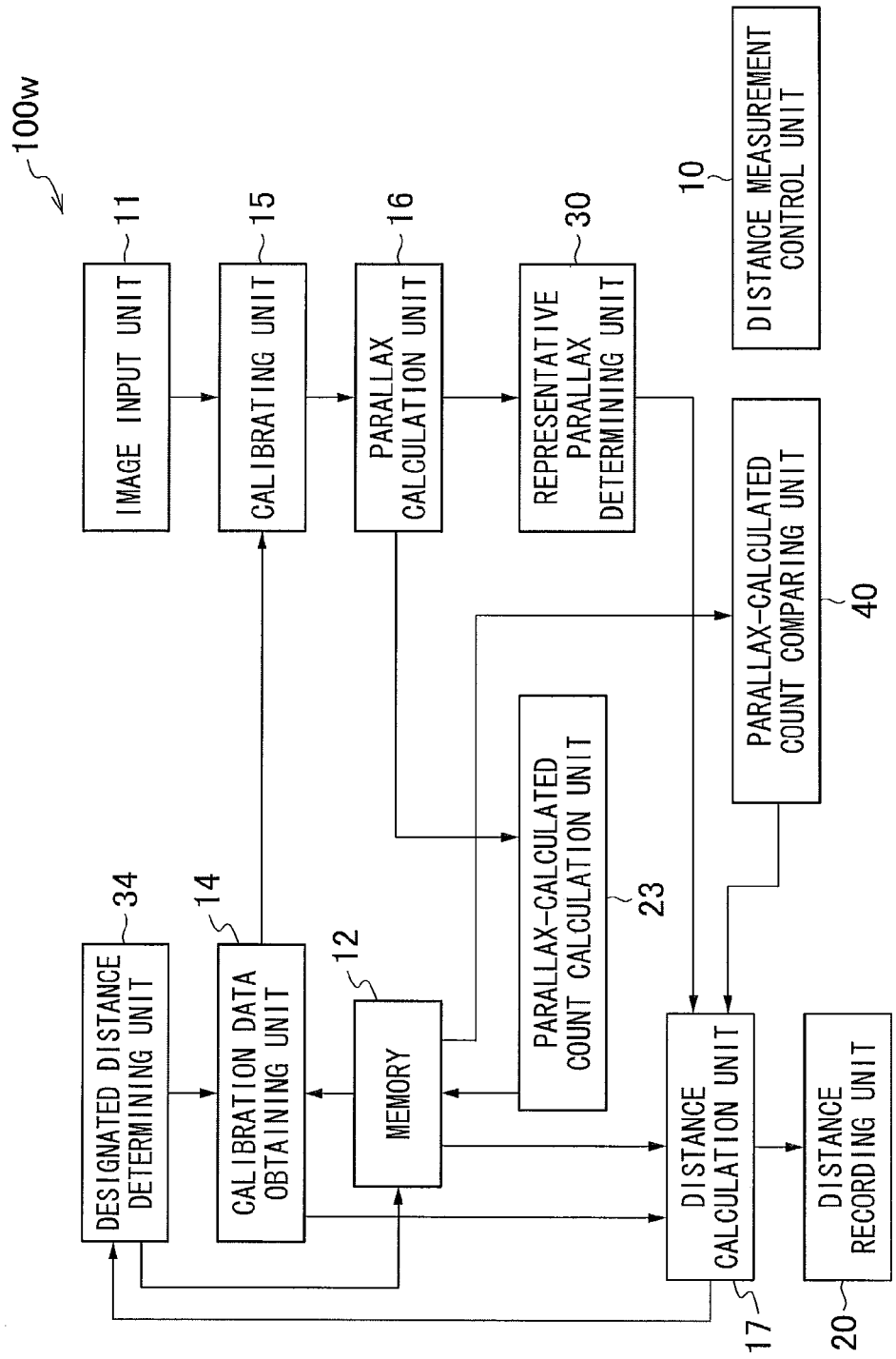
FIG. 55 is a block diagram of a distance measuring apparatus in a second example of the eleventh embodiment.

FIG. 55 is a block diagram of a distance measuring apparatus 100w of a second example of the eleventh embodiment. Note that components identical to those of the distance measuring apparatus 100j of FIG. 29 (the second example of the fifth embodiment) and those of FIG. 53 (the first example of the present embodiment) are provided with same reference characters, and details already described are hereinafter not described. In the present example, a subject distance is calculated only based on the representative parallax. In the present example, a subject distance is calculated only based on the representative parallax.

Next, a twelfth embodiment is described.

Figure 56:
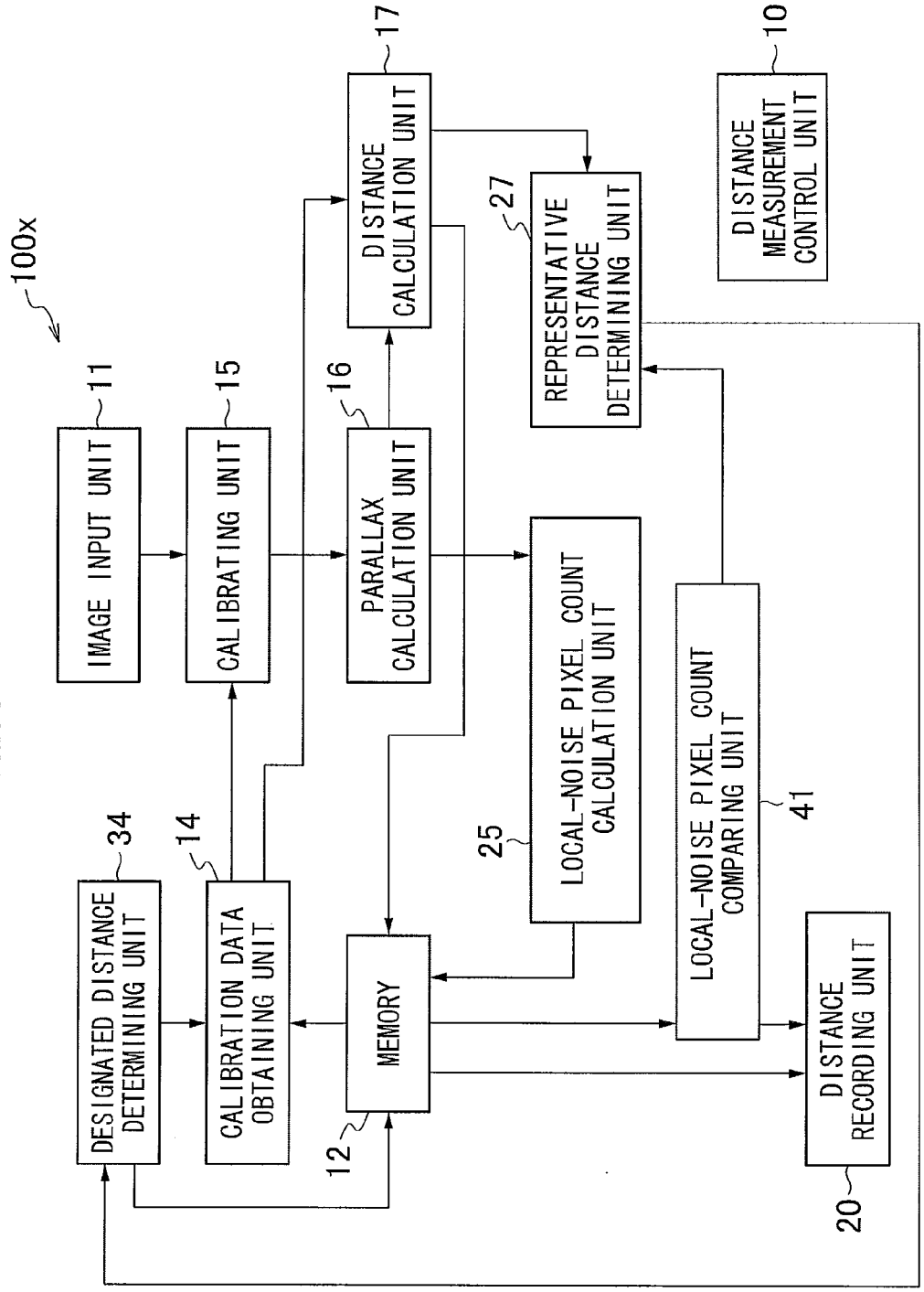
FIG. 56 is a block diagram of a distance measuring apparatus in a first example of a twelfth embodiment.

FIG. 56 is a block diagram of a distance measuring apparatus 100x of a first example of the twelfth embodiment. Note that components identical to those of the distance measuring apparatus 100m of FIG. 40 (the first example of the seventh embodiment) are provided with same reference characters, and details already described are hereinafter not described. Also, a local-noise pixel count calculation unit 25 is similar to that of FIG. 21 (the fourth embodiment), and is not described.

A local-noise pixel count comparing unit 41 of the present embodiment compares, for each switching of the designated distance (the distance of interest) by the designated distance determining unit 34, the local-noise pixel counts before and after switching with each other and, if the local-noise pixel count before switching is smaller than the local-noise pixel count after switching, adopts the representative distance (the subject distance) before switching as a distance measurement result.

Next, a distance measuring process of the first example of the twelfth embodiment is described by using flowcharts of FIG. 57A and FIG. 57B.

Steps S1200 to S1212 are similar to steps S700 to S712 of FIG. 41A (the first example of the seventh embodiment). At step S1214, a local-noise pixel count is calculated by the local-noise pixel count calculation unit 25. At step S1216, the calculated local-noise pixel count is set as a threshold.

Steps S1218 to S1228 are similar to steps S716 to S726 of FIG. 41B (the first example of the seventh embodiment). At step S1230, a local-noise pixel count is calculated by the local-noise pixel count calculation unit 25.

At step S1232, the local-noise pixel count currently calculated and the threshold (the local-noise pixel count previously calculated) are compared with each other by the local-noise pixel count comparing unit 41. At step S1234, if the local-noise pixel count≤the threshold, the procedure goes to step S1236. If local-noise pixel count>the threshold, the procedure goes to step S1238. At step S1236, the local-noise pixel count currently calculated is set as a threshold. At step S1238, the representative distance previously calculated is adopted and recorded as a distance measurement result.

Figure 58:
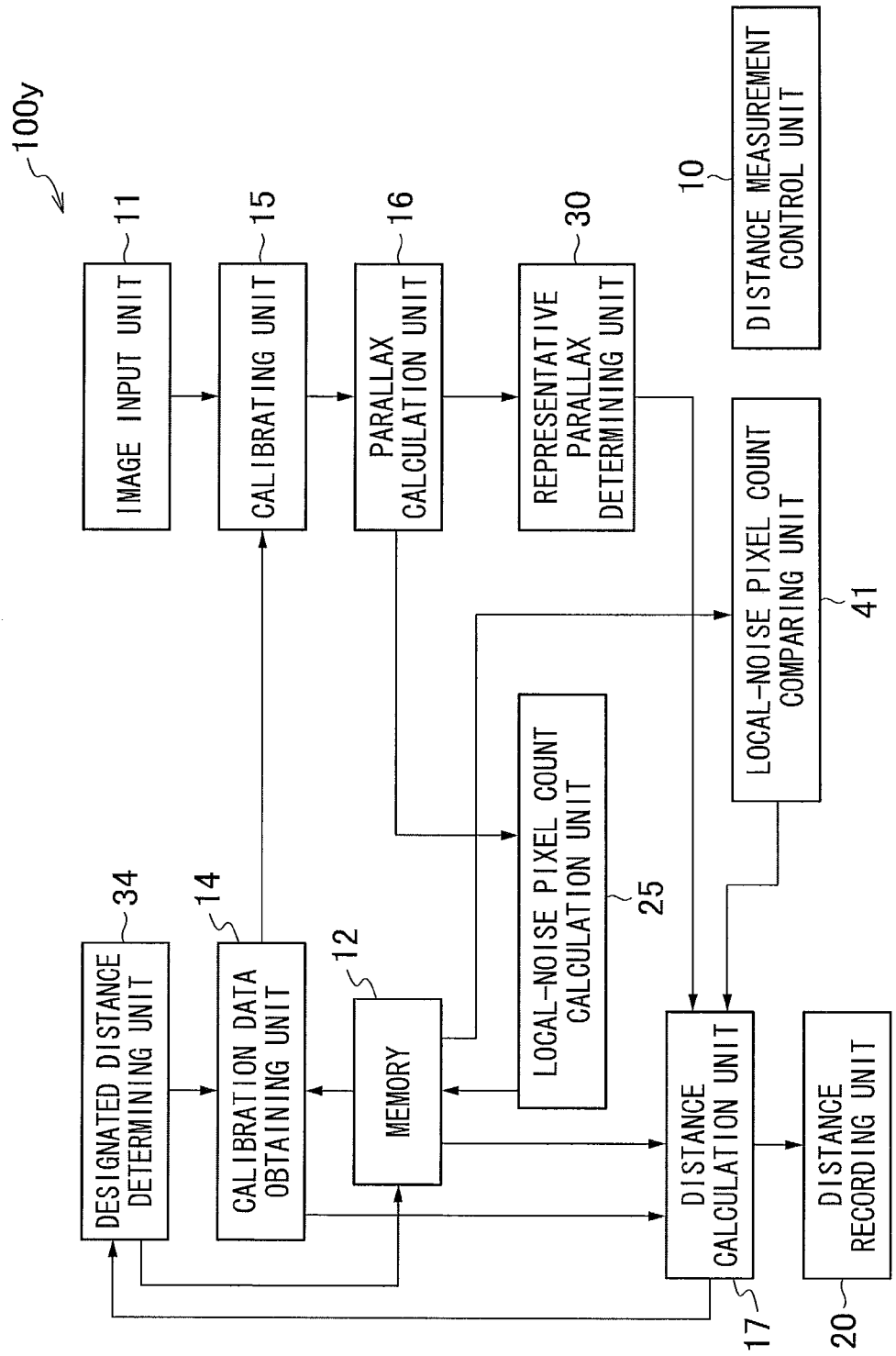
FIG. 58 is a block diagram of a distance measuring apparatus in a second example of the twelfth embodiment.

FIG. 58 is a block diagram of a distance measuring apparatus 100y of a second example of the twelfth embodiment. Note that components identical to those of the distance measuring apparatus 100j of FIG. 29 (the second example of the fifth embodiment) and those of FIG. 50 (the first example of the present embodiment) are provided with same reference characters, and details already described are hereinafter not described. In the present example, a subject distance is calculated only based on the representative parallax. In the present example, a subject distance is calculated only based on the representative parallax.

Next, a thirteenth embodiment is described.

Figure 60:
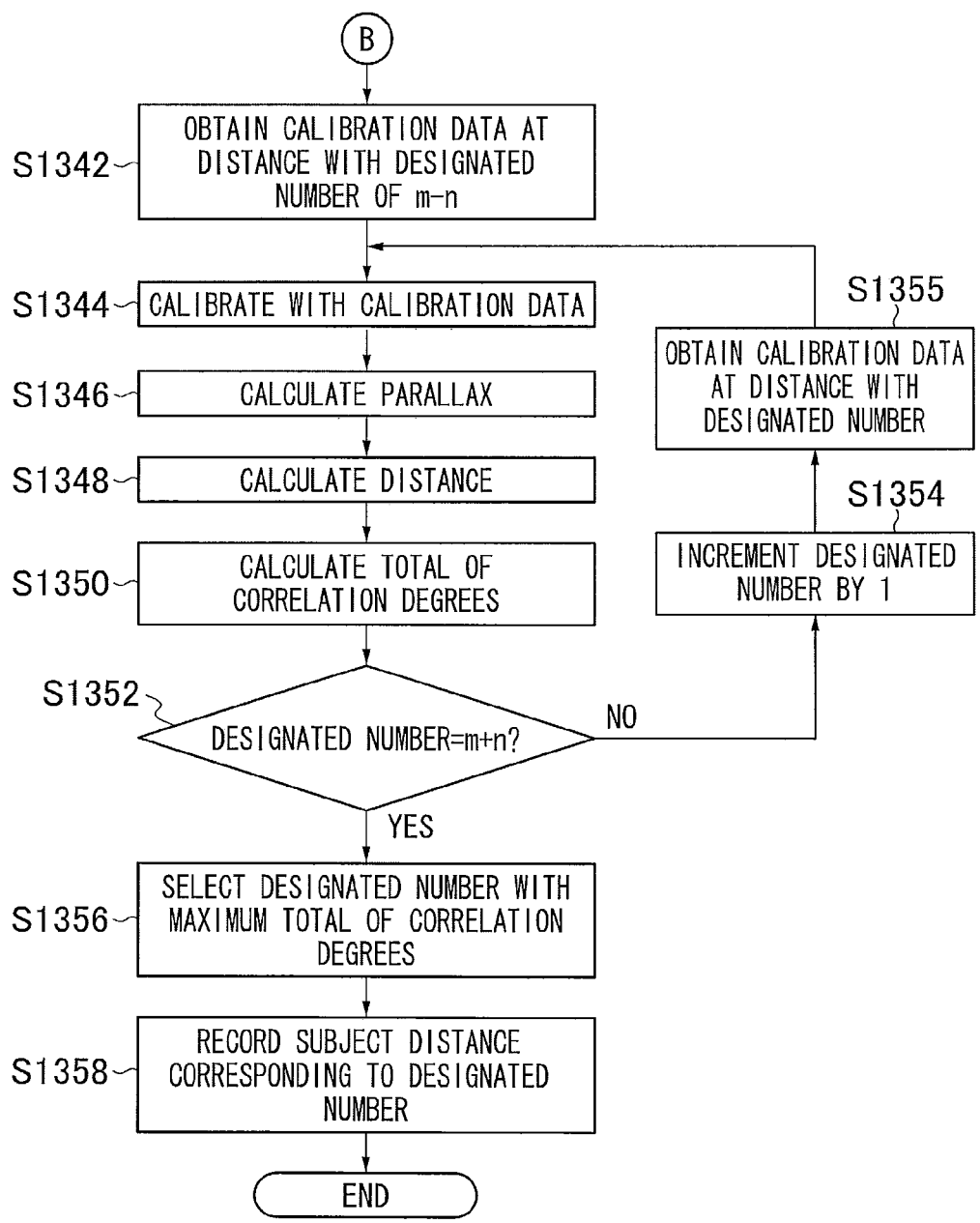
FIG. 60 is a flowchart of a distance measuring process in a second example of the thirteenth embodiment.

A distance measuring process of a first example of the thirteenth embodiment is described by using flowcharts of FIG. 59 and FIG. 60. This distance measuring process is executed by the distance measuring apparatus 100m of FIG. 40 (the first example of the seventh embodiment).

In the present embodiment, with the control by the distance measurement control unit 10, an initial designated distance (an initial distance of interest) is first determined to perform a first distance measurement (hereinafter referred to as a "first-half process"), thereby obtaining a first subject distance. Next, the first subject distance is determined as the next designated distance to perform a second distance measurement (hereinafter referred to as a "latter-half process"), thereby obtaining a second subject distance. The distance recording unit 20 records the second subject distance as a distance measurement result. Between the first distance measurement and the second distance measurement, judgment criteria for determining optimum calibration data differ.

FIG. 59 illustrates an example of a first-half process. Steps S1300 to S1332 are similar to steps S700 to S732 of FIG. 41A and FIG. 41B (the first example of the seventh embodiment). At step S1334, the previous designated number is obtained as m, and the current designated number is obtained as m+n.

FIG. 60 illustrates an example of the latter-half process. At step S1342, calibration data corresponding to a distance (a designated distance) with a designated number of m−n is obtained. Steps S1344 to S1350 are similar to steps S104 to S110 of FIG. 5 (the first example of the first embodiment). At step S1352, it is determined whether the designated number=m+n. If the designated number=m+n does not hold, the procedure goes to step S1354. If the designated number=m+n holds, the procedure goes to step S1356. The designated number is incremented by 1 at step S1354. At step S1355, calibration data corresponding to the designated distance is obtained. At step S1356, a designated number with a maximum correlation degree is selected. At step S1358, the designated distance corresponding to the selected designated number is recorded as a distance measurement result.

Figure 61B:
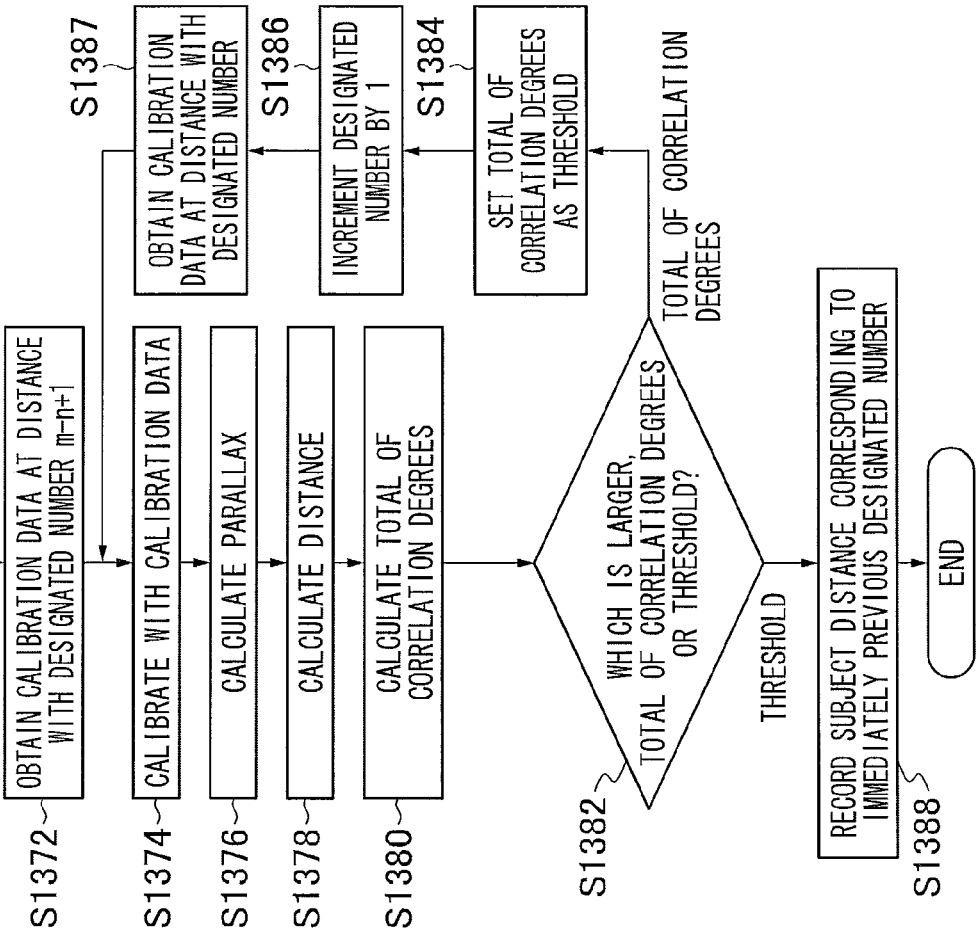
FIG. 61B is a flowchart of the distance measuring process in the third example of the thirteenth embodiment.
Figure 61A:
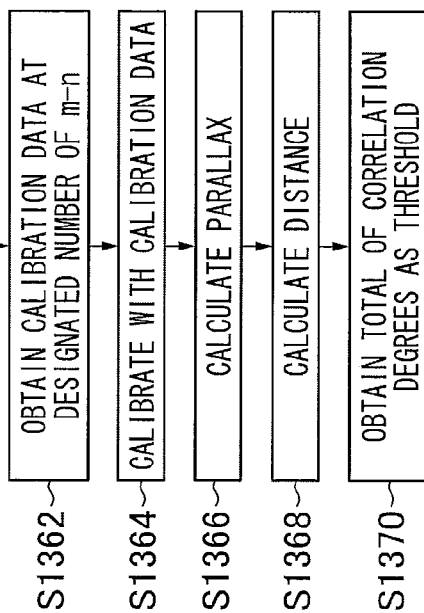
FIG. 61A is a flowchart of a distance measuring process in a third example of the thirteenth embodiment.

FIG. 61A and FIG. 61B illustrate another example of the latter-half process. At step S1362, calibration data corresponding to a distance (a designated distance) with a designated number of m−n is obtained. Step S1364 to S1370 are similar to steps S124 to S130 of FIG. 7A (the second example of the first embodiment). At step S1372, calibration data corresponding to a distance (a designated distance) with the designated number of m−n is obtained. Step S1374 to S1388 are similar to steps S134 to S148 of FIG. 7B.

Note that while the case has been described, as an example in which in which judgment criteria differ between the first-half process and the latter-half process, in which designated distance–representative distance| is used in the first-half process and the total of correlation degrees is used in the latter-half process, the present invention is not particularly restricted to this case. Any of the judgment criterions described in the seventh embodiment (|designated distance–representative distance|), the eighth embodiment (|designated distance–representative distance| and the threshold), the ninth embodiment (the total of correlation degrees), the tenth embodiment (the total of vertical deviation amount), the eleventh embodiment (parallax-calculated pixel count), and the twelfth embodiment (the local-noise pixel amount).

Next, a fourteenth embodiment is described.

Figure 62:
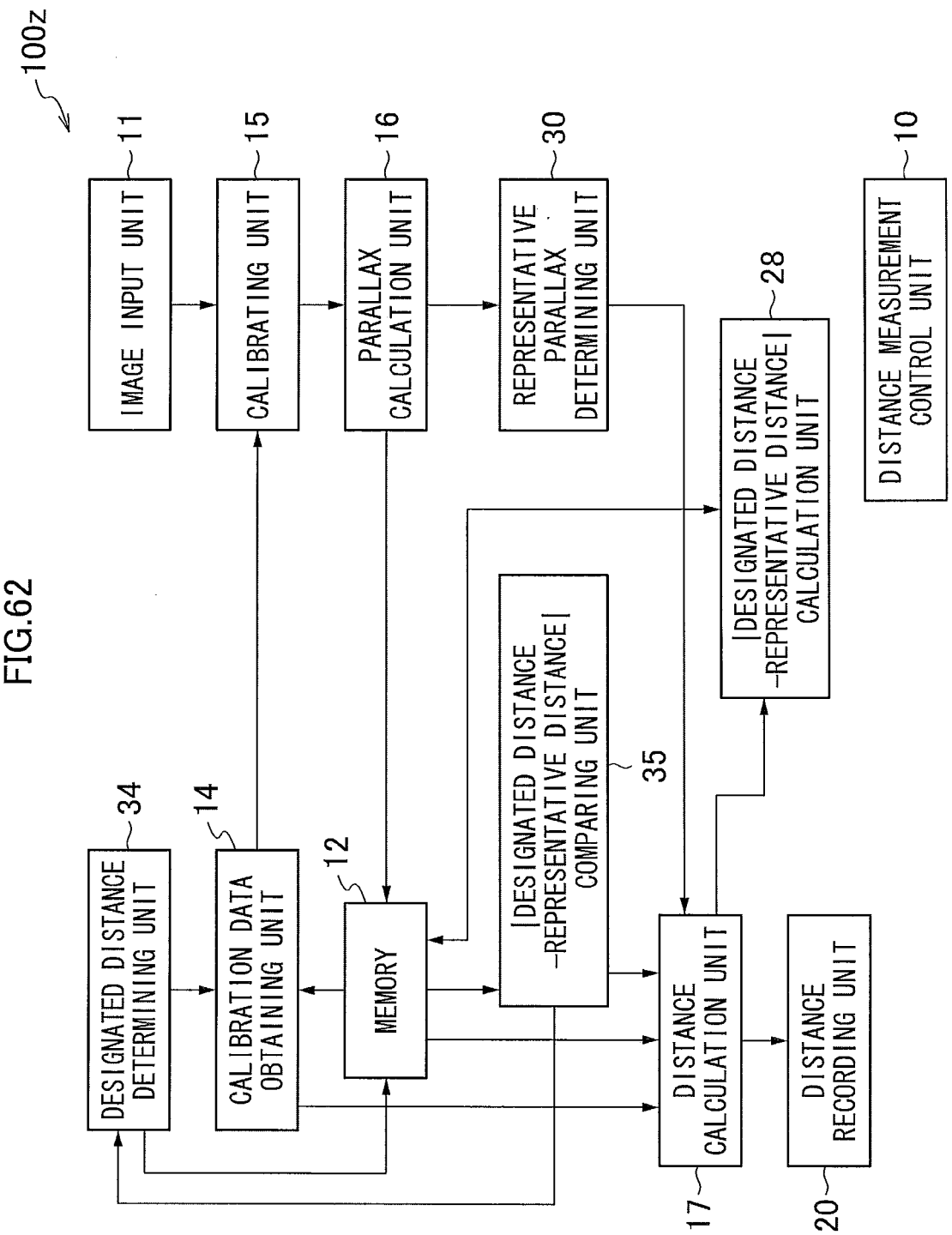
FIG. 62 is a block diagram of an example of a distance measuring apparatus in a fourteenth embodiment.

FIG. 62 is a block diagram of a distance measuring apparatus 100z of a first example of the fourteenth embodiment. Note that components identical to those of the distance measuring apparatus 100m of FIG. 40 (the first example of the seventh embodiment) are provided with same reference characters, and details already described are hereinafter not described. The distance measuring apparatus 100z is configured to include a representative parallax determining unit 30 determining a representative parallax. The representative parallax represents a parallax for each pixel (or pixel group) for which detection of a corresponding pixel has been successful at the parallax calculation unit 16.

Figure 63:
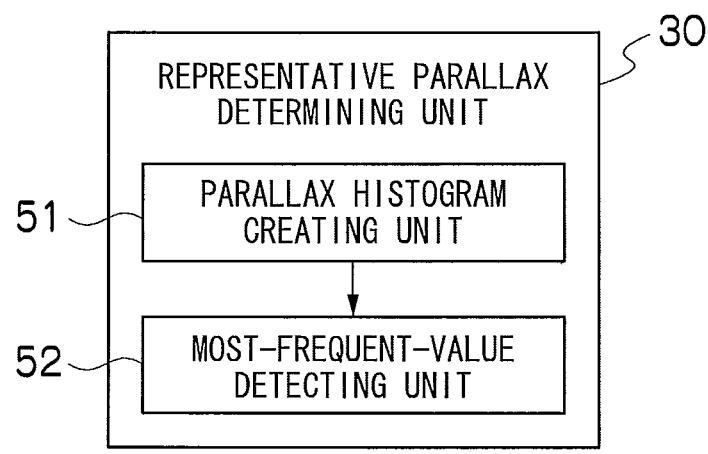
FIG. 63 is a detailed block diagram of a representative parallax determining unit in a first example of the fourteenth embodiment.

FIG. 63 is a block diagram illustrating details of the representative parallax determining unit 30 in the first example of the fourteenth embodiment. The representative parallax determining unit 30 has a parallax histogram creating unit 51 creating a parallax histogram indicating a relation between parallax and the number of occurrences (pixel count) for each pixel between the plurality of viewpoint images and a most-frequent-value detecting unit 52 detecting the most frequent value in the parallax histogram as a representative parallax.

A distance measuring process of the first example of the fourteenth embodiment is illustrated in flowcharts of FIG. 64A and FIG. 64B. Here, steps S1450 to S1484 are similar to steps S750 to S784 of FIG. 43A and FIG. 43B (the second example of the seventh embodiment).

At steps S1458 and S1472, as described in the third example of the fifth embodiment, a parallax histogram as illustrated in FIG. 31 is created by the parallax histogram creating unit 51. At steps S1460 and S1474, the most frequent value in the parallax histogram is detected by the most-frequent-value detecting unit 52, and that most frequent value is determined as a representative parallax. At steps S1462 and step S1476, a representative distance is calculated by the distance calculation unit 17 based on the representative parallax. That is, the representative parallax is converted to a representative distance as a subject distance candidate of a distance measurement result.

Note that when a background such as a distant view or a front view in front of a main subject is reflected in the viewpoint images, the most frequent value may be present at an edge of the measurement range. Thus, at the representative parallax determining step (S1460), it is preferable to select the most frequent value by excluding the numbers of occurrences present at edges of the parallax range (a left end side and a right end side in the parallax histogram of FIG. 31). Also, in the parallax histogram, a pixel corresponding to a number of occurrences locally present has a high possibility of being a noise pixel. Thus, at the histogram creating step (S1458), whether the number of occurrences of each parallax is high or low may be discriminated, and a parallax with a high number of occurrences may be selected and a parallax with a low number of occurrences may be removed from the histogram.

Next, a second example of the fourteenth embodiment is described.

Figure 65:
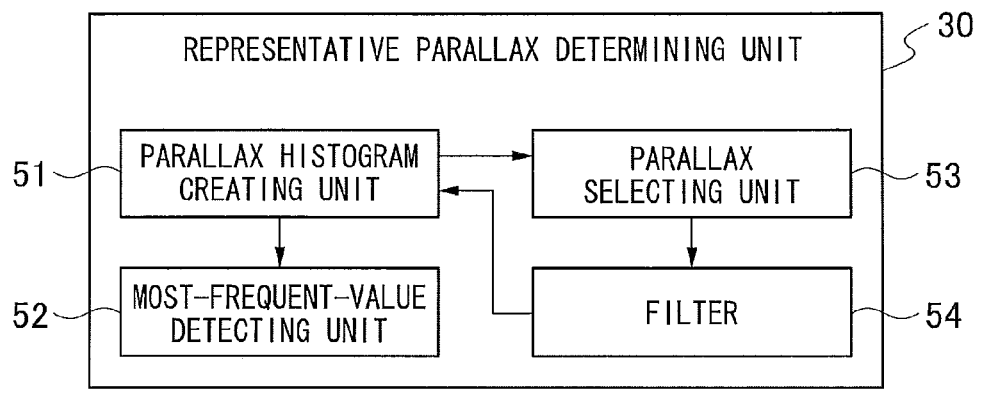
FIG. 65 is a detailed block diagram of a representative parallax determining unit in a second example of the fourteenth embodiment.

FIG. 65 is a block diagram illustrating details of the representative parallax determining unit 30 in the distance measuring apparatus of the second example of the fourteenth embodiment. Portions other than this are as illustrated in FIG. 62.

The representative parallax determining unit 30 of the present example is configured to include a parallax histogram creating unit 51, a most-frequent-value detecting unit 52, a parallax selecting unit 53, and a filter 54. Here, the parallax histogram creating unit 51 and the most-frequent-value detecting unit 52 are identical to those of the first example.

The parallax selecting unit 53 discriminates whether the number of occurrences of each parallax is high or lower in the parallax histogram, and selects a parallax with a high number of occurrences, thereby excluding a component of a pixel locally present from the parallax histogram. For example, a parallax with a number of occurrences (pixel count) equal to a threshold or more is selected, and a parallax with a number of occurrences (pixel count) lower than the threshold is excluded from the histogram.

The filter 54 removes a component (pixel count) of a pixel in which matching between the viewpoint images is not appropriate from the number of occurrences of the each selected parallax. For example, pixels not having a same correspondence between matching with the right viewpoint image being taken as a standard image and the left viewpoint image being taken as a reference image and matching with the left viewpoint image being taken as a standard image and the right viewpoint image being taken as a reference image are selected, and the number of selected pixels is subtracted from the number of occurrences of each parallax. Also, for example, when one pixel of the standard image corresponds to many pixels of the reference image, pixels having this correspondence are selected, and the number of selected pixels is subtracted from the number of occurrences of each parallax. Note that the filter in the present invention is not particularly restricted for the pixel selection described above. For example, the filter includes another pixel selecting means judging whether an appropriate parallax calculation has been made and preclude an inappropriate parallax-calculated component.

Figure 66:
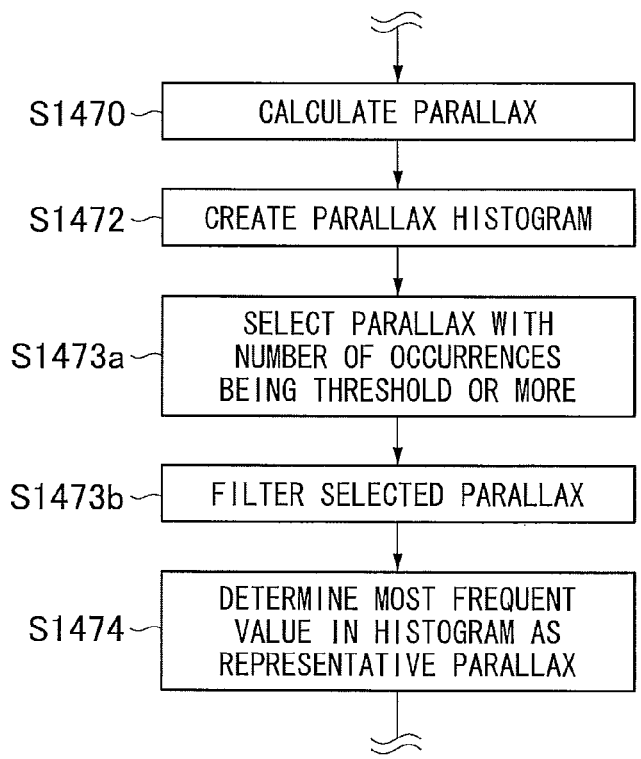
FIG. 66 is a flowchart of main parts of a distance measuring process in the second example of the fourteenth embodiment.

A distance measuring process of the second example of the fourteenth embodiment is described by using a flowchart of FIG. 66. Here, processes before creation of a parallax histogram are similar to those of FIG. 64A and FIG. 64B (identical to steps S1450 to S1472). In the following, only details different from the first example are described.

Figure 67B:
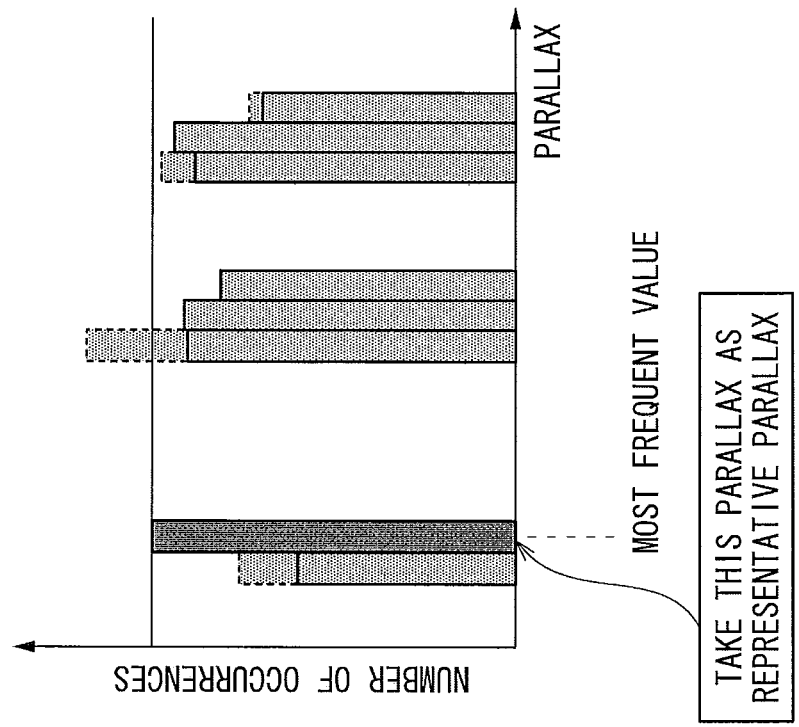
FIG. 67B is an explanatory diagram of a filter.
Figure 67A:
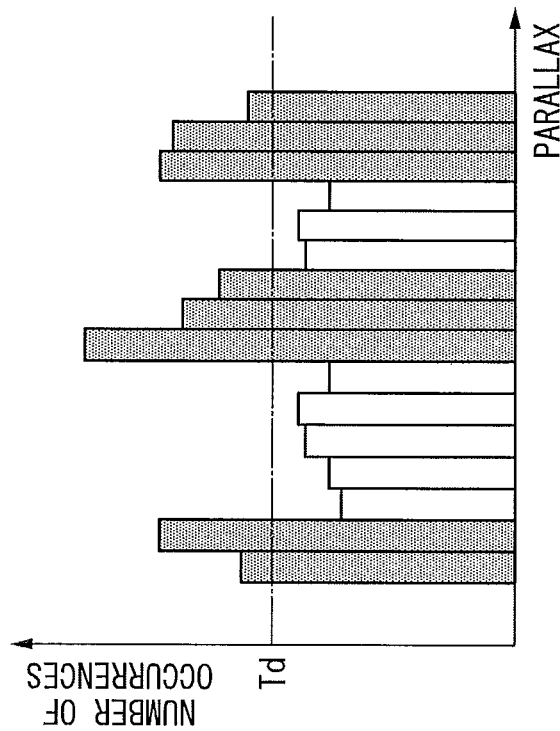
FIG. 67A is an explanatory diagram of parallax selection.

At step S1473a, a parallax with a number of occurrences (a pixel count) equal to a threshold Td or more is selected by the parallax selecting unit 53, as illustrated in FIG. 67A. Here, the threshold Td is dynamic, and if the number of occurrences of the most frequent value is taken as Dm, Td=Dm−Km. Km is, for example, a constant value. That is, the parallax selecting unit 53 of the present example selects a parallax with a difference in the number of occurrences from the most frequent value is within the constant value Km.

At step S1473b, the selected parallax is subjected to filtering. That is, by the filter 54, as indicated by dotted lines in FIG. 67B, a component (pixel count) of a pixel for which matching between the viewpoint images is in appropriate is removed from the number of occurrences of each selected parallax.

Processes at step S1474 onward are as described using FIG. 64B. However, the most-frequent-value detecting unit 52 of the present example takes the most frequent value in the parallax histogram after filtering as a representative parallax, as illustrated in FIG. 67B.

Next, a third example of the fourteenth embodiment is described.

Figure 68A:
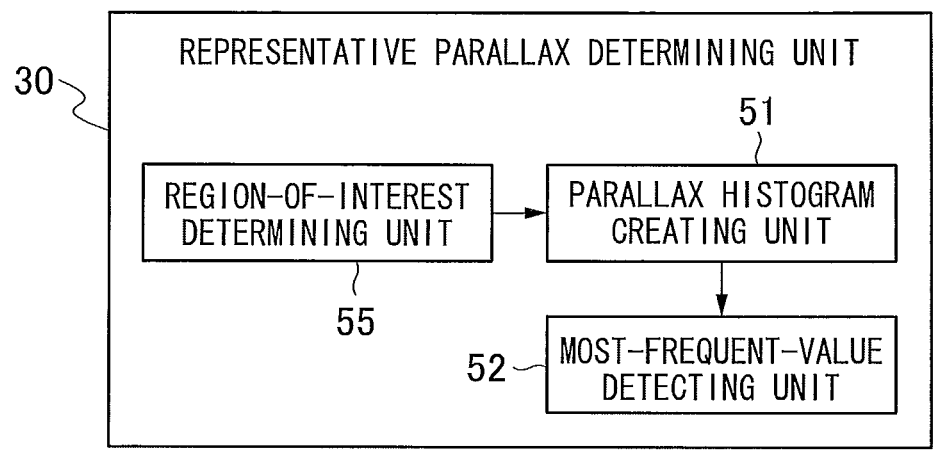
FIG. 68A is a detailed block diagram of a representative parallax determining unit in a third example of the fourteenth embodiment.

FIG. 68A is a block diagram illustrating details of the representative parallax determining unit 30 in the distance measuring apparatus of the third example of the fourteenth embodiment. Portions other than this are as illustrated in FIG. 62.

The representative parallax determining unit 30 of the present example includes a parallax histogram creating unit 51, a most-frequent-value detecting unit 52, and a region-of-interest determining unit 55. Here, the units other than the region-of-interest determining unit 55 are similar to those of the first example.

The region-of-interest determining unit 55 determines a region of interest for which a number of occurrences (pixel count) for each parallax is calculated. That is, a region for use in creating a parallax histogram is determined.

Figure 68B:
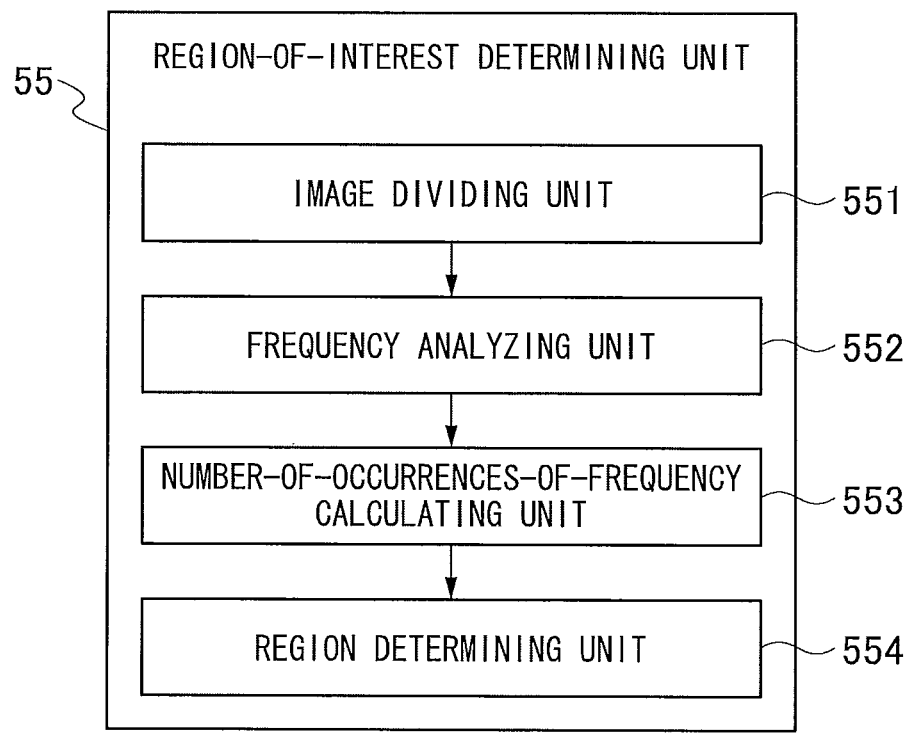
FIG. 68B is a detailed block diagram of a region-of-interest determining part.

The region-of-interest determining unit 55 is configured to include, as illustrated in FIG. 68B, an image dividing unit 551, a frequency analyzing unit 552, a number-of-occurrences-of-frequency calculating unit 553, and a region determining unit 554.

The image dividing unit 551 divides a viewpoint image into a plurality of divisional regions in an array.

The frequency analyzing unit 552 performs a frequency analysis by Fourier transform for each divisional region.

The number-of-occurrences-of-frequency calculating unit 553 calculates an integrated value of a high-frequency component for each divisional region. In the present example, the number of pixels with a spatial frequency being in a predetermined high-frequency range.

The region determining unit 554 determines a divisional region with a maximum integrated value of a high-frequency component, and obtains the position of the region of interest.

The parallax histogram creating unit 51 of the present example calculates the number of occurrences restrictively to the region of interest, and creates a parallax histogram.

Figure 69:
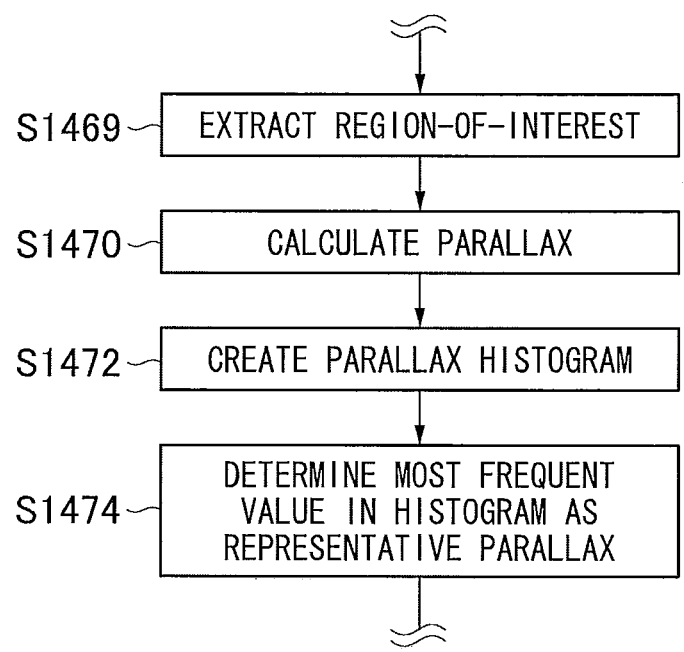
FIG. 69 is a flowchart of main parts of a distance measuring process in the third example of the fourteenth embodiment.

A distance measuring process of the third example of the fourteenth embodiment is described by using a flowchart of FIG. 69. Here, processes before determination of a region of interest (step S1469) are similar to those of FIG. 64A and FIG. 64B (steps S1450 to S1468). In the following, only details different from the first example are described.

At step S1469, a region of interest for which the number of occurrences is to be calculated is determined by the region-of-interest determining unit 55, and is extracted from the viewpoint image.

Figure 70:
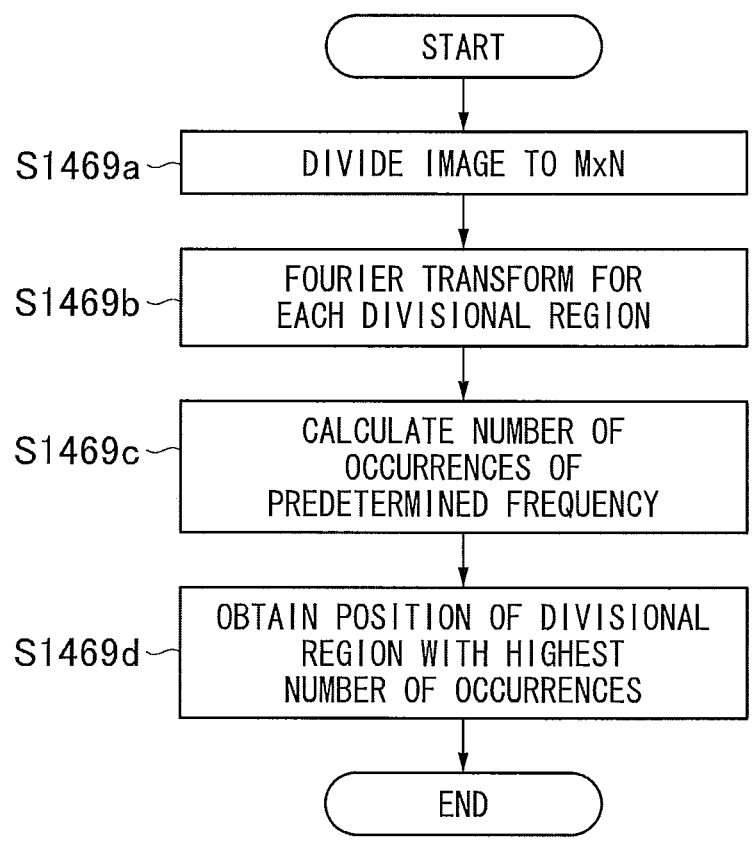
FIG. 70 is a flowchart of an example of a region-of-interest determining process.

FIG. 70 is a detailed flowchart illustrating details of determining a region of interest (S1469).

At step S1469a, the viewpoint image is divided by the image dividing unit 551 into M×N divisional regions.

At step S1469b, a frequency analysis by Fourier transform is performed by the frequency analyzing unit 552 for each divisional region.

At step S1469c, a number of occurrences of the determined frequency is calculated by the number-of-occurrences-of-frequency calculating unit 553 for each divisional region. That is, an integrated value of a high-frequency component is calculated for each divisional region.

At step S1469d, the position of the divisional region with the highest number of occurrences is obtained. That is, a divisional region with a maximum integrated value of the high-frequency component is determined as a region of interest, and the position of the region of interest is obtained.

Processes at step S1470 onward are identical to those of the first example.

Here, while the case has been described in which a high-frequency region is determined as a region of interest, the present invention is not particularly restricted to the above mode. For example, there are modes as follows.

In a first mode, a region inputted upon instruction from a user is determined as a region of interest.

In a second mode, a calculation region used in exposure control or focusing control at the time of shooting the viewpoint images is determined as a region of interest. For example, information indicating an exposure calculation region and a focusing calculation region at the time of shooting (shooting-time calculation region information) is obtained from the header of an image file including the viewpoint images.

Figure 71B:
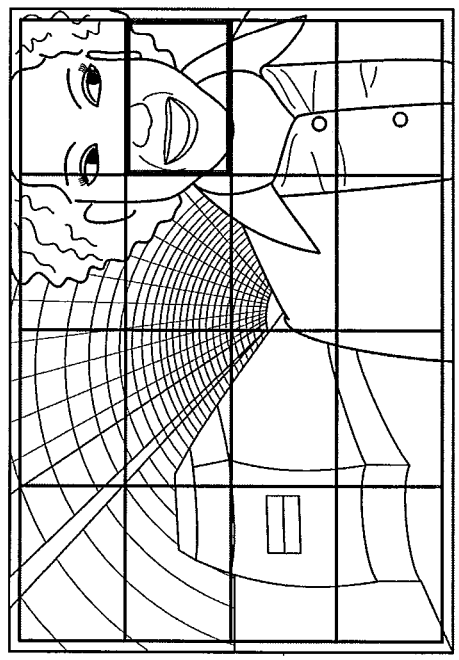
FIG. 71B is an explanatory diagram when a face extracting region is taken as a region of interest.
Figure 71A:
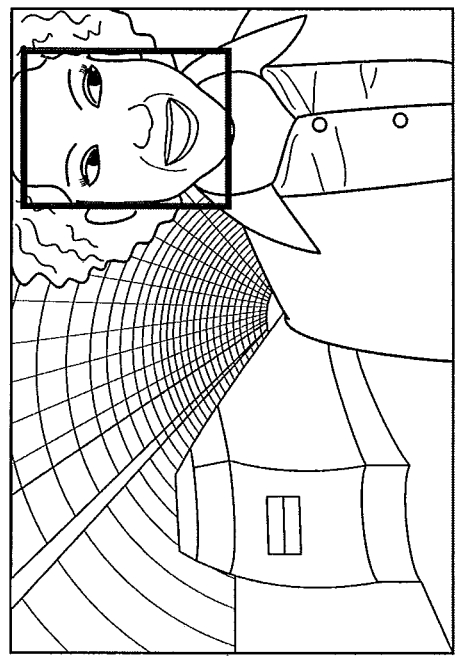
FIG. 71A is an explanatory diagram when a high-frequency region is taken as a region of interest.

In a third mode, a region where a specific target is extracted from the viewpoint images (a specific target extraction region) is determined as a region of interest. For example, as illustrated in FIG. 71B, with a face being taken as a specific target, a face extraction region is determined as a region of interest. For example, from the header of an image file including the viewpoint images, information indicating the specific target extraction region (specific target extraction region information) is obtained.

A main subject region may be determined as a region of interest with another method.

Next, a fourth example of the fourteenth embodiment is described.

Figure 72:
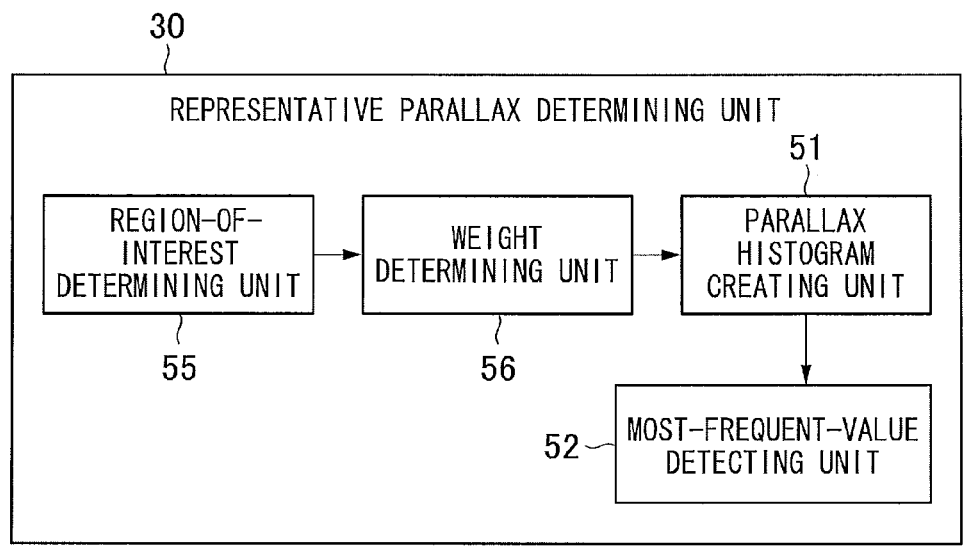
FIG. 72 is a detailed block diagram of a representative parallax determining unit in a fourth example of the fourteenth embodiment.

FIG. 72 is a block diagram illustrating details of a representative parallax determining unit 30 in a distance measuring apparatus in the fourth example of the fourteenth embodiment. Portions other than this are as illustrated in FIG. 62.

A representative parallax determining unit 30 of the present example is configured to include a parallax histogram creating unit 51, a most-frequent-value detecting unit 52, a region-of-interest determining unit 55, and a weight determining unit 56. Here, the units other than the weight determining unit 56 are identical to those of the third example. The weight determining unit 56 determines a weight with respect to the number of occurrences in the parallax histogram based on the position of each pixel in the viewpoint image. The parallax histogram creating unit 51 of the present example weights the number of occurrences.

Figure 73:
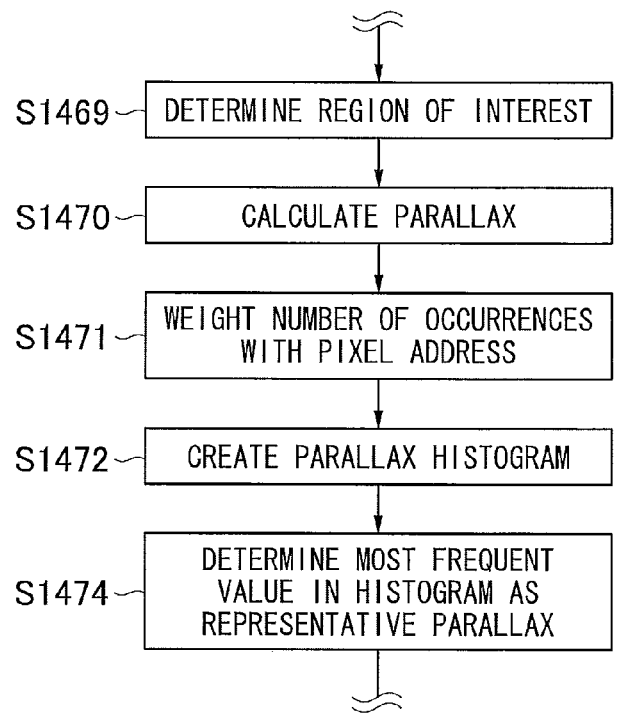
FIG. 73 is a flowchart of main parts of a distance measuring process in the fourth example of the fourteenth embodiment.

A distance measuring process of the fourth example of the fourteenth embodiment is described by using a flowchart of FIG. 73.

Steps S1469 to S1470 are similar to those of the third example.

At step S1471, a weight is determined by a weight determining unit 56.

At step S1472, weighting is performed on the number of occurrences by the parallax histogram creating unit 51 to create a parallax histogram.

Figure 74:
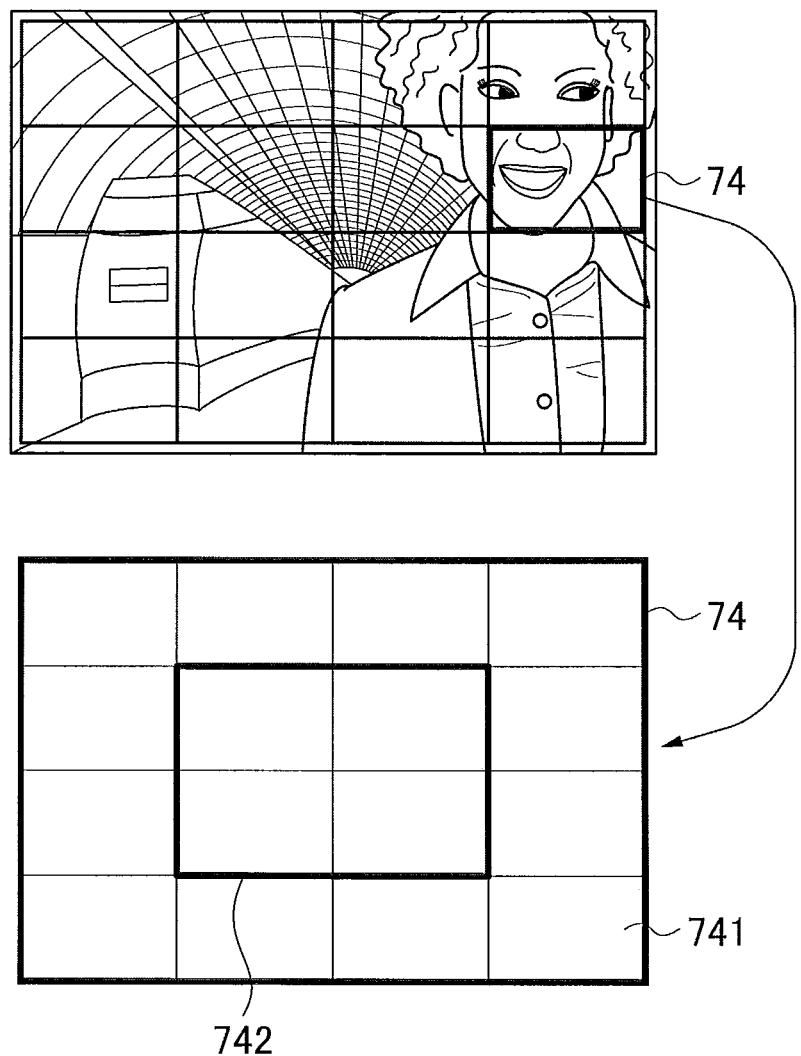
FIG. 74 is an explanatory diagram for use in describing division and weighting of a region of interest.

In the present example, as illustrated in FIG. 74, one region of interest 74 is further divided into a plurality of (for example, 4×4) divisional regions 741 and, each divisional region has a different weighting factor. For example, as illustrated in FIG. 74, a weighting factor of 2×2 regions at center are set larger than weighting factors of surrounding regions.

Processes at step S1474 onward are identical to those of the third example.

Note that while the case of creating a parallax histogram has been exemplarily described, it goes without saying that the description of the present embodiment can also be applied to the case of creating a distance histogram.

Also, while the case has been described by way of example by using FIG. 62, FIG. 64A, and FIG. 64B in which optimum calibration data is specified with reference to |designated distance–representative distance|, the description of the present embodiment can be applied even to the case in which optimum calibration data is specified by using other judgment criteria (for example, correlation degree, vertical deviation amount, parallax-calculated pixel count, local-noise pixel count, and others).

Figure 75:
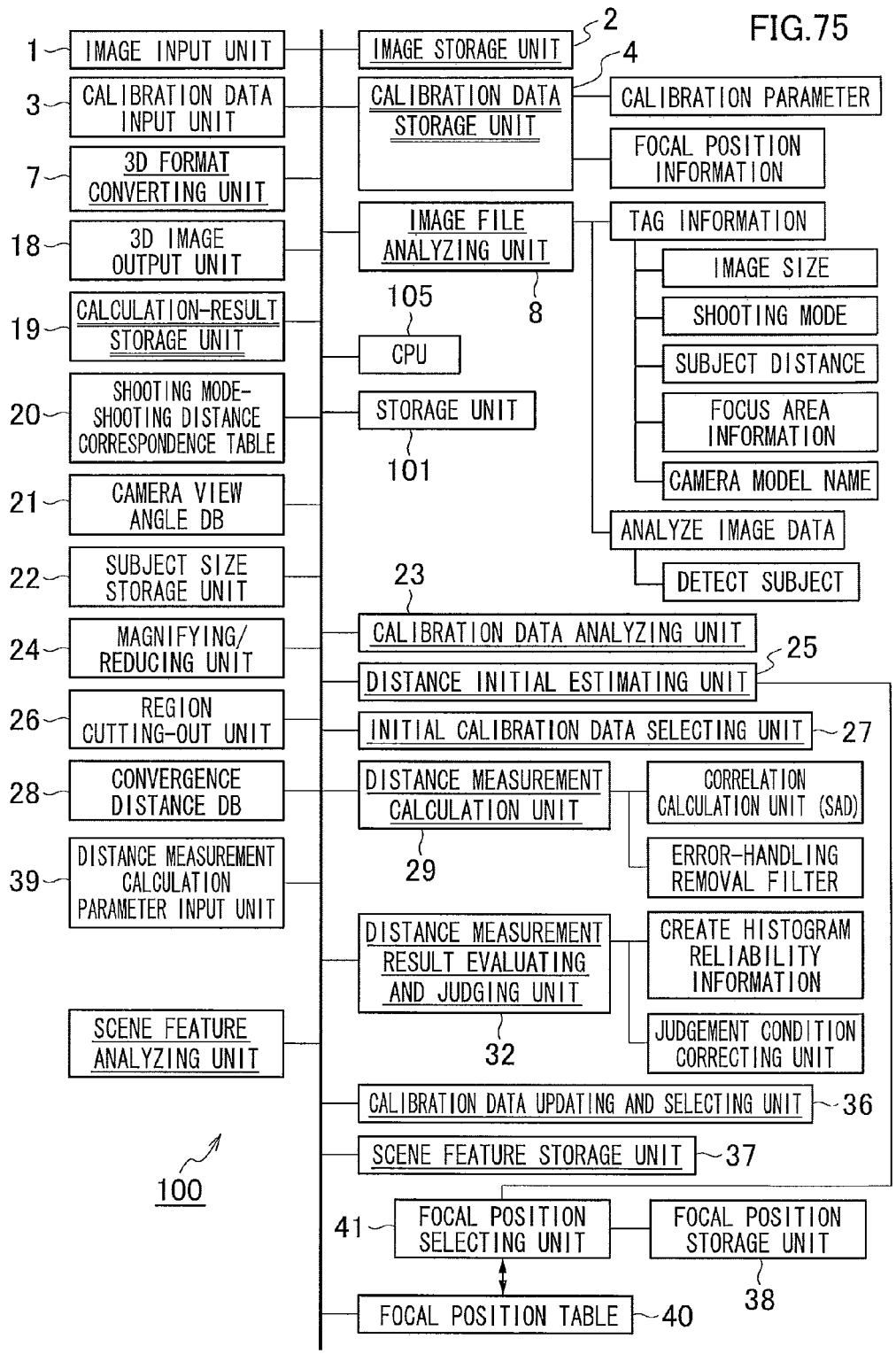
FIG. 75 is a block diagram of a distance measuring apparatus.

FIG. 75 is a block diagram of a distance measuring apparatus 100 according to a preferable fifteenth embodiment of the present invention. The present apparatus can be configured of an information processing apparatus (including circuits required for calculation processing, such as a CPU, a RAM, and a ROM; a data storage medium; a data input/output circuit; a display circuit; an operating apparatus; a communication circuit, and others).

An image input unit 1 inputs a set of a reference image (a viewpoint image obtained by capturing a subject with one predetermined standard image pickup means among cameras including a plurality of image pickup means with different viewpoints) and a reference image (a viewpoint image of the subject obtained by image pickup means other than the standard image pickup means of the camera) from a storage medium among various recording media such as a memory card, a flash memory, a CD-ROM, and a DVD-ROM, from a general-purpose interface for peripheral equipment connection such as a USB connected to the camera, or from a network such as the Internet or a LAN. The standard image and the reference image inputted by the image input unit 1 are stored in a image storage unit 2.

In the following, it is hereinafter assumed that the standard image and the reference image at least include luminance information to allow stereo matching between the standard image and the reference image. To add color information to a 3D image, the standard image may include color information.

A focal position table 40 is configured of a non-volatile storage medium such as an EEPROM, and stores a focal position table defining a focal position corresponding to a desired subject distance. For example, a focal position table of Patent Literature 11 is stored in the focal position table 40. Here, the subject distance is a distance from a camera to a subject. For example, the subject distance can be a distance to a subject focused by a focus control mechanism of a camera (such as TTL auto-focus or auto-focus of an external distance measurement scheme using an infrared triangulation distance measurement scheme or a pupil-division phase-difference detection scheme) or can represent distance information calculated based on a parallax vector (such as Patent Literature 4).

A calibration data input unit 3 inputs calibration data from a storage medium such as a memory card, a flash memory, a CD-ROM, a DVD-ROM, or the like, from a personal computer, or from a interface such as a keyboard, or from a network such as the Internet or a LAN. The calibration data includes a set of internal parameters formed of information about a focal distance, an image center, a pixel size, or the like of each camera, external parameters formed of related information such as the positions and postures of two cameras, and optical distortion parameters from a difference between an ideal optical system and an actual optical system of the respective cameras.

Also, each item of the parameter set corresponds to any of a plurality of predetermined focal positions.

The plurality of predetermined focal positions may be discrete values such as a position 1, a position 3, a position 5, . . . or all focal points. The calibration data for each focal position inputted by the calibration data input unit 3 is stored in a calibration data storage unit 4.

A 3D format converting unit 7, an image file analyzing unit 8, a calibration data analyzing unit 23, an enlarging and reducing unit 24, a distance initial estimating unit 25, a region cutting out unit 26, an initial calibration data selecting unit 27, a distance measurement calculation unit 29, a distance measurement calculation result evaluating and judging unit 32, a calibration data updating and selecting unit 36, and a focal position selecting unit 41 are each a coprocessor, having charge of performing a specialized process to assist the process operation of a CPU 105. However, the CPU 105 itself may play a role of each of these units.

Also, the image storage unit 2, a calibration data storage unit 4, a calculation result storage unit 19, a scene feature storage unit 37, and a focal position storage unit 38 are each configured of a volatile storage medium such as a RAM.

A distance measurement parameter input unit 39 is means (a user interface) accepting a data input through an operation by a user, such as a keyboard, a mouse, a touch panel, an audio input interface, or a visual line input interface.

Figure 76:
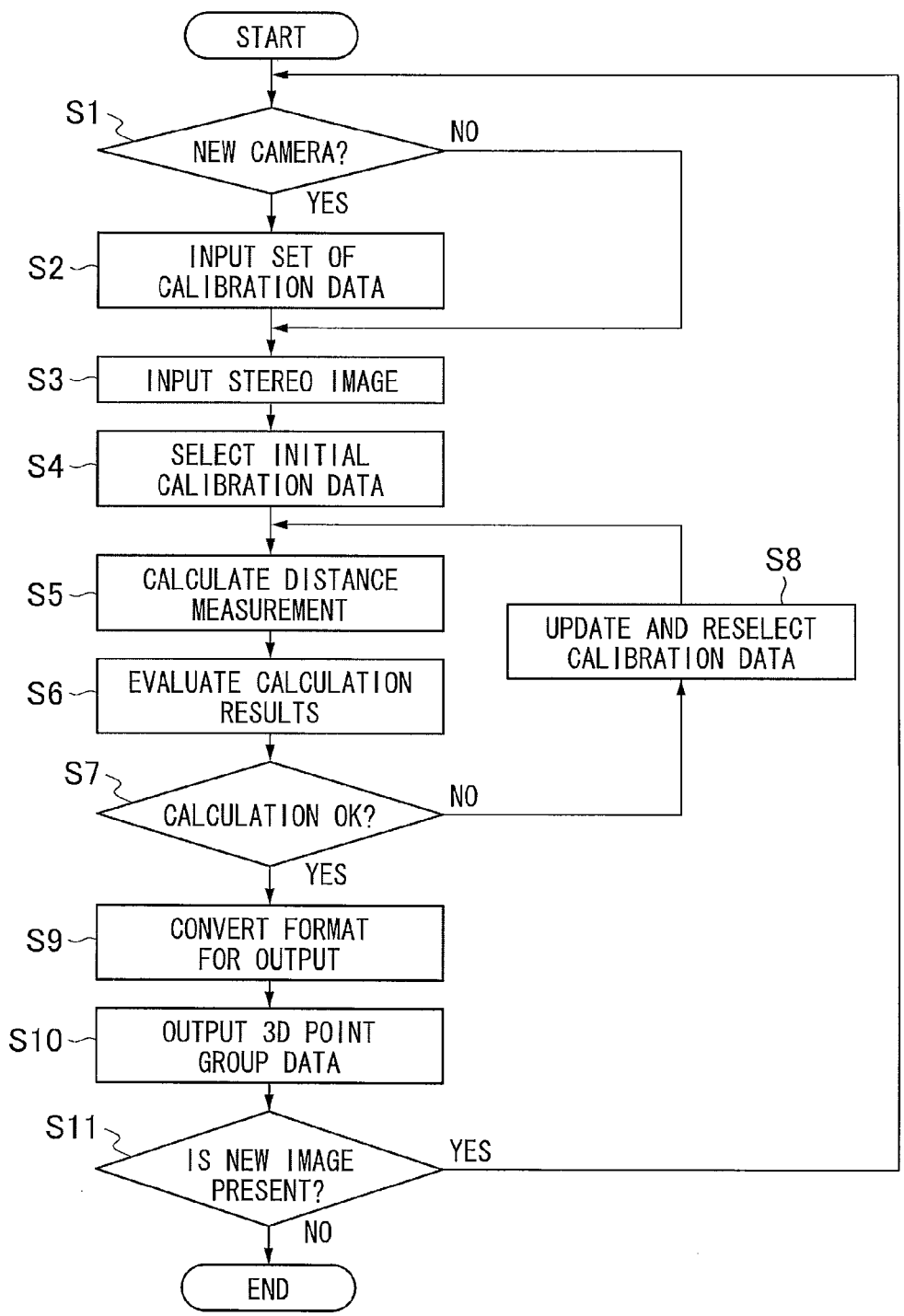
FIG. 76 is a schematic flowchart of a distance measuring process.

FIG. 76 illustrates a flowchart illustrating a general outline of a distance measuring process to be executed by the distance measuring apparatus. A program for causing the CPU 105 of the distance measuring apparatus to execute this process is recorded on the storage unit 101, which is a computer-readable recording medium, such as a ROM, a RAM, an EEPROM, a CD-ROM, or a DVD. The CPU 105 reads this program from this recording medium for execution.

At S1, the CPU 105 judges whether a standard image has been inputted from the image input unit 1 of a new camera that has not been a standard-image input source so far. If a judgment is made as Yes, the procedure goes to S2. If a judgment is made as No, the procedure goes to S3. Specifically, for example, identification information about cameras that previously have been standard-image input sources is stored in a non-volatile storage medium, for example, an EEPROM, and the CPU 105 compares and matches that identification information and identification information of a camera stored in collateral information of the newly-inputted standard image. If both match, a judgment is made as No. If both do not match, a judgment is made as Yes.

At S2, calibration data corresponding to the type of the new camera is inputted from the calibration data input unit 3.

At S3, the standard image and the reference image are inputted from the image input unit 1.

At S4, the initial calibration data selecting unit 27 executes an initial calibration selecting process. Details of this process will be described further below.

At S5, the distance measurement calculation unit 29 makes a three-dimensional measurement of the subject of the standard image based on the calibration data selected as a result of the initial calibration selecting process, thereby obtaining three-dimensional information (point group information) including distance information, parallax information, three-dimensional position information, and others. The three-dimensional information is stored in the calculation result storage unit 19.

At S6, the distance measurement calculation result evaluating and judging unit 32 executes a calculation result evaluating process. Details of this process will be described further below.

At S7, the distance measurement calculation result evaluating and judging unit 32 executes a calculation result judging process. Details of this process will be described further below. When it is judged as a result of the calculation result judging process that the calculation result is reliable, the procedure goes to S9. If it is judged that the calculation result is unreliable, the procedure goes to S8.

At S8, the calibration data updating and selecting unit 36 executes a calibration data updating and reselecting process. Details of this process will be described further below.

At S9, the 3D format converting unit 7 converts, based on the three-dimensional information, the standard image to a 3D image (a right-eye image and a left-eye image) allowing stereoscopic viewing.

At S10, a 3D image output unit 18 outputs the 3D image and the three-dimensional information. Output destination of the 3D image and the three-dimensional information can include a display device, a storage medium, information communication equipment on a network, a 3D printer, and others.

At S11, the CPU 105 judges whether a new standard image has been inputted to the image input unit 1. If a judgment is made as Yes, the procedure goes to step S1. If a judgment is made as No, the procedure ends.

Figure 77:
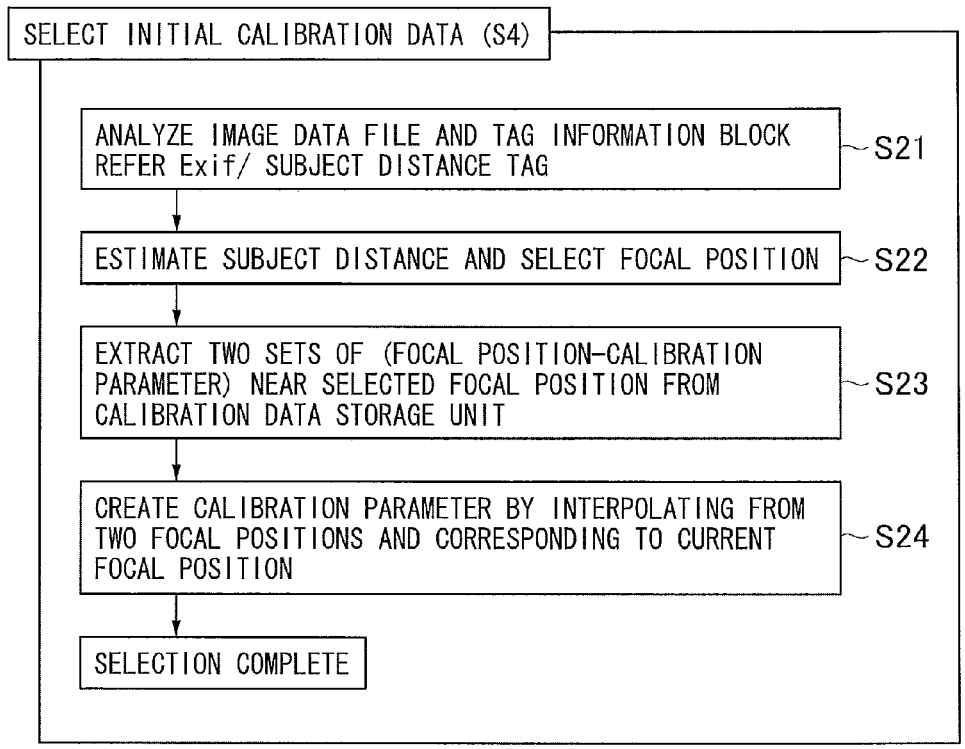
FIG. 77 is a flowchart of an initial calibration data selecting process in the fifteenth embodiment.

FIG. 77 is a detailed flowchart of the initial calibration data selecting process (S4).

At S21, the image file analyzing unit 8 analyzes image data file collateral information of the inputted standard image to obtain a subject distance. For example, a subject distance (SubjectDistance) of an Exif tag is obtained.

At S22, the distance initial estimating unit 25 estimates the subject distance obtained by the image file analyzing unit 8 as subject distance regarding the subject of the standard image. The focal position selecting unit 41 selects a focal position corresponding to the estimated subject distance based on the focal position table of the focal position table 40. Then, the focal position selecting unit 41 stores a current focal position, which is the selected focal position, in the focal position storage unit 38.

At S23, the initial calibration data selecting unit 27 selects, from the calibration data storage unit 4, calibration data corresponding to upper two sets of focal positions adjacent to the current focal position stored in the focal position storage unit 38.

At S24, the initial calibration data selecting unit 27 interpolates the selected two sets of calibration data to create calibration parameters corresponding to the current focal position stored in the focal position storage unit 38. The created calibration parameters are associated with the current focal position and are stored in the calibration data storage unit 4.

Figure 78:
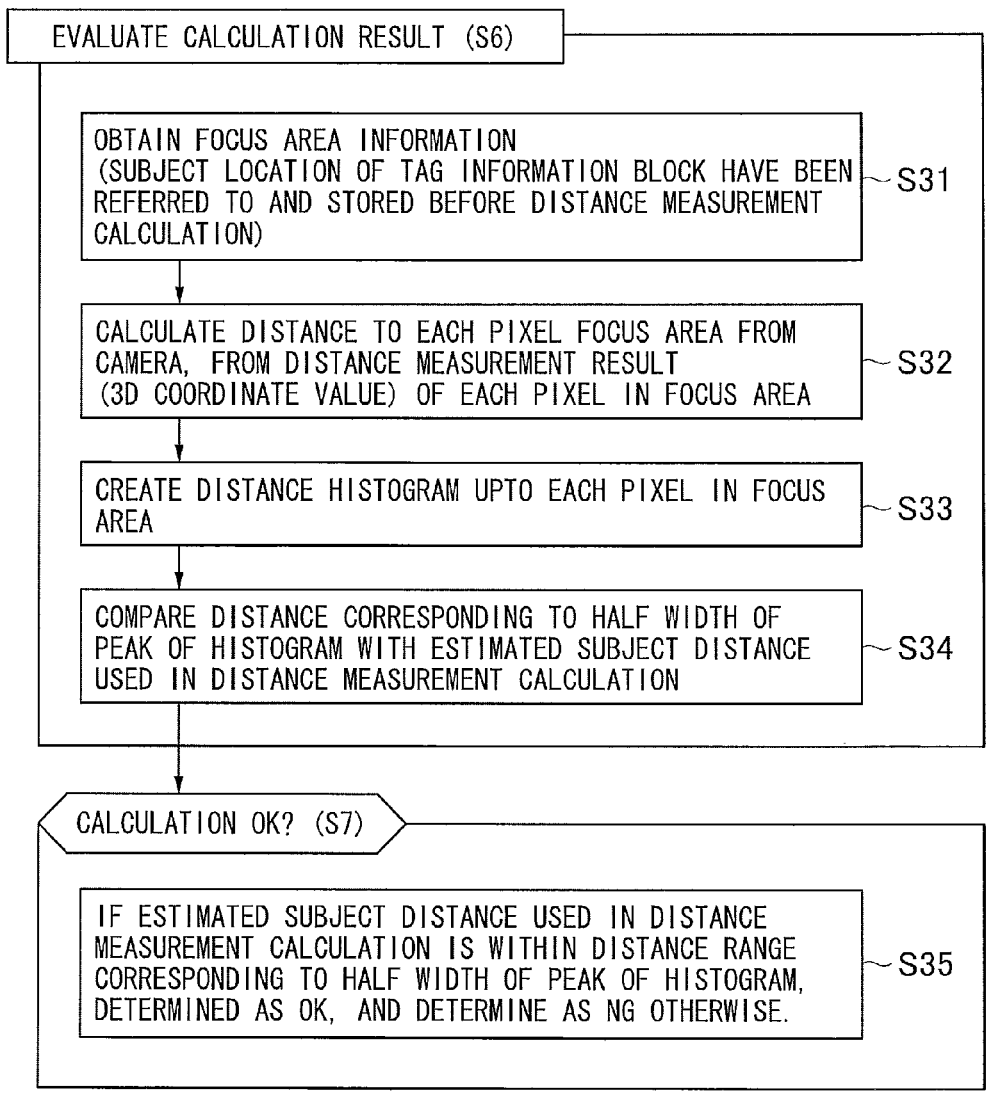
FIG. 78 is a flowchart of a calculation result evaluating process.

FIG. 78 is a detailed flowchart of the calculation result evaluating process (S6) and the calculation result determining process (S7).

At S31, the image analyzing unit 8 obtains subjection position information from the collateral information of the standard image. This can be obtained by, for example, referring a subject position block (SubjectLocation) of the Exif tag before distance measurement calculation.

At S32, from the distance measurement result (the 3D coordinate values) of each pixel in an AF region of the standard image, the distance measurement calculation result evaluating and judging unit 32 calculates a distance to each pixel in the AF region.

At S33, the distance measurement calculation result evaluating and judging unit 32 creates a histogram based on the distance to each pixel in the AF region. This histogram represents reliability information indicating reliability of the initial calibration data.

At S34, the distance measurement calculation result evaluating and judging unit 32 compares a corresponding distance between the peak of the histogram created at S33 and its half-width value and the estimated subject distance used in the distance measurement calculation (S22) with each other. Then, the procedure goes to a calculation result judging process (S35).

At S35, the distance measurement calculation result evaluating and judging unit 32 judges whether the estimated subject distance is in a distance range corresponding to the half-width value of the peak of the histogram as a result of comparison at S34. If the estimated subject distance is in that range, the calculation result is judged as being reliable, and the procedure then goes to S9. If the estimated subject distance is not in that range, the calculation result is judged as being unreliable, and the procedure then goes to S8.

Figure 79:
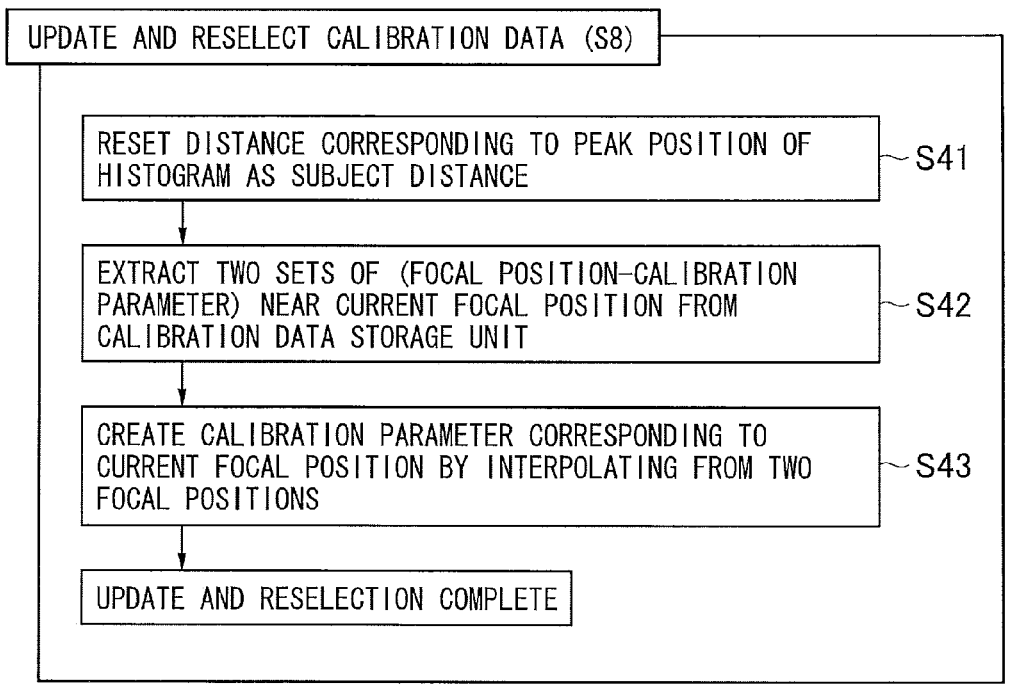
FIG. 79 is a flowchart of a calibration data updating and reselecting process.

FIG. 79 is a detailed flowchart of the calibration data updating and reselecting process (S8).

At S41, the focal position selecting unit 41 regards a distance corresponding to a peak position of a histogram created in a manner similar to that of S33 as an estimated subject distance, selects a focal position corresponding to this subject distance from the focal position table 40, and stores the selected focal position in the focal position storage unit 38 as a current focal position.

At S42, a set of calibration parameters corresponding to upper two focal positions adjacent to the current focal position stored in the focal position storage unit 38 is extracted from the calibration data storage unit 4.

At S43, the set of the calibration parameters is interpolated to create calibration parameters corresponding to the current focal position. The created calibration parameters are associated with the current focal position and are stored in the calibration data storage unit 4.

Figure 80:
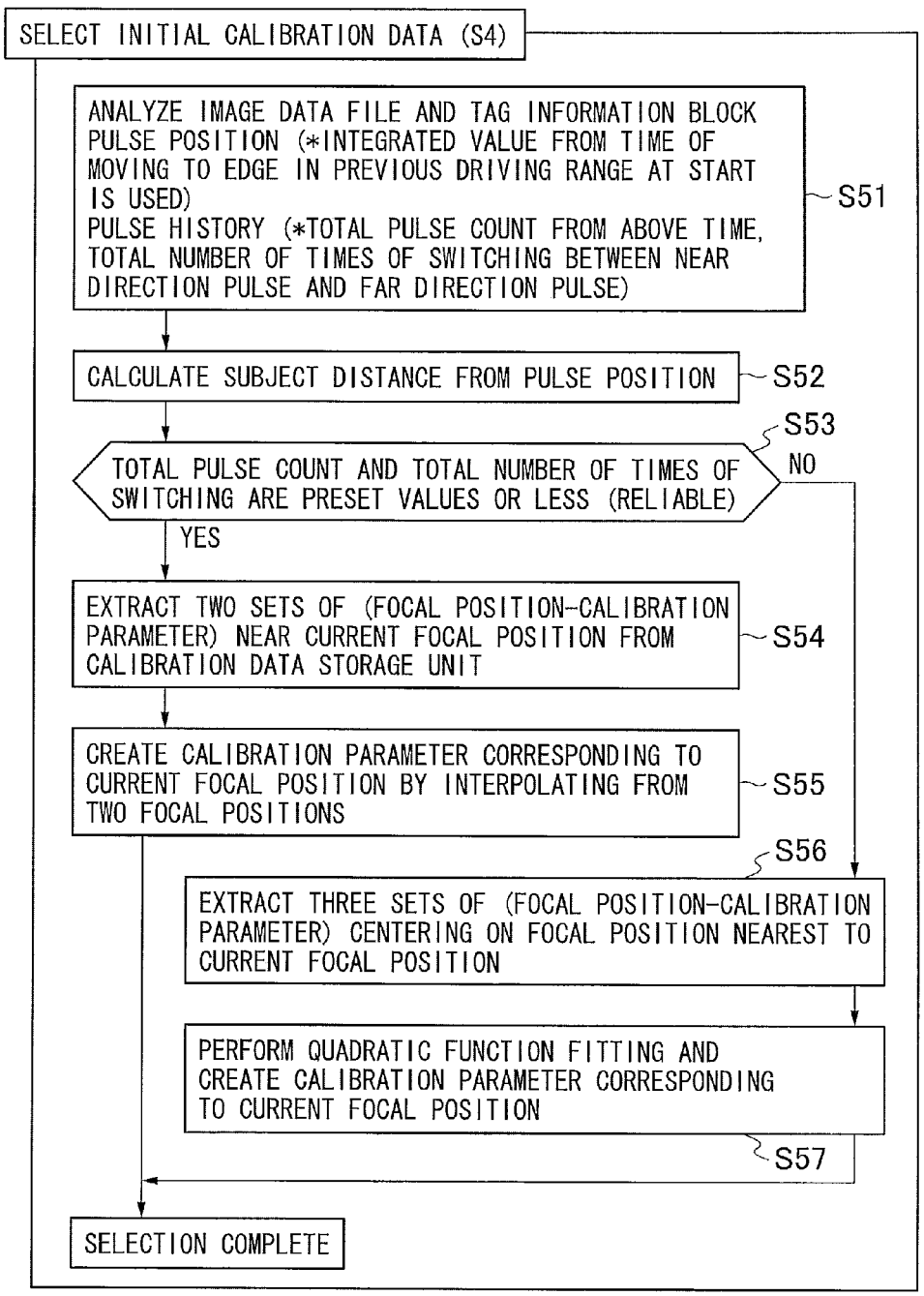
FIG. 80 is a flowchart of an initial calibration data selecting process in the sixteenth embodiment.

FIG. 80 is another detailed flowchart of the initial calibration data selecting process (S4) according to a sixteenth embodiment. This process can be executed in place of the process of FIG. 77.

At S51, the image file analyzing unit 8 analyzes image data file collateral information of the inputted standard image to obtain a position of driving and BR>Pulse count corresponding to the position of the focus lens at the time of shooting (an integrated value of driving pulse setting values from the time of starting the camera or from the time when the focus lens is driven to an edge of a driving range) and pulse history (a total integrated value of driving pulse counts from the time of starting the camera or from the time when the focus lens is driven to the edge of the driving range or a total number of times of switching from a near-side pulse to a far-side pulse).

At S52, the distance initial estimating unit 25 calculates a subject distance from the pulse cout obtained at S51. Calculation of a subject distance from the pulse count can be performed as in Patent Literature 6. The distance initial estimating unit 25 estimates the calculated subject distance as a subject distance with respect to the subject of the standard image.

At S53, the initial calibration data selecting unit 27 judges whether the total pulse count and the total number of times of switching are equal to respective corresponding defined thresholds or less. If a judgment is made as Yes, the procedure goes to S54. If a judgment is made as No, the procedure goes to S56.

At S54, the focal position selecting unit 41 selects a focal position corresponding to the subject distance estimated at S52 from the focal position table 40, and stores the selected focal position in the focal position storage unit 38 as a current focal position.

The initial calibration data selecting unit 27 selects, from the calibration data storage unit 4, calibration data corresponding to upper two sets of focal positions adjacent to the current focal position stored in the focal position storage unit 38.

At S55, the initial calibration data selecting unit 27 interpolates the selected two sets of calibration data to create calibration parameters corresponding to the current focal position storage in the focal position storage unit 38. The created calibration parameters are stored in the calibration parameter storage unit 4. Then, the procedure ends.

At S56, calibration data corresponding to upper three sets of focal positions adjacent to the current focal position calculated at S52 is selected from the calibration data storage unit 4.

At S57, the initial calibration data selecting unit 27 performs fitting the selected three sets of calibration data with a quadric function to create calibration parameters corresponding to the current focal position stored in the focal position storage unit 38. The created calibration parameters are associated with the current focal position and are stored in the calibration parameter storage unit 4. Then, the procedure ends.

Figure 81:
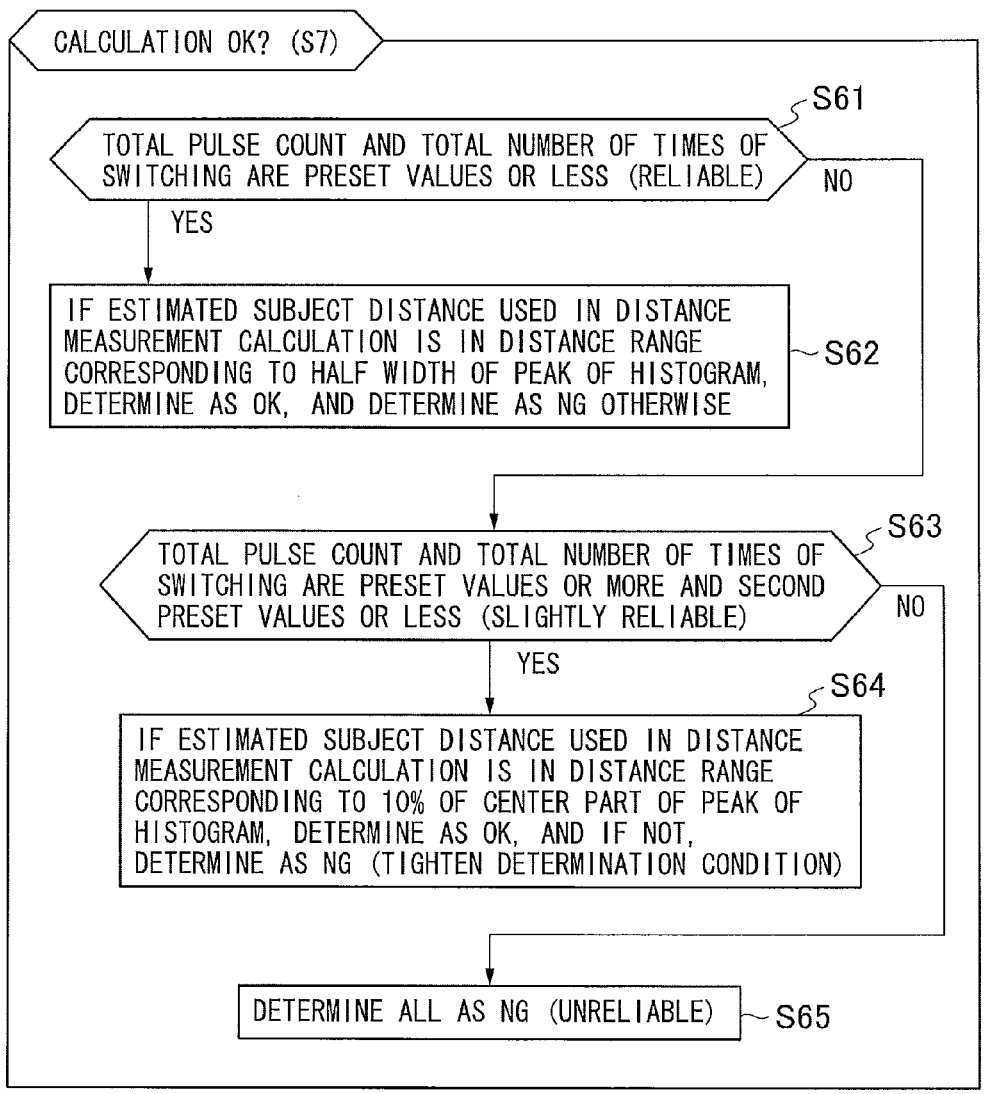
FIG. 81 is a flowchart of a calculation result determining process in the sixteenth embodiment.

FIG. 81 is another detailed flowchart of the calculation result determining process (S7).

At S61, a judgment is made in a manner similar to that of S53. If a judgment is made as Yes, the procedure goes to S62. If a judgment is made as No, the procedure goes to S63.

At S62, a judgment is made in a manner similar to that of S35, and the procedure goes to S9 or S8 according to the determination result.

At S63, the distance measurement calculation result evaluating and judging unit 32 judges whether the total pulse count and the total number of times of switching are equal to respective corresponding defined thresholds or less (the defined thresholds are each a numerical value equal to 2 or less). If a judgment is made as Yes, the procedure goes to S64. If a judgment is made as No, the procedure goes to S65.

At S64, the distance measurement calculation result evaluating and judging unit 32 compares the distance corresponding to the peak of the histogram created at S33 and its half-width value and the estimated subject distance used in the distance measurement calculation with each other. Then, it is judged whether the estimated subject distance is in a range of distance corresponding to 10% of a center portion of the peak of the histogram. If the subject distance is in that range, the calculation result is judged as being reliable, and the procedure then goes to S9. If the subject distance is not in that range, the calculation result is judged as being unreliable, and the procedure then goes to S8.

At S65, the distance measurement calculation result evaluating and judging unit 32 judges the calculation result as being unreliable, and then the procedure goes to step S8.

Figure 82:
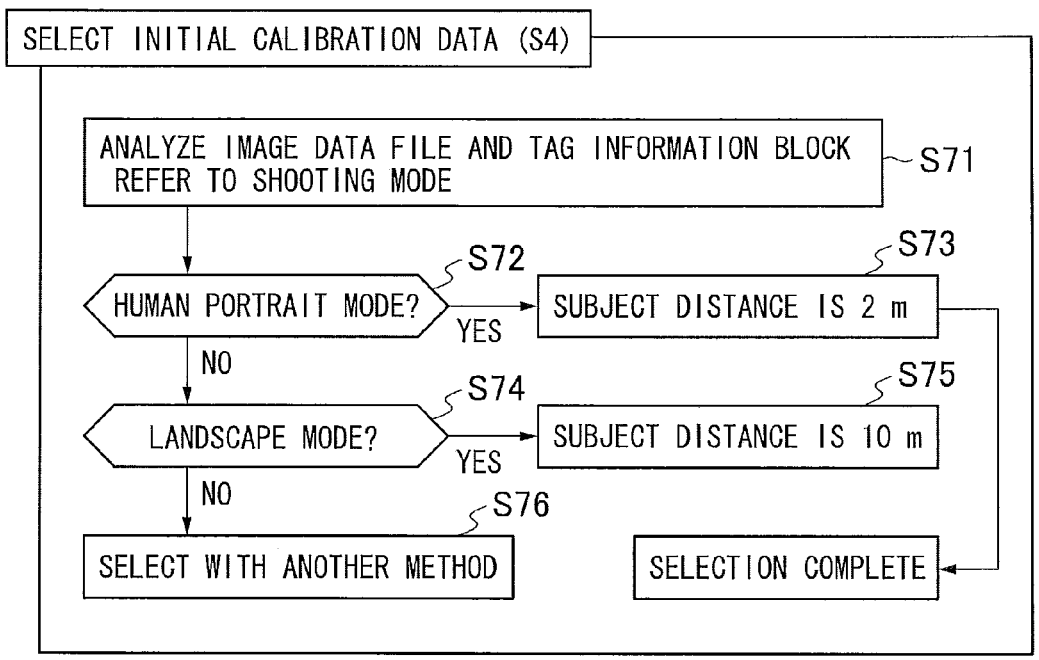
FIG. 82 is a flowchart of an initial calibration data selecting process in the third seventeenth embodiment.

FIG. 82 is another detailed flowchart of the initial calibration data selecting process (S4) according to a seventeenth embodiment. This process can be executed in place of the process of FIG. 77 or 80.

At S71, the image file analyzing unit 8 analyzes collateral information of the inputted standard image to obtain shooting mode information. For example, a shooting scene type SceneCaptureType (including a landscape, a human portrait, a nightscape, and others) of an Exif tag is obtained as shooting mode information.

At S72, the distance initial estimating unit 25 judges whether the shooting mode information obtained at S71 is a "human portrait". If a judgment is made as Yes, the procedure goes to S73. If a judgment is made as No, the procedure goes to S74.

At S73, the distance initial estimating unit 25 estimates a distance corresponding to the "human portrait"=2 m as a subject distance, based on a shooting mode-shooting distance correspondence table 20 stored in a ROM or the like in advance.

At S74, the distance initial estimating unit 25 judges whether the shooting mode information obtained at S71 is a "landscape". If a judgment is made as Yes, the procedure goes to S75. If a judgment is made as No, the procedure goes to S76.

At S75, the distance initial estimating unit 25 estimates a distance corresponding to the "landscape"=10 m as a subject distance, based on the shooting mode-shooting distance correspondence table 20.

At S76, the distance initial estimating unit 25 estimates a subject distance with any initial calibration data selecting process other than that of the present embodiment.

Thereafter, a focal position corresponding to the estimated subject distance is selected, and initial calibration data based on the selected focal position is calculated. These are similar to those described above.

Figure 83:
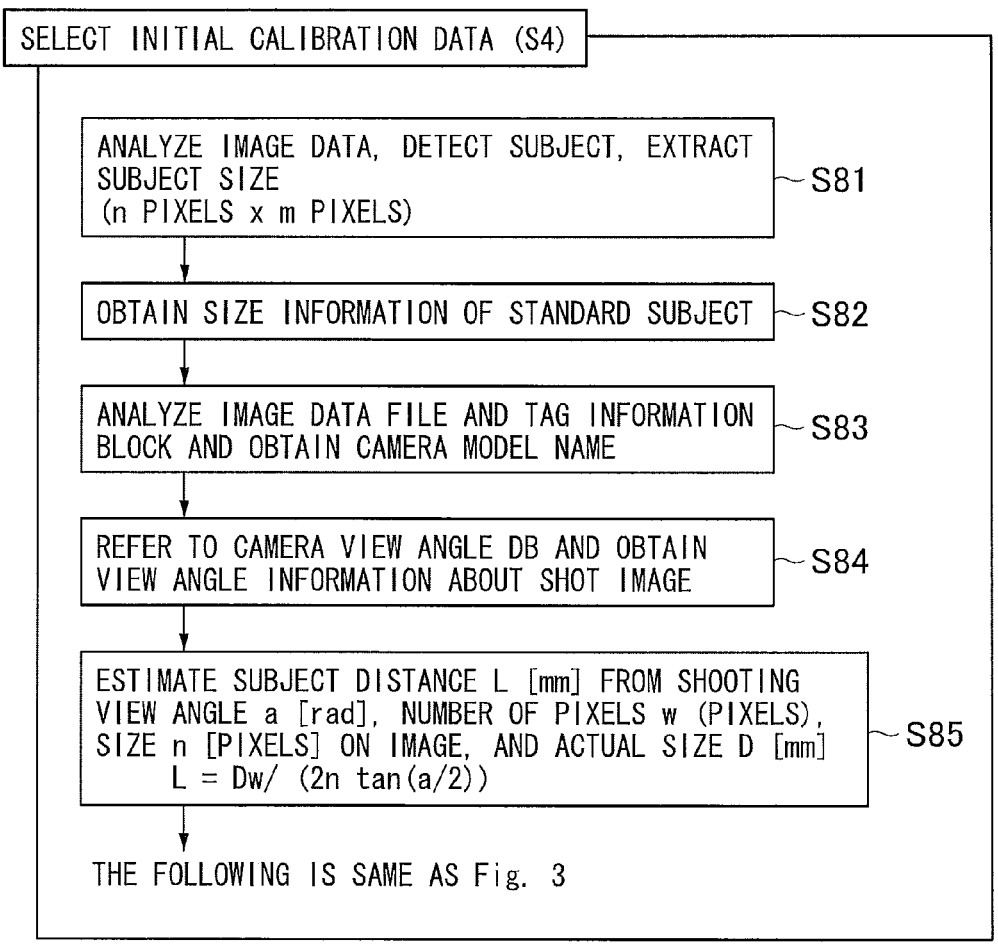
FIG. 83 is a flowchart of an initial calibration data selecting process in the eighteenth embodiment.

FIG. 83 is another detailed flowchart of the initial calibration data selecting process (S4) according to an eighteenth embodiment. This process can be executed in place of the process of FIG. 77, 80, or 82.

At S81, the image data analyzing unit 16 detects a subject from the standard image. Subject detection can be performed with a known methodology, for example, those of Patent Literatures 7 and 8. The image data analyzing unit 16 detects a size D (for example, a pixel count n×m corresponding to a longitudinal length of a rectangular region) of the detected subject. When a plurality of detected subjects are present, the image data analyzing unit 16 takes one satisfying a predetermined criterion (for example, a subject positioned closest to the center of a screen) as a representative subject, and detects the size of that representative subject. Note that the subject is not restricted to a face, but the size of a specific type of subject other than the face may be detected with a known physical object detecting technique.

At S82, the image data analyzing unit 16 obtains a standard subject size stored in advance in a subject size storage unit 22.

At S83, the image file analyzing unit 8 analyzes image data file collateral information of the inputted standard image to obtain camera model information. For example, a model name Model of the camera of the Exif tag is obtained as camera model information.

At S84, the distance initial estimating unit 25 obtains view angle information corresponding to the camera model information obtained at S83 among view angle information of the shot image for each camera model information stored in advance in a camera view angle DB 21. The view angle information includes a shooting view angle a [rad] and a pixel count w [pixels] of the standard image.

At S85, the distance initial estimating unit 25 calculates a shooting distance L [mm] based on the shooting view angle a [rad] and the pixel count w [pixels] of the standard image at S84, the standard subject size n [pixels] at S82, and the actual subject size D [mm] at S81. That is, $$L=Dw/(2n \tan(a/2)).$$

The distance initial estimating unit 25 estimates L as a subject distance and, subsequently, a focal position corresponding to the estimated subject distance is selected, and initial calibration data is calculated based on the selected focal position. Note that if a standard size corresponding to a subject of a specific type other than the face is prepared in advance, when the size of a subject of that type is detected, a shooting distance can be calculated from that standard size and a detection size.

Figure 84:
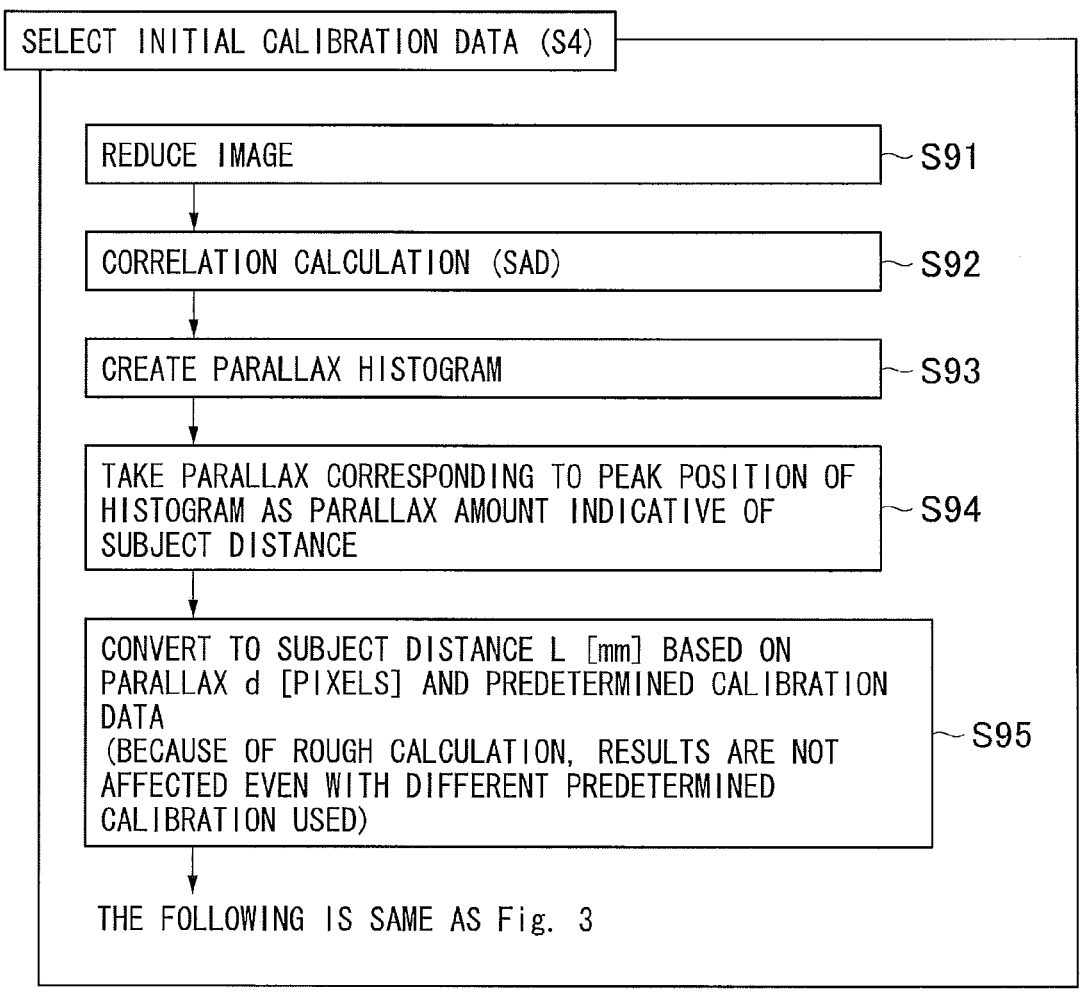
FIG. 84 is a flowchart of an initial calibration data selecting process in the nineteenth embodiment.

FIG. 84 is another detailed flowchart of the initial calibration data selecting process (S4) according to a nineteenth embodiment. This process can be executed in place of the process of FIG. 77, 80, 82, or 83.

At S91, the enlarging and reducing unit 24 reduces the standard image and the reference image forming as a set with the standard image. The reduction ratio is a value recorded in the storage unit 101 in advance, for example, ¼.

At S92, the distance initial estimating unit 25 performs a correlation calculation based on the reduced standard image and reference image. The correlation calculation of the distance initial estimating unit 25 is performed with various schemes, such as the SAD method (refer to Patent Literature 9). Next, the distance initial estimating unit 25 performs a search for a corresponding point of the reference image corresponding to each pixel of the standard image. Then, a parallax between a corresponding pixel on the standard image and a corresponding pixel on the reference image is calculated.

At S93, the distance initial estimating unit 25 creates a histogram from the parallax for each pixel.

At S94, the distance initial estimating unit 25 takes a peak of the created histogram as a parallax d [pixels] indicating a distance.

At S95, the distance initial estimating unit 25 converts the parallax d to a subject distance L [mm] based on predetermined initial calibration parameters stored in advance in the calibration data storage unit 4. Details of the predetermined initial calibration parameters can be any. The distance initial estimating unit 25 estimates L as a subject distance with respect to the current subject. Subsequently, the focal position selecting unit 41 selects a focal position corresponding to the estimated subject distance L, the initial calibration data selecting unit 27 takes the focal position selected correspondingly to L as a current focal position, and then S23 to 24 of FIG. 77 are executed.

Figure 85:
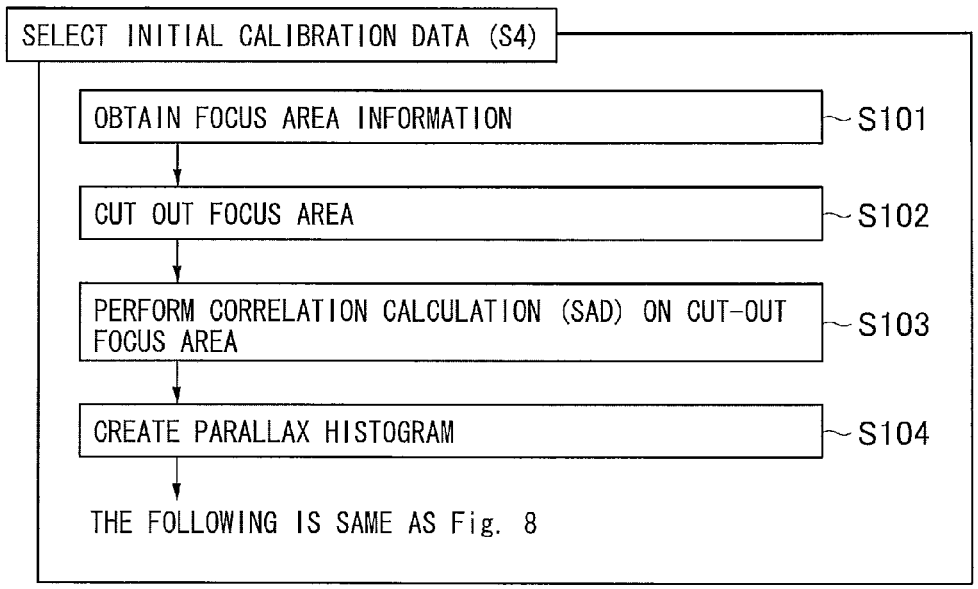
FIG. 85 is a flowchart of an initial calibration data selecting process in the twentieth embodiment.

FIG. 85 is another detailed flowchart of the initial calibration data selecting process (S4) according to a twentieth embodiment. This process can be executed in place of the process of FIG. 77, 80, 82, 83, or 84.

At S101, the image file analyzing unit 8 analyzes image data file collateral information of the inputted standard image to obtain position information of a focus area (focus area information) in the standard image from the collateral information. For example, the image file analyzing unit 8 obtains an AF region (NKAFFocusPoint) of the Exif tag as focus area information.

At S102, the region cutting out unit 26 cuts out an image in the focus area of the standard image specified by the focus area information.

At S103, the distance initial estimating unit 25 performs a correlation calculation by a correlation calculation unit 30 based on the cut-out image of the focus area of the standard image and the reference image. The correlation calculation of the correlation calculation unit 30 is performed with various schemes, such as the SAD method. Next, the distance initial estimating unit 25 performs a search for a corresponding point of the reference image corresponding to each pixel of the cut-out image of the standard image. Then, a parallax between a corresponding pixel on the standard image and a corresponding pixel on the reference image is calculated.

At S104, the distance initial estimating unit 25 creates a histogram from the parallax for each pixel. The distance initial estimating unit 25 takes a peak of the created histogram as a parallax d [pixels] indicating a subject distance. The distance initial estimating unit 25 converts the parallax d to a subject distance L [mm] based on predetermined initial calibration parameters stored in advance in the calibration data storage unit 4. These processes are similar to S94 and 95. Also, details of the predetermined initial calibration parameters can be any.

Subsequently, the focal position selecting unit 41 selects a focal position corresponding to L, and the calibration data selecting unit 27 takes the focal position selected correspondingly to L as a current focal position to execute S23 to 24 of FIG. 77.

Figure 86:
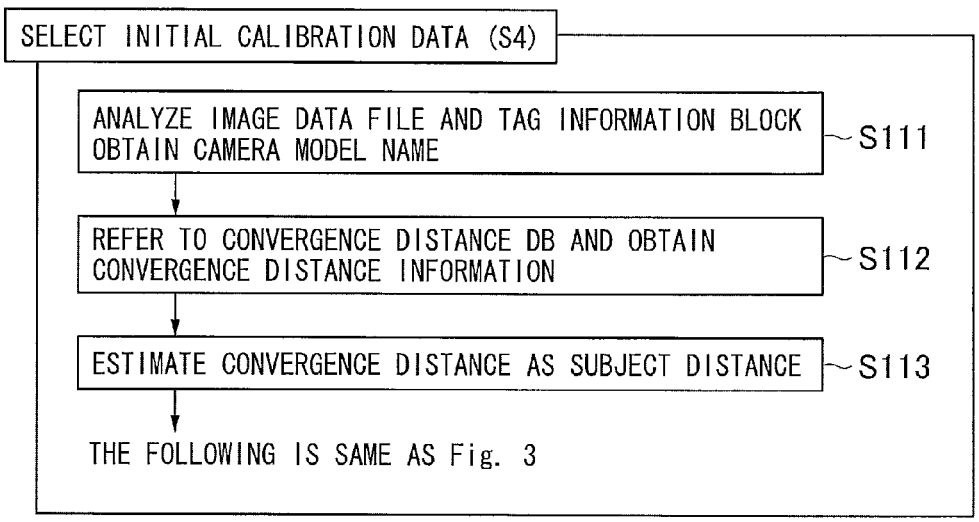
FIG. 86 is a flowchart of an initial calibration data selecting process in the twenty-first embodiment.

FIG. 86 is another detailed flowchart of the initial calibration data selecting process (S4) according to a twenty-first embodiment. This process can be executed in place of the process of FIG. 77, 80, 82, 83, 84, or 85.

At S111, the image file analyzing unit 8 analyzes image data file collateral information of the inputted standard image to obtain camera model information. For example, a camera model name Model of the Exif tag is obtained as shooting mode information.

At S112, the distance initial estimating unit 25 obtains a convergence distance corresponding to the obtained camera model information among convergence distances for respective camera models stored in advance in a convergence distance DB 28.

At S113, the distance initial estimating unit 25 estimates the obtained convergence distance as a subject distance. Thereafter, the focal position selecting unit 41 selects a focal position corresponding to the subject distance, the initial calibration data selecting unit 27 takes the selected focal position as a current focal position, and the initial calibration data selecting unit 27 executes S23 to 24 of FIG. 77.

Figure 87:
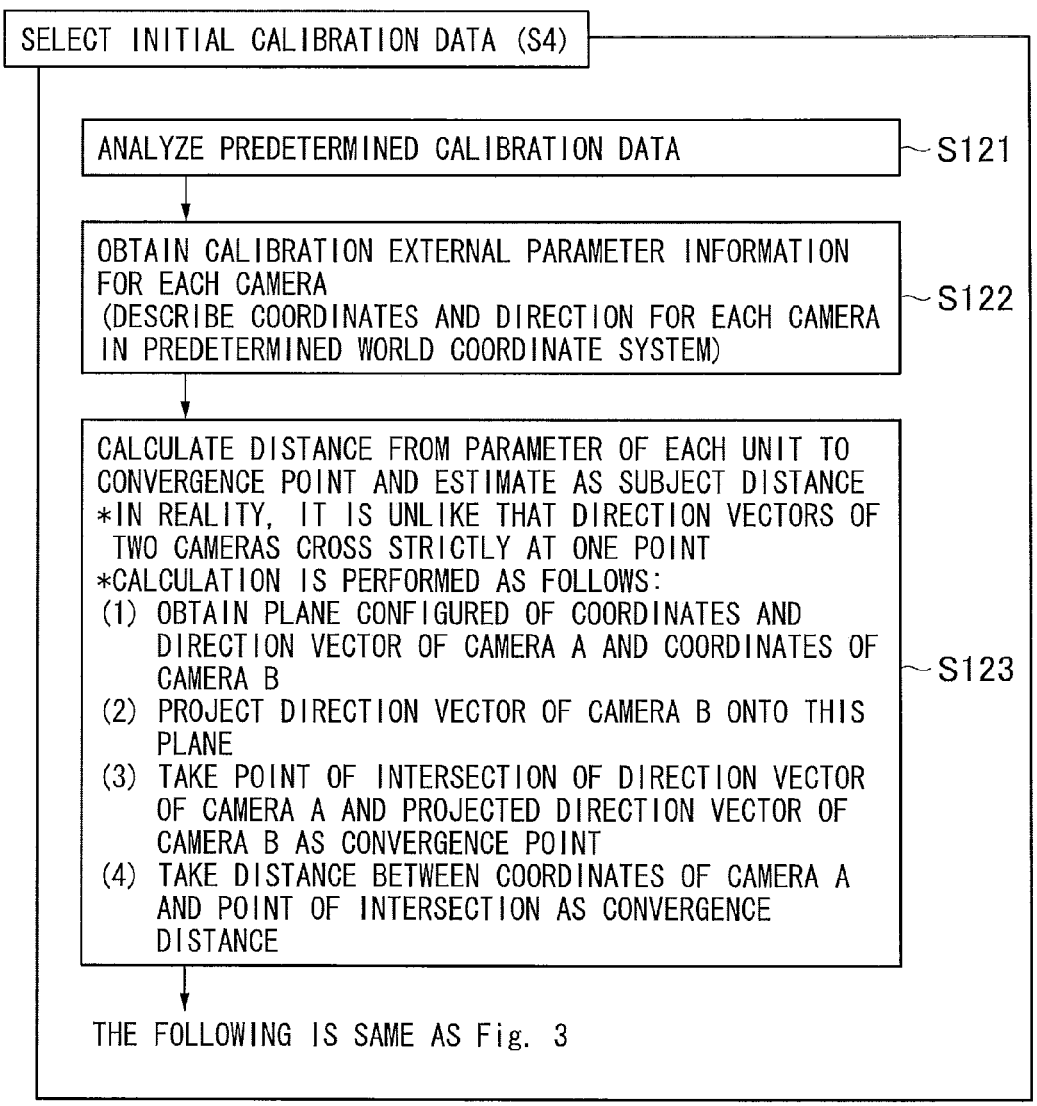
FIG. 87 is a flowchart of an initial calibration data selecting process in the twenty-second embodiment.

FIG. 87 is another detailed flowchart of the initial calibration data selecting process (S4) according to a twenty-second embodiment. This process can be executed in place of the process of FIG. 77, 80, 82, 83, 84, 85, or 86.

At S121, the distance initial estimating unit 25 obtains predetermined initial calibration parameters stored in advance in the calibration data storage unit 4.

At S122, the distance initial estimating unit 25 obtains external parameters of each image pickup means of the camera based on the obtained predetermined initial calibration parameters. The external parameters describe the positional coordinates of the camera and a direction of an optical axis of each image pickup means of the camera in a world coordinate system.

At S123, the distance initial estimating unit 25 calculates a convergence distance, which is a distance from the camera to a convergence point, based on the obtained external parameters. For example, a plane configured of position coordinates and a direction vector of an optical axis of image pickup means A of a camera in the world coordinate system and coordinates of image pickup means B of the camera is obtained. Next, a direction vector of the image pickup means B is projected onto this plane. Next, a point of intersection of the direction vector of the image pickup means A and the projected direction vector of the image pickup means B is taken as a convergence point. Then, a distance between the position coordinates of the image pickup means A and the convergence point is taken as a convergence distance. The distance initial estimating unit 25 estimates the calculated convergence distance as a subject distance.

Thereafter, the focal position selecting unit 41 selects a focal position corresponding to the estimated subject distance, the initial calibration data selecting unit 27 takes the selected focal position as a current focal position, and the initial calibration data selecting unit 27 executes S23 to 24 of FIG. 77.

Figure 88:
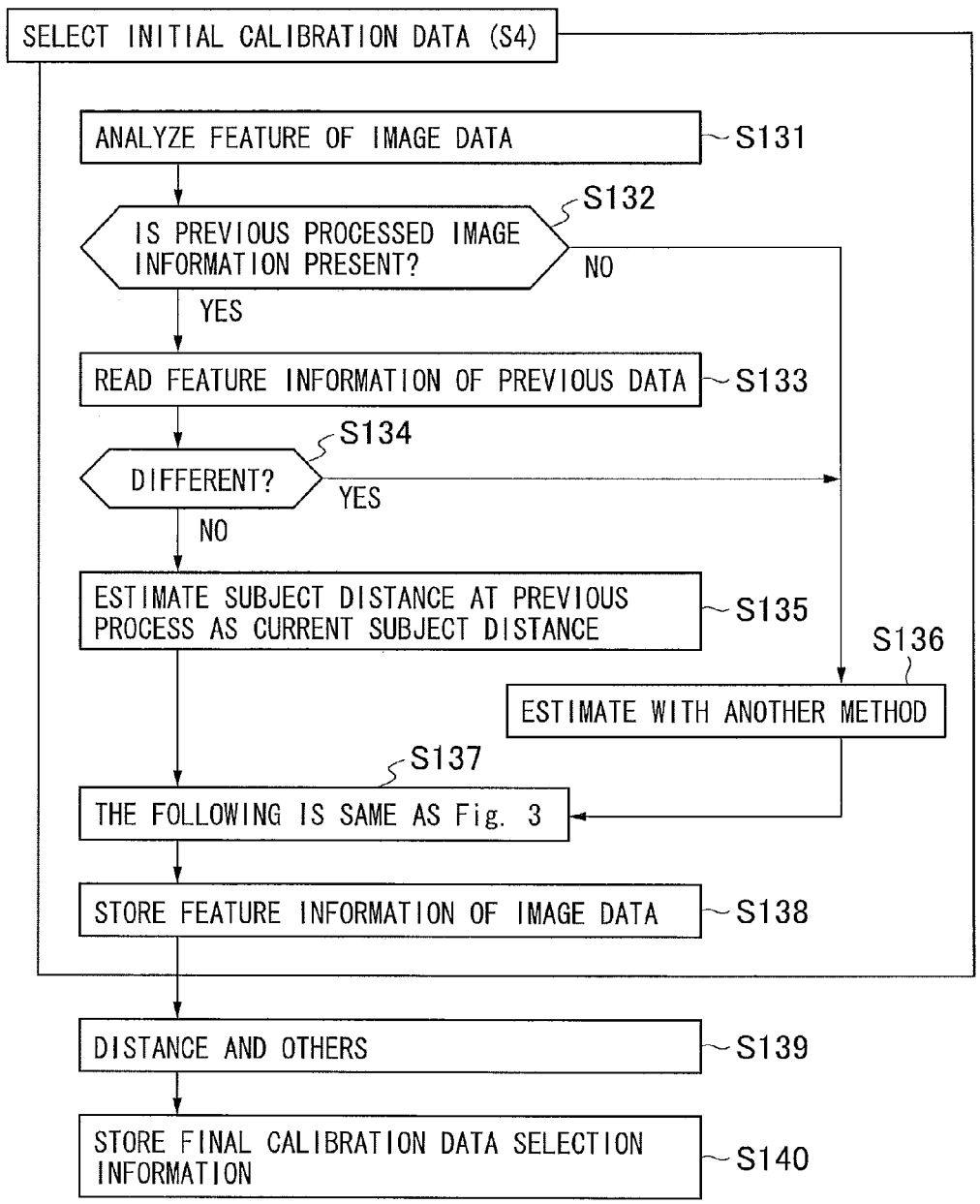
FIG. 88 is a flowchart of an initial calibration data selecting process in the twenty-third embodiment.
Figure 89:
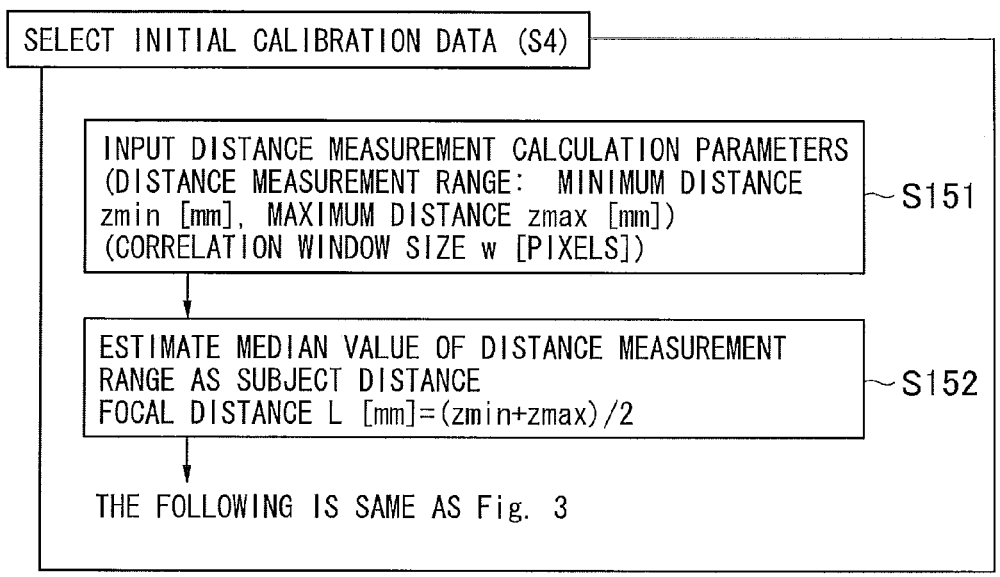
FIG. 89 is a flowchart of an initial calibration data selecting process in the twenty-fourth embodiment.

FIG. 88 is another detailed flowchart of the initial calibration data selecting process (S4) according to a twenty-third embodiment. This process can be executed in place of the process of FIG. 77, 80, 82, 83, 84, 85, 86, or 87.

At S131, a scene feature analyzing unit 35 analyzes a feature of the standard image currently inputted. The feature includes the presence or absence of a shooting mode and/or a subject person. The shooting mode may be obtained from the collateral information of the standard image as described above. The analysis results are stored in the scene feature storage unit 37.

At S132, the scene feature analyzing unit 35 judges whether the analysis result of the feature of the standard image previously inputted from the image input unit 1 is stored in the scene feature storage unit 37. If a judgment is made as Yes, the procedure goes to S133. If a judgment is mad as No, the procedure goes to S136.

At S133, the scene feature analyzing unit 35 obtains the analysis result of the feature of the previous standard image from the scene feature storage unit 37.

At S134, the scene feature analyzing unit 35 compares the analysis result of the feature of the previous standard image and the analysis result of the feature of the current standard image obtained at S131 with each other, and judges whether both are different. If a judgment is made as Yes, the procedure goes to S136. If a judgment is mad as No, the procedure goes to S135.

At S135, the distance initial estimating unit 25 estimates the estimated subject distance about the previous standard image as a subject distance about the current standard image.

At S136, the distance initial estimating unit 25 performs a desired initial calibration data selecting process different from the initial calibration data selecting process applied to the previous standard image (any one of the processes in FIGS. 77, 80, 82, 83, 84, 85, and 86) to estimate a subject distance. Which initial calibration data selecting process is to be performed may be specified with recorded data in the storage unit 101, or may be specified arbitrarily from a user interface.

At S137, the focal position selecting unit 41 selects a focal position corresponding to the subject distance estimated at S135 or S136 based on the focal position table 40. The initial calibration data selecting unit 27 executes the processes at S23 and S24 to create initial calibration data corresponding to the selected focal position.

At S138, the scene feature analyzing unit 35 stores the feature of the image data obtained at S131 in the scene feature storage unit 37.

The process is complete at S138. However, thereafter, at S139, the distance measurement calculation unit 29 performs a distance measurement for each pixel according the selected initial calibration data. Then, at S140, the created initial calibration data is stored in the calibration parameter storage unit 4, and distance measurement information is stored in the calibration parameter storage unit 4.

FIG. 88 is another detailed flowchart of the initial calibration data selecting process (S4) according to a twenty-fourth embodiment. This process can be executed in place of the process of FIG. 77, 80, 82, 83, 84, 85, 86, or 88.

At S151, the distance measurement calculation parameter input unit 39 accepts an input of a minimum distance zmin [mm] of a distance measurement region, a maximum distance zmax [mm] of the distance measurement region, and a correlation window size w [pixel]. These pieces of information may be set in the storage unit 101 in advance.

At S152, the distance initial estimating unit 25 estimates a median value of the inputted distance measurement range as a subject distance L. That is, the subject distance L [mm]= (zmin+zmax)/2.

Subsequently, the focal position selecting unit 41 selects a focal position corresponding to L, and the initial calibration data selecting unit 27 takes the focal position selected correspondingly to L as a current focal position to execute S23 to 24 of FIG. 77.

FIG. 90 illustrates the structure of calibration parameters stored in the calibration data storage unit 4 according to a twenty-fifth embodiment. Calibration parameters for each image pickup means of the camera corresponding to a plurality of predetermined focal positions include center coordinates of distortion parameters, coefficients, external parameter matrixes, and internal parameters. When the current focal position is between a plurality of predetermined focal positions, calibration parameters corresponding to the current focal positions are calculated with linear interpolation by, for example, interpolating or fitting calibration parameters corresponding to predetermined two focal positions adjacent to the obtained focal position.

FIG. 91 illustrates another structure of the calibration parameters stored in the calibration data storage unit 4.

The calibration parameters for each image pickup means of the camera corresponding to a plurality of predetermined focal positions include a function of center coordinates of distortion parameters, coefficients, external parameter matrixes, and focal distances and optical axis center coordinates of internal parameters. The function of each parameter is approximately represented by a polynomial expression with the focal position L defined in advance being taken as a parameter, and therefore only the coefficients are enough to be stored as a calibration parameter. For example, a polynomial expression representing a relation of a focal distance fx(L) is defined as $$fx(L)=fx_2*L^2+fx_1*L+fx_0.$$

In FIG. 91, the external parameters are represented by a 3×4 matrix. Elements of this matrix include one 3×3 rotation matrix and one three-dimensional vector, and the number of elements is 12. The internal parameters are represented by five elements. The distortion parameters are represented by four elements. Each element of each parameter is represented by an n-degree polynomial function (for example, n=2) with the focal position being taken as a variable. Therefore, in practice, only coefficients and constant terms corresponding to respective degrees of the polynomial function are enough to be stored as calibration parameters.

Figure 92:
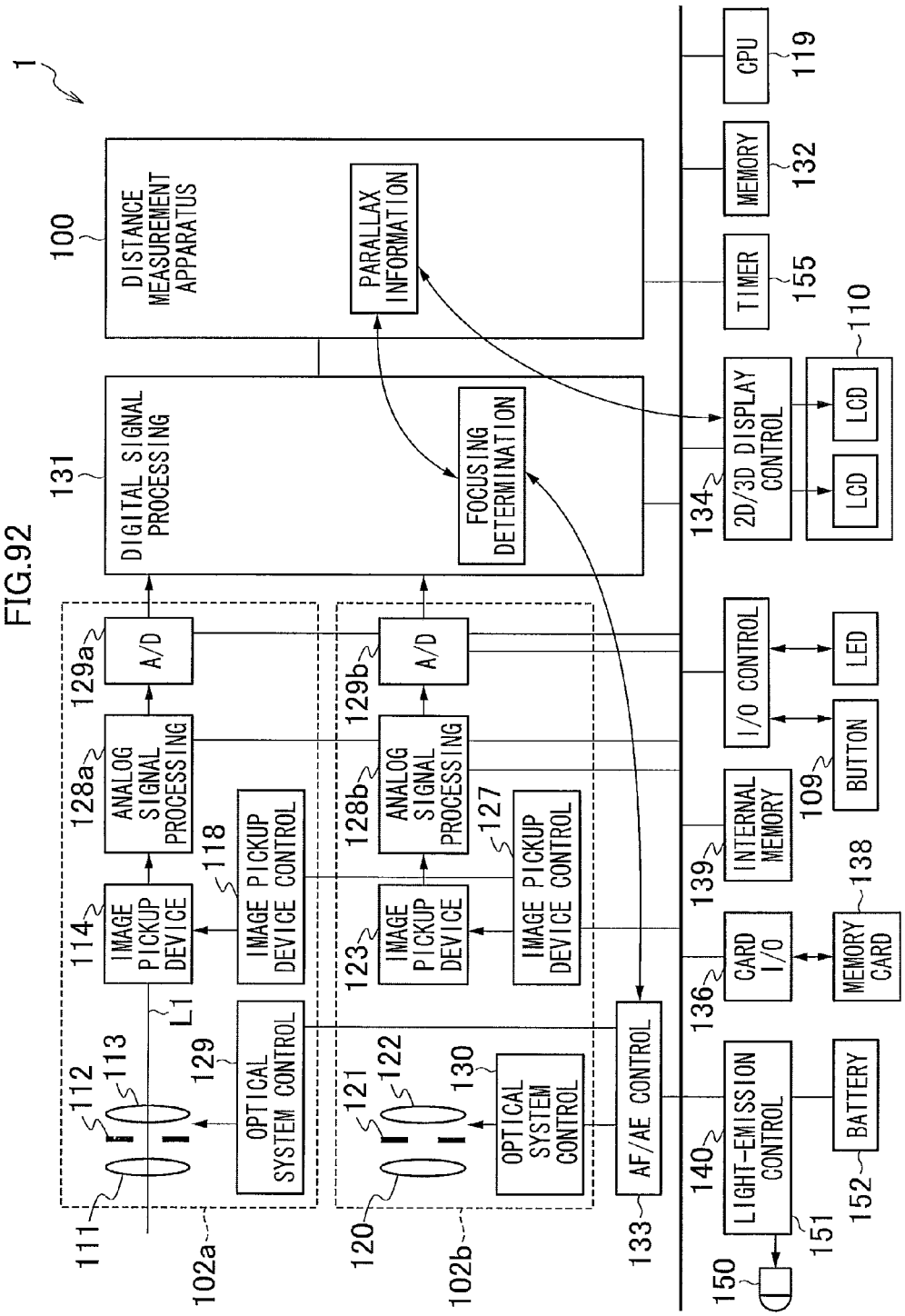
FIG. 92 is a diagram illustrating an electric structure of a camera.

FIG. 92 illustrates an electric structure of a camera that can provide a standard image and a reference image to the distance measuring apparatus 100 according to a twenty-sixth embodiment. A first image pickup unit 102a is configured of a first image pickup optical system including a first zoom lens 111, a first aperture 112, a first focus lens 113 arranged along a lens optical axis L1, and a first image pickup device 114. Although not illustrated in the drawing, a first zoom lens motor is connected to the first zoom lens 111, a first aperture motor is connected to the first aperture 112, and a first focus lens motor is connected to the first focus lens 113. Also, a first image pickup device control unit 118 including a timing generator (TG) is connected to the first image pickup device 114. The operation of each motor and the first image pickup device control unit 118 is controlled by a CPU 119, and an optical system control 129 makes an instruction for starting and ending actual driving of each motor according to the control by the CPU 119.

The optical system control 129 controls the first zoom lens motor, moving the first zoom lens 111 to a wide angle side or a telescopic side along the lens optical axis L according to a zoom operation from a button (an operating unit) 109, thereby changing a zoom magnification. The first aperture motor changes an aperture value (an f number) of the first aperture 112 at the time of AE (Auto Exposure) operation to limit a pencil of light, thereby adjusting exposure. The first focus lens motor moves the first focus lens 113 to an infinity side or a close-up side along the lens optical axis L1 at the time of AF (Auto Focus) operation to search for a focusing position, which is a focal position corresponding to the peak of an AF evaluation value, thereby adjusting focus.

The first image pickup device 114 is configured of a solid-state image pickup device, such as a CCD or CMOS, receiving subject light whose image is formed by the first image pickup optical system formed of the first zoom lens 111, the first aperture 112, and the first focus lens 113 and accumulating photocharge according to the light-receiving amount. The photocharge accumulating and transferring operation of the first image pickup device 114 is controlled by the image pickup device control unit 118. With a timing signal (a clock pulse) inputted from the image pickup device control unit 118, an electronic shutter speed (photoelectric charge accumulating time) is determined. The first image pickup device 114 obtains an image signal for one screen at each predetermined cycle, and sequentially inputs the signal to an analog signal processing circuit 128a.

The second image pickup unit 102b is configured in a manner similar to that of the first image pickup unit 102a, including a second image pickup optical system including a second zoom lens 120, a second aperture 121, and a second focus lens 122 arranged along a lens optical axis L2. Also, although not illustrated in the drawing, the second image pickup unit 102b includes a second zoom lens motor connected to the second zoom lens 120, a second aperture motor connected to the second aperture 121, a second focus lens motor connected to the second focus lens 122, and a second optical control unit 130 controlling driving of these components. Furthermore, the second image pickup unit 102b includes a second image pickup device control unit 127, which is a timing generator (TG) connected to the second image pickup device 123. The operation of each motor and the second image pickup device control unit 127 is controlled by the CPU 119.

The second image pickup device 123 obtains an image signal for one screen at each predetermined cycle, and sequentially inputs the signal to the analog signal processing circuit 128b.

The first image pickup unit 102a and the second image pickup unit 102b performs operations basically in an interlocked manner, but can be operated individually. Thus, a still picture can be shot by one unit and a moving picture can be shot by the other unit, and both can shot still pictures or moving pictures.

However, the second image pickup unit 102b may be configured in a manner simpler than that of the first image pickup unit 102a. For example, the second image pickup device 123 may be configured so as to be able to output at least a luminance signal, and may be configured with, for example, a monochrome CCD. Alternatively, the second image pickup unit 102b may not have a zoom function or an AF function.

The CPU 119 instructs the image pickup device control units 118 and 127 at the time when a shutter button of the operating unit 109 is pressed (or when a timer 155 finishes counting of a predetermined lapse of time) to supply exposure start signals toward image pickup devices 114 and 123. At this time, if the CPU 119 judges based on a photometry result that emission of fill light for shooting is required, in synchronization with the pressing of the shutter button, light-emission control means 151 is instructed to cause a light-emitting unit 150 configured of an LED and others to emit fill light for shooting. Note that light-emission power of the light-emitting unit 150 is supplied from a battery 152.

As such, once shooting is performed without emission of fill light for shooting when luminance of field is bright or with emission of fill light for shooting when luminance of field is dark, the CPU 119 instructs the image pickup device control units 118 and 127 and a generation circuit 121 to cause exposure end signals to be supplied toward the image pickup devices 114 and 123 after a lapse of a predetermined shutter second and cause image signals to be outputted from the image pickup devices 114 and 123 in synchronization with the exposure end signals.

Image pickup signals outputted from the first and second image pickup devices 114 and 123 are inputted to a correlated double sampling circuit (CDS) included in analog signal processes 128a and 128b, respectively (collectively referred to as an image pickup circuit 128). The CDS inputs image data of R, G, B accurately corresponding to the accumulated charge amount of each light-receiving element of the first and second image pickup devices 114 and 123 to an amplifier (AMP) for amplification. The amplified image pickup signals from the first and second image pickup devices 114 and 123 are inputted to A/D converters 129a and 129b, respectively (collectively referred to as an image pickup circuit 129). The A/D converter 129 converts the inputted image data from analog to digital. Through CDS and AMP included in the image pickup circuit 128 and the A/D converter 129, the image pickup signal of the first image pickup device 114 is outputted as first image data (a standard image), and the image pickup signal of the second image pickup device 123 is outputted as second image data (a reference image).

A digital signal processing circuit 131 performs various image processes, such as gray-scale transform, white balance correction, and γ correction process, on the first and second image data inputted from the A/D converter 129. A memory 132 temporarily stores the first and second image data subjected to various image processes at the digital signal processing circuit 131.

An AF/AE control unit 133 calculates an AF evaluation value and an AE evaluation value from each piece of the first and second image data stored in the memory 132. The AF evaluation value is calculated by adding up high-frequency components of luminance values regarding a predetermined AF region (for example, a center portion of the image or an entire region of the image) set in each image data, representing a degree of sharpness of the image. The high-frequency components of the luminance values are obtained by adding up differences in luminance (contrasts) between adjacent pixels in a predetermined region. Also, the AE evaluation value is calculated by adding up luminance values regarding a predetermined AE region (for example, a center portion of the image or an entire region of the image, and this region can be identical to the AF region) set in each image data, representing brightness of the image. The AF evaluation value and the AE evaluation value are used in the AF operation (auto focus control) and the AE control (auto exposure control) described above, respectively.

When a panorama shooting mode is selected from the operating unit 9, a 2D/3D display control unit 134 performs association and a merge so that overlapping regions of the first and second image data stored in the memory 132 are coupled together. An image obtained by the merge by the 2D/3D display control unit 134 is called a panorama image. The 2D/3D display control unit 134 stores the panorama image in the memory 132, and this panorama image data is displayed via the 2D/3D display control unit 134 onto the LCD 110 as a through image.

When a stereoscopic shooting mode is selected from the operating unit 9, the 2D/3D display control unit 134 converts the first and second image data stored in the memory 132 to a 3D image (stereoscopic image data) for the display unit 110 to perform stereoscopic display. A method for this is as illustrated in S9. When the display unit 110 is used as an electronic view finder in a shooting mode, the stereoscopic image data obtained by merging by the 2D/3D display control unit 134 is displayed on the display unit 110 as a through image.

When a simultaneous double shooting mode is selected from the operating unit 9, the 2D/3D display control unit 134 configures first and second image data each as individual and separate image data. The separate data is discriminated with a separation frame video supplied from an OSD signal generation circuit not illustrated, and is then displayed on the display unit 110 as a through image.

Upon input of a shooting instruction from the operating unit 109, a card I/O unit 136 performs a compressing process on the first and second image data (panorama image data, stereoscopic image data, or separate image data) stored in the memory 132 with a compression scheme, such as JPEG, MPEG, or the like. The card I/O unit 136 causes the image data subjected to the compressing process by the digital signal processing circuit 131 to be recorded in a recording medium 138 such as a memory card. Note that image data supporting different optical systems may be recorded in one image file or may be recorded in two or more independent image files.

However, in the collateral information of two independent image files (header information, tag information, and others), identification information (for example, "1") of the first image pickup unit 2a or identification information (for example, "2") of the second image pickup unit 2b shooting the image data, shooting date and time information, and a shooting mode selected at the time of shooting are recorded. With the sameness of the shooting date and time information, two images shot simultaneously are associated with each other.

Also, the CPU 119 writes, in the collateral information of the image file via the card I/O unit 136, the shooting mode, subject distance, subject position information, positions of the number of driving pulses corresponding to the focus lenses 113 and 122 at the time of shooting (an integrated value of driving pulse setting values from the time of starting the camera or from the time when the focus lenses 113 and 122 are driven to the edge of each driving range), pulse history, camera model, and position information of the AF region.

When the image data recorded in the recording medium 138 in this manner is reproduced and displayed on the display unit 110, each piece of image data in the recording medium 138 is read by the card I/O unit 136, and is subjected to an extending process by the digital signal processing circuit 131.

When the shooting mode in the collateral information corresponding to the read image data is a panorama shooting mode, the image data is converted by the 2D/3D display control unit 140 to a plain panorama image with overlapping regions superposed each other, and is then displayed as a reproduced image on the display unit 110.

When the shooting mode in the collateral information corresponding to the read image data is a stereoscopic shooting mode, the image data is converted by the 2D/3D display control unit 140 to stereoscopic image data, and is then displayed as a 3D reproduced image on the display unit 110. A method of conversion to stereoscopic image data is as illustrated in S9.

When the shooting mode in the collateral information corresponding to the read image data is a simultaneous shooting mode, the pieces of image data of two image files with the same shooting date and time information recorded in the header information are displayed on the same screen of the display unit 110, as being each arranged at a position corresponding to the identification information of the image pickup optical system (a left side or a right side in a two-eyed image pickup system).

Although a detailed structure of the display unit 110 is not illustrated, the display unit 110 includes a parallax barrier display layer on the surface. When performing stereoscopic display, the display unit 110 causes a parallax barrier to occur, which is formed of a pattern with a light transmitting part and a light shielding part alternately arranged on the parallax barrier layer with predetermined pitches, and causes strap-shaped image fragments indicating right and left images to be arranged and displayed on an image display surface of a lower layer of the barrier, thereby allowing pseudo-stereoscopic vision. Note that if the plane images obtained from the first image pickup unit 102a and the second image pickup unit 102b are reconfigured into strap-shaped image fragments and these fragments are not alternately arranged and only the right or left image obtained from either one of the first image pickup unit 102*a* and the second image pickup unit 102*b* is reconfigured into strap-shaped image fragments and these fragments are alternately arranged, the right and left eyes of an observer view the same plane image.

The CPU 119 controls the entire operation in a centralized manner. To the CPU 119, in addition to the operating unit 109 as described above, an internal memory 139 configured of a non-volatile memory such as an EEPROM is connected. The internal memory 139 stores programs and setting information for various controls. The CPU 119 executes various processes based on these programs and setting information.

The shutter button of the operating unit 109 has a two-step-pressing switch structure. When the shutter button is lightly pressed (pressed halfway down) during a shooting mode, the CPU 119 starts an AF operation and an AE operation to perform a shooting preparation process. In this state, when the shutter button is strongly pressed (pressed all the way down), the CPU 119 starts a shooting process, transferring first and second image data for one screen from the memory 132 to the recording medium 138 for recording.

The AF operation is performed by the CPU 119 finding a maximum value of the AF evaluation value calculated by the AF/AE control unit 133 from the first and second image data sequentially obtained while controlling the lens motors of the optical system control unit 129 to move the first and second focus lenses 113 and 122 in each predetermined direction. The AE operation is performed, after the AF operation is completed, by the CPU 119 controlling iris motors 18 and 27 and the image pickup device control units 118 and 127 based on the AE evaluation value calculated by the AF/AE control unit 133 and setting aperture values (f numbers) of the first and second apertures 12 and 21 and electronic shutter speeds of the first and second image pickup devices 114 and 123 according to a program diagram stored in advance in the internal memory 139 (configured of an EEPROM or the like).

A distance measuring apparatus 100 can take a structure similar to that of the distance measuring apparatus 100 of the fifteenth to twenty-fifth embodiments. The distance measuring apparatus 100 receives inputs first and second image data outputted from the digital signal processing circuit 131 or stored in the memory 132 as a standard image and a reference image. Which of the first and second image data is taken as a standard image, in other words, which of the first image pickup unit 102*a* and the second image pickup unit 102*b* is taken as standard image pickup means, is arbitrary. In any event, in the internal memory 139, information specifying which of the first image pickup unit 102*a* and the second image pickup unit 102*b* is taken as standard image pickup means as a source from which a standard image is to be obtained is recorded. According to that information, the distance measuring apparatus 100 discriminates between the standard image and the reference image.

With the standard image and the reference image obtained by at least one shooting by the first image pickup unit 102*a* and the second image pickup unit 102*b*, the distance measuring apparatus 100 can select initial calibration parameters, perform stereo matching, calculate a parallax, and measure a distance to a point on the subject corresponding to each pixel. Also, with the standard image and the reference image obtained by second and onward shooting, the distance measuring apparatus 100 can reselect and update calibration parameters. According to the three-dimensional information obtained by the distance measuring apparatus 100 according to the calibration parameters, the 2D/3D display control unit 134 can generate a distance image representing a stereoscopic shape of the subject for recording in the recording medium 138 and outputting to the display unit 110.

In the foregoing, while the present invention has been described as being divided into the first to twenty-sixth embodiments, it goes without saying that the present invention may be implemented with any combination of these embodiments.

Also, as a matter of course, the present invention is not restricted to the examples described in the specification or the examples illustrated in the drawings, and can be variously changed in design or improved within a range not deviating from the gist of the present invention.

REFERENCE SIGNS LIST

11 . . . image input unit, 12 . . . memory, 13 . . . designated number determining unit, 14 . . . calibration data obtaining unit, 15 . . . calibrating unit, 16 . . . parallax calculation unit, 17 . . . distance calculation unit, 18 . . . correlation degree calculation unit, 19, 38 . . . correlation degree comparing unit, 20 . . . distance recording unit, 21, 39 . . . vertical deviation amount calculation unit, 22 . . . vertical deviation amount comparing unit, 23 . . . parallax calculation/pixel count calculation unit, 24, 40 . . . parallax calculation/pixel count comparing unit, 25, 41 . . . local noise pixel count calculation unit, 26 . . . local noise pixel count comparing unit, 27 . . . representative distance determining unit, 28 . . . |designated distance–representative distance|calculation unit, 29 . . . |designated distance–representative distance|comparing unit, 30 . . . representative parallax determining unit, 31 . . . designated parallax calculation unit, 32 . . . |designated parallax–representative parallax|calculation unit, 33 . . . |designated parallax–representative parallax|comparing unit, 34 . . . designated distance determining unit, 35, 37 . . . |designated parallax–representative parallax|comparing unit, 36 . . . threshold determining unit, 51 . . . parallax histogram creating unit, 52 . . . most-frequent-value detecting unit, 53 . . . parallax selecting unit, 54 . . . filter, 55 . . . region-of-interest determining unit, 56 . . . weight determining unit

The invention claimed is:

1. A distance measuring apparatus comprising:
    an image input unit configured to input a plurality of viewpoint images obtained by capturing a subject from different viewpoints by a plurality of image pickup devices;
    a calibration data obtaining unit configured to obtain, regarding each of a plurality of distances of interest, a piece of calibration data corresponding to each of the plurality of distances of interest from a plurality of pieces of calibration data for matching two-dimensional coordinates of the viewpoint images and three-dimensional coordinates in a real space;
    an image correcting unit configured to correct, for each of the distances of interest, the plurality of viewpoint images based on each of the pieces of calibration data;
    a parallax calculation unit configured to calculate, for each of the distances of interest, a parallax between the plurality of corrected viewpoint images;
    a comparing unit configured to compare the corrected viewpoint images over the plurality of distances of interest to specify a piece of optimum calibration data from the plurality of pieces of calibration data;
    a distance calculation unit configured to calculate a subject distance based on the parallax; and
    an output unit configured to output, as a distance measurement result, the subject distance calculated from the parallax between the corrected viewpoint images with the piece of optimum calibration data.

2. The distance measuring apparatus according to claim 1, further comprising
a correlation degree calculation unit configured to calculate, for each of the distances of interest, a correlation degree of at least one of luminance and color between the plurality of corrected viewpoint images, wherein
the comparing unit compares the correlation degrees over the plurality of distances of interest to specify a piece of calibration data with the correlation degree being maximum as the piece of optimum calibration data.

3. The distance measuring apparatus according to claim 1, further comprising
a vertical deviation amount calculation unit configured to calculate, for each of the distances of interest, a vertical deviation amount between corresponding pixels between the plurality of corrected viewpoint images, wherein
the comparing unit compares the vertical deviation amounts over the plurality of distances of interest to specify a piece of calibration data with the vertical deviation amount being minimum as the piece of optimum calibration data.

4. The distance measuring apparatus according to claim 1, further comprising
a parallax-calculated pixel count calculating unit configured to calculate, for each of the distances of interest, a parallax-calculated pixel count that allows parallax calculation between the plurality of corrected viewpoint images, wherein
the comparing unit compares the parallax-calculated pixel counts over the plurality of distances of interest to specify a piece of calibration data with the parallax-calculated pixel count being maximum as the piece of optimum calibration data.

5. The distance measuring apparatus according to claim 1, further comprising
a local-noise pixel count calculation unit configured to calculate, for each of the distances of interest, a local-noise pixel count that is locally present in a parallax distribution of the plurality of corrected viewpoint images, wherein
the comparing unit compares the local-noise pixel counts over the plurality of distances of interest to specify a piece of calibration data with the local-noise pixel count being minimum as the piece of optimum calibration data.

6. The distance measuring apparatus according to claim 1, further comprising:
a distance-of-interest determining unit configured to determine a beginning distance of interest among the plurality of distances of interest and to determine the calculated subject distance as a next distance of interest to switch the distance of interest; and
a correlation degree calculation unit configured to calculate, for each of the distances of interest, a correlation degree of at least one of luminance and color between the plurality of corrected viewpoint images, wherein
the comparing unit compares the correlation degrees for each switching of the distance of interest and, when the correlation degree calculated after switching of the distance of interest is smaller than the correlation degree calculated before switching of the distance of interest, adopts the subject distance calculated before switching of the distance of interest as the distance measurement result.

7. The distance measuring apparatus according to claim 1, further comprising:
a distance-of-interest determining unit configured to determine a beginning distance of interest among the plurality of distances of interest and to determine the calculated subject distance as a next distance of interest to switch the distance of interest; and
a vertical deviation amount calculation unit configured to calculate, for each of the distances of interest, a vertical deviation amount between corresponding pixels between the plurality of corrected viewpoint images, wherein
the comparing unit compares the vertical deviation amounts for each switching of the distance of interest and, when the vertical deviation amount calculated after switching of the distance of interest is larger than the vertical deviation amount calculated before switching of the distance of interest, adopts the subject distance calculated before switching of the distance of interest as the distance measurement result.

8. The distance measuring apparatus according to claim 1, further comprising:
a distance-of-interest determining unit configured to determine a beginning distance of interest among the plurality of distances of interest and to determine the calculated subject distance as a next distance of interest to switch the distance of interest; and
a parallax-calculated pixel count calculating unit configured to calculate, for each of the distances of interest, a parallax-calculated pixel count that allows parallax calculation between the plurality of corrected viewpoint images, wherein
the comparing unit compares the parallax-calculated pixel counts for each switching of the distance of interest and, when the parallax-calculated pixel count calculated after switching of the distance of interest is smaller than the parallax-calculated pixel count calculated before switching of the distance of interest, adopts the subject distance calculated before switching of the distance of interest as the distance measurement result.

9. The distance measuring apparatus according to claim 1, further comprising:
a distance-of-interest determining unit configured to determine a beginning distance of interest among the plurality of distances of interest and to determine the calculated subject distance as a next distance of interest to switch the distance of interest; and
a local-noise pixel count calculation unit configured to calculate, for each of the distances of interest, a local-noise pixel count that is locally present in a parallax distribution of the plurality of corrected viewpoint images, wherein
the comparing unit compares the local-noise pixel counts for each switching of the distance of interest and, when the local-noise pixel count calculated after switching of the distance of interest is larger than the local-noise pixel count calculated before switching of the distance of interest, adopts the subject distance calculated before switching of the distance of interest as the distance measurement result.

10. The distance measuring apparatus according to claim 1, further comprising
a representative parallax determining unit configured to create a histogram indicating a relation between a parallax and a number of occurrences between the viewpoint images and to determine a representative parallax based on the number of occurrences in the histogram, wherein the distance calculation unit calculates the subject distance based on the representative parallax.

11. The distance measuring apparatus according to claim 10, wherein the representative parallax determining unit detects a most frequent value from the histogram, and determines the most frequent value as the representative parallax.

12. The distance measuring apparatus according to claim 10, wherein whether the number of occurrences is high or low is discriminated in the histogram, and a component of a pixel locally present is removed from the histogram.

13. The distance measuring apparatus according to claim 10, further comprising a region-of-interest determining unit configured to determine a region of interest for which the number of occurrences is to be calculated, wherein the number of occurrences is calculated restrictively to the region of interest to create the histogram.

14. The distance measuring apparatus according to claim 13, wherein the region-of-interest determining unit determines a calculation region for use in exposure control or focusing control at the time of shooting the viewpoint images as the region of interest.

15. The distance measuring apparatus according to claim 13, wherein the region-of-interest determining unit divides the viewpoint images into a plurality of divisional regions in an array, performs a frequency analysis for each of the divisional regions, and determines a divisional region having a high-frequency component as the region of interest.

16. The distance measuring apparatus according to claim 13, wherein the region-of-interest determining unit determines a specific target extraction region where a specific target is extracted from the viewpoint images as the region of interest.

17. The distance measuring apparatus according to claim 10, further comprising a weight determining unit determining a weight with respect to the number of occurrences based on a position of each of the pixels in the viewpoint images, wherein the histogram is created by weighting based on the weight.

18. The distance measuring apparatus according to claim 1, further comprising a representative distance determining unit configured to create a histogram indicating a relation between a distance and a number of occurrences of each of pixels of the viewpoint images and to determine a representative distance based on the number of occurrences in the histogram, wherein the distance calculation unit calculates a distance of each of the pixels, and the output unit outputs the representative distance as the distance measurement result.

19. The distance measuring apparatus according to claim 18, wherein the most frequent value is detected in the histogram, and the most frequent value is determined as the representative distance.

20. A distance measuring method comprising:

an image input step of inputting a plurality of viewpoint images obtained by capturing a subject from different viewpoints by a plurality of image pickup devices;

a calibration data obtaining step of obtaining, regarding each of a plurality of distances of interest, a piece of calibration data corresponding to each of the plurality of distances of interest from a plurality of pieces of calibration data for matching two-dimensional coordinates of the viewpoint images and three-dimensional coordinates in a real space;

an image correcting step of correcting, for each of the distances of interest, the plurality of viewpoint images based on each of the pieces of calibration data;

a parallax calculation step of calculating, for each of the distances of interest, a parallax between the plurality of corrected viewpoint images;

a comparing step of comparing the corrected viewpoint images over the plurality of distances of interest, thereby specifying a piece of optimum calibration data from the plurality of pieces of calibration data;

a distance calculation step of calculating a subject distance based on the parallax; and an output step of outputting, as a distance measurement result, the subject distance calculated from the parallax between the corrected viewpoint images with the piece of optimum calibration data.

21. The distance measuring method according to claim 20, further comprising a correlation degree calculation step of calculating, for each of the distances of interest, a correlation degree of at least one of luminance and color between the plurality of corrected viewpoint images, wherein the correlation degrees are compared over the plurality of distances of interest to specify a piece of calibration data with the correlation degree being maximum as the piece of optimum calibration data.

22. The distance measuring method according to claim 20, further comprising a vertical deviation amount calculation step of calculating, for each of the distances of interest, a vertical deviation amount between corresponding pixels between the plurality of corrected viewpoint images, wherein the vertical deviation amounts are compared over the plurality of distances of interest to specify a piece of calibration data with the vertical deviation amount being minimum as the piece of optimum calibration data.

23. The distance measuring method according to claim 20, further comprising a parallax-calculated pixel count calculating step of calculating, for each of the distances of interest, a parallax-calculated pixel count that allows parallax calculation between the plurality of corrected viewpoint images, wherein the parallax-calculated pixel counts are compared over the plurality of distances of interest to specify a piece of calibration data with the parallax-calculated pixel count being maximum as the piece of optimum calibration data.

24. The distance measuring method according to claim 20, further comprising a local-noise pixel count calculation step of calculating, for each of the distances of interest, a local-noise pixel count that is locally present in a parallax distribution of the plurality of corrected viewpoint images, wherein the local-noise pixel counts are compared over the plurality of distances of interest to specify a piece of calibration data with the local-noise pixel count being minimum as the piece of optimum calibration data.

25. The distance measuring method according to claim 20, wherein a first distance measurement is performed while the distance of interest is being changed with a second change width larger than a first change width to obtain a first subject distance, a second distance measurement is performed while the distance of interest being changed with the first change width near the first subject distance to obtain a second subject distance, and the second subject distance is outputted as the distance measurement result.

26. The distance measuring method according to claim 25, wherein a judgment criterion for the piece of optimum calibration data differs between the first distance measurement and the second distance measurement.

27. The distance measuring method according to claim 20, further comprising:

a step of determining a beginning distance of interest among a plurality of distances of interest;

a step of calculating, for each of the distances of interest, a correlation degree of at least one of luminance and color between the plurality of corrected viewpoint images; and a step of determining the calculated subject distance as a next distance of interest, thereby switching the distance of interest, wherein the correlation degrees are compared for each switching of the distance of interest and, when the correlation degree calculated after switching of the distance of interest is smaller than the correlation degree calculated before switching of the distance of interest, the subject distance calculated before switching of the distance of interest is adopted as the distance measurement result.

28. The distance measuring method according to claim 20, further comprising:

a step of determining a beginning distance of interest among a plurality of distances of interest;

a step of calculating, for each of the distances of interest, a vertical deviation amount between corresponding pixels between the plurality of corrected viewpoint images; and a step of determining the calculated subject distance as a next distance of interest, thereby switching the distance of interest, wherein the vertical deviation amounts are compared for each switching of the distance of interest and, when the vertical deviation amount calculated after switching of the distance of interest is larger than the vertical deviation amount calculated before switching of the distance of interest, the subject distance calculated before switching of the distance of interest is adopted as the distance measurement result.

29. The distance measuring method according to claim 20, further comprising:

a step of determining a beginning distance of interest among a plurality of distances of interest;

a step of calculating, for each of the distances of interest, a parallax-calculated pixel count that allows parallax calculation between the plurality of corrected viewpoint images; and a step of determining the calculated subject distance as a next distance of interest, thereby switching the distance of interest, wherein the parallax-calculated pixel counts are compared for each switching of the distance of interest and, when the parallax-calculated pixel count calculated after switching of the distance of interest is larger than the parallax-calculated pixel count calculated before switching of the distance of interest, the subject distance calculated before switching of the distance of interest is adopted as the distance measurement result.

30. The distance measuring method according to claim 20, further comprising:

a step of determining a beginning distance of interest among a plurality of distances of interest;

a step of calculating, for each of the distances of interest, a local-noise pixel count that is locally present in a parallax distribution of the plurality of corrected viewpoint images; and a step of determining the calculated subject distance as a next distance of interest, thereby switching the distance of interest, wherein the local-noise pixel counts are compared for each switching of the distance of interest and, when the local-noise pixel count calculated after switching of the distance of interest is larger than the local-noise pixel count calculated before switching of the distance of interest, the subject distance calculated before switching of the distance of interest is adopted as the distance measurement result.

31. The distance measuring method according to claim 20, wherein a histogram indicating a relation between a parallax and a number of occurrences between the viewpoint images is created to determine a representative parallax based on the number of occurrences in the histrogram, and the subject distance is calculated based on the representative parallax.

32. The distance measuring method according to claim 31, wherein a most frequent value is detected in the histogram, and the most frequent value is determined as the representative parallax.

33. The distance measuring method according to claim 31, wherein whether the number of occurrences is high or low is discriminated in the histogram, and a component of a pixel locally present is removed from the histogram.

34. The distance measuring method according to claim 31 wherein a region of interest for which the number of occurrences is to be calculated is determined, and the number of occurrences is calculated restrictively to the region of interest to create the histogram.

35. The distance measuring method according to claim 34, wherein a calculation region for use in exposure control or focusing control at the time of shooting the viewpoint images is determined as the region of interest.

36. The distance measuring method according to claim 34, wherein the viewpoint images are divided into a plurality of divisional regions in an array, a frequency analysis for each of the divisional regions, and a divisional region having a high-frequency component as the region of interest.

37. The distance measuring method according to claim 34 wherein a specific target extraction region where a specific target is extracted from the viewpoint images is determined as the region of interest.

38. The distance measuring method according to claim 31, wherein a weight with respect to the number of occurrences is determined based on a position of each of the pixels in the viewpoint images, and the histogram is created by weighting based on the weight.

39. The distance measuring method according to claim 20, wherein a histogram indicating a relation between a distance and a number of occurrences of each pixel of the viewpoint images is created, a representative distance is determined based on the number of occurrences in the histogram, and the representative distance is outputted as the distance measurement result.

40. The distance measuring method according to claim 39, wherein a most frequent value is detected in the histogram, and the most frequent value is determined as the representative distance.

41. A distance measuring apparatus comprising:

an image input unit configured to input a plurality of viewpoint images obtained by capturing a subject from different viewpoints by a plurality of image pickup devices;

a calibration data obtaining unit configured to obtain, regarding each of a plurality of distances of interest, a piece of calibration data corresponding to each of the plurality of distances of interest from a plurality of pieces of calibration data for matching two-dimensional coordinates of the viewpoint images and three-dimensional coordinates in a real space;

an image correcting unit configured to correct, for each of the distances of interest, the plurality of viewpoint images based on each of the pieces of calibration data;

a parallax calculation unit configured to calculate, for each of the distances of interest, a parallax between the plurality of corrected viewpoint images;

a distance calculation unit configured to calculate, for each of the distances of interest, a subject distance based on the parallax;

a comparing unit configured to compare differences each between the subject distance and the distance of interest over the plurality of distances of interest to specify a piece of optimum calibration data from the plurality of pieces of calibration data; and an output unit configured to output, as a distance measurement result, the subject distance calculated from the parallax between the corrected viewpoint images with the piece of optimum calibration data.

42. A distance measuring apparatus comprising:

an image input unit configured to input a plurality of viewpoint images obtained by capturing a subject from different viewpoints by a plurality of image pickup devices;

a calibration data obtaining unit configured to obtain, regarding each of a plurality of distances of interest, a piece of calibration data couesponding to each of the plurality of distances of interest from a plurality of pieces of calibration data for matching two-dimensional coordinates of the viewpoint images and three-dimensional coordinates in a real space;

a first parallax calculation unit configured to calculate, for each of the distances of interest, a first parallax based on the distance of interest;

an image correcting unit configured to correct, for each of the distances of interest, the plurality of viewpoint images based on each of the pieces of calibration data;

a second parallax calculation unit configured to calculate, for each of the distances of interest, a second parallax between the plurality of corrected viewpoint images;

a comparing unit configured to compare differences each between the first parallax and the second parallax over the plurality of distances of interest to specify a piece of optimum calibration data from the plurality of pieces of calibration data;

a distance calculation unit configured to calculate a subject distance based on the second parallax of the corrected viewpoint image with the piece of optimum calibration data; and an output unit configured to output the calculated subject distance as a distance measurement result.

43. A distance measuring apparatus comprising:

an image input unit configured to input a plurality of viewpoint images obtained by capturing a subject from different viewpoints by a plurality of image pickup devices;

a calibration data obtaining unit configured to obtain, regarding each of a plurality of distances of interest, a piece of calibration data corresponding to each of the plurality of distances of interest from a plurality of pieces of calibration data for matching two-dimensional coordinates of the viewpoint images and three-dimensional coordinates in a real space;

an image correcting unit configured to correct, for each of the distances of interest, the plurality of viewpoint images based on each of the pieces of calibration data;

a parallax calculation unit configured to calculate, for each of the distances of interest, a parallax between the plurality of corrected viewpoint images;

a distance calculation unit configured to calculate, for each of the distances of interest, a subject distance based on the parallax;

a distance difference calculation unit configured to calculate, for each of the distances of interest, a difference between the subject distance and the distance of interest;

a distance-of-interest determining unit configured to determine a beginning distance of interest among the plurality of distances of interest and to determine the calculated subject distance as a next distance of interest to switch the distance of interest;

a comparing unit configured to compare the differences before and after switching of the distance of interest to select a distance measurement result from the plurality of calculated subject distances; and an output unit configured to output the distance measurement result.

44. A distance measuring apparatus comprising:

an image input unit configured to input a plurality of viewpoint images obtained by capturing a subject from different viewpoints by a plurality of image pickup devices;

a calibration data obtaining unit configured to obtain, regarding each of a plurality of distances of interest, a piece of calibration data corresponding to each of the plurality of distances of interest from a plurality of pieces of calibration data for matching two-dimensional coordinates of the viewpoint images and three-dimensional coordinates in a real space;

an image correcting unit configured to correct, for each of the distances of interest, the plurality of viewpoint images based on each of the pieces of calibration data;

a parallax calculation unit configured to calculate, for each of the distances of interest, a parallax between the plurality of corrected viewpoint images;

a distance calculation unit configured to calculate, for each of the distances of interest, a subject distance based on the parallax;
a distance-of-interest determining unit configured to determine a beginning distance of interest among the plurality of distances of interest and to determine the calculated subject distance as a next distance of interest to switch the distance of interest;
a distance difference calculation unit configured to calculate, for each of the distances of interest, a difference between the subject distance and the distance of interest;
a comparing unit configured to compare the difference and a threshold; and
an output unit configured to output the calculated subject distance as a distance measurement result when the difference is smaller than the threshold.

45. A distance measuring method comprising:
an image input step of inputting a plurality of viewpoint images obtained by capturing a subject from different viewpoints by a plurality of image pickup devices;
a calibration data obtaining step of obtaining, regarding each of a plurality of distances of interest, a piece of calibration data corresponding to each of the plurality of distances of interest from a plurality of pieces of calibration data for matching two-dimensional coordinates of the viewpoint images and three-dimensional coordinates in a real space;
an image correcting step of correcting, for each of the distances of interest, the plurality of viewpoint images based on each of the pieces of calibration data;
a parallax calculation step of calculating, for each of the distances of interest, a parallax between the plurality of corrected viewpoint images;
a distance calculation step of calculating, for each of the distances of interest, a subject distance based on the parallax;
a comparing step of comparing differences each between the subject distance and the distance of interest over the plurality of distances of interest, thereby specifying a piece of optimum calibration data from the plurality of pieces of calibration data; and
an output step of outputting, as a distance measurement result, the subject distance calculated from the parallax between the corrected viewpoint images with the piece of optimum calibration data.

46. A distance measuring method comprising:
an image input step of inputting a plurality of viewpoint images obtained by capturing a subject from different viewpoints by a plurality of image pickup devices;
a calibration data obtaining step of obtaining, regarding each of a plurality of distances of interest, a piece of calibration data corresponding to each of the plurality of distances of interest from a plurality of pieces of calibration data for matching two-dimensional coordinates of the viewpoint images and three-dimensional coordinates in a real space;
a first parallax calculation step of calculating, for each of the distances of interest, a first parallax based on the distance of interest;
an image correcting step of correcting, for each of the distances of interest, the plurality of viewpoint images based on each of the pieces of calibration data;
a second parallax calculation step of calculating, for each of the distances of interest, a second parallax between the plurality of corrected viewpoint images;
a comparing step of comparing differences each between the first parallax and the second parallax over the plurality of distances of interest, thereby specifying a piece of optimum calibration data from the plurality of pieces of calibration data;
a distance calculation step of calculating a subject distance based on the second parallax of the corrected viewpoint image with the piece of optimum calibration data; and
an output step of outputting the calculated subject distance as a distance measurement result.

47. A distance measuring method comprising:
an image input step of inputting a plurality of viewpoint images obtained by capturing a subject from different viewpoints by a plurality of image pickup devices;
a calibration data obtaining step of obtaining, regarding each of a plurality of distances of interest, a piece of calibration data corresponding to each of the plurality of distances of interest from a plurality of pieces of calibration data for matching two-dimensional coordinates of the viewpoint images and three-dimensional coordinates in a real space;
a step of determining a beginning distance of interest among the plurality of distances of interest;
an image correcting step of correcting, for each of the distances of interest, the plurality of viewpoint images based on each of the pieces of calibration data;
a parallax calculation step of calculating, for each of the distances of interest, a parallax between the plurality of corrected viewpoint images;
a distance calculation step of calculating, for each of the distances of interest, a subject distance based on the parallax;
a step of determining the calculated subject distance as a next distance of interest, thereby switching the distance of interest;
a comparing step of calculating, for each of the distances of interest, a difference between the subject distance and the distance of interest and comparing the differences before and after switching of the distance of interest, thereby selecting a distance measurement result from the plurality of calculated subject distances; and
an output step of outputting the distance measurement result.

48. The distance measuring method according to claim 47, wherein
a judgment criterion for the piece of optimum calibration data differs between a first distance measurement for determining the beginning distance of interest and obtaining an initial subject distance and a second distance measurement for determining the subject distance obtained in the first distance measurement as a next distance of interest and obtaining the subject distance as the distance measurement result.

49. A distance measuring method comprising:
an image input step of inputting a plurality of viewpoint images obtained by capturing a subject from different viewpoints by a plurality of image pickup devices;
a step of determining a beginning distance of interest among a plurality of distances of interest;
a calibration data obtaining step of obtaining, regarding each of the plurality of distances of interest, a piece of calibration data corresponding to each of the plurality of distances of interest from a plurality of pieces of calibration data for matching two-dimensional coordinates of the viewpoint images and three-dimensional coordinates in a real space;
an image correcting step of correcting, for each of the distances of interest, the plurality of viewpoint images based on each of the pieces of calibration data;

a parallax calculation step of calculating, for each of the distances of interest, a parallax between the plurality of corrected viewpoint images;

a distance calculation step of calculating, for each of the distances of interest, a subject distance based on the parallax;

a step of determining the calculated subject distance as a next distance of interest, thereby switching the distance of interest;

a comparing step of calculating, for each of the distances of interest, a difference between the subject distance and the distance of interest and comparing the difference and a threshold; and an output step of outputting the calculated subject distance as a distance measurement result when the difference is smaller than the threshold.

50. A distance measuring apparatus comprising:

an image input unit configured to input a plurality of viewpoint images obtained by capturing a same subject from different viewpoints by an image pickup apparatus capable of focus adjustment;

a calibration parameter storage unit configured to store calibration parameters corresponding to focal positions in the image pickup apparatus;

a distance estimating unit configured to obtain a piece of shooting mode information included in the viewpoint images or a piece of collateral information of the viewpoint images, and to estimate a subject distance from the image pickup apparatus to the subject, based on a relation between a piece of previously stored shooting mode information and a shooting distance;

a focal position selecting unit configured to select a focal position based on the subject distance estimated by the distance estimating unit;

an initial calibration data setting unit configured to set a piece of initial calibration data for use in initial distance measurement calculation for the subject from the calibration parameters stored in the calibration parameter storage unit based on the focal position selected by the focal position selecting unit; and a distance measurement calculation unit configured to calculate a subject distance based on the piece of initial calibration data set by the initial calibration data setting unit and a parallax between the plurality of viewpoint images.

51. The distance measuring apparatus according to claim 50, further comprising:

a judging unit configured to evaluate the distance calculated by the distance measurement calculation unit and to judge success or failure of distance measurement calculation; and a calibration parameter resetting unit configured to reset a calibration parameter applicable to the subject distance from the calibration parameters stored in the calibration parameter storage unit according to the judgment result of the judging unit.

52. The distance measuring apparatus according to claim 51, wherein the distance estimating unit estimates the subject distance based on a piece of collateral information of the viewpoint images, the initial calibration data setting unit sets the piece of initial calibration data for use in the initial distance measurement calculation for the subject based on the subject distance estimated by the distance estimating unit and the calibration parameters stored in the calibration parameter storage unit, and the judging unit creates a piece of reliability information indicating reliability of the initial calibration data set by the piece of initial calibration data setting unit based on the result of the distance measurement calculation by the distance measurement calculation unit, and judges success or failure of the distance measurement calculation based on the reliability information.

53. The distance measuring apparatus according to claim 52, wherein the judging unit selects a condition for judging success or failure of the distance measurement calculation according to the reliability information.

54. The distance measuring apparatus according to claim 51, wherein the calibration parameter resetting unit extracts a pair of pieces of calibration data corresponding to top two focal positions adjacent to the focal position when the judging unit judges that the distance measuring calculation fails, interpolates the extracted pair of pieces of calibration data and prepares and resets a calibration parameter corresponding to a calibration parameter corresponding to the focal position.

55. The distance measuring apparatus according to claim 50, wherein the distance estimating unit estimates the subject distance based on a piece of information about a shot scene obtained by analyzing the viewpoint images or a piece of shot-scene information included in the piece of collateral information.

56. The distance measuring apparatus according to claim 50, wherein the distance estimating unit estimates the subject distance based on a piece of size information of the subject obtained by analyzing the viewpoint images or a piece of subject size information included in the piece of collateral information.

57. The distance measuring apparatus according to claim 56, wherein the distance estimating unit estimates the subject distance based on a comparison between a size of a human subject included in the viewpoint images and a standard size of the human subject.

58. The distance measuring apparatus according to claim 50, wherein the distance estimating unit estimates the subject distance based on a parallax in a focus evaluation value calculation region of the viewpoint images.

59. The distance measuring apparatus according to claim 50, wherein the distance estimating unit estimates the subject distance based on a convergence distance of the image pickup apparatus.

60. The distance measuring apparatus according to claim 59, further comprising a convergence distance storage unit configured to store a convergence distance for each model of the image pickup apparatus, wherein the distance estimating unit estimates the subject distance based on a convergence distance corresponding to a model of the image pickup apparatus capturing the viewpoint images among the convergence distances stored in the convergence distance storage unit.

61. The distance measuring apparatus according to claim 59, further comprising an external parameter obtaining unit configured to obtain an external parameter of the image pickup apparatus, wherein the distance estimating unit calculates the convergence distance of the image pickup apparatus from the external parameter of the image pickup apparatus obtained by the external parameter obtaining unit, and estimates the calculated convergence distance as the subject distance.

62. The distance measuring apparatus according to claim 50, further comprising
a distance measurement calculation parameter input unit configured to receive an input of a parameter regarding distance measurement calculation, wherein
the distance estimating unit estimates the subject distance from the parameter inputted from the distance measurement calculation parameter input unit.

63. The distance measuring apparatus according to claim 50, wherein
the calibration parameter storage unit stores calibration parameters corresponding to respective focal points set in a discrete manner.

64. The distance measuring apparatus according to claim 50, wherein
the calibration parameter storage unit stores functions defining calibration parameters corresponding to respective focal points.

65. An image pickup apparatus comprising:
a focal position control unit configured to control a focal position of each of focus lenses of different image pickup optical systems; and
an image pickup unit capable of outputting a plurality of viewpoint images obtained by image pickup devices photoelectrically converting subject images formed via the image pickup optical systems to an image input unit included in the distance measuring apparatus according to claim 50.

66. A distance measuring system comprising:
the distance measuring apparatus according to claim 50
a focal position control unit configured to control a focal position of each of focus lenses of different image pickup optical systems; and
an image pickup unit capable of outputting a plurality of viewpoint images obtained by image pickup devices photoelectrically converting subject images formed via the image pickup optical systems to an image input unit of the distance measuring apparatus.

67. A distance measuring apparatus comprising:
an image input unit configured to input a plurality of viewpoint images obtained by capturing a same subject from different viewpoints by an image pickup apparatus capable of focus adjustment;
a calibration parameter storage unit configured to store calibration parameters corresponding to focal positions in the image pickup apparatus;
a distance estimating unit configured to estimate a subject distance from the image pickup apparatus to the subject, based on the viewpoint images or a piece of collateral information of the viewpoint images;
a focal position selecting unit configured to select a focal position based on the subject distance estimated by the distance estimating unit;
an initial calibration data setting unit configured to set a piece of initial calibration data for use in initial distance measurement calculation for the subject from the calibration parameters stored in the calibration parameter storage unit based on the focal position selected by the focal position selecting unit;
a distance measurement calculation unit configured to calculate a subject distance based on the piece of initial calibration data set by the initial calibration data setting unit and a parallax between the plurality of viewpoint images; and
a feature storage unit configured to store features of the viewpoint images, wherein
the distance estimating unit compares a feature of a previous viewpoint image stored in the feature storage unit and a feature of a current viewpoint image, and estimates a subject distance of the previous viewpoint image as the subject distance of the current viewpoint image only when the feature of the previous view point image stored in the feature storage unit and the feature of a current view point image are identical to each other.

68. A distance measuring method comprising the steps, to be executed by an information processing apparatus, of:
inputting a plurality of viewpoint images obtained by capturing a same subject from different viewpoints by an image pickup apparatus capable of focus adjustment;
storing calibration parameters corresponding to focal positions in the image pickup apparatus;
obtaining a piece of shooting mode information included in the viewpoint images or a piece of collateral information of the viewpoint images, and estimating a subject distance from the image pickup apparatus to the subject, based on a relation between a piece of previously stored shooting mode information and a shooting distance
selecting a focal position based on the estimated subject distance;
setting a piece of initial calibration data for use in initial distance measurement calculation for the subject from the stored calibration parameters based on the selected focal position; and
calculating a subject distance based on the piece of set initial calibration data and a parallax between the plurality of viewpoint images.

69. A distance measuring method comprising the steps, to be executed by an information processing apparatus, of:
inputting a plurality of viewpoint images obtained by capturing a same subject from different viewpoints by an image pickup apparatus capable of focus adjustment;
storing calibration parameters corresponding to focal positions in the image pickup apparatus;
storing features of the viewpoint images;
estimating a subject distance from the image pickup apparatus to the subject, based on the viewpoint images or a piece of collateral information of the viewpoint images, wherein a feature of a previous viewpoint image stored in the feature storage unit and a feature of a current viewpoint image are compared, and a subject distance of the previous viewpoint image is estimated as the subject distance of the current viewpoint image only when the feature of the previous view point image stored in the feature storage unit and the feature of a current view point image are identical to each other;
selecting a focal position based on the estimated subject distance;
setting a piece of initial calibration data for use in initial distance measurement calculation for the subject from the stored calibration parameters based on the selected focal position; and
calculating a subject distance based on the piece of set initial calibration data and a parallax between the plurality of viewpoint images.

* * * * *